US 10,766,480 B2
Sep. 8, 2020

(12) United States Patent
Wu et al.

(54) HYBRID CONSTRUCTION MACHINE

(71) Applicants: SUMITOMO HEAVY INDUSTRIES, LTD., Tokyo (JP); SUMITOMO(S.H.I.) CONSTRUCTION MACHINERY CO., LTD., Tokyo (JP)

(72) Inventors: Chunnan Wu, Kanagawa (JP); Hideaki Kanbayashi, Kanagawa (JP); Kyoko Takanashi, Kanagawa (JP)

(73) Assignees: SUMITOMO HEAVY INDUSTRIES, LTD., Tokyo (JP); SUMITOMO(S.H.I.) CONSTRUCTION MACHINERY CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/670,039

(22) Filed: Aug. 7, 2017

(65) Prior Publication Data

US 2017/0335547 A1 Nov. 23, 2017

Related U.S. Application Data

(63) Continuation of application No. 13/128,256, filed as application No. PCT/JP2009/069057 on Nov. 9, 2009, now Pat. No. 9,725,008.

(30) Foreign Application Priority Data

Nov. 10, 2008 (JP) .................................. 2008-288191
Nov. 10, 2008 (JP) .................................. 2008-288192

(Continued)

(51) Int. Cl.
  *B60W 20/50* (2016.01)
  *B60K 6/48* (2007.10)
  (Continued)

(52) U.S. Cl.
  CPC ............... *B60W 20/50* (2013.01); *B60K 6/48* (2013.01); *B60L 1/003* (2013.01); *B60L 1/20* (2013.01);
  (Continued)

(58) Field of Classification Search
  USPC .......................................................... 701/22
  See application file for complete search history.

(56) References Cited

U.S. PATENT DOCUMENTS 3,571,662 A * 3/1971 Paine .................. H02H 7/1213
  361/101
3,866,702 A * 2/1975 Eastham .................. B60L 7/14
  180/65.8

(Continued)

FOREIGN PATENT DOCUMENTS

EP 1157873 11/2001
JP S64-043067 2/1989

(Continued)

OTHER PUBLICATIONS

International Search Report for PCT/JP2009/069057 dated Feb. 16, 2010.

(Continued)

*Primary Examiner* — Jean Paul Cass
(74) *Attorney, Agent, or Firm* — IPUSA PLLC

(57) ABSTRACT

A hybrid construction machine includes: a motor generator system connected to an internal combustion engine and performing a motor generator operation; an electric power accumulation system connected to the motor generator system; a load drive system connected to the electric power (Continued)

accumulation system and being driven electrically; an abnormality detection part equipped to the motor generator system, the electric power accumulation system and the load drive system; and a main control part determining whether an abnormality has occurred based on a detection value of the abnormality detection part. When the abnormality determination part determines that an abnormality has occurred, the main control part stops a drive of a drive system in which the abnormality is detected in the load drive system.

13 Claims, 56 Drawing Sheets

(30) Foreign Application Priority Data

| Nov. 10, 2008 | (JP) | 2008-288193 |
|---|---|---|
| Nov. 10, 2008 | (JP) | 2008-288194 |
| Apr. 9, 2009 | (JP) | 2009-094860 |
| Apr. 13, 2009 | (JP) | 2009-097250 |

(51) Int. Cl.

| B60L 1/00 | (2006.01) |
|---|---|
| B60L 3/00 | (2019.01) |
| B60W 10/06 | (2006.01) |
| B60W 10/08 | (2006.01) |
| B60W 10/30 | (2006.01) |
| B60W 50/029 | (2012.01) |
| E02F 9/20 | (2006.01) |
| E02F 9/22 | (2006.01) |
| E02F 9/26 | (2006.01) |
| E02F 9/12 | (2006.01) |
| B60W 30/188 | (2012.01) |
| F02D 29/06 | (2006.01) |
| B60L 50/61 | (2019.01) |
| B60L 58/24 | (2019.01) |
| B60L 50/16 | (2019.01) |
| B60K 6/442 | (2007.10) |
| B60W 20/00 | (2016.01) |

(52) U.S. Cl.
CPC .......... *B60L 3/0023* (2019.01); *B60L 50/16* (2019.02); *B60L 50/61* (2019.02); *B60L 58/24* (2019.02); *B60W 10/06* (2013.01); *B60W 10/08* (2013.01); *B60W 10/30* (2013.01); *B60W 30/1886* (2013.01); *B60W 50/029* (2013.01); *E02F 9/123* (2013.01); *E02F 9/2058* (2013.01); *E02F 9/2075* (2013.01); *E02F 9/2091* (2013.01); *E02F 9/2246* (2013.01); *E02F 9/26* (2013.01); *F02D 29/06* (2013.01); *B60K 6/442* (2013.01); *B60L 2200/40* (2013.01); *B60W 20/00* (2013.01); *B60W 2510/242* (2013.01); *B60Y 2200/25* (2013.01); *B60Y 2200/412* (2013.01); *Y02T 10/6217* (2013.01); *Y02T 10/6221* (2013.01); *Y02T 10/6286* (2013.01); *Y02T 10/705* (2013.01); *Y02T 10/7005* (2013.01); *Y02T 10/7077* (2013.01); *Y02T 10/7258* (2013.01)

(56) References Cited

U.S. PATENT DOCUMENTS

| 4,090,114 | A | * | 5/1978 | Thompson | H02P 7/2825 318/139 |
|---|---|---|---|---|---|
| 4,256,196 | A | * | 3/1981 | Waddington | B60K 1/00 180/65.7 |
| 4,562,393 | A | * | 12/1985 | Loyzim | H02P 7/04 318/257 |
| 5,161,634 | A | * | 11/1992 | Ichihara | B60K 31/047 180/170 |
| 5,266,891 | A | * | 11/1993 | Kumar | G01R 31/34 324/750.3 |
| 5,294,871 | A | * | 3/1994 | Imaseki | B60L 3/10 318/139 |
| 5,297,019 | A | * | 3/1994 | Zuehlke | B66C 13/18 701/50 |
| 5,345,155 | A | * | 9/1994 | Masaki | B60L 15/2036 318/400.07 |
| 5,350,992 | A | * | 9/1994 | Colter | H02M 7/48 318/805 |
| 5,357,181 | A | * | 10/1994 | Mutoh | B60L 3/0038 318/139 |
| 5,414,339 | A | * | 5/1995 | Masaki | B60L 3/003 318/800 |
| 5,485,375 | A | * | 1/1996 | Tamaki | B60L 3/04 180/65.8 |
| 5,565,760 | A | * | 10/1996 | Ball | B60L 15/2009 322/23 |
| 5,661,380 | A | * | 8/1997 | Obara | B60L 3/0023 318/139 |
| RE36,454 | E | * | 12/1999 | Ball | B60L 15/2009 322/23 |
| 6,199,018 | B1 | * | 3/2001 | Quist | G01M 13/028 318/806 |
| 6,226,582 | B1 | * | 5/2001 | Adsett | B66F 9/20 180/315 |
| 6,427,100 | B1 | * | 7/2002 | Kaku | B60K 6/48 701/22 |
| 6,575,257 | B1 | * | 6/2003 | Ikkai | B60L 15/10 180/65.1 |
| 6,580,239 | B1 | * | 6/2003 | Tamaki | B60L 3/0023 318/434 |
| 6,778,097 | B1 | * | 8/2004 | Kajita | E02F 3/437 340/12.5 |
| 6,885,920 | B2 | * | 4/2005 | Yakes | A62C 27/00 701/22 |
| 7,181,370 | B2 | * | 2/2007 | Furem | E02F 9/205 701/50 |
| 7,242,311 | B2 | * | 7/2007 | Hoff | E02F 9/20 340/425.5 |
| 8,200,400 | B2 | * | 6/2012 | Filla | B60K 6/48 701/50 |
| 2003/0125852 | A1 | * | 7/2003 | Schade | H04L 43/0817 701/33.4 |
| 2003/0132729 | A1 | | 7/2003 | Yoshimatsu | |
| 2003/0158638 | A1 | * | 8/2003 | Yakes | B60L 58/34 701/22 |
| 2006/0164028 | A1 | * | 7/2006 | Welchko | H02P 27/06 318/105 |
| 2007/0120530 | A1 | * | 5/2007 | Nozaki | B60L 3/0046 320/130 |
| 2007/0227470 | A1 | * | 10/2007 | Cole | H02K 11/048 123/3 |
| 2009/0052215 | A1 | * | 2/2009 | Watanabe | H02M 7/53873 363/131 |
| 2009/0058086 | A1 | * | 3/2009 | Arinaga | F03D 9/255 290/44 |
| 2009/0231811 | A1 | * | 9/2009 | Tokuyama | H01L 23/473 361/699 |
| 2009/0261599 | A1 | * | 10/2009 | Alston | B60L 15/2045 290/40 B |
| 2011/0051371 | A1 | * | 3/2011 | Azuma | B60K 6/445 361/699 |
| 2011/0193509 | A1 | * | 8/2011 | Ooyama | H02M 1/12 318/503 |
| 2011/0273141 | A1 | * | 11/2011 | Kanbayashi | E02F 9/2025 320/134 |
| 2012/0053773 | A1 | * | 3/2012 | Gustavsson | B66C 23/40 701/22 |

(56) References Cited

U.S. PATENT DOCUMENTS

2012/0098336 A1\* 4/2012 Gurunathan ............ H02M 1/10
307/18
2018/0030690 A1\* 2/2018 Hita ...................... B60W 10/06

FOREIGN PATENT DOCUMENTS

| JP | H07-071805 | 3/1995 |
| --- | --- | --- |
| JP | H10-103112 | 4/1998 |
| JP | 2000-308253 | 11/2000 |
| JP | 2000-319932 | 11/2000 |
| JP | 2001-329573 | 11/2001 |
| JP | 2002-242234 | 8/2002 |
| JP | 2006-296112 | 10/2006 |
| JP | 2007-204924 | 8/2007 |
| JP | 2008-038503 | 2/2008 |
| JP | 2010-106464 | 5/2010 |
| JP | 2010-106561 | 5/2010 |

OTHER PUBLICATIONS

Japanese Office Action for JP2008-279985 dated May 17, 2011.
Japanese Office Action for JP2008-225252 dated Jan. 24, 2012.

\* cited by examiner

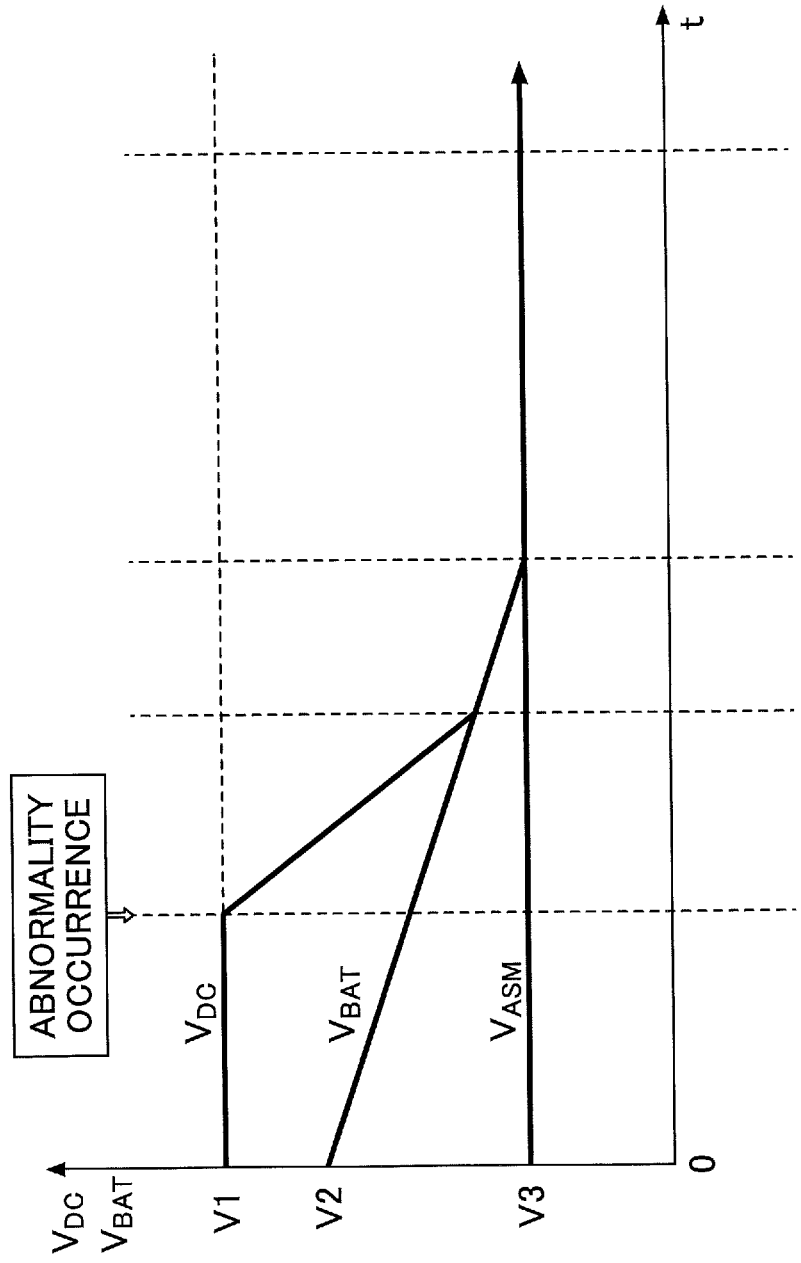

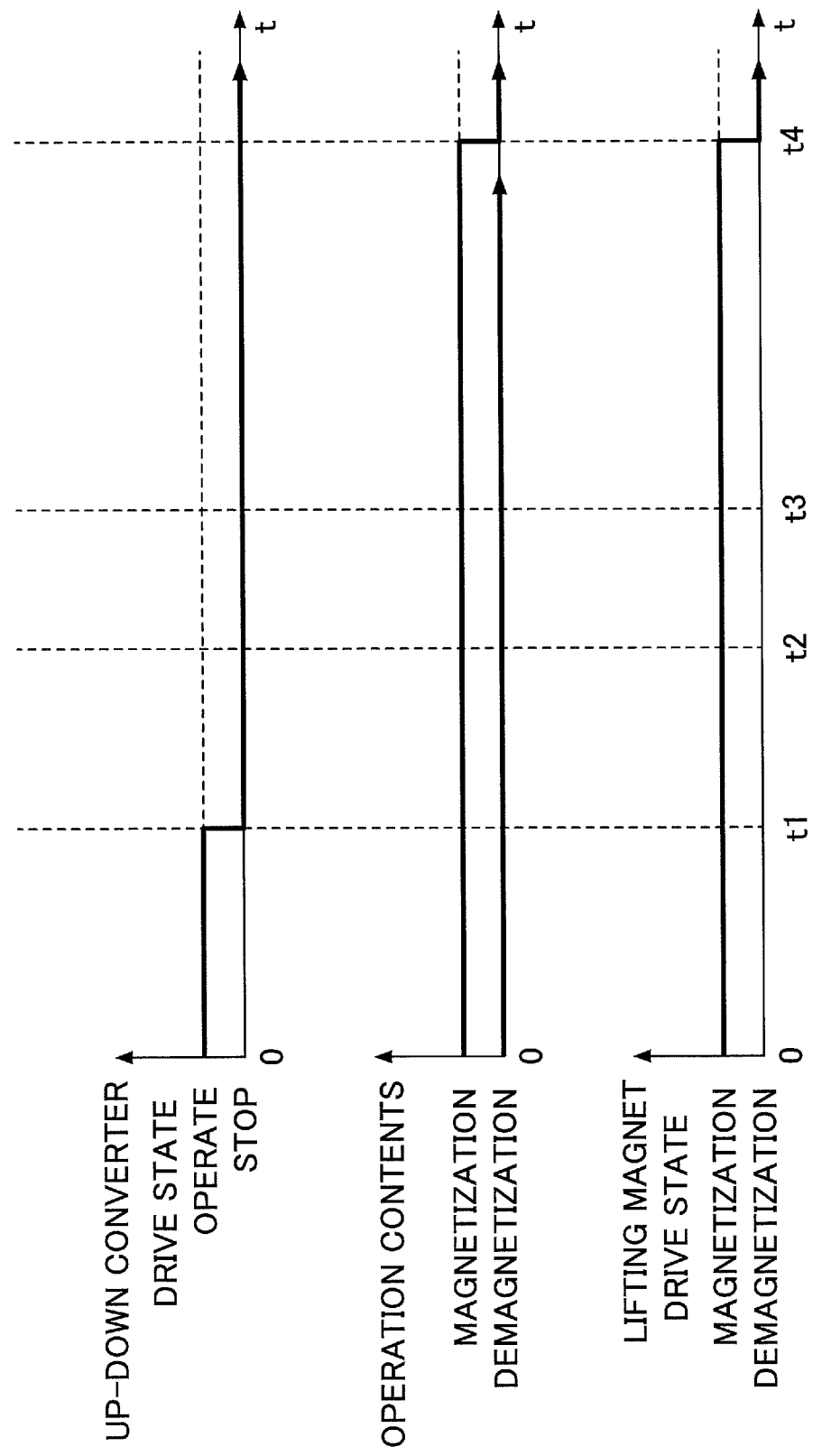

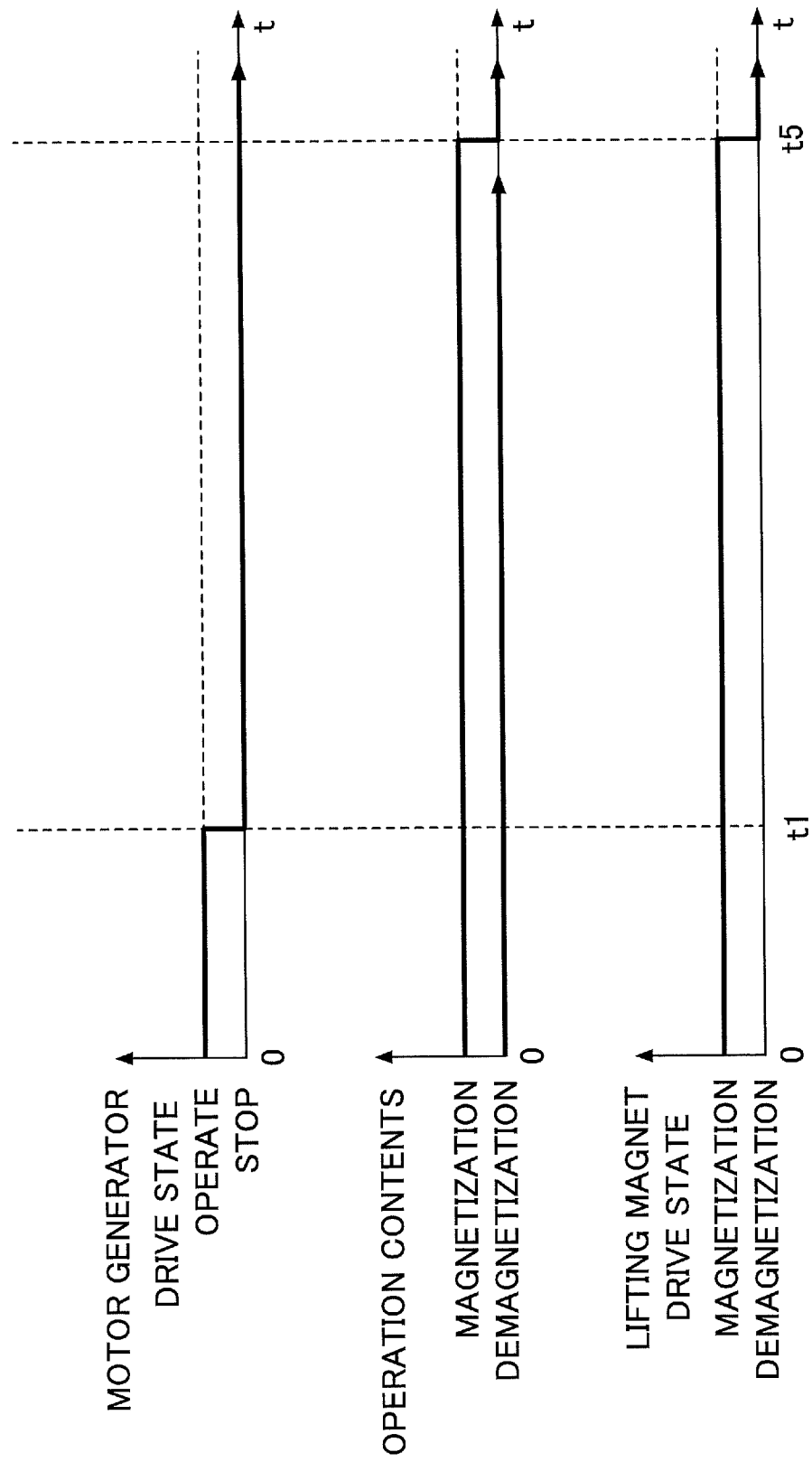

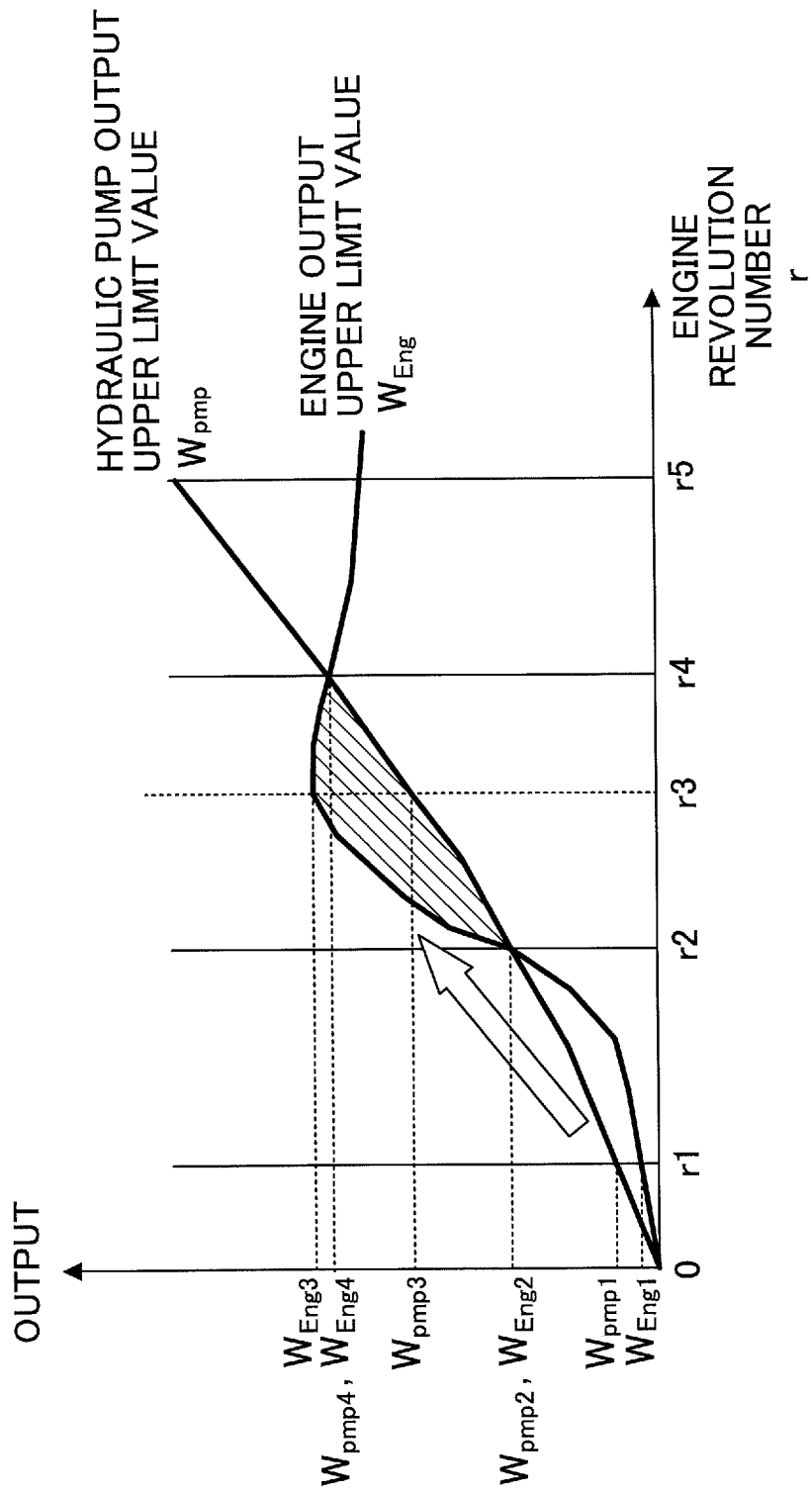

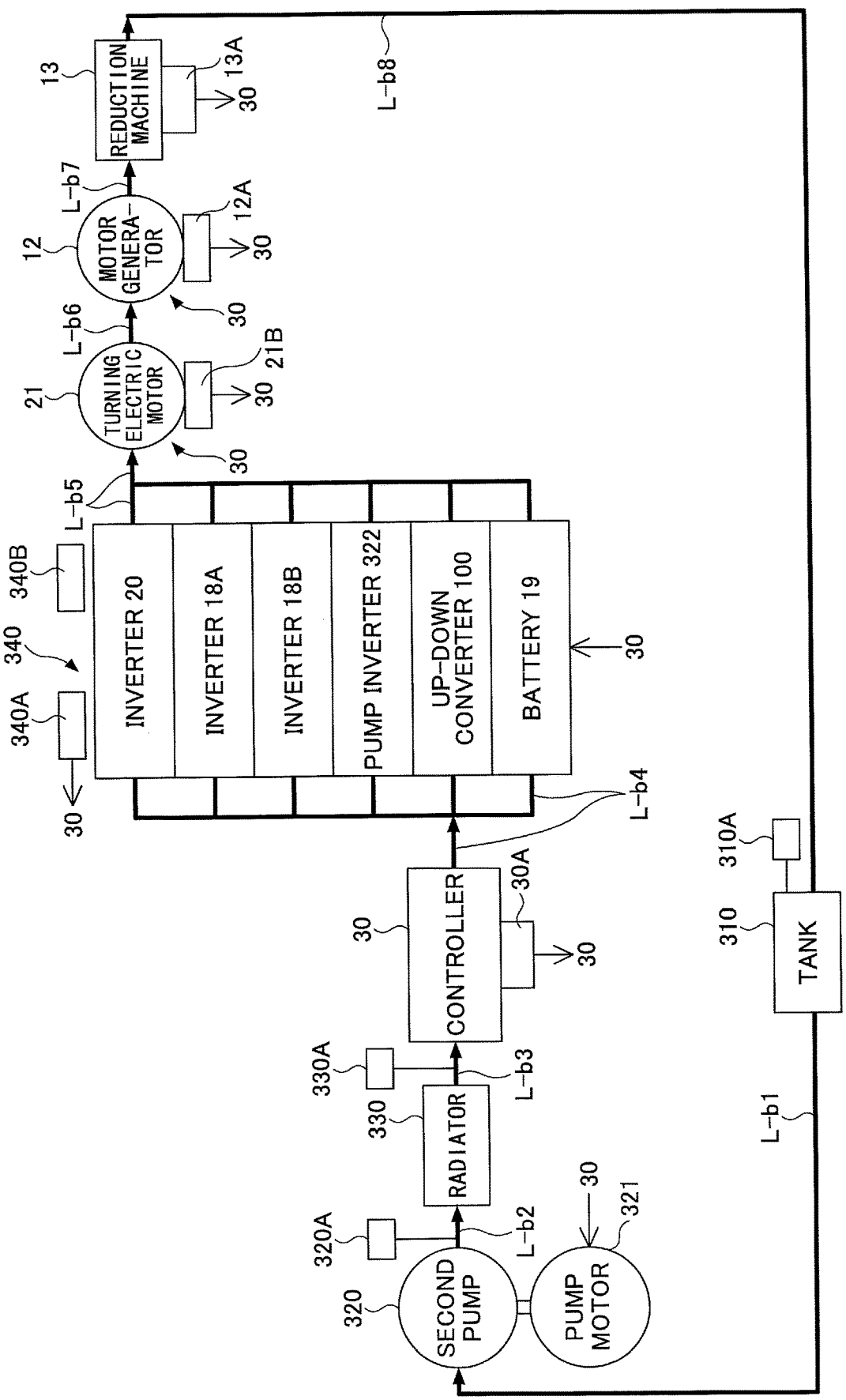

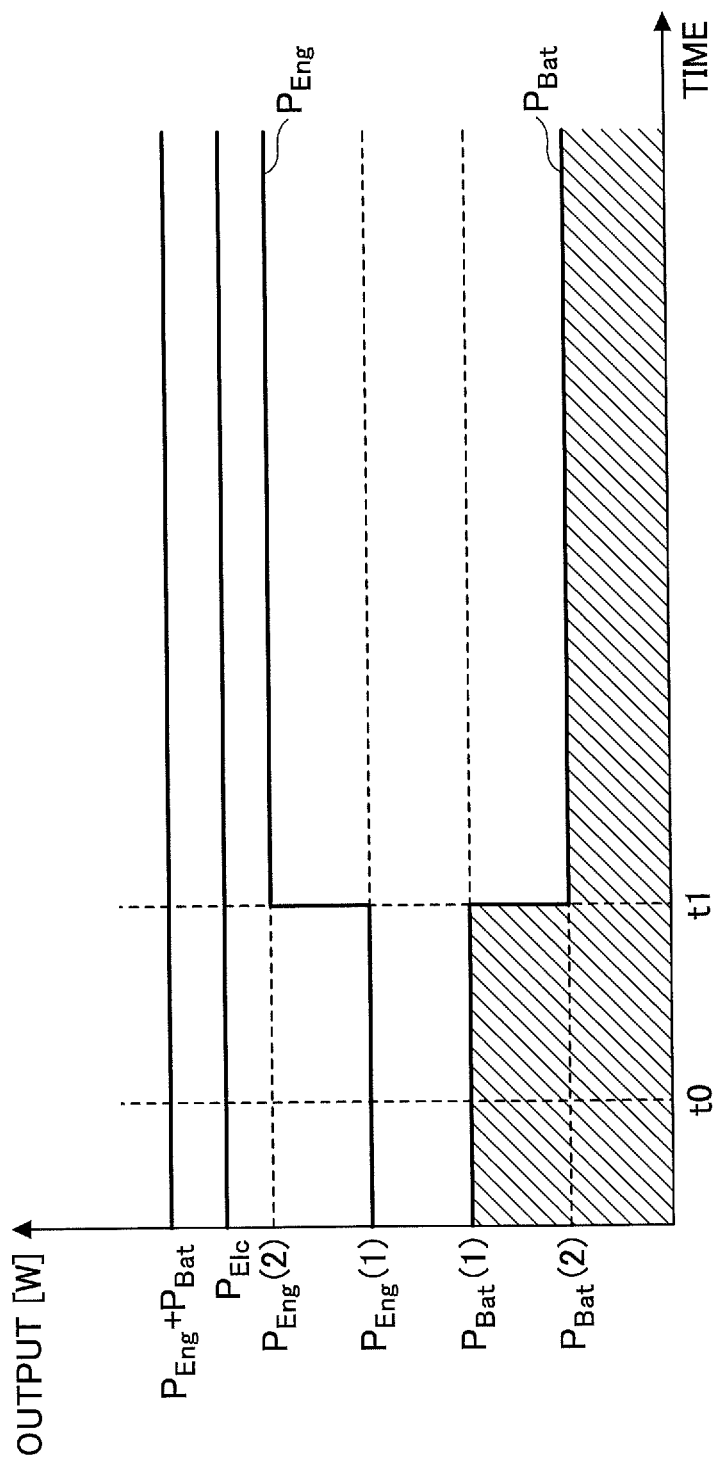

HYBRID CONSTRUCTION MACHINE

CROSS-REFERENCE TO RELATED APPLICATIONS

The present application is a continuation of U.S. patent application Ser. No. 13/128,256, filed on May 9, 2011, which is the National Stage of International Application No. PCT/JP2009/069057, filed on Nov. 9, 2009, which is based upon and claims priority to Japanese Patent Application No. 2008-288191 filed on Nov. 10, 2008, Japanese Patent Application No. 2008-288192 filed on Nov. 10, 2008, Japanese Patent Application No. 2008-288193 filed on Nov. 10, 2008, Japanese Patent Application No. 2008-288194 filed on Nov. 10, 2008, Japanese Patent Application No. 2009-094860 filed on Apr. 9, 2009, and Japanese Patent Application No. 2009-097250 filed on Apr. 13, 2009, and is also based upon Japanese Patent Application No. 2008-225252 filed on Sep. 2, 2008, Japanese Patent Application No. 2008-277224 filed on Oct. 28, 2008, and Japanese Patent Application No. 2008-279985 filed on Oct. 30, 2008. The disclosures of the prior applications are hereby incorporated herein in their entirety by reference.

BACKGROUND OF THE INVENTION

1. Field of the Invention

The present invention relates to a hybrid construction machine, which performs a control of electric power supply to a load and a control of supply of a regenerative electric power obtained from a load to a capacitor.

2. Description of the Related Art

In recent years, a hybrid construction machine of which a part of a drive mechanism is electrically driven is suggested. Such a construction machine is equipped with a hydraulic pump to hydraulically drive a work element, such as a boom, an arm and a bucket, in many cases. Generally, a hydraulic pump is driven by an engine. Then, a motor generator is connected to the engine, which drives the hydraulic pump, via reduction gears. The motor generator assists a drive of the engine, and the electric power obtained by generation-operating the motor generator is charged to a capacitor.

There is suggested a construction machine, which is equipped with an electric motor in addition to a hydraulic motor as a power source of a turning mechanism to turn an upper part turning body, wherein a drive of the hydraulic motor is assisted by the electric motor when accelerating the turning mechanism, and a regenerating operation is performed by the electric motor when decelerating the turning mechanism to charge the generated electric power to a battery (for example, refer to Patent Document 1).

PRIOR ART DOCUMENT

Patent Document

PATENT DOCUMENT 1: Japanese Laid-Open Patent Application No. 10-103112

SUMMARY OF THE INVENTION

In a conventional hybrid construction machine, a control of charge and discharge is not performed especially, and a control of a supply voltage to a motor generator or an electric motor is not performed, either. For this reason, there is a possibility that a supply voltage to an electric work element, such as a motor generator for assistance, an electric motor for turning, etc., becomes unstable. When failure occurs in the electric work element, such as a motor generator for assistance, an electric motor for turning, etc., or in a drive control system such as an inverter to drive them, it becomes difficult to appropriately control a motor operation and a generating operation of the motor generator for assistance or a power-running operation and a regenerating operation of the electric motor for turning. In a worst case, it is possible that controls of the motor generator and the electric motor cannot be performed at all.

Such a problem may arise similarly, when an abnormality occurs in an electric work element other than a motor generator for assistance and an electric motor for turning or in a drive control system such as an inverter to drive such an electric work element. Moreover, in a conventional hybrid construction equipment, when an abnormality occurs in a drive control system such as a motor generator and an inverter as mentioned above, a normal inverter, in which no abnormality occurs, may be damaged if a large amount of electric power is generated by a generating operation of the motor generator for assistance or a regenerating operation of the electric motor for turning.

Thus, it is an object of the present invention to provide a hybrid construction machine, which attempts to stabilize a supply voltage to a motor generator and an electric work element and further attempts to improve reliability by enabling a drive control of an electric work element such as a motor generator and an electric motor for turning over a certain time period even when an abnormality occurs in the electric work element such as a motor generator and an electric motor for turning or in a drive control system to drive them.

There is provided according to the present invention a hybrid construction machine comprising: a motor generator system connected to an internal combustion engine and performing a motor generator operation; an electric power accumulation system connected to the motor generator system; a load drive system connected to the electric power accumulation system and being driven electrically; an abnormality detection part equipped to the motor generator system, the electric power accumulation system and the load drive system; and a main control part determining whether an abnormality has occurred based on a detection value of the abnormality detection part, wherein, when the abnormality determination part determines that an abnormality has occurred, the main control part stops a drive of a drive system in which the abnormality is detected in said load drive system.

According to the present invention, even if an abnormality occurs in the electric work element, such as a motor generator for assistance and a motor for turning, and the drive control system that drives these, it is possible to cause a drive control of the electric work element, such as a motor generator for assistance and an electric motor for turning, to be performed over a certain period of time. Thereby, a hybrid construction machine of which reliability is improved can be provided.

BRIEF DESCRIPTION OF THE DRAWINGS

FIG. 18A is a graph illustrating transition of each voltage in a case where an abnormality occurs in a voltage up-down converter in the hybrid construction machine according to the eleventh embodiment of the present invention.

FIG. 18B is a graph illustrating transition of a drive state of the voltage up-down converter, a drive state of a lifting magnet and contents of an operation of the lifting magnet by an operator in a case when an abnormality occurs in a voltage up-down converter in the hybrid construction machine according to the eleventh embodiment of the present invention.

FIG. 19B is a graph illustrating transition of a drive state of a motor generator, a drive state of a lifting magnet and a content of an operation of the lifting magnet by an operator when an abnormality occurs in an inverter in the hybrid construction machine according to the eleventh embodiment of the present invention.

FIG. 24A is a graph in which an output upper limit value of an engine and an output upper limit value of a main pump are plotted with respect to an engine revolution when an abnormality occurs in a motor generator or an inverter in a hybrid construction machine according to a fifth embodiment of the present invention.

FIG. 27B is an illustration illustrating a motor generator, reduction gears and turning electric motor and a cooling path of a drive control system of those parts of the hybrid construction machine according to the seventeenth embodiment of the present invention.

FIG. 42 is a graph illustrating an example of changes in an engine output and a battery output before and after the time at which an abnormality occurs in an electric power accumulation system in the twentieth embodiment of the present invention.

DETAILED DESCRIPTION OF THE PREFERRED EMBODIMENTS

A description will be given below, with reference to the drawings, of hybrid construction machines according to various embodiments of the present invention.

Figure 1:
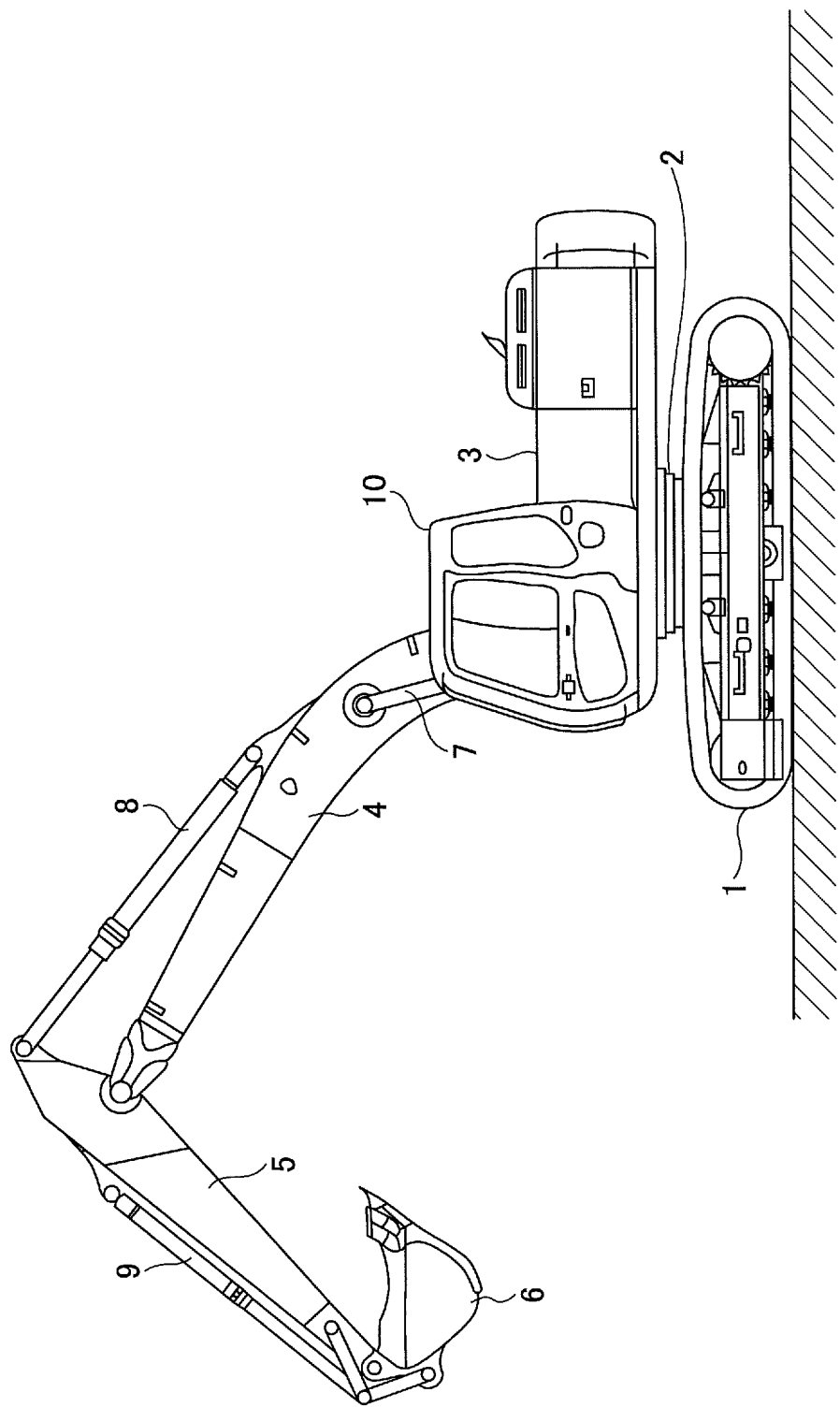
FIG. 1 is a side view of a hydraulic shovel, which is an example of a hybrid construction machine according to a first embodiment of the present invention.

FIG. 1 is a side view of a hydraulic shovel, which is an example of a hybrid construction machine according to a first embodiment of the present invention.

An upper-part turning body 3 is mounted on a lower-part running body 1 via a turning mechanism 2. A boom 4, an arm 5 and a bucket 6, and a boom cylinder 7, an arm cylinder 8 and a bucket cylinder 9 to drive those cylinders are mounted on the upper-part turning body 3. Moreover, a cabin 10 having a driver's seat, an operation apparatus and a power source, such as an engine or the like, are mounted on the lower-part running body.

Figure 2:
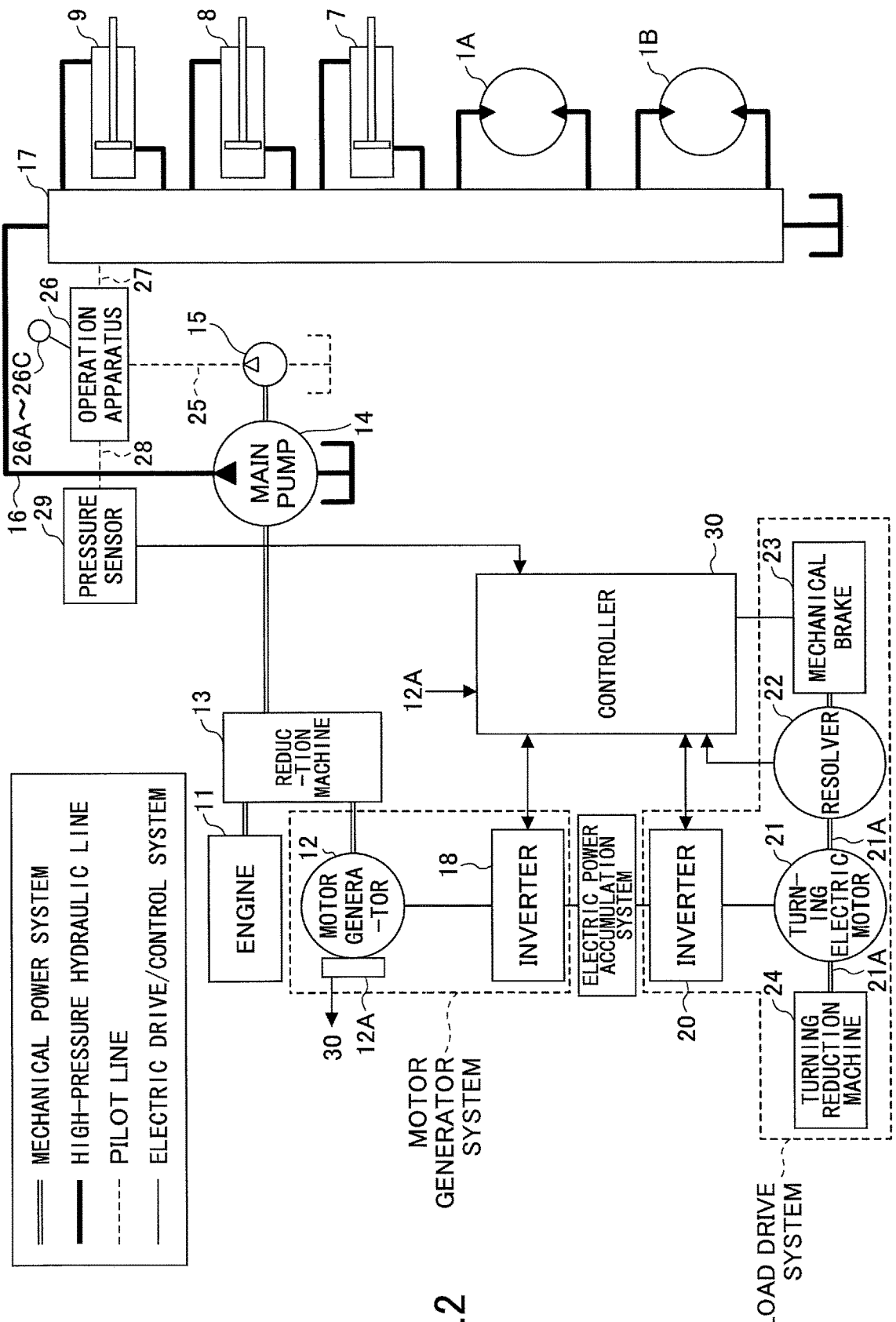
FIG. 2 is a block diagram of the hydraulic shovel.

FIG. 2 is a block diagram illustrating a structure of the hydraulic shovel. In FIG. 2, a double line indicates a mechanical power system, a bold solid line a high-pressure hydraulic line, a dashed line a pilot line, and a solid line an electric drive/control system.

Both an engine 11 as a mechanical drive part and a motor generator 12 as an assist drive part are connected to an input axis of a reduction machine 13 as a power increasing machine. A main pump 14 and a pilot pump 15, which are hydraulic pumps, are connected to an output axis of the reduction machine 13. A control valve 17 is connected to the main pump 14 through a high-pressure hydraulic line 16.

The control valve 17 is a control device which controls a hydraulic system in the construction machine according to the first embodiment. The control valve 17 is connected with hydraulic motors 1A (for right) and 1B (for left) for the lower-part running body 1, the boom cylinder 7, the arm cylinder 8, and the bucket cylinder 9 through high-pressure hydraulic lines.

A battery 19 as an electric power accumulator is connected to the motor generator through an inverter 18 and an up-down converter 100 as an electric power accumulation control part. The inverter 18 and the up-down converter 100 are connected by a DC bus 110 to each other.

A resolver 22, a mechanical brake 23 and a turning reduction machine 24 are connected to a rotation axis 21A of a turning electric motor 21. An operation apparatus 26 is connected to the pilot pump 15 through a pilot line 25. The turning electric motor 21, the inverter 20, the resolver 22, and the turning reduction machine 24 together constitute a load drive system.

The operation apparatus 26 includes a lever 26A, a lever 26B and a pedal 26C. The control valve 17 and a pressure sensor 29 are connected to the lever 26A, the lever 26B and the pedal 26C through hydraulic lines 27 and 28, respectively.

A controller 30, which performs a drive control of an electric system of the hydraulic shovel, is connected to the pressure sensor 29.

The hydraulic shovel according to the first embodiment of the present invention is a hybrid construction machine having the engine 11, the motor generator 12 and the turning electric motor 21 serving as power sources. These power sources are mounted on the upper-part turning body 3 illustrated in FIG. 1. A description will be given below of each part of the hydraulic shovel.

The engine 11 is, for example, an internal combustion engine, which is constituted by a diesel engine, and an output axis thereof is connected to one of input axes of the reduction machine 13. The engine 11 is always operated during operation of the construction machine.

The motor generator 12 can be any electric motor which is capable of performing both a motor (assist) operation and a generating operation. In the present embodiment, the motor generator driven by an alternating current by the inverter 20 is used as the motor generator. For example, an IPN (Interior Permanent Magnet) motor having a magnet embedded in an interior of a rotor may be used. The rotation axis of the motor generator 12 is connected to the other of the input axes of the reduction machine 13. Then, the motor generator 12 is provided with a temperature sensor 12A as an abnormality detection part of an electric power generation system. If a load is applied to the motor generator 12, a temperature detection value of the temperature sensor 12A rises. Thereby, if the temperature detection value of the temperature sensor 12A is too high, it can be grasped that the motor generator 12 is in an over-load state.

The reduction machine 13 has two input axes and one output axis. A drive axis of the engine 11 and a drive axis of the motor generator 12 are connected to the two input axes, respectively. A drive axis of the main pump 14 is connected to the output axis. When a load of the engine 11 is large, the motor generator 12 performs a motor (assist) operation so that the drive power of the motor generator 12 is transmitted to the main pump 14 through the output axis of the reduction machine 13. Thereby, the drive of the engine is assisted. On the other hand, when the load of the engine 11 is small, the motor generator 12 performs a power generation by a generating operation by a drive power of the engine 11 being transmitted to the motor generator 12 through the reduction machine 13. Switching between the power running operation and the generating operation of the motor generator is performed by the controller 30 in accordance with a load to the engine 11 and the like. Here, the reduction machine 13 transmits a revolution of the engine by increasing the speed, and assists the revolution of the engine by decreasing the speed of the motor generator 12.

The main pump 14 is a hydraulic pump which generates a hydraulic pressure to be supplied to the control valve 17. The hydraulic pressure generated by the main pump is supplied to drive each of the hydraulic motors 1A and 1B, the boom cylinder 7, the aim cylinder 8, and the bucket cylinder 9.

The pilot pump 15 is a hydraulic pump which generates a pilot pressure necessary for a hydraulic operation system. A structure of the hydraulic operation system will be described later.

The control valve 17 is a hydraulic control device to perform a hydraulic drive control, and controls a hydraulic pressure supplied to each of the hydraulic motors 1A and 1B for the lower-part running body 1, the boom cylinder 7, the arm cylinder 8, and the bucket cylinder 9 connected through the high-pressure hydraulic lines according to an operation input of a driver.

The inverter 18 is a drive control part of the motor generator 12 provided between the motor generator 12 and the up-down converter 100 as mentioned above, and performs switching based on a control instruction from the controller 30. Thereby, when the inverter 18 causes the motor generator 12 to perform a motor operation, the inverter supplies a necessary electric power to the motor generator 12 from the battery 19 and the up-down converter 100 through the DC bus 110. On the other hand, when causing the motor generator 12 to perform a generating operation, the inverter charges the electric power generated by the motor generator 12 to the battery 19 through the DC bus 110 and the up-down converter 100. The motor generator 12 and the inverter 18 together constitute an electric motor generation system. The inverter 18 is provided with a temperature sensor, a current detector and a voltage detector (not illustrated in the figure) as an abnormality detection part of the electric motor generating system.

The temperature sensor can detect a temperature of a switching element of the inverter 18 and detect a current of the motor generator by the current detector. For example, when a line failure occurs between the inverter 18 and the motor generator 12, an occurrence of the abnormality can be detected because a current value detected by the current detector rapidly decreases.

The inverter 20 is provided between the turning electric motor 21 and the up-down converter 100 as mentioned above, and is a drive control part of the turning electric motor 21, which performs switching based on an control instruction from the controller 30 and perform a drive control on the turning electric motor 21. Thereby, when the inverter is performing an operation control of a power running operation of the turning electric motor 21, a necessary electric power is supplied from the battery 19 to the turning electric motor 21 through the up-down converter 100. On the other hand, when the turning electric motor 21 is performing a generating operation, the electric power generated by the turning electric motor 21 is charged to the battery 19 through the up-down converter 100. Although the embodiment containing the turning electric motor (one set) and the inverter (one set) is illustrated in FIG. 2, a plurality of motors and a plurality of inverters may be connected to the DC bus 110 if it is provided with a magnet mechanism as a drive part other than the turning mechanism. The turning electric motor 21 is provided with a temperature sensor (not illustrated in the figure) as an abnormality detection part of the electric work element. If a load is applied to the turning electric motor 21, a temperature detection value of the temperature sensor rises. Thereby, if the temperature detection value of the temperature sensor is too high, it can be grasped that the turning electric motor 21 is in an overload state. Furthermore, the inverter 18 is provided with a temperature sensor, a current detector and a voltage detector (not illustrated in the figure) as an abnormality detection part of the load drive system. The temperature sensor can detect a temperature of a switching element of the inverter 20, and can detect a current of the turning electric motor 21 by the current detector. For example, when a line failure occurs between the inverter 20 and the turning electric motor 21, the occurrence of the abnormality van be detected because the current value detected by the current detector rapidly decreases.

The turning electric motor 21 can be an electric motor, which can perform both a power running operation and a generating operation, and is an electric work element which is provided to drive the turning mechanism 2 of the upper-part turning body 3. When performing a power running operation, a rotation force of the turning electric motor 21 is increased by the reduction machine 24 so that the upper-part turning body 3 is rotated by the rotation force under an acceleration and deceleration control. Moreover, a revolution speed of the upper-part turning body 3 due to an inertia force is increased by the reduction machine 24 and is transmitted to the turning electric motor 21, which can generate a regenerative electric power. Here, an electric motor, which is driven by an alternating current by a PWM (Pulse Width Modulation) control signal by the inverter 20, is illustrated as the turning electric motor 21. The turning electric motor 21 can be constituted by, for example, an IPM motor of a magnet embedded type. Thus, because a large electromotive power can be generated, the electric power generated by the turning electric motor 21 at the time of regeneration can be increased.

The resolver 22 is a sensor to detect a rotation position and a rotation angle of the rotation axis 21A of the turning electric motor 21. The resolver 22 can detect the rotation position and the rotation angle of the rotation axis 21A by being coupled mechanically to the turning electric motor 21 to detect a rotation position of the rotation axis 21A before rotation of the turning electric motor 21 and a rotation position after making a left turn or a right turn. By detecting the rotation angle of the rotation axis 21A of the turning electric motor 21, a rotation angle and a rotation direction of the turning mechanism 2 is acquired. Although a mode of attaching the resolver 22 is illustrated in FIG. 2, an inverter control method having no rotation sensor of an electric motor may be used.

The mechanical brake 23 is a brake apparatus, which generated a mechanical brake force, to mechanically stop the rotation axis 21A of the turning electric motor 21. An operation of the mechanical brake 23 is switched between a braking operation and a releasing operation by an electromagnetic switch. This switching is performed by the controller 30.

The turning reduction machine 24 reduces a rotation speed of the rotation axis 21A of the turning electric motor 21, and mechanically transmits the rotation speed to the turning mechanism 2. The turning reduction machine 24 increases, when performing a power running operation, a rotation force of the turning electric motor 21, and can transmit the increased rotating force to the turning body. On the other hand, when performing a regenerating operation, the turning reduction machine 24 increases a revolution speed generated by the turning body to cause the turning electric motor 21 to generate an increased rotation speed.

The turning mechanism 2 is permitted to turn in a state where the mechanical brake 23 of the turning electric motor 21 is released, and, thereby, the upper-part turning body 3 is turned in a leftward direction or a rightward direction.

The operation apparatus 26 is an apparatus to operate the turning electric motor 21, the lower-part running body 1, the boom 4, the arm 5 and the bucket 6. The operation apparatus 26 is operated by a driver of the hybrid construction machine. The operation apparatus 26 outputs a hydraulic pressure (primary side hydraulic pressure) after converting it to a hydraulic pressure (secondary side hydraulic pressure) corresponding to an amount of operation of the driver. The secondary side hydraulic pressure output from the operation apparatus 26 is supplied to the control valve 17 through the hydraulic line 27, and is detected by the pressure sensor 29.

When the operation apparatus 26 is operated, the control valve 17 is driven through the hydraulic line 27. Thereby, the hydraulic pressure in the hydraulic motors 1A and 1B, the boom cylinder 7, the arm cylinder 8, and the bucket cylinder 9 is controlled, and the lower-part running body 1, the boom 4, the arm 5, and the bucket 6 are driven. It should be noted that the hydraulic line 27 supplies a hydraulic pressure necessary for driving the hydraulic motors 1A and 1B, the boom cylinder 7, the arm cylinder 8, and the bucket cylinder 9.

When an operation for turning the turning mechanism 2 is input to the operation apparatus 26, the pressure sensor 29 as a turning operation detection part detects an amount of the operation as a change in the hydraulic pressure in the hydraulic line 28. The pressure sensor 29 outputs an electric signal representing the hydraulic pressure in the hydraulic line 28. Thereby, an amount of the operation input to the operation apparatus 26 to turn the turning mechanism 2 can be grasped appropriately. The electric signal is input to the controller 30, and is used for a drive control of the turning electric motor 21. Although a mode of using a pressure sensor as a lever operation detection part is explained in the first embodiment, a sensor reading an amount of an operation input to the operation apparatus 26 to drive the turning mechanism 2 may be used.

The controller 30 is a control apparatus as a main control part which performs a drive control of the hydraulic shovel, and is constituted by an operation processing device including a CPU (Central Processing Unit) and an internal memory. The controller 30 is an apparatus realized by the CPU executing programs for the drive control stored in the internal memory.

The controller 30 changes a signal input from the pressure sensor 29 (a signal input form the operation apparatus 26 and representing an amount of operation for turning the turning mechanism 2) into a velocity instruction in order to perform a drive control of the turning electric motor 21.

The controller 30 performs an operation control of the motor generator 12 (switching between a motor (assist) operation and a generating operation), and also performs a charge-and-discharge control of the battery 19 by controlling a drive of the up-down converter 100 as an up-down control part. The controller performs a switching control between a voltage-up operation and a voltage-down operation of the up-down converter 100 based on a charge state of the battery 19, an operation state (a motor (assist) operation or a generating operation) of the motor generator 12, and an operation state (a power running operation or a regenerative operation) of the turning electric motor 21, and, thereby, performs the charge-and-discharge control of the battery 19.

The switching control between the voltage-up operation and the voltage-down operation of the up-down converter 100 is performed based on a DC bus voltage value detected by a DC bus voltage detection part 111, a battery voltage value detected by a battery voltage detection part 112, and a battery current value detected by a battery current detection part 113.

Moreover, the controller 30 is configured to be supplied with various signals representing a temperature of the motor generator 12, a current value flowing in the motor generator 12, a voltage value applied to the motor generator 12, a temperature of the turning electric motor 21, a current value flowing in the turning electric motor 21, a voltage valued applied to the turning electric motor 21, a temperature of a switching element contained in the inverter, voltage values applied to the inverters 18 and 20, and current values supplied to the inverters 18 and 20.

The controller 30 performs an abnormality determination of the motor generator 12, the inverters 18 and 20 and the turning electric motor 21 by comparing the above-mentioned temperatures and values with threshold values previously set according to the respective abnormality detection parts. Thus, the controller 30 also provides a function as an abnormality determination part to detect an abnormality in the motor generator 12, the inverters 18 and 20, and the turning electric motor 21. The abnormality in the motor generator 12 or the turning electric motor 21 means a condition in which, for example, a line failure occurs in the motor generator 12 or the turning electric motor 21 or a temperature is abnormally high. The abnormality in the inverters 18 and 20 means a state, for example, a temperature of the switching element, a voltage value or a current value exceeds the respective threshold values due to a line failure or a malfunction, which results in an over-heat state, an over-voltage state or an over-current state.

Figure 3:
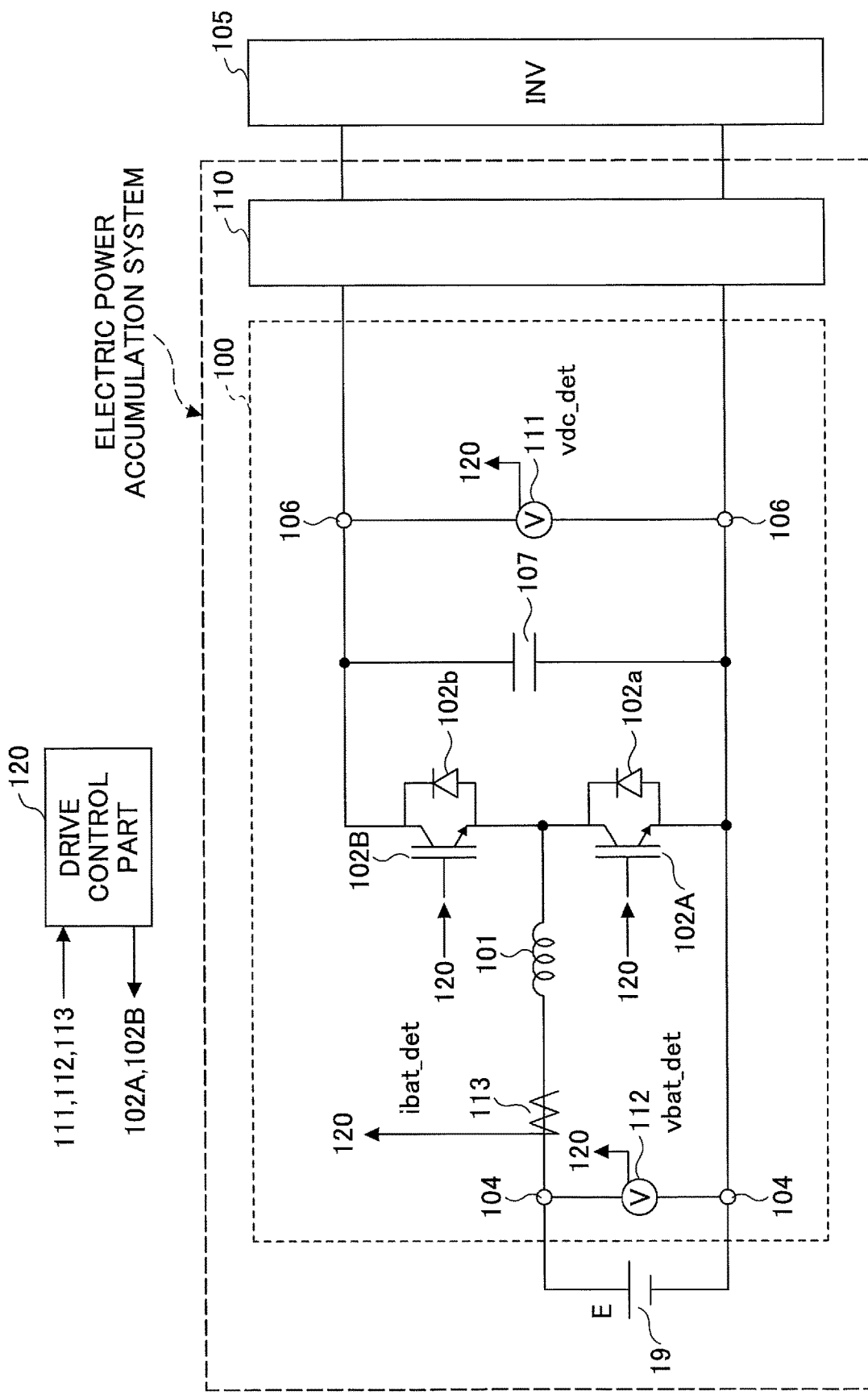
FIG. 3 is a circuit diagram of an electric power accumulation system of the shovel.

FIG. 3 is a circuit diagram of the electric power accumulation system of the hydraulic shovel. The up-down converter 100 includes a reactor 101, an up-down IGBT (Insulated Gate Bipolar Transistor) 102A, and up-down IGBT 102B, a power supply connection terminal 104 for connecting the battery 19, a pair of output terminals for connecting an inverter 105, and a smoothing capacitor 107 inserted between the output terminals 106 in parallel. The DC bus 110 connects the output terminal 106 of the up-down converter 100 and the inverter 105. The inverter 105 corresponds to the inverters 18 and 20.

The turning electric motor 21 as an electric work element is connected to the DC bus 110 through an inverter 20. The turning electric motor 21 is an electric work element, which functions as an electric motor for work. The DC bus 110 is provided to perform an exchange of electric power between the battery 19, the motor generator 12, and the turning electric motor 21. The DC bus 110 is provided with a DC bus voltage detection part 111 which detects a voltage value of the DC bus 110 (hereinafter, referred to as a DC bus voltage value). The DC bus voltage value detected by the DC bus voltage detection part 111 is input into the controller 30.

The battery 19 is provided with a battery voltage detection part 112 which detects a battery voltage value, and a battery current detection part 113 which detects a battery current value. The battery voltage value and the battery current value detected by those parts are input into the controller 30. The battery 19, the DC bus 110, and the up-down converter 100 together constitute the electric power accumulation system, which transfers electric power between the motor generator 12 and the turning electric motor 21.

The battery 19 is connected to the inverter 18 and the inverter 20 through the up-down converter 100. Thereby, when at least one of a motor (assist) operation of the motor generator 12 and a power running operation of the turning electric motor 21 is being performed, the battery 19, as a power source, supplies electric power required for the motor (assist) operation or the power running operation. On the other hand, when at least one of a generating operation of the motor generator 12 and a regenerative operation of the turning electric motor 21 is being performed, the battery 19 accumulates electric power generated by the generating operation or the regenerative operation, as an electric energy. The battery 19 is provided with a temperature sensor (not illustrated in the figure) as an electric power accumulation system abnormality detection part. Because the temperature detection value of the temperature sensor rises if an over-current continues to flow in the battery 19, it can be determined as to whether the battery 19 is in an overload state by detecting a temperature detection value of the temperature sensor to detect an abnormality of the electric power accumulation system. The battery 19 and the up-down converter 100 together constitute the electric power accumulation system. Temperature sensors (not illustrated in the figure) are provided, as an electric power accumulation system abnormality detection part, to the battery 19 and the up-down converter 100, respectively. That is, the temperature sensor of the up-down converter 100 detects a temperature of the switching element or the reactor, and the temperature sensor of the battery (electric power accumulator) 19 measures heat generation of the battery 19.

The charge-and-discharge control of the battery 19 is performed by the up-down converter 100 based on a charge state of the battery 19, an operation state (a motor (assist) operation or a generating operation) of the motor generator 12, and an operation state (a power running operation or a regenerative operation) of the turning electric motor 21. The switching control between the voltage-up operation and the voltage-down operation is performed by the controller 30 based on a DC bus voltage value detected by the DC bus voltage detection part 111, a battery voltage value detected by the battery voltage detection part 112, and a battery current value detected by the battery current detection part 113.

One side of the up-down converter 100 is connected to the motor generator 12 and the turning electric motor 21 through the DC bus 110, and the other side is connected to the battery 19. The up-down converter 100 performs a control to switch between a voltage-up and a voltage-down so that the DC bus voltage value falls within a fixed range. Because it is necessary to supply electric power to the motor generator 12 through the inverter 18 when the motor generator 12 performs a motor (assist) operation, it is necessary to increase the DC bus voltage value. On the other hand, because it is necessary to charge a generated electric power to the battery 19 through the inverter 18 when the motor generator 12 performs a generating operation, it is necessary to decrease the DC bus voltage value. This is the same as in the power running operation and the regenerative operation of the turning electric motor 21. Additionally, because the operation state of the motor generator 12 is changed in response to a load state of the engine 11 and the operation state of the turning electric motor 21 is changed in response to a turning operation of the upper-part turning body 3, there may be a condition established in which one of the motor generator 12 and the turning electric motor 21 performs the motor (assist) operation or a power running operation and the other performs a generating operation or a regenerative operation. For this reason, the up-down converter 100 performs a control to switch between a voltage-up operation and a voltage-down operation in response to the operation states of the motor generator 12 and the turning electric motor 21 so that the DC bus voltage value falls within a fixed range.

The DC bus 110 is provided between the inverters 18 and 20 and the up-down converter 100, and is configured to be capable of transferring electric power between the battery 19, the motor generator 12, and the turning electric motor 21. The DC bus voltage detection part 111 is a voltage detection part which detects a DC bus voltage value. The DC bus voltage value detected is input into the controller 30, and is used to perform the switching control between the voltage-up operation and the voltage-down operation to cause the DC bus voltage to fall within a fixed range.

The battery voltage detection part 112 is a voltage detection part which detects a voltage value of the battery 19, and is used to detect a charge state of the battery. The battery voltage value detected is input into the controller 30, and is used to perform the switching control of the voltage-up operation and the voltage-down operation of the up-down converter 100. When an abnormality occurs between the up-down converter 100 and the battery 19, the DC bus voltage detection part 111 and the battery voltage detection part 112 can also function as an electric power accumulation system abnormality detection part, which can determine an occurrence of an abnormality in the electric power accumulation system and determine a location where the abnormality occurs by comparing the voltage value of the battery voltage detection part 112 with the voltage value of the DC bus voltage detection part 111. Then, if the detection value from the electric power accumulation system abnormality detection part exceeds the threshold value for abnormality determination, the controller 30 determines that an abnormality occurs in the electric power accumulation system, and the electric power accumulation system is stopped.

The battery current detection part 113 is a current detection part which detects a current value of the battery 19. The battery current value is detected so that a current flowing from the battery 19 to the up-down converter 100 is detected as a positive value. The battery current value detected is input into the controller 30, and is used to perform the switching control of the voltage-up operation and the voltage-down operation of the up-down converter 100. The battery current detection part 113 also functions as an electric power accumulation system abnormality detection part by determining the current value detected by the battery current detection part 113.

One end of the reactor 101 is connected to a middle point between the voltage-up IGBT 102A and the voltage-down IGBT 102B, and the other end is connected to the power supply connection terminal 104. The reactor 101 is provided to supply an electromotive power generated by ON/OFF of the voltage-up IGBT 102A to the DC bus 110.

Each of the voltage-up IGBT 102A and the voltage-down IGBT 102B is configured by a bipolar transistor having a gate part into which a MOSFET (Metal Oxide Semiconductor Field Effect Transistor) is incorporated, and is a semiconductor device capable of performing a high-speed switching of a large power. Each of the voltage-up IGBT 102A and the voltage-down IGBT 102B is driven by the controller 30 by being applied with a PWM voltage at a gate terminal thereof. The voltage-up IGBT 102A and the voltage-down IGBT 102B are connected with diodes 102a and 102b, which are rectifying elements, respectively.

The battery 19 is an electric power accumulator which is chargeable and dischargeable so that electric power can be exchanged with the DC bus 110 through the up-down converter 100. It should be noted that the battery 19 is illustrated as electric power in FIG. 3, a capacitor, a rechargeable secondary battery, or other kinds of rechargeable power sources may be used instead of the battery 19.

The power supply connection terminals 104 and the output terminals 106 may be terminals connectable to the battery 19 and the inverter 105. The battery voltage detection part 112, which detects a battery voltage, is connected between the pair of power supply connection terminals 104. The DC bus voltage detection part 111, which detects a DC bus voltage, is connected between the pair of output terminals 106. The battery voltage detection part 112 detects a voltage (vbat_det) of the battery 19. The DC bus voltage detection part 111 detects a voltage of the DC bus 110 (hereinafter, referred to as a DC bus voltage: vdc_det).

The smoothing capacitor 107 is a capacitor element inserted between a positive terminal and a negative terminal of the output terminal 106 to smooth the DC bus voltage. The battery current detection part 113 is a detection means capable of detecting a value of a current flowing in the battery 19, and contains a resistor for detecting a current. The reactor current detection part 113 detects a current value (ibat_det) flowing in the battery 19.

In the above-mentioned up-down converter 100, when raising a voltage of the DC bus 110, a PWM voltage is applied to the gate terminal of the voltage-up IGBT 102B to supply an electromotive power generated in the reactor 101 in association with ON/OFF of the voltage-up IGBT 102B through the diode 102b connected to the voltage-up IGBT 102B in parallel. Thereby, the voltage of the DC bus 110 is raised. On the other hand, when decreasing the voltage of the DC bus 110, a PWM voltage is applied to the gate terminal of the voltage-down IGBT 102B to supply a regenerative electric power, which is supplied through the inverter 105, from the DC bus 110 to the battery 19. Thereby, electric power accumulated in the DC bus 110 is charged to the battery 19, and the voltage of the DC bus is decreased.

It should be noted that although a drive part creating the PWM signals to drive the voltage-up IGBT 102A and the voltage-down IGBT actually exists between a controller 120 and each of the voltage-up IGBT 102A and the voltage-down IGBT 102B, illustration of the drive part is omitted in FIG. 3. Such a drive part can be achieved by either an electronic circuit or an operation processing device.

Figure 4:
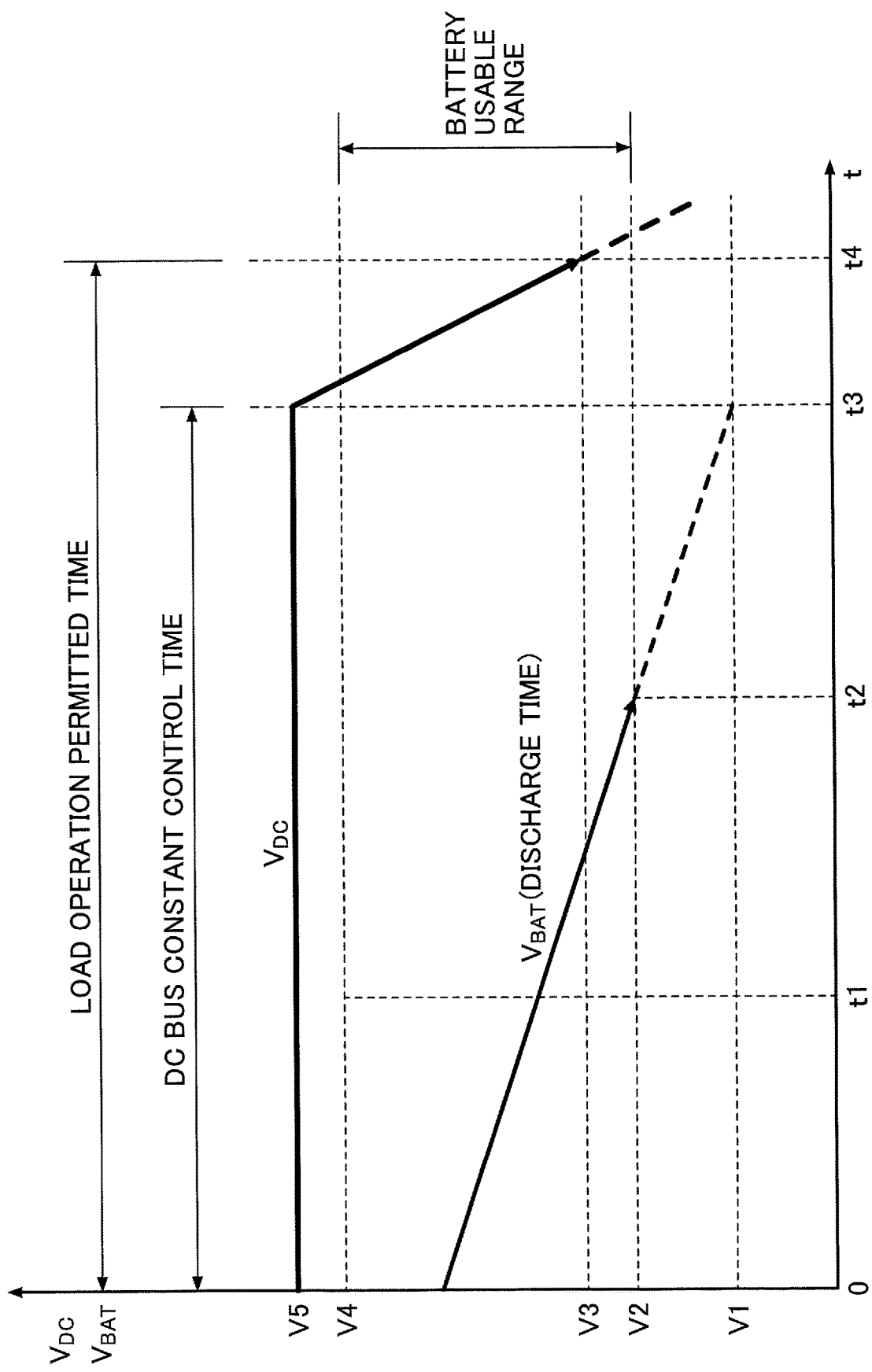
FIG. 4 is a graph illustrating transition of a DC bus voltage value and a battery voltage value with respect to passage of time when maintaining the DC bus voltage value constant by a controller in a case where an abnormality is detected in an inverter.

FIG. 4 is a graph illustrating a time transition of a DC bus-voltage value and a battery voltage value when an abnormality of the inverter 18 is detected and the DC bus voltage is to be maintained constant by the controller 30. Here, V1 is a lower limit value of the battery voltage value, which can raise the DC bus voltage, V2 is a lower limit value of a battery usable range, V3 is a lower limit value of the rated voltage value of the motor generator 12 and the turning electric motor 21, V4 is an upper limit value of the battery usable range, V5 is a target value of a DC bus voltage value, $V_{DC}$ is the DC bus voltage value, and $V_{BAT}$ is a battery voltage value.

The lower limit value V1 of the battery voltage value, which can be raised, is a lower limit value of the voltage value necessary for the battery 19 to raise the DC bus voltage value. If the voltage value of the battery 19 is below the lower limit, the voltage of the DC bus 110 cannot be raised. The battery usable range is a range of the battery voltage value when the battery is used in the hydraulic shovel, and is defined by the lower limit value V2 and the upper limit value V4. If the battery voltage value is out of the range defined by the lower limit value V2 and the upper limit value V4, the control of the turning electric motor 21 is stopped.

The lower limit value V3 of the rated voltage values of the motor generator 12 and the turning electric motor 21 is a lower limit value of the rated voltage values of the motor generator 12 and the turning electric motor 21. If the voltage applied to the motor generator 12 and the turning electric motor 21 is below the lower limit value, the motor generator 12 and the turning electric motor 21 cannot perform a power running operation.

When the power shovel continues work and if a load to the motor generator 12 is in excess, and a detection value detected by the temperature sensor 12A of the motor generator 12 reaches a previously set temperature, the controller 30 determines that the motor generator 12 is in an overloaded stated. In such as case, the controller 30 determines that an abnormality occurs in the motor generation system (time t=0). Thus, the controller 30 sends a control instruction to the inverter 18 to stop the drive of the motor generator 12 so that the load to the motor generator 12 is reduced.

On the other hand, the controller 30 sends a control instruction to the up-down converter 100 to continuously maintain the DC bus voltage $V_{DC}$ at V1 before and after the generation of the abnormality of the motor generator 12. Thus, if an abnormality occurs in the motor generation system, the up-down converter 100 continues the charge and discharge control to maintain the DC bus at a constant voltage before and after the occurrence of the abnormality. As a result, when an abnormality occurs in the inverter 18 at the time t=0, the battery voltage continues to decease when a discharge state continues. As mentioned above, because the DC bus voltage value is maintained constant by the up-down converter 100, the inverter 20 and the turning electric motor 21 can perform a stable control.

The battery voltage value is below the lower value V2 of the battery usable range at a time t=t2, and the controller 30 stops the control of the turning electric motor 21. If the discharge state continued as mentioned above, the battery voltage value decreases below the lower limit value of the usable range at the time t=t2. Thus, if the DC bus voltage value is not controlled, the drive control of the motor generator 12 cannot be appropriately performed after the time t2.

However, according to the present embodiment, the DC bus voltage value is maintained at a target value V5 after the time t=t2 has passed even when an abnormality occurs in the inverter 20 because the up-down converter 100 controls the DC bus voltage value at the target value V5. For this reason, the drive control of the motor generator 12 can be performed appropriately.

At a time t=t3, the DC bus voltage value starts to decrease because the battery voltage value is below the lower limit value V1 of the battery voltage value, which can raise the DC bus voltage. However, because the DC bus voltage value is higher than the lower limit value V3 of the rated voltage value of the motor generator 12, the drive control of the motor generator 12 can be performed.

At a time t=t4, the DC bus voltage value is below the lower limit value V3. Thus, the drive control of the turning electric motor 21 cannot be performed after the time t=t4.

As mentioned above, according to the present embodiment, the drive control of the motor generator 12 can be performed after the time t=t2 at which a conventional hybrid construction machine cannot perform the drive control, because the drive control of the up-down converter 100 is continued after an abnormality occurs in the inverter 18.

That is, according to the hybrid construction machine according to the first embodiment, even when an abnormality occurs in the inverter 18, because the controller continues the voltage up and down control of the up-down converter 100, the DC bus voltage value is maintained constant for a certain period of time after the battery voltage value is out of the usable range, and the turning electric motor 21 can be accurately controlled while the DC bus voltage value is equal to or larger than the lower limit value V3 of the rated voltage value of the turning electric motor 21 even (until the time t=t4) if the DC bus voltage value starts to decrease.

Therefore, according to the present embodiment, even if an abnormality occurs in the inverter 18, the turning electric motor 21 can be accurately driven and controlled for a certain period of time, and, thus, the turning electric motor 21 can be driven and controlled for a longer time period than a conventional hybrid construction machine after the occurrence of the abnormality in the inverter 18, and a hybrid construction machine improving reliability at an emergency time can be provided.

Moreover, because the turning electric motor 21 can be driven and controlled for a certain period of time after an abnormality occurs in the inverter 18, the electric power of the DC bus 110 can be consumed. Thus, even if an abnormality occurs in a state where an excessive electric power is accumulated in the DC bus 110, the battery 19 is prevented from receiving damage.

Moreover, when an abnormality occurs in the inverter 18, the controller 30 may cause the engine 11 to continue the operation. Because the engine 11 drives the main pump 14, drive operations of the work elements (the lower-part running body 1, the boom 4, the aim 5, and the bucket 6) which are driven by a hydraulic pressure can be maintained by continuing the operation of the engine 11 to continuously drive the main pump 14.

The controller 30 may cause the cooling system of the turning electric motor 21, the inverter 18, the inverter 20, the controller 30 and the up-down converter, which cooling system serves as a cooling auxiliary machine, to be continuously driven. In such a case, the up-down converter 100 is driven continuously, and, thereby, those parts can be continuously cooled by the continuous operation of the cooling system even if the reactor generates heat. Therefore, the DC bus 110 can be maintained stably at a constant voltage.

In addition, although the operation when an abnormality occurs in the inverter 18 is described with reference to FIG. 4, when an abnormality occurs in the inverter 20, a voltage up and down control of the up-down converter 100 is performed by the controller 30 to drive and control the motor generator 12. Additionally, when an abnormality (for example, a line failure abnormality) occurs in the turning electric motor 21, a voltage up and down control of the up-down converter 100 is performed by the controller 30 to drive and control the motor generator 12. In such a case, the controller 30 sends a control instruction to the inverter 20 to stop the drive operation of the turning electric motor 21 in which the abnormality occurs. Further, when an abnormality occurs in the motor generator 12, similarly, a voltage up-and-down control of the up-down converter 100 is performed by the controller 30 to drive and control the turning electric motor 21.

Figure 5:
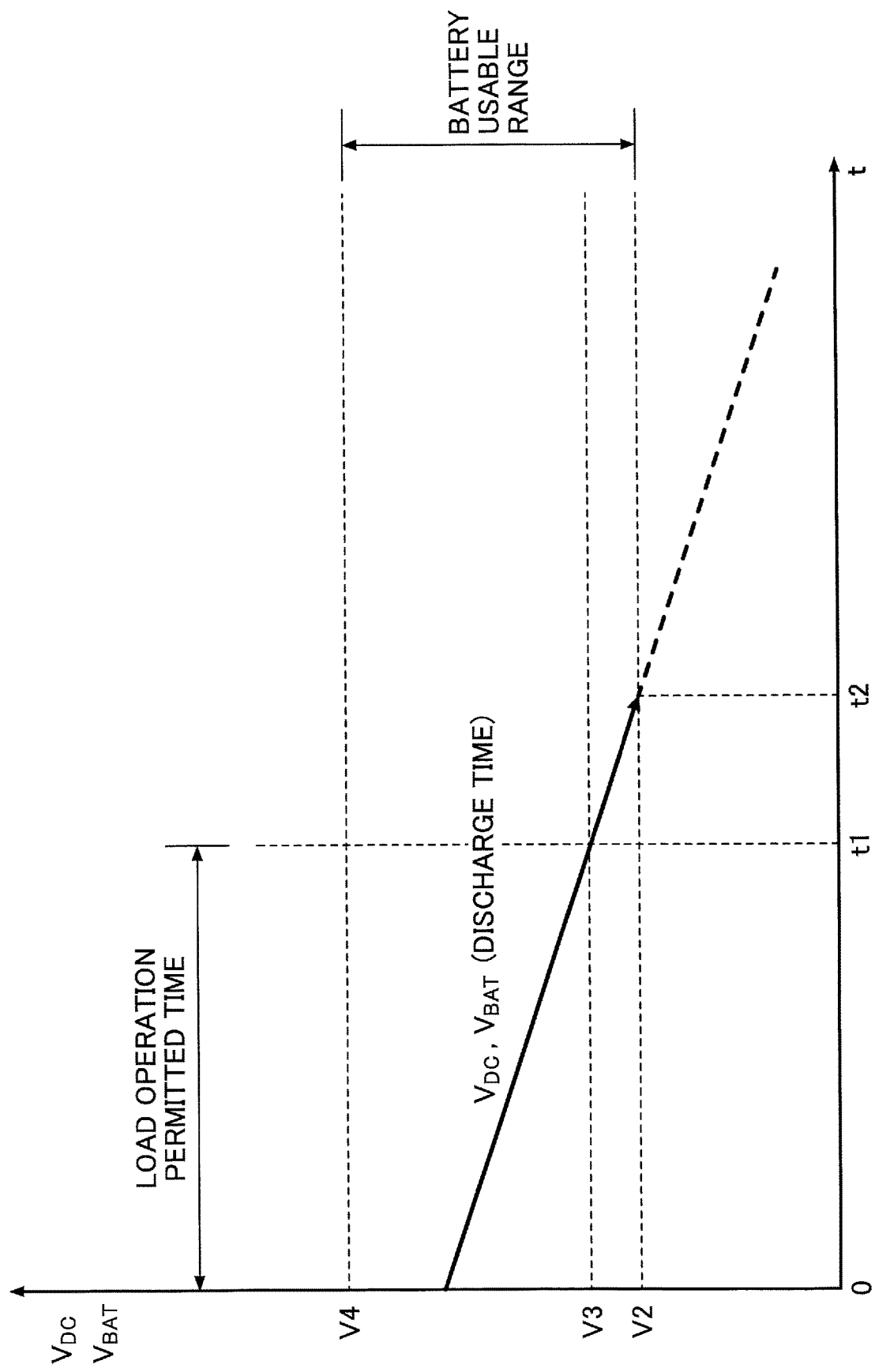
FIG. 5 is a graph illustrating transition of a battery voltage value with respect to passage of time when an abnormality is detected in an inverter in a conventional hybrid construction machine as a comparative example.

FIG. 5 is a graph illustrating time transition of a battery voltage value when an abnormality of the inverter 20 is detected in a conventional hybrid construction machine as an example for comparison.

Because the hybrid construction machine of the example for comparison is a conventional hybrid construction machine, it is not equipped with an up-down converter. For this reason, a voltage supplied to a motor generator 12 and a turning electric motor 21 receives an influence of changes in a battery voltage value, and is not maintained constant as in the hybrid construction machine according to the first embodiment. Moreover, when an abnormality occurs in the inverter 18 and a discharge state continues, the battery voltage value continues to drop. The battery voltage value decreases below the lower limit value V2 of the battery usable range at the time t=t2, and control of the turning electric motor 21 is stopped. Thus, in the hybrid construction machine of the example for comparison, it becomes impossible to perform a drive control of the motor generator 12 after the time t=t1 or t2.

Next, a description will be given of a second embodiment of the present invention.

Figure 6:
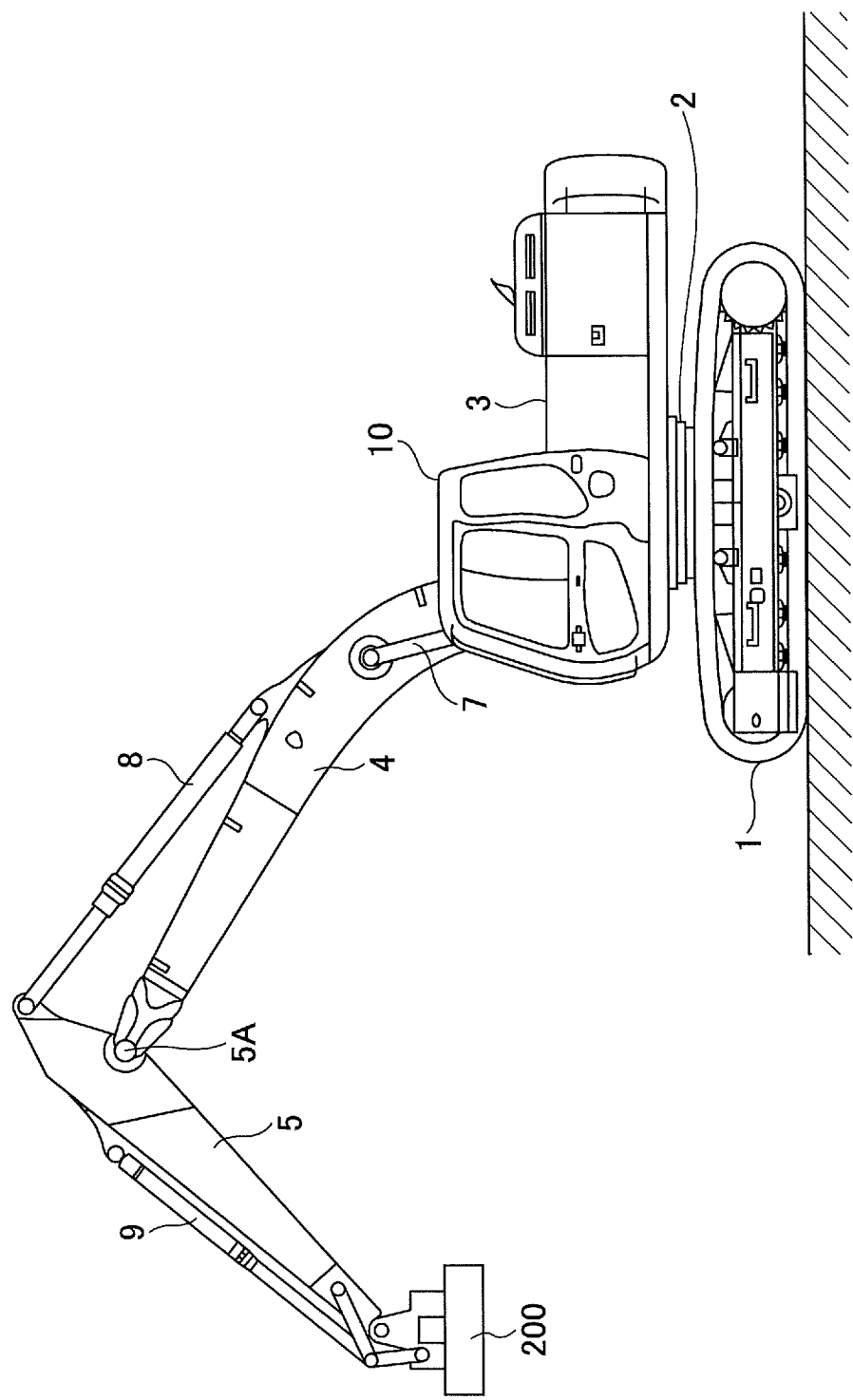
FIG. 6 is a side view of a lifting-magnet system hybrid construction machine according to a second embodiment of the present invention.

FIG. 6 is a side view of a lifting magnet type construction machine which is an example of a hybrid construction machine according to the second embodiment of the present invention. The lifting magnet type construction machine is equipped with a lifting magnet 200 instead of the bucket 6 of the hydraulic shovel according to the first embodiment. The lifting magnet 200 is an apparatus for attracting a metal body by an electromagnetic attracting force, and is one of the electric work elements. Thus, it differs from the hybrid construction machine according to the first embodiment also in the structure of the drive control system.

Figure 7:
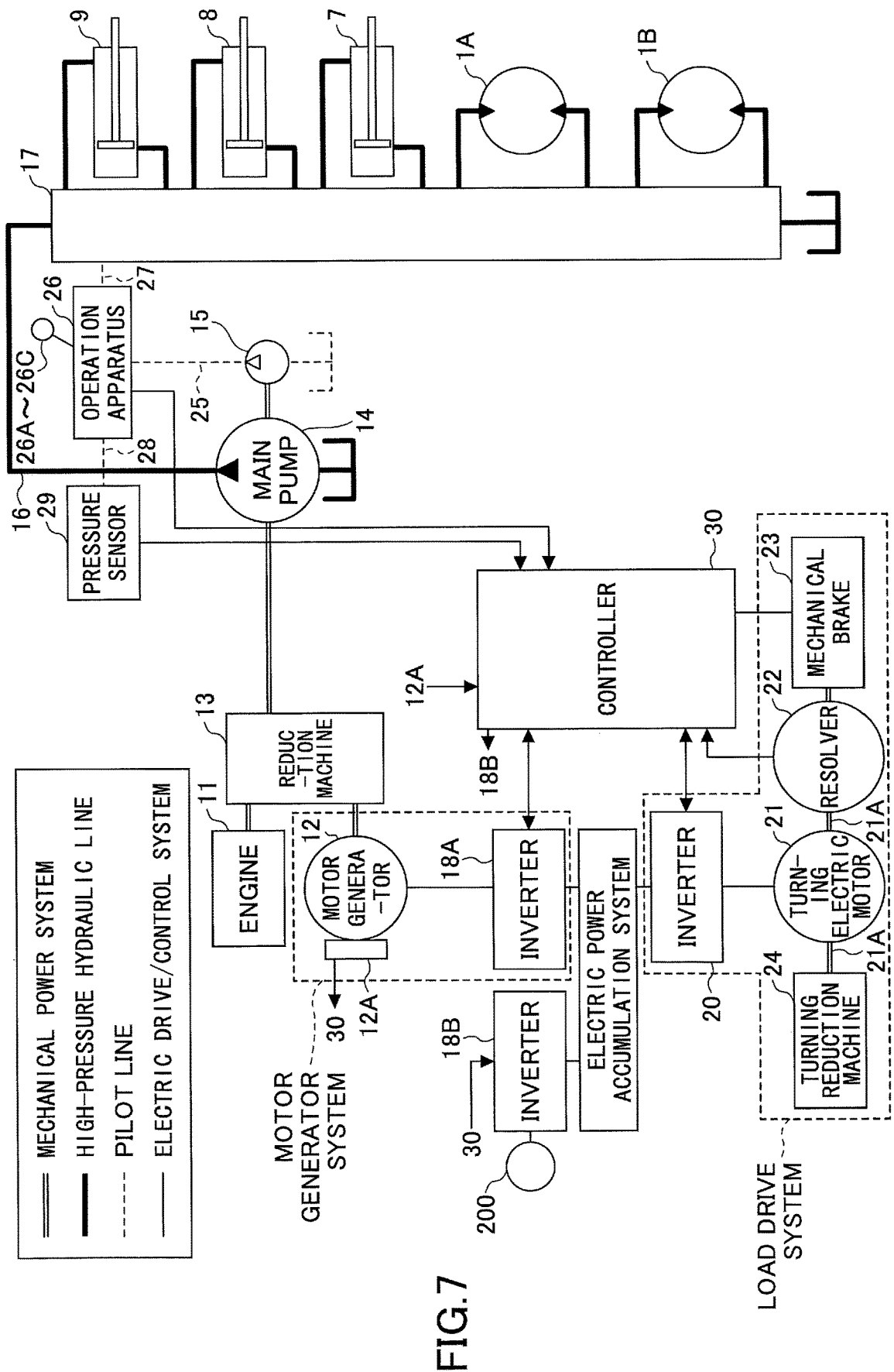
FIG. 7 is a block diagram illustrating a structure of the lifting-magnet system hybrid construction machine according to the second embodiment of the present invention.

FIG. 7 is a block diagram illustrating the hybrid construction machine according to the second embodiment. As mentioned above, the hybrid construction machine according to the second embodiment is equipped with the lifting magnet 200. Thus, an inverter to drive the motor generator 12 is indicated by a reference numeral 18A. The inverter 18A is the same as the inverter 18 in the first embodiment. Because, other structural elements are the same as the structural elements illustrated in FIG. 2, the same structural elements are given the same reference numerals, and descriptions thereof will be omitted.

The lifting magnet 200 is an electric work element connected to the DC bus 110 through an inverter 18B, and is constituted as an attracting apparatus. The lifting magnet 200 contains an electromagnet which generates a magnetic attracting force for magnetically attracting a metal body, and is supplied with electric power from the DC bus 110 through the inverter 18B. A drive control of the lifting magnet 200 is performed by the controller 30, and a switching operation between a magnetization (attraction) or demagnetization (release) is performed by the button switch 26D of the operation apparatus 26.

The inverter 18B is provided between the lifting magnet 200 and the up-down converter 100, and, when turning on the electromagnet, supplies electric power required by the lifting magnet 200 from the DC bus 110 based on a control instruction from the controller 30. On the other hand, when turning off the electromagnet, the inverter 18B supplies a regenerated electric power to the DC bus 110.

The battery 19 is connected to the inverter 18A, the inverter 18B and the inverter 20 through the up-down converter 100. Thereby, when at least one of a motor (assist) operation of the motor generator 12 and a power running operation of the turning electric motor 21 is performed or magnetizing (turning on) the lifting magnet 200, the battery 19 supplies a necessary electric power. Additionally, when at least one of a generating operation of the motor generator 12 and a regenerative operation of the turning electric motor 21 is performed or demagnetizing (turning off) the lifting magnet 200, the battery 19 accumulates electric power generated by the generating operation or the regenerative operation as an electric energy.

The motor generator 12, the lifting magnet 200 and the turning electric motor 21 are connected to the DC bus 110 through the inverters 18A, 18B and 20. Thus, electric power generated by the motor generator 12 may be directly supplied to the lifting magnet 200 or the turning electric motor 21, electric power regenerated by the lifting magnet 200 may be supplied to the motor generator 12 or the turning electric motor 21, or electric power regenerated by the turning electric motor 21 may be supplied to the motor generator 12 or the lifting magnet 200.

The charge and discharge control of the battery 19 is performed by the up-down converter 100 based on a charge state of the battery 19, an operation state (a motor (assist) operation or a generating operation) of the motor generator 12, a drive state of the lifting magnet 200, and an operation state (a power running operation or a regenerative operation) of the turning electric motor 21.

One side of the up-down converter 100 is connected to the motor generator 12, the lifting magnet 200 and the turning electric motor 21 through the DC bus 110 and the other side is connected to the battery 19 in order to control switching between a voltage-up and a voltage down so that the DC bus voltage value falls within a fixed range. Similar to the case of the motor operation and the generating operation of the motor generator 12 and the case of the power-running operation and the regenerative operation of the turning electric motor 21, when the lifting magnet 200 is magnetized (attracting), the up-down converter 100 is required to supply electric power to the lifting magnet 200 through the inverter 18B, and, thus, it is necessary to raise the DC bus voltage value. On the other hand, when the lifting magnet 200 is demagnetized (released), the generated electric power must be charged to the battery 19 through the inverter 18B, it is necessary to drop the DC bus voltage.

For this reason, there may be a case where electric power is supplied through the DC bus 110 to any one of the motor generator 12, the lifting magnet 200 and the turning electric motor 21, and electric power is supplied to the DC bus 110 from any one of them. Thus, the up-down converter 100 performs a control of switching between a voltage-up operation and a voltage-down operation so that the DC bus voltage value falls within a fixed range in response to the operation states of the motor generator 12, the lifting magnet 200 and the turning electric motor 21.

The DC bus 110 is provided between the three inverters 18A, 18B and 20 and the up-down converter 100, and exchanges electric power with the battery 19, the motor generator 12, the lifting magnet 200 and the turning electric motor 21.

The button switch 26D is a switch for operating the lifting magnet 200 (switching operation to perform a magnetization (attraction) and a demagnetization (release)). Here, although, for the sake of convenience of explanation, the button switch 26D is indicated independently from the operation apparatus 26 in the block diagram of FIG. 7, the button switch 26D is a press button switch provided on a top part of the lever 26A arranged on the right side of the operator, and is configured so that an operator can perform an easy switching operation by a right thumb.

The operation apparatus 26 transmits an electric signal indicating operation contents (magnetization (attraction) or demagnetization (release) of the lifting magnet 200 input to the button switch 26D to the controller 30. When the button switch 26D is operated, the drive state of the lifting magnet 200 (magnetization (attraction) or demagnetization (release) is switched.

The switches for magnetization and demagnetization may be separated, or a magnetization switch may be provided to the lever 26A located on a right front of the operator and a demagnetization switch may be provided to the lever 26A located on right front of the operator. The hybrid construction machine according to the present embodiment is equipped with the lifting magnet 200 and, thus, the control process contents of the controller 30 are different from the hybrid construction machine according the first embodiment.

The controller 30 is a control device to perform a charge and discharge control of the battery 19 by operating and controlling the motor generator 12, driving and controlling the lifting magnet 200 (switching between magnetization (ON) and demagnetization (OFF)) and driving and controlling the up-down converter 100. The controller 30 performs the switching control between a voltage-up operation and a voltage-down operation of the up-down converter 100 based on a charge state of the battery 19, an operation state (a motor (assist) operation or a generating operation) of the motor generator 12, a drive state (magnetization (ON) and demagnetization (OFF)) of the lifting magnet 200, and an operation state (a power running operation or a regenerative operation) of the turning electric motor 21, and, thereby performing the charge and discharge control of the battery 19.

Because other control contents are the same as the controller 30 of the hybrid construction machine according to the first embodiment, descriptions thereof is omitted.

In the hybrid construction machine according to the present embodiment, if an abnormality occurs in the inverter 20, similar to the hybrid construction machine according to the first embodiment, a voltage up and down control of the DC bus 110 is performed by the DC bus 110. Thus, the drive control of the motor generator 12 and the lifting magnet 200 can be performed until the time t=t4 indicated in FIG. 4.

As mentioned above, according to the hybrid construction machine according to the second embodiment, when an abnormality occurs in the inverter 20, the motor generator 12 and the lifting magnet 200 can be appropriately driven and controlled for a certain time period. Thus, the motor generator 12 and the lifting magnet 200 can be driven and controlled for a longer time after an occurrence of an abnormality than a conventional hybrid construction machine, which can provide a hybrid construction machine which improves reliability at an emergency time.

Although the case where an abnormality occurs in the inverter 20 was explained in the present embodiment, similarly in a case where an abnormality occurs in the inverter 18A, the voltage up and down control of the up-down converter 100 is performed by the controller 30 to drive and control the turning electric motor 21 and the lifting magnet 200. Moreover, when an abnormality occurs in the inverter 18B, similarly, the voltage up and down control of the up-down converter 100 is performed by the controller 30 to drive and control the turning electric motor 21 and the lifting magnet 200. Further, when an abnormality occurs in the motor generator 12, similarly, the voltage up and down control of the up-down converter 100 is performed by the controller 30 to drive and control the turning electric motor 21 and the lifting magnet 200. Further, when an abnormality occurs in the turning electric motor, similarly, the voltage up and down control of the up-down converter 100 is performed by the controller 30 to drive and control the turning electric motor 21 and the lifting magnet 200.

A description will be given below of a hybrid construction machine according to a third embodiment of the present invention.

Figure 8:
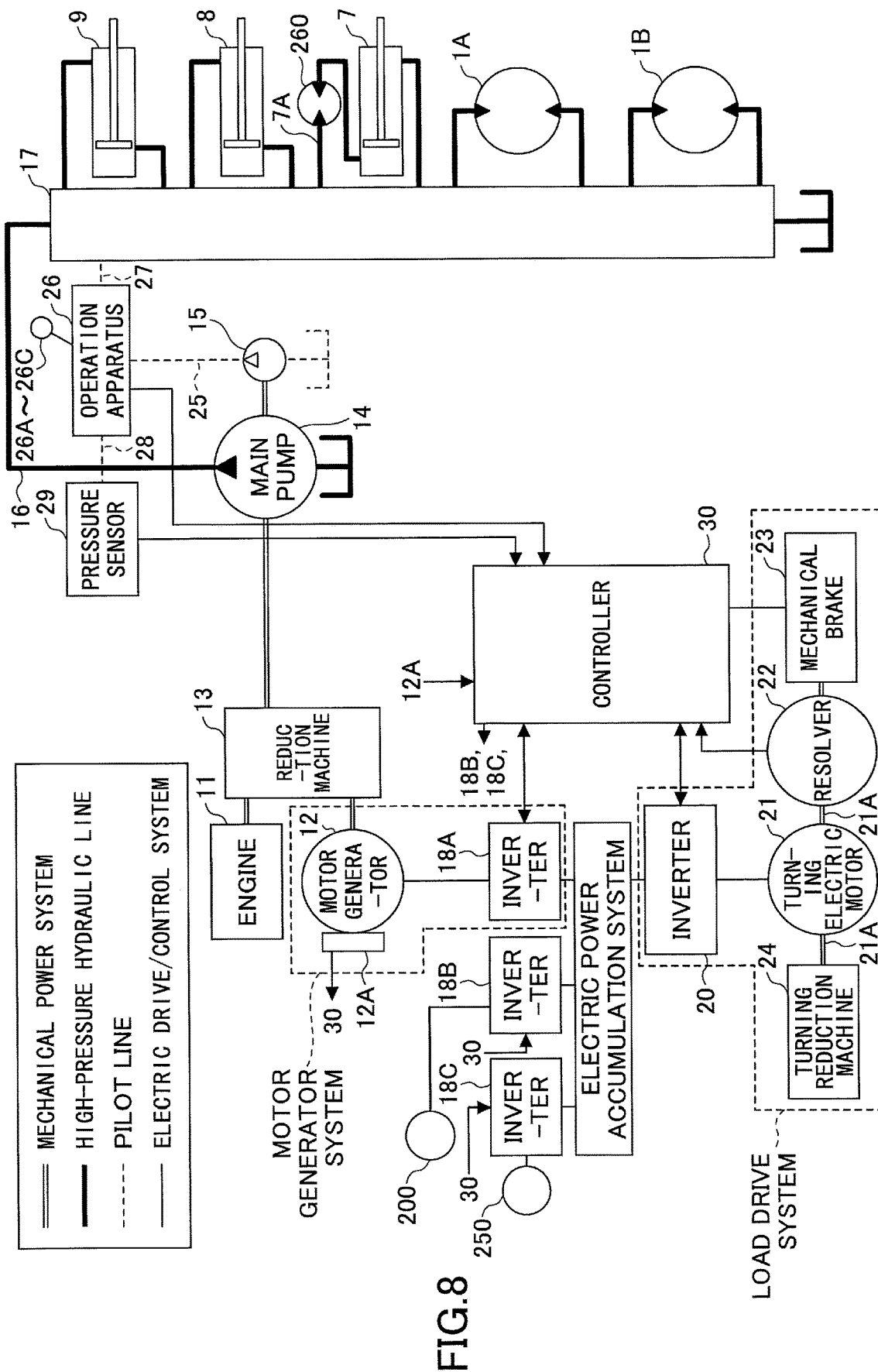
FIG. 8 is a block diagram illustrating a structure of a hybrid construction machine according to a third embodiment of the present invention.

FIG. 8 is a block diagram illustrating a structure of the hybrid construction machine according to the third embodiment of this invention. The hybrid construction machine according to the third embodiment differs from the hybrid construction machine according the second embodiment in that a generator 250 as an electric work element is connected to the DC bus 110 through an inverter 18C.

In the hybrid construction machine according to the third embodiment, a hydraulic motor 260 is connected to the boom cylinder 7, and a rotation axis of the generator 250 is driven by the hydraulic motor 260. Although, for the sake of convenience of explanation, the hydraulic motor 260 and the generator 250 are separated in FIG. 8, the rotation axis of the generator 250 is mechanically connected to the rotation axis of the hydraulic motor 260 actually.

The generator 250 is an electric work element, which is driven by the hydraulic motor 260 as mentioned above and converts a potential energy into an electric energy when the boom 4 is lowered by gravity, and is configured as a motor for work.

The hydraulic motor 260 is configured to rotate by hydraulic oil discharged from the boom cylinder 7 when the boom 4 is lowered, and is provided to convert an energy generated by the boom 4 being lowered according to gravity into a rotation force. Because the hydraulic motor 260 is provided to the hydraulic pipe 7A between the control valve 17 and the boom cylinder 7, it can be attached to a suitable place in the upper-part turning body 3.

The electric power generated by the generator 250 is supplied to the DC bus 110 through the inverter 18C as a regenerative energy. The generator 250 and the inverter 18C together constitute a load drive system. Thus, a condition may be established in which an electric power supply is performed through the DC bus 110 to any one of the motor generator 12, the lifting magnet 200 and the turning electric motor 21. Additionally, there may be a condition established where any one of the motor generator 12, the lifting magnet 200, the generator 250 and the turning electric motor 21 supplies electric power to the DC bus 110.

In the present embodiment, the up-down converter 100 performs a switching control between a voltage up operation and a voltage down operation so that the DC bus voltage value falls within a fixed range in accordance with operation states of the motor generator 12, the lifting magnet 200, the generator 250 and the turning electric motor 21. The DC bus 110 is arranged between the inverters 18A, 18B, 18C and 20 and the up-down converter 100, and exchanges electric power with the battery 19, the motor generator 12, the lifting magnet 200, the generator 250 and the turning electric motor 21.

In the present embodiment, when an abnormality occurs in the inverter 18C, similar to the hybrid construction machines according to the first and second embodiments, the voltage up and down control of the up-down converter 100 is performed by the controller 30 to drive and control the motor generator 12, the turning electric motor 21 and the lifting magnet 200. Additionally, when an abnormality occurs in the generator 250, similarly, the voltage up and down control of the up-down converter 100 is performed by the controller 30 to drive and control the turning electric motor 21, the lifting magnet 200 and the motor generator 12. In this circumstance, if an abnormality (for example, a line failure) occurs in the generator 250, the controller 30 sends a control instruction to the inverter 180 to stop the generator 250 in which the abnormality occurs.

Although a mode of converting a potential energy of the boom 4 into an electric energy by the generator 250 through the hydraulic motor 260 was explained in the present embodiment, the generator 250 may be connected to a boom axis of the boom 4 and configured to perform a generating operation when the boom 4 is lowered. A determination of moving up or down of the boom 4 may be performed by an output of a pressure sensor provided on a secondary side of the operation lever 26A, which is provided to operate the boom 4.

Next, a description will be given of a hybrid construction machine according to a fourth embodiment of the present invention.

Figure 9:
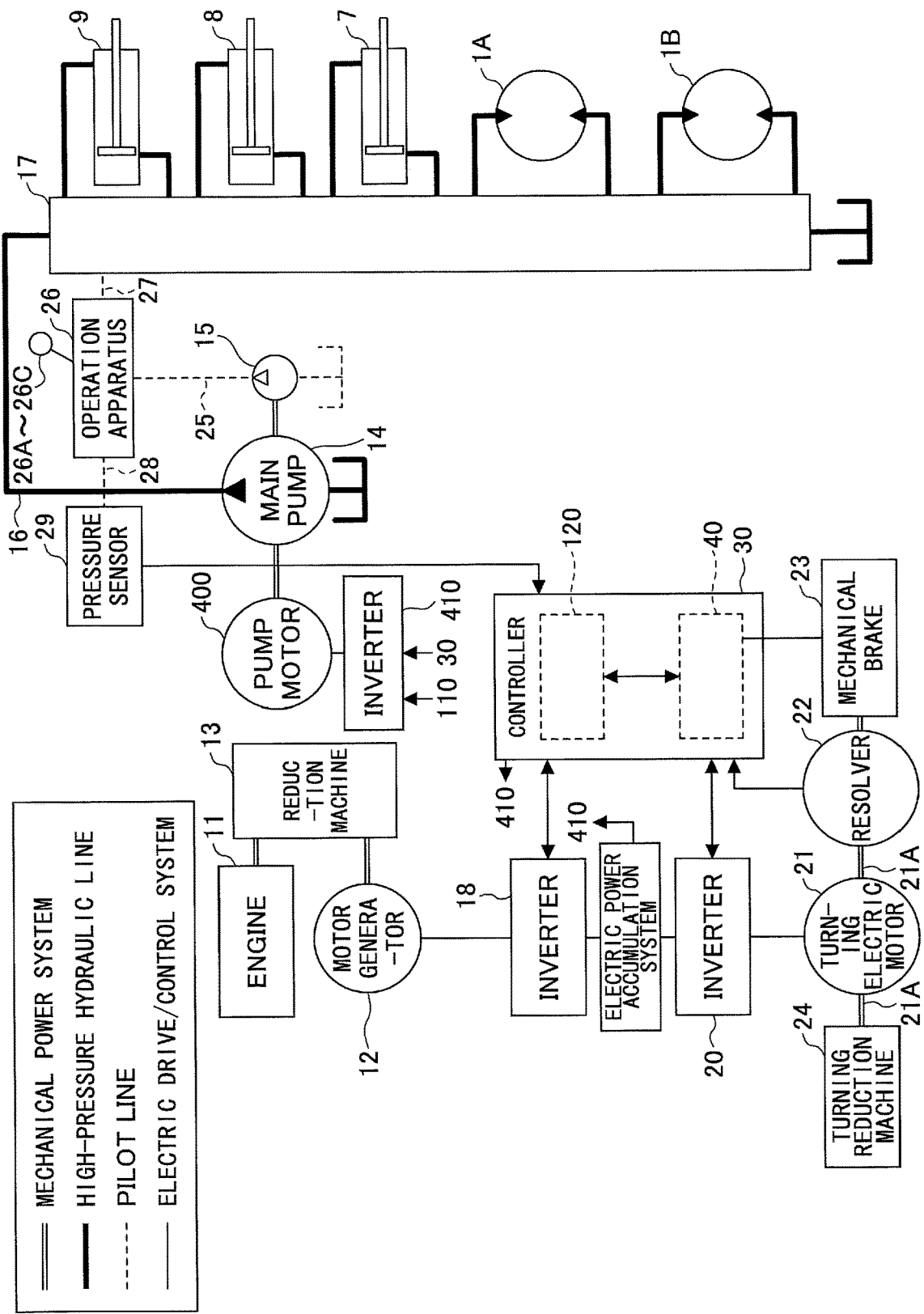
FIG. 9 is a block diagram illustrating a structure of a hybrid construction machine according to a third embodiment of the present invention.

FIG. 9 is a block diagram illustrating a structure of the hybrid construction machine according to the fourth embodiment of the present invention. The hybrid construction machine according to the fourth embodiment differs from the hybrid construction machine according to the first embodiment in that the main pump is driven by the pump motor 400 and the motor generator 12 is configured to perform a recovery of electric power (generating operation) by being driven by the engine 11. Because other structures are the same as the hybrid construction machine according to the first embodiment, the same structural elements are given the same reference numerals and descriptions thereof will be omitted. The motor generator is provided with only a function as a generator, which performs only a generating operation by being driven by the engine 11.

The pump motor 400 is configured to perform only a power running operation to drive the main pump 14, and is connected to the DC bus 110 through an inverter 410. The pump motor 400 is configured to be driven by the controller 30. When any one of the levers 26A-26C is operated, electric power is supplied through the inverter 410 from the DC bus 110 and a power running operation is performed, and the main pump 14 is driven and pressurized oil is discharged. Here, a description will be given on the assumption that a lower limit value of the rated voltage value of the pump motor 400 is the same as the lower limit value V3 of the rated voltage values of the motor generator 12 and the turning electric motor 21. Thus, there may be a condition established where electric power is supplied through the DC bus 110 to any one of the motor generator 12, the pump motor 400 and the turning electric motor 21. Additionally, there may be a condition established where electric power is supplied to the DC bus 110 from any one of the motor generator 12, the pump motor 400 and the turning electric motor 21. The drive of the turning electric motor 21 is controlled by a turning drive control apparatus 40 provided in the controller 30.

In the present embodiment, the up-down converter 100 performs a switching control between a voltage up operation and a voltage down operation so that the DC bus voltage value falls within a fixed range in accordance with operation states of the motor generator 12, the pump motor 400 and the turning electric motor 21. The DC bus 110 is arranged between the inverters 18, 410 and 20 and the up-down converter 100, and exchanges electric power with the battery 19, the pump motor 400 and the turning electric motor 21.

In the present embodiment, when an abnormality occurs in the inverter 20, similar to the hybrid construction machine according to the first embodiment, the voltage up and down control of the up-down converter 100 is continuously performed by the controller 30. Thus, the DC bus voltage value is maintained constant for a certain time period after the battery voltage value is out of the usable range, and the motor generator 12 can be driven and controlled appropriately for a time period during which the DC bus voltage value is equal to or larger than the lower limit value V3 (until the time t=t4) even when the DC bus voltage value starts to decrease.

As mentioned above, when an abnormality occurs in the inverter 20, the motor generator 12 and the pump motor 400 can be appropriately driven and controlled for a certain time period, and, thus, the motor generator 12 and the pump motor 400 can be driven and controlled for a longer time after an occurrence of an abnormality than a conventional hybrid construction machine. Accordingly it is possible to provide a hybrid construction machine which improves reliability at an emergency time.

Although the case where an abnormality occurs in the inverter 20 was explained, similarly in a case where an abnormality occurs in the inverter 18, the voltage up and down control of the up-down converter 100 is performed by the controller 30 to drive and control the turning electric motor 21 and the pump motor 400. Moreover, when an abnormality occurs in the inverter 410, similarly, the voltage up and down control of the up-down converter 100 is performed by the controller 30 to drive and control the motor generator 12 and the turning electric motor 21. Further, when an abnormality occurs in the motor generator 12, similarly, the voltage up and down control of the up-down converter 100 is performed by the controller 30 to drive and control the turning electric motor 21 and the pump motor 400. Further, when an abnormality occurs in the turning electric motor 21, similarly, the voltage up and down control of the up-down converter 100 is performed by the controller 30 to drive and control the turning electric motor 21 and pump motor 400. Further, when an abnormality occurs in the pump motor 400, similarly, the voltage up and down control of the up-down converter 100 is performed by the controller 30. In this case, the controller 30 sends a control instruction to the inverter 410 to stop the pump motor 400 in which the abnormality has occurred. Furthermore, when an abnormality occurs in the lifting magnet 200, similarly, the voltage up and down control of the up-down converter 100 is performed by the controller 30. In this case, the controller 30 sends a control instruction to the inverter 18B to stop the drive of the lifting magnet 200 in which the abnormality has occurred.

As mentioned above, although various types of hybrid construction machines are described in the first embodiment through the fourth embodiment, the hybrid construction machine of the present invention may be an arbitrary combination of the structures according to the first embodiment through the fourth embodiment.

Here, in the hybrid construction machine according to the fourth embodiment, the main pump 14 is driven by the pump motor 400 and a power of the engine 11 is not transmitted to the main pump 14. Thus, the main pump 14 cannot be driven by driving the engine 11 after an abnormality occurs in the inverter 18, 20 or 410. However, all of other structures disclosed in the first through third embodiments may be combined with the hybrid construction machine according to the fourth embodiment.

As mentioned above, according to the above-mentioned embodiments, when an abnormality due to a light malfunction occurs, which abnormality does not invite a serious problem in the operation of the electric power accumulation system or the electric drive system or which may not invite another serious problem, the hybrid construction machine can be effectively used without immediately stopping the operation such as in a case where an abnormality due to a serious malfunction occurs, by continuing the operation while limiting an output of a part in which the abnormality due to the light malfunction occurs.

By the way, in the conventional hybrid construction machine, when an abnormality occurs in an electric power accumulation system, a charge to the electric power accumulation system cannot be performed. In such a case, a voltage of a circuit connecting to the electric power accumulation system rises, and there is a possibility that an inverter connected to the circuit is damaged. Thus, in the following embodiment, when an abnormality occurs in an electric power accumulation system, a drive of an inverter is stopped to prevent the inverter from being damaged.

A description will be given below of hybrid construction machines according to a fifth embodiment through a seventh embodiment by referring to the hybrid-shovel illustrated in FIG. 1 as an example.

The mechanical drive system and the electric drive system of the hydraulic shovel according to the fifth embodiment are the same as that of the hydraulic shovel according to the first embodiment illustrated in FIG. 1 and FIG. 2, and descriptions thereof will be omitted.

As mentioned above, when an abnormality occurs in the electric power accumulation system of the hydraulic shovel, that is, when an abnormality occurs in the up-down converter 100 and does not operate normally, or when an abnormality occurs in the battery 19, an excessively large electric power is supplied to the inverter 18 or 20, and, thereby, there is a case where the inverter 18 or 20 is damaged.

Thus, in the hydraulic shovel according to the fifth embodiment of the present invention, when an abnormality occurs in the electric power accumulation system, a drive control part 120 stops the drive of the inverters 18 and 20. The operating characteristic at this time is explained with reference to FIG. 10A and FIG. 10B.

Figure 10A:
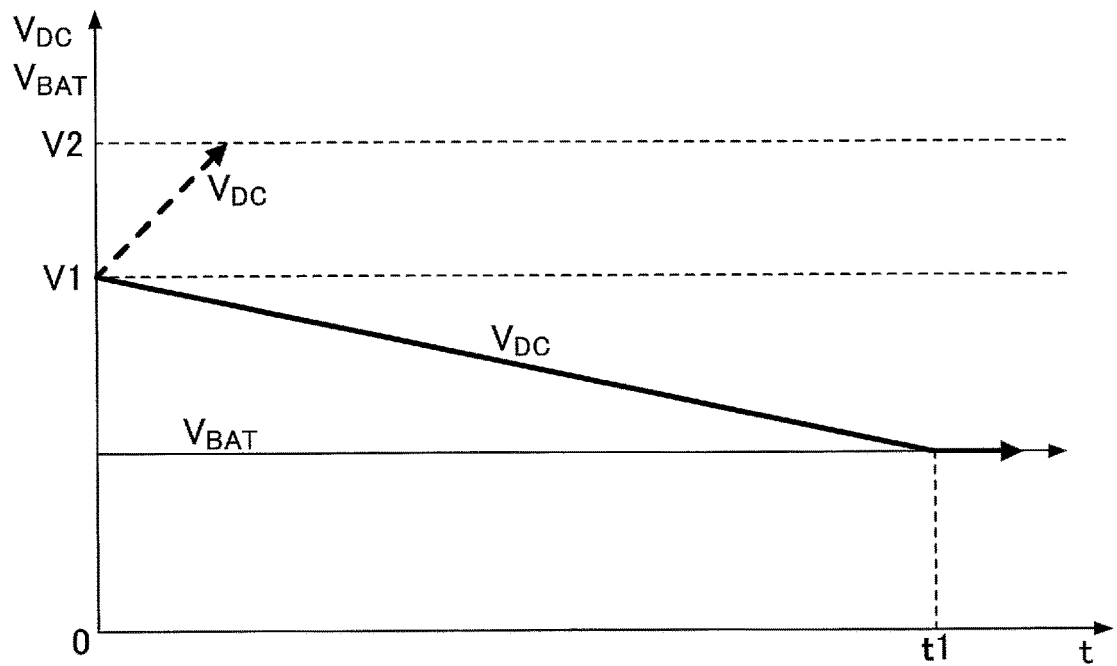
FIG. 10A is a graph illustrating transition of a DC bus voltage value and a battery voltage value when a load is performing a regenerating operation in a hydraulic shovel according to a fifth embodiment of the present invention.
Figure 10B:
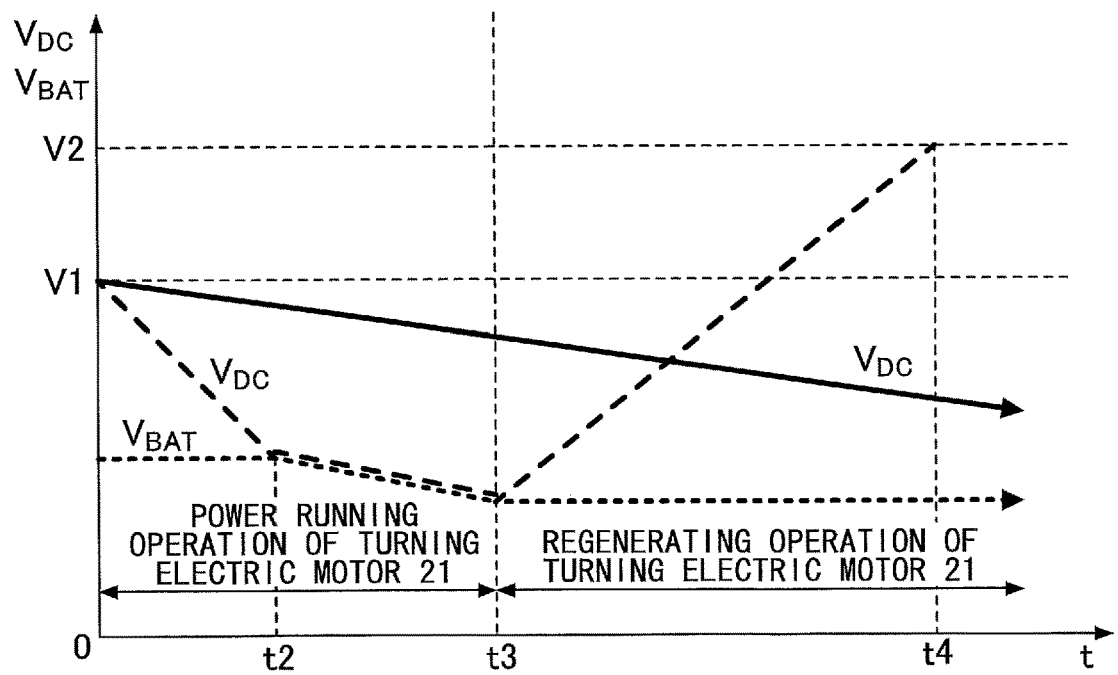
FIG. 10B is a graph illustrating transition of a DC bus voltage value and a battery voltage value when an operation state of a load is changed from a power running operation to a regenerating operation and an abnormality occurs in an electric power accumulation system in the hydraulic shovel according to the fifth embodiment of the present invention.

FIG. 10A is a graph indicating transition of the DC bus voltage value and the battery voltage value when an abnormality occurs in the electric power accumulation system in a case where a load is performing a regenerative operation in the hydraulic shovel according to the fifth embodiment of the present invention. FIG. 10B is a graph indicating transition of the DC bus voltage value and the battery voltage value when an abnormality occurs in the electric power accumulation system in a case where an operation state of a load is changed from a power running operation to a regenerative operation in the hydraulic shovel according the fifth embodiment of the present invention.

In FIG. 10A and FIG. 10B, a vertical axis represents a voltage value, V1 indicates a target value of a DC bus voltage value, V2 indicates an upper limit value of the DC bus voltage value, $V_{DC}$ indicates a DC bus voltage value, and $V_{BAT}$ indicates a battery voltage value. The upper limit value V2 of the DC bus voltage value is a voltage value for judging whether a DC bus voltage value is an excessive voltage. In FIG. 10A and FIG. 10B, a solid line illustrates a characteristic of the hybrid construction machine according to the fifth embodiment, and a dashed line illustrates a characteristic of the conventional hybrid construction machine. In addition, a characteristic when an abnormality occurs in the up-down converter 100 in the electric power accumulation systems is illustrated in FIG. 10A and FIG. 10B.

As illustrated in FIG. 10A, at a time t=0, the DC bus voltage value $V_{DC}$ is in a higher state than the battery voltage value $V_{BAT}$. If the turning electric motor 21 is performing a regenerative operation and the motor generator 12 is performing a generating operation at the time t=0 at which an abnormality occurs in the up-down converter 100, the DC bus voltage value $V_{DC}$ rises because a charge operation to the battery 19 cannot be performed. Thereafter, if the regenerative operation is continued, the DC bus voltage value $V_{DC}$ is also continues to rise and reaches the upper limit value V2, which establishes an excessive voltage state. In this case, if a motor operation of the motor generator 12 or a power running operation of the turning electric motor 21 is performed, a large amount of electric power is supplied to the inverter 18 or 20, which may damage the inverter 18 or 20. This is the same as in a case where an abnormality occurs in the up-down converter 100 when the turning electric motor 21 is performing a regenerative operation.

On the other hand, in the hybrid construction machine according to the fifth embodiment, if, for example, a temperature detection value of the temperature sensor provided in the up-down converter 100 becomes larger than a threshold value, which is previously determined according to an excessive voltage of the reactor, at the time t=0, the controller 30 makes a determination that an abnormality has occurred. In this case, the controller 30 sends a control instruction to the up-down converter 100 to stop a charge and discharge control. As a result, electric power is gradually consumed by the internal resistance of the DC bus 110, and, thereby, the DC bus voltage value $V_{DC}$ gradually decreases. Then, the DC bus voltage value $V_{DC}$ becomes the same value as the battery voltage value $V_{BAT}$ at a time t=t1.

Thus, by stopping a drive of the turning electric motor 21 when an abnormality occurs in the electric power accumulation system, the turning electric motor 21 is prohibited from generating a regenerative electric power. Thereby, the DC bus voltage value $V_{DC}$ after occurrence of an abnormality can be prevented from being raised. As a result, the inverter 18 or 20 can be prevented from being damaged even if an abnormality occurs in the electric power accumulation system.

Further, the controller 30 may send a control instruction to the inverter 18 to stop the drive and control of the motor generator 12. In this case, the DC bus voltage $V_{DC}$ is prevented from being raised due to a generated electric power because the motor generator 12 is prevented from performing a generating operation.

As mentioned above, in the hybrid construction machine according to the fifth embodiment, because the DC bus voltage value $V_{DC}$ decreases even if an abnormality occurs in the electric power accumulation system, the inverters 18 and 20 are prevented from being damaged.

On the other hand, as indicated by a dashed line in FIG. 10B, in the conventional hybrid construction machine, a drive and control of the inverters 18 and 20 is not stopped when an abnormality occurs in the up-down converter 100.

When an abnormality occurs in the up-down converter 100 at the time t=0, it becomes difficult to maintain the DC bus voltage value to a fixed value by a discharge control from the battery 19. At this time, if a control instruction is sent from the controller 30 to the inverter 20 to perform a power running operation of the turning electric motor 21, the voltage of the DC bus 110 is applied to the turning electric motor 21. Thus, the DC bus voltage cannot be maintained at V1, and the DC bus voltage rapidly decreases as compared to a voltage decrease due to power consumption by an internal resistance of the DC bus 110.

When the DC bus voltage value $V_{DC}$ and the Battery voltage value $V_{BAT}$ become the same value at time t=t2, the motor operation of the motor generator 12 is continuously performed, and, thereby, the DC bus voltage value $V_{DC}$ and the Battery voltage value $V_{BAT}$ decrease while maintaining the same value.

When the operation of the turning electric motor 21 is changed into a regenerative operation at a time t=t3, the DC bus voltage value $V_{DC}$ starts to rise, and reaches the upper limit value V2 at a time t=t4, which is an over voltage state. In this case, if the regenerative operation of the turning electric motor 21 is performed, an over voltage state is set to the inverters 18 and 20, which may damage the inverters 18 and 20.

The above-mentioned problem may occur also in a case where the motor generator 12 performs a generating operation after the time t=t3.

On the other hand, in the hybrid construction machine according to the present embodiment, if, for example, a temperature detection value of the temperature sensor provided in the up-down converter 100 becomes equal to or larger than a threshold value, which is previously determined according to an excessive voltage of the reactor, at the time t=0, the controller 30 makes a determination that an abnormality has occurred. In this case, similar to the process of FIG. 10A, the controller 30 sends a control instruction to the up-down converter 100 to stop a charge and discharge control. Then, the controller 30 also sends a control instruction to the inverter 20 to stop the drive and control of the turning electric motor 21. As a result, electric power is gradually consumed by the internal resistance of the DC bus 110, and, thereby, the DC bus voltage value $V_{DC}$ gradually decreases.

Thus, by stopping a drive of the turning electric motor 21 when an abnormality occurs in the electric power accumulation system, the turning electric motor 21 is prohibited from generating a regenerative electric power. Thereby, the DC bus voltage value $V_{DC}$ after occurrence of an abnormality can be prevented from being raised. As a result, the inverter 18 or 20 can be prevented from being damaged even if an abnormality occurs in the electric power accumulation system.

Furthermore, upon making an abnormality determination of the electric power accumulation system, the controller may send a control instruction to the inverter 18 to stop the drive and control of the motor generator 12. In this case, the motor generator 12 is prevented from performing a generating operation, and, thus, the DC bus voltage value $V_{DC}$ can be prevented from rising due to a generated electric power. In this case, the DC bus 110 is surely prevented from being an over voltage, and the inverters 18 and 20 are prevented from being damaged.

As mentioned above, in the hybrid construction machine according to the present embodiment, because the DC bus voltage value $V_{DC}$ is decreased even if an abnormality occurs in the electric power accumulation system, the inverters 18 and 20 are prevented from being damaged. Although the case where an abnormality occurs in the up-down converter 100 in the electric power accumulation system was explained in the present embodiment, the drive and control of the inverters 18 and 20 may be stopped by the drive control part 120 also when an abnormality occurs in the battery 19.

For example, when it is determined that the battery 19 is in an overheated state by the temperature sensor provided in the battery 19, the controller 30 stops the charge and discharge control of the up-down converter 100. Then, by stopping the drive of the turning electric motor 21, the regenerative operation of the turning electric motor 21 can be prohibited. Thus, when an abnormality occurs in the battery 19, similar to the above-mentioned vase, the inverters 18 and 20 can be prevented from being damaged.

Although, the case where a drive and control of the inverter 20 is stopped when an abnormality occurs in the battery or the up-down converter 100 was explained above, the controller 30 may cause the main pump 14 to limit (reduce) an amount of discharge. Thereby, a load when the engine 11 drives the main pump 14 can be reduced even in a case where an output of the motor generator 12 is reduced due to an occurrence of an abnormality in the battery 19 or the up-down converter 100. Thus, when an abnormality occurs in the battery 19 or the up-down converter 100 and if a load of the main pump 14 is large, a stall of the engine 11 can be suppressed.

Next, a description will be given of a hybrid construction machine according to a sixth embodiment of the present invention.

Figure 11:
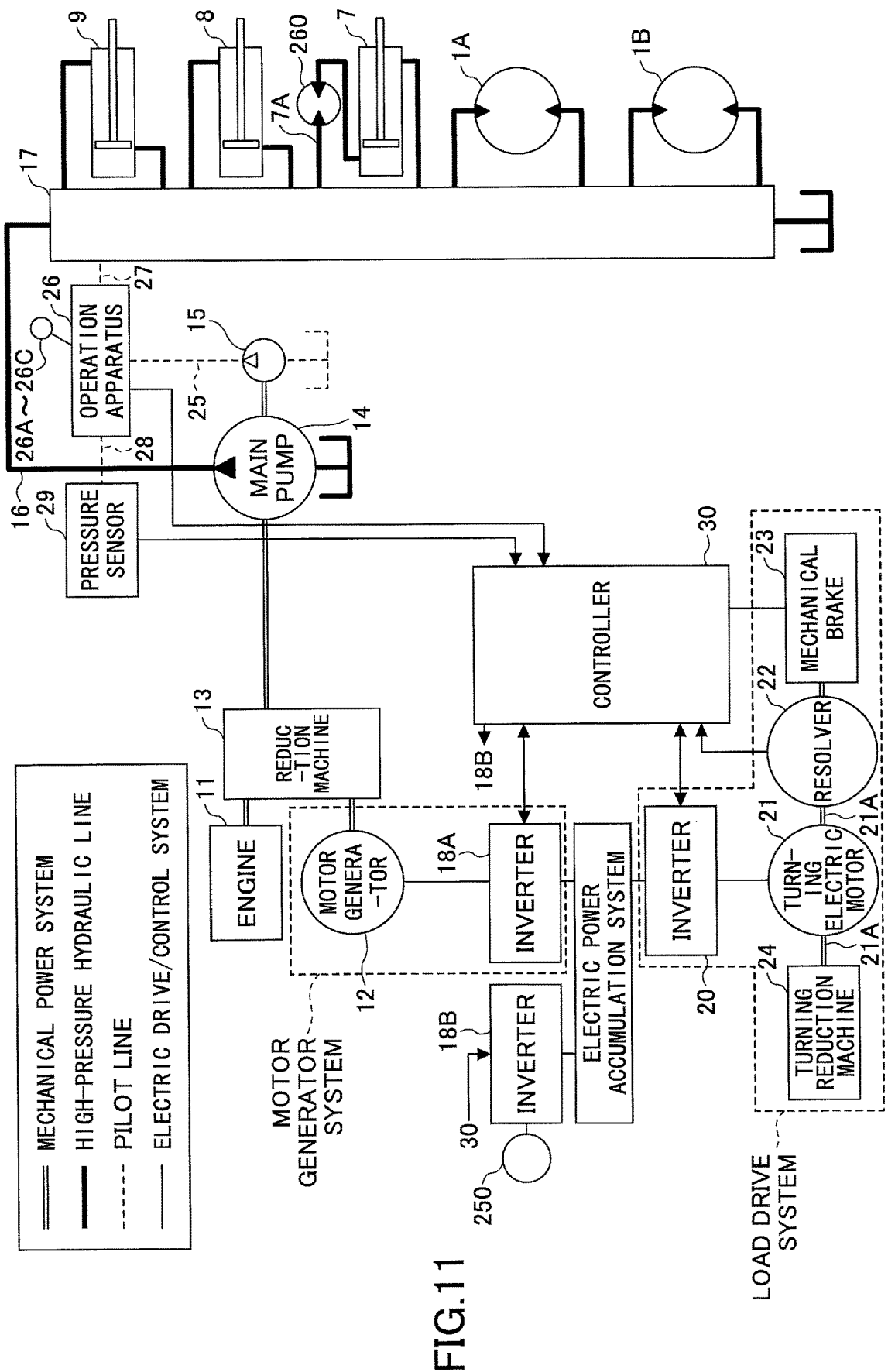
FIG. 11 is a block diagram illustrating a structure of a hydraulic shovel, which is an example of a hybrid construction machine according to a sixth embodiment of the present invention.

FIG. 11 is a block diagram illustrating a structure of a power shovel, which is an example of a hybrid construction machine according to a sixth embodiment of the present invention. The hybrid construction machine according to a sixth embodiment of the present invention differs from the hybrid construction machine according to the fifth embodiment of the present invention in that a boom regenerative generator 250 as an electric work element is connected to the DC bus 110 through the inverter 18B as a drive control system. The inverter 18B and the boom regenerative generator 250 together constitute a load drive system.

In the present embodiment, a hydraulic motor 260 is connected to the boom cylinder 7, and the rotation axis of the boom regenerative generator 250 is driven by the hydraulic motor 260. Although the hydraulic motor 260 and the boom regenerative generator 250 are separated from each other in FIG. 11 for the sake of convenience of explanation, actually, the rotation axis of the boom regenerative generator 250 is mechanically connected to the hydraulic motor 260.

The boom regenerative generator 250 is an electric work element which is driven by the hydraulic motor 260, as mentioned above, to convert potential energy into electric energy when the boom 4 is moved down by gravity. The hydraulic motor 260 is configured to be rotated by oil discharged from the boom cylinder 7 when the boom 4 is lowered, and is provided to convert energy of the boom 4 being lowered by gravity into a rotational force. Because the hydraulic motor 260 is provided between a hydraulic pipe 7A between the control valve 17 and the boom cylinder 7, it can be attached to an appropriate position in the upper-part turning body 3.

Electric power generated by the boom regenerative generator 250 is supplied to the DC bus 110 through the inverter 18B as regeneration energy. Thus, a situation may occur where electric power is supplied by either one of the motor generator 12 and the turning electric motor 21 through the DC bus 110. Moreover, a situation may occur where electric power is supplied to the DC bus 110 from any one of the motor generator 12, the boom regenerative generator 250 and the turning electric motor 21.

Thus, in the present embodiment, the up-down converter 100 performs a control to switch between a voltage-up operation and a voltage-down operation in response to the operation states of the motor generator 12, the boom regenerative generator 250 and the turning electric motor 21 so that the DC bus voltage value falls within a fixed range. The DC bus 110 is provided between the inverters 18A, 18B and 20 and the up-down converter 100 to enable exchange of electric power between the battery 19, the motor generator 12, the boom regenerative generator 250 and the turning electric motor 21.

In the present embodiment, when an abnormality occurs in the up-down converter 100 or the battery 19 of the electric power accumulation system, a drive control of the inverters 18A, 18B and 20 is stopped by the drive control part 120. Thereby, when an abnormality occurs in the electric power accumulation system, the supply of regenerative energy into the DC bus 110 from the inverter 18B can be prevented.

As mentioned above, according to the present embodiment, even in the hybrid construction machine containing the boom regenerative generator 250 which converts potential energy of the boom 4 into electric energy, similar to the hybrid construction machine according to the fifth embodiment, when an abnormality occurs in the up-down converter 100 or the battery 19 of the electric power accumulation system, the drive control of the inverters 18A, 18B and 20 is stopped by the drive control part 120. Thereby, the inverters 18A, 18B and 20 can be prevented from being damaged.

Although a mode of converting potential energy of the boom 4 into electric energy by the boom regenerative generator 250 through the hydraulic motor 260 was explained in the above embodiment, the boom regenerative generator 250 may be connected to the boom axis of the boom 4 to perform a generating operation when the boom 4 is lowered. A determination of up and down of the boom 4 may be made by the drive control part 120 based on an output of a pressure sensor provided on a secondary side of the operation lever 26A to perform an operation of the boom 4.

Next, a description will be given of a hybrid construction machine according to a seventh embodiment of the present invention.

Figure 12:
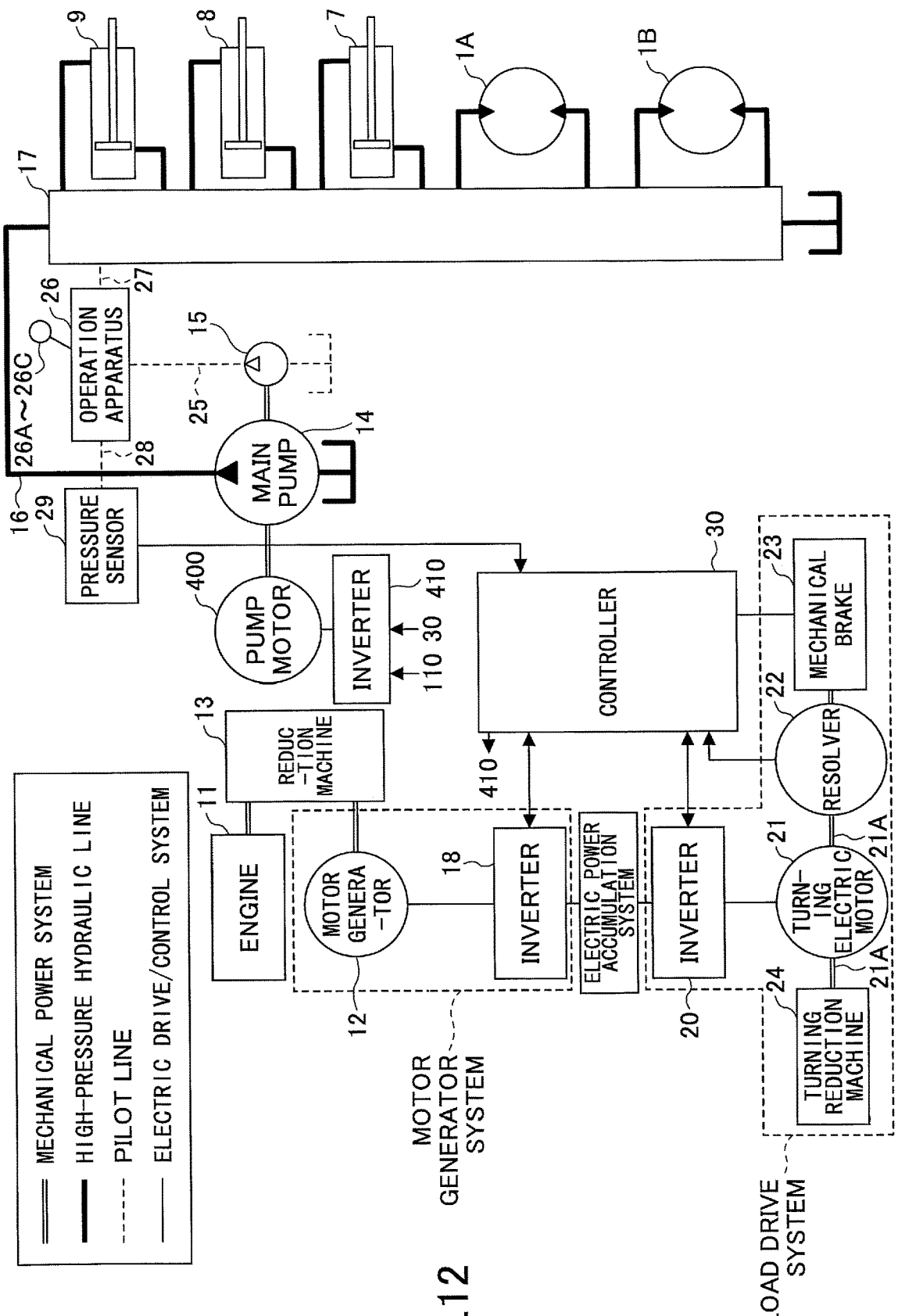
FIG. 12 is a block diagram illustrating a structure of a hydraulic shovel, which is an example of a hybrid construction machine according to a seventh embodiment of the present invention.

FIG. 12 is a block diagram illustrating a structure of a power shovel, which is an example of a hybrid construction machine according to a seventh embodiment of the present invention. The hybrid construction machine according to the seventh embodiment of the present invention differs from the hybrid construction machine according to the fifth embodiment of the present invention in that a main pump 14 is driven by a pump motor 400 and the motor generator 12 is configured to recover (generating operation) by being driven by the engine 11. Because other structures are the same as the hybrid construction machine according to the fifth embodiment, the same structural elements are given the same reference numerals, and descriptions thereof will be omitted. Here, the motor generator 12 has only a function as a generator to perform only a generating operation by being driven by the engine 11.

The pump motor 400 is configured to perform only a power running operation to drive the main pump 14, and is connected to the DC bus 110 through the inverter 410. The pump motor 400 is configured to be driven by the drive control part 120. When one of the levers 26A through 26C is operated, electric power is supplied to the pump motor 400 from the DC bus 110 through the inverter 410, and, thereby, a power running operation is performed and the pump 14 is driven and a pressurized oil is discharged. Thus, a situation may occur where electric power is supplied through the DC bus 110 to any one of the motor generator 12, the pump motor 400 and the turning electric motor 21. Additionally, a situation may occur where electric power is supplied to the DC bus 110 from either of the motor generator 12 and the turning electric motor 21.

Thus, in the present embodiment, the up-down converter 100 performs a control to switch between a voltage-up operation and a voltage-down operation in response to the operation states of the motor generator 12, the pump motor 400 and the turning electric motor 21 so that the DC bus voltage value falls within a fixed range. The DC bus 110 is provided between the inverters 18, 410 and 20 and the up-down converter 100 to enable exchange of electric power between the battery 19, the pump motor 400 and the turning electric motor 21.

In the hybrid construction machine of the above-mentioned structure, similar to the hybrid construction machine according to the fifth embodiment, when an abnormality occurs in the up-down converter 100 or the battery 19 of the electric power accumulation system, a drive control of the inverters 18, 20 and 410 is stopped by the drive control part 120. Thereby, the inverters 18, 20 and 410 are prevented from being damaged.

The hybrid construction machines having various structures are explained in the fifth through seventh embodiments. The hybrid construction machine according to the present invention can be made by arbitrarily combining the structures of the fifth through seventh embodiments. Although the hybrid construction machine provided with the up-down converter 100 was explained in the fifth through seventh embodiments, the abnormality processing of the electric power accumulation system due to an abnormality of the battery 19 can be applied in a case where the up-down converter 100 is not provided.

By the way, in the conventional hybrid construction machine, when an abnormality occurs in a motor generator for assistance or a drive control system of the motor generator, the motor generator cannot perform a motor operation to assist the engine, and, thus, a regenerative electric power generated by the turning electric motor may not be recovered by the electric power accumulation system. Moreover, conversely, when an abnormality occurs in the turning electric motor or the drive control system of the turning electric motor, electric power generated by the motor generator may not be recovered by the electric power accumulation system. In this case, a voltage of the electric power accumulation system becomes an excessive voltage, which may cause the electric power accumulation system being damaged.

Thus, in the following embodiments, an attempt is made to improve reliability by stopping a drive of a drive control system of an electric work element when an abnormality occurs in a motor generator or a drive control system of the motor generator.

A description will be given below of hybrid construction machine according to eighth through tenth embodiments of the present invention with reference to the hydraulic shovel illustrated in FIG. 1 as an example.

The mechanical drive system of the hydraulic shovel according to the eighth embodiment of the present invention has the same structure as the hybrid construction machine according to the first embodiment illustrated in FIG. 1 and FIG. 2, and descriptions thereof will be omitted.

As mentioned above, when an abnormality occurs in the motor generator 12 or the inverter 18, an excessive electric power is supplied to the inverter 20, and it is possible that the inverter 20 is damaged. For this reason, in the hybrid construction machine according to the eighth embodiment, when an abnormality occurs in the motor generator 12 or the inverter 18, the drive control part 120 stops the drive of the inverter 20. The operating characteristic at this time is explained with reference to FIG. 13A, FIG. 13B and FIG. 14.

Figure 13A:
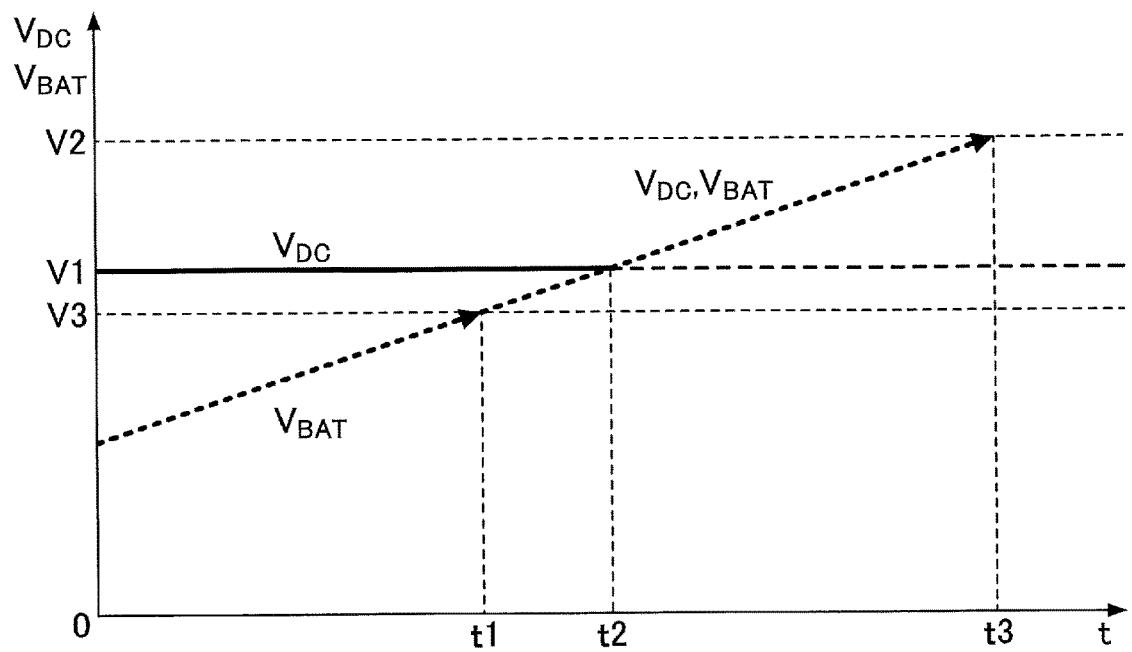
FIG. 13A is a graph illustrating transition of a DC bus voltage value and a battery voltage value when a load is performing a regenerating operation and an abnormality occurs in a motor generator or an inverter in a conventional hybrid construction machine.
Figure 13B:
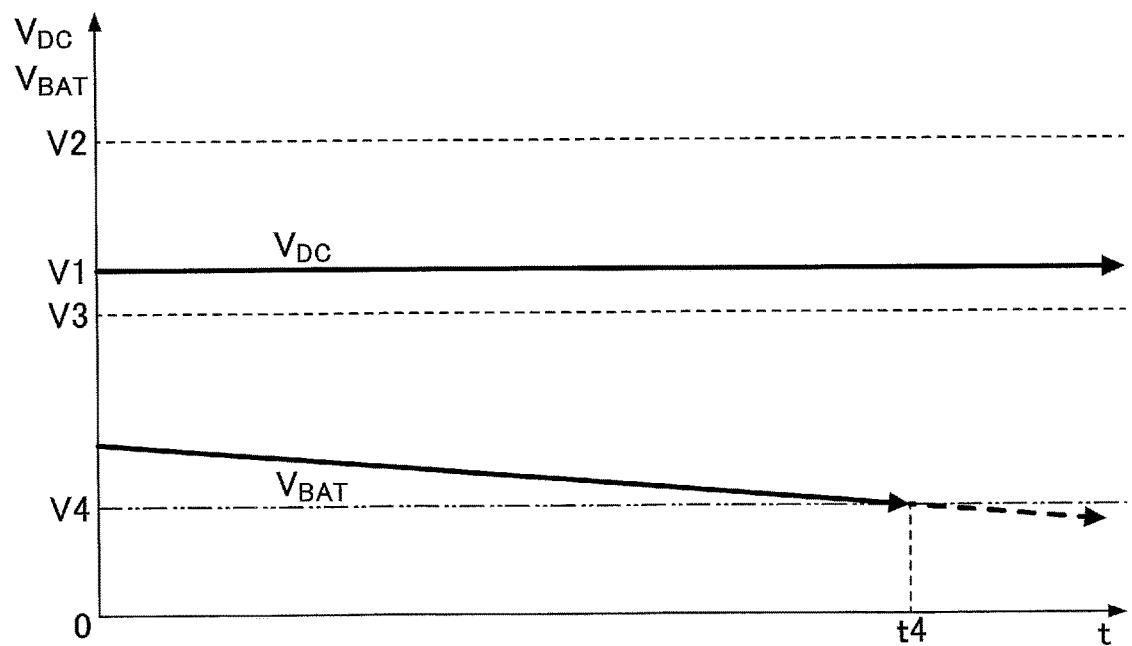
FIG. 13B is a graph illustrating transition of a DC bus voltage value and a battery voltage value when a load is performing a power running operation and an abnormality occurs in an inverter in a conventional hybrid construction machine.
Figure 14:
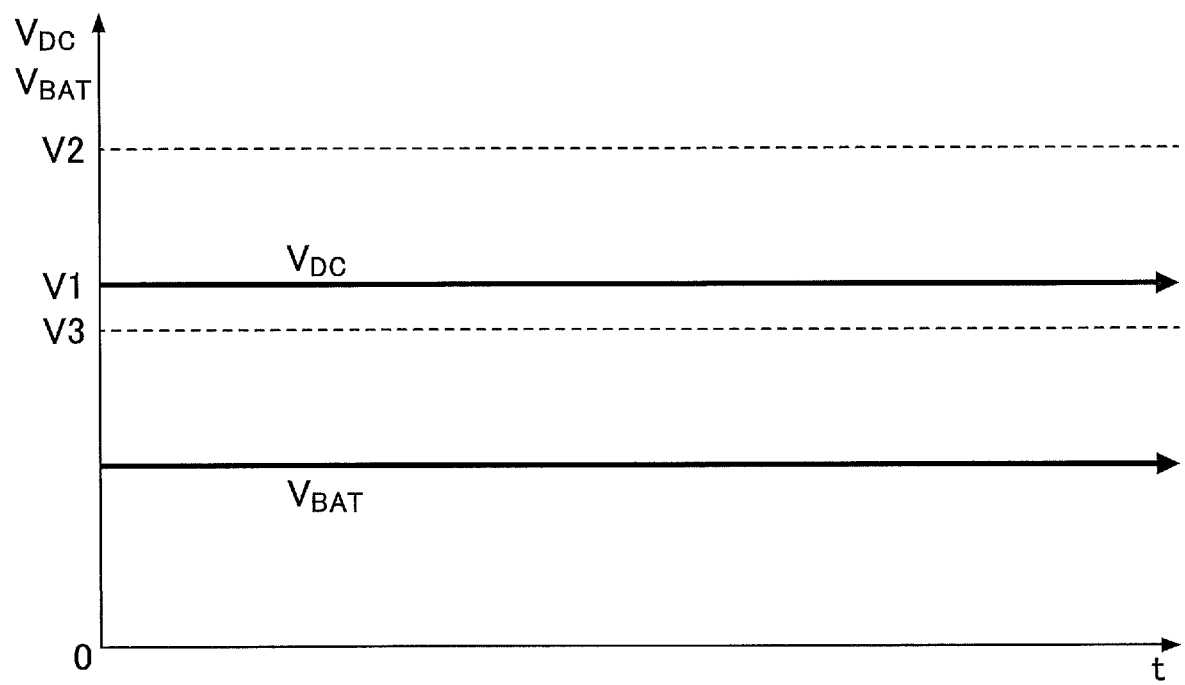
FIG. 14 is a graph illustrating transition of a DC bus voltage value and a battery voltage value when an abnormality occurs in a motor generator or an inverter in a hybrid construction machine according to an eighth embodiment according to the present invention.

FIG. 13A is a graph illustrating transition of the DC bus voltage value and the battery voltage value when an abnormality occurs in the motor generator 12 or the inverter 18 in a case where a load is performing a regenerative operation in the conventional hybrid construction machine. FIG. 13B is a graph illustrating transition of the DC bus voltage value and the battery voltage value when an abnormality occurs in the motor generator 12 or the inverter 18 in a case where a load is performing a power running operation in the conventional hybrid construction machine. FIG. 14 is a graph illustrating transition of the DC bus voltage value and the battery voltage value when an abnormality occurs in the motor generator 12 or the inverter 18 in the hybrid construction machine according to the eighth embodiment of the present invention.

In FIG. 13A, FIG. 13B and FIG. 14, a vertical axis represents a voltage value, V1 indicates a target value of a DC bus voltage value, V2 indicates an upper limit value of the DC bus voltage value, $V_{DC}$ indicates a DC bus voltage value, and $V_{BAT}$ indicates a battery voltage value. The upper limit value V2 of the DC bus voltage value is a voltage value for judging whether a DC bus voltage value is an excessive voltage. The battery usable range is a range of the battery voltage value when using the battery 19 in the hybrid construction machine, and only a lower limit value V4 is indicated in FIG. 13B. A characteristic of a case where an abnormality occurs in the inverter 18 is indicated in FIG. 13A and FIG. 13B. Before a time t=0, a regenerative operation of the turning electric motor 21 is performed in FIG. 13A and a power running operation is performed in FIG. 13B.

As illustrated in FIG. 13A, at the time t=0, the DC bus voltage value $V_{DC}$ is in a higher state than the battery voltage value $V_{BAT}$. In a conventional hybrid construction machine, even when an abnormality occurs in the inverter 18 at the time t=0, the drive control of the turning electric motor 21 as an electric drive work element is not stopped, and, thus, electric power regenerated by the turning electric motor 21 is supplied to the DC bus 110. Thereby, the controller 30 causes the up-down converter 100 to perform a voltage-down operation to maintain the DC bus voltage value $V_{DC}$ constant, and, thus, the battery voltage value $V_{BAT}$ is raised.

The battery voltage value $V_{BAT}$ reaches the DC bus voltage value $V_{DC}$ at a time t=t2. Thereafter, if the regeneration from the turning electric motor 21 is continued, both the battery voltage value $V_{BAT}$ and the DC bus voltage value $V_{DC}$ are raised. Further, at a time t=t3, the upper limit value of the DC bus voltage value is reached. In this case, an excessive voltage state is set also to the inverter 20, and the inverter 20 may be damaged. Additionally, as illustrated in FIG. 13B, at the time t=0, the DC bus voltage value $V_{DC}$ is in a higher state than the battery voltage value $V_{BAT}$.

Thus, in the conventional hybrid construction machine, because the drive control of the turning electric motor 21 as an electric work element does not stop even when an abnormality occurs in the inverter 18 at the time t=0, the electric power of the DC bus 110 is consumed by the turning electric motor 21. Thereby, the drive control part 120 causes the up-down converter 100 to perform a voltage-up operation to maintain the DC bus voltage value $V_{DC}$ constant, and thus, the battery voltage value $V_{BAT}$ is down. By the motor operation of the turning electric motor 21 being performed continuously, the battery voltage value $V_{BAT}$ goes below the lower limit value V4 of the battery usable range. When the battery voltage value $V_{BAT}$ is below the lower limit value V4, an output of the battery 19 is reduced, and, thus, a normal operation cannot be performed.

On the other hand, in the present embodiment, even if an abnormality occurs in the inverter 18, the inverter 20 can be prevented from being damaged, as mentioned below. Time transition of the battery voltage value and the DC bus voltage value after an abnormality occurs in the inverters 18 and 20 in the eighth embodiment is illustrated in FIG. 14.

When the hybrid construction machine continues work and an excessive load is applied to the motor generator 12 and a detection value of the temperature sensor 12A provided in the motor generator 12 reaches a previously determined temperature, the controller 30 determines that the motor generator 12 is in an overload state (time t=0). In this case, the controller 30 determines that an abnormality has occurred in the motor generation system. Then, the controller sends a control instruction to the inverter 18 to stop the drive of the motor generator 12. Further, the controller 30 sends a control instruction to the inverter 20 to stop the drive control of the turning electric motor 21. Thereby, the turning electric motor 21 is prohibited from generating a regenerative electric power, and further prohibited from consuming electric power due to a power running operation. On the other hand, the controller 30 sends a control instruction to the up-down converter 100 before or after an abnormality occurrence of the motor generation system to continuously maintain the DC bus voltage value $V_{DC}$.

Thereby, as illustrated in FIG. 14, after the time t=0, the DC bus voltage value $V_{DC}$ and the battery voltage value $V_{BAT}$ are maintained at a fixed value. For this reason, the inverter 20 is not damaged. It should be noted that when an abnormality occurs in the motor generator 12 instead of the inverter 18, similarly, the drive control of the inverter 20 is stopped by the drive control part 120, and the DC bus voltage value $V_{DC}$ and the battery voltage value $V_{BAT}$ are maintained at a fixed value. Thus, no situation occurs where the inverter 20 is damaged.

As mentioned above, in the present embodiment, when an abnormality occurs in the motor generator 12 or the inverter, which is a drive control system of the motor generator 12, the drive control of the inverter 20 is stopped by the drive control part 120. Thus, the inverter 20 is prevented from being damaged. After the stop of the drive control of the inverters 18 and 20, the DC bus voltage value $V_{DC}$ and the battery voltage value $V_{BAT}$ are maintained at a fixed value. Thus, a normal operation can be performed immediately after the recovery of the inverter 18. Additionally, when an abnormality occurs in the motor generator 12 or the inverter 18, the controller 30 may limit (decrease) an amount of discharge of the main pump 14. Thereby, a load applied to the engine 11 to drive the main pump 14 can be reduced even in a case where the output of the motor generator 12 is decreased due to an occurrence of an abnormality in the motor generator 12 or the inverter 18. Thus, an amount of discharge of the main pump is limited when an abnormality occurs in the motor generator 12 or the inverter 18, thereby suppressing a stall of the engine 11.

Next, a description will be given of a hybrid construction machine according to a ninth embodiment of the present invention.

Figure 15:
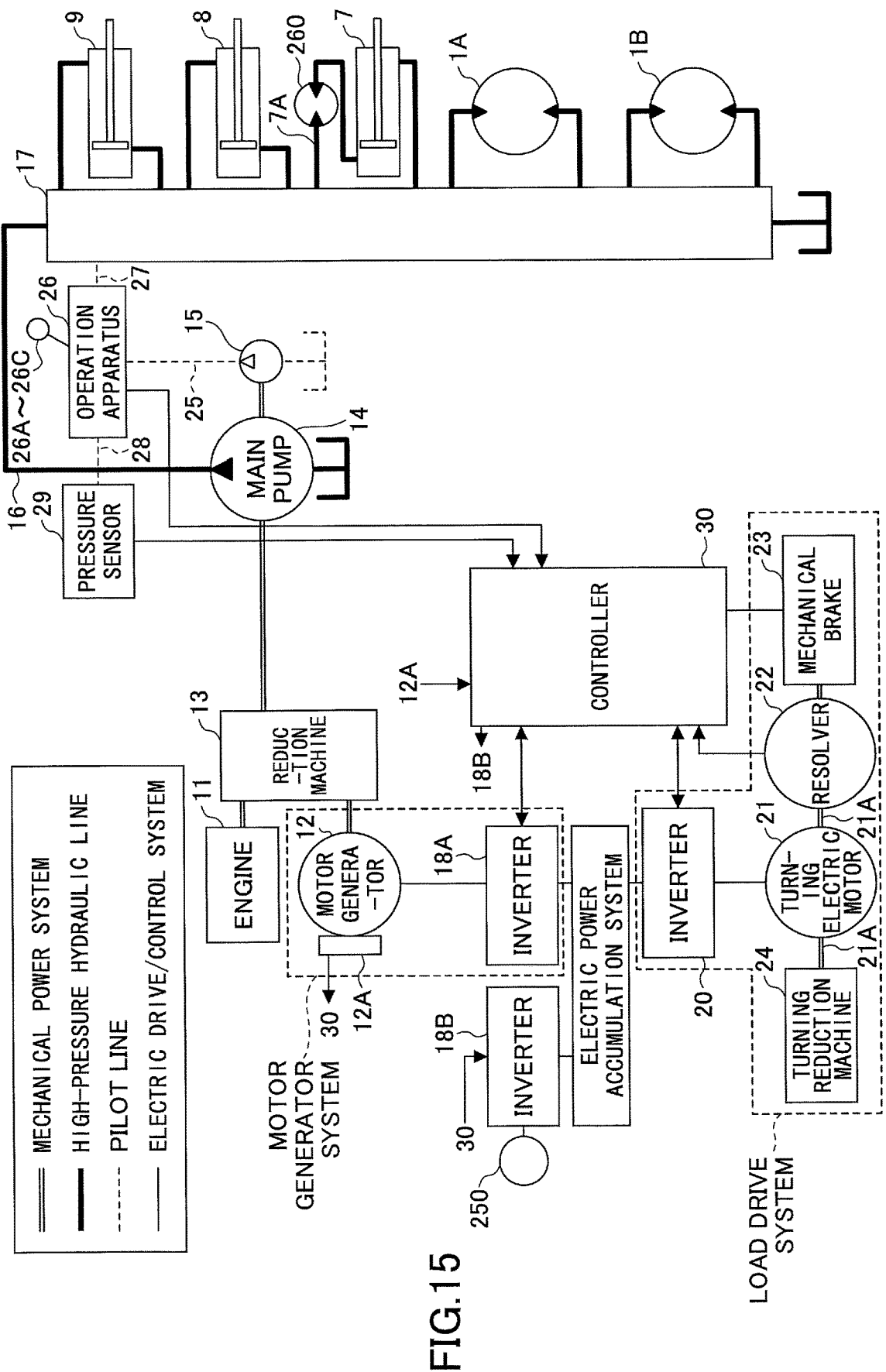
FIG. 15 is a block diagram illustrating a structure of a hydraulic shovel, which is an example of a hybrid construction machine according to a ninth embodiment according to the present invention.

FIG. 15 is a block diagram illustrating a structure of a power shovel, which is an example of a hybrid construction machine according to a ninth embodiment of the present invention. The hybrid construction machine according to the ninth embodiment of the present invention differs from the hybrid construction machine according to the eighth embodiment of the present invention in that a boom regenerative generator 250 as an electric work element is connected to the DC bus 110 through the inverter 18B as a drive control system. The inverter 18B and the boom regenerative generator 250 together constitute a load drive system.

In the hybrid construction machine according to the ninth embodiment, a hydraulic motor 260 is connected to the boom cylinder 7, and the rotation axis of the boom regenerative generator 250 is driven by the hydraulic motor 260. Although the hydraulic motor 260 and the boom regenerative generator 250 are separated from each other in FIG. 15 for the sake of convenience of explanation, actually, the rotation axis of the boom regenerative generator 250 is mechanically connected to the hydraulic motor 260.

The boom regenerative generator 250 is an electric work element which is driven by the hydraulic motor 260, as mentioned above, to convert potential energy into electric energy when the boom 4 is moved down by gravity. The hydraulic motor 260 is configured to be rotated by oil discharged from the boom cylinder 7 when the boom 4 is lowered, and is provided to convert energy of the boom 4 being lowered by gravity into a rotational force. Because the hydraulic motor 260 is provided between a hydraulic pipe 7A between the control valve 17 and the boom cylinder 7, it can be attached to an appropriate position in the upper-part turning body 3. Electric power generated by the boom regenerative generator 250 is supplied to the DC bus 110 through the inverter 18B as regeneration energy.

Thus, a situation may occur where electric power is supplied either one of the motor generator 12 and the turning electric motor 21 through the DC bus 110. Moreover, a situation may occur where electric power is supplied to the DC bus 110 from any one of the motor generator 12, the boom regenerative generator 250 and the turning electric motor 21.

In the present embodiment, the up-down converter 100 performs a control to switch between a voltage-up operation and a voltage-down operation in response to the operation states of the motor generator 12, the boom regenerative generator 250 and the turning electric motor 21 so that the DC bus voltage value falls within a fixed range. The DC bus 110 is provided between the inverters 18A, 18B and 20 and the up-down converter 100 to enable exchange of electric power between the battery 19, the motor generator 12, the boom regenerative generator 250 and the turning electric motor 21.

In the present embodiment, when an abnormality occurs in the inverter 18A at the time t=0, the drive control part 120 stops the drive control of the inverters 18B and 20 and also stops the drive control of the boom regenerative motor 250 and the turning electric motor 21. Thereby, when an abnormality occurs in the electric power accumulation system, the supply of regenerative energy into the DC bus 110 from the inverter 18B can be prevented. Thereby, the DC bus voltage value $V_{DC}$ and the battery voltage value $V_{BAT}$ are maintained at a fixed value. Thus, no situation occurs where the inverters 18B and 20 are damaged. When an abnormality occurs in the motor generator 12 instead of the inverter 18A, similarly, the DC bus voltage value $V_{DC}$ and the battery voltage value $V_{BAT}$ are maintained at a fixed value. Thus, no situation occurs where the inverters 18B and 20 are damaged.

As mentioned above, in the present embodiment, when an abnormality occurs in the motor generator 12 or the inverter 18, which is a drive control system of the motor generator 12, the drive control of the inverters 18B and 20 is stopped by the drive control part 120. Thus, the inverters 18B and 20 are prevented from being damaged. After the stop of the drive control of the inverters 18B and 20, the DC bus voltage value $V_{DC}$ and the battery voltage value $V_{BAT}$ are maintained at a fixed value. Thus, a normal operation can be performed immediately after the recovery of the inverter 18.

Although an example of converting a potential energy of the boom 4 into an electric energy by the generator 250 through the hydraulic motor 260 was explained above, the boom regenerative generator 250 may be connected to a boom axis of the boom 4 and configured to perform a generating operation when the boom 4 is lowered. A determination of moving up or down of the boom 4 may be performed by an output of a pressure sensor provided on a secondary side of the operation lever 26A, which is provided to operate the boom 4.

Next, a description will be given of a hybrid construction machine according to a tenth embodiment of the present invention.

Figure 16:
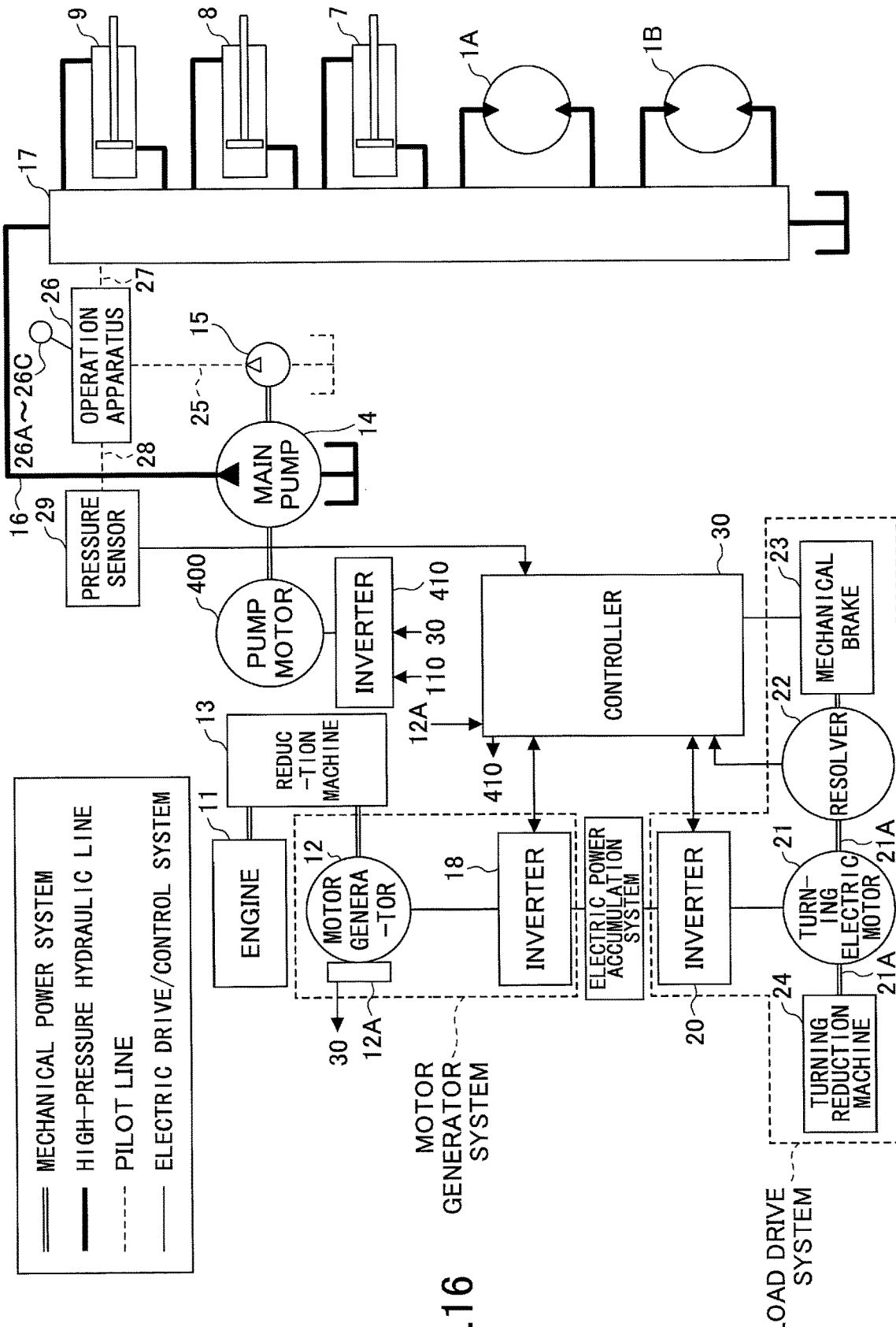
FIG. 16 is a block diagram illustrating a structure of a hydraulic shovel, which is an example of a hybrid construction machine according to a tenth embodiment of the present invention.

FIG. 16 is a block diagram illustrating a structure of a power shovel, which is an example of a hybrid construction machine according to a tenth embodiment of the present invention. The hybrid construction machine according to the tenth embodiment of the present invention differs from the hybrid construction machine according to the eighth embodiment of the present invention in that a main pump 14 is driven by a pump motor 400 and the motor generator 12 is configured to recover (generating operation) by being driven by the engine 11. Because other structures are the same as the hybrid construction machine according to the eighth embodiment, the same structural elements are given the same reference numerals, and descriptions thereof will be omitted. Here, the motor generator 12 has only a function as a generator to perform only a generating operation by being driven by the engine 11.

The pump motor 400 is configured to perform only a power running operation to drive the main pump 14, and is connected to the DC bus 110 through the inverter 410. The pump motor 400 is configured to be driven by the drive control part 120. When one of the levers 26A through 26C is operated, electric power is supplied to the pump motor 400 from the DC bus 110 through the inverter 410, and, thereby, a power running operation is performed and the pump 14 is driven and a pressurized oil is discharged. Thus, a situation may occur where electric power is supplied through the DC bus 110 to any one of the motor generator 12, the pump motor 400 and the turning electric motor 21. Additionally, a situation may occur where electric power is supplied to the DC bus 110 from either of the motor generator 12 and the turning electric motor 21.

In the present embodiment, the up-down converter 100 performs a control to switch between a voltage-up operation and a voltage-down operation in response to the operation states of the motor generator 12, the pump motor 400 and the turning electric motor 21 so that the DC bus voltage value falls within a fixed range. The DC bus 110 is provided between the inverters 18, 410 and 20 and the up-down converter 100 to enable exchange of electric power between the battery 19, the pump motor 400 and the turning electric motor 21.

In the hybrid construction machine of the above-mentioned structure, when an abnormality occurs in the inverter 18 at the time t=0, the drive control part 120 stops the drive control of the inverter 20 and the inverter 410 and also stops the drive control of the turning electric motor 21 and the pump motor 400. Thereby, the DC bus voltage value $V_{DC}$ and the battery voltage value $V_{BAT}$ are maintained at a fixed value. Thus, no situation occurs where the inverters 20 and 410 are damaged. Similarly, in a case where an abnormality occurs in the motor generator 12 instead of the inverter 18, the DC bus voltage value $V_{DC}$ and the battery voltage value $V_{BAT}$ are maintained at fixed value. Thus, no situation occurs where the inverters 20 and 410 are damaged.

As mentioned above, in the hybrid construction machine according to the tenth embodiment, when an abnormality occurs in the motor generator 12 or the inverter 18, which is a drive control system of the motor generator 12, the drive control of the inverters 20 and 410 is stopped by the drive control part 120. Thus, the inverters 20 and 410 are prevented from being damaged. After the stop of the drive control of the inverters 20 and 410, the DC bus voltage value $V_{DC}$ and the battery voltage value $V_{BAT}$ are maintained at a fixed value. Thus, a normal operation can be performed immediately after the recovery of the inverter 18.

The hybrid construction machines having various structures are explained in the eighth through tenth embodiments. The hybrid construction machine according to the present invention can be made by arbitrarily combining the structures of the eighth through tenth embodiments. Although the hybrid construction machine provided with the up-down converter 100 was explained in the eighth through tenth embodiments, the abnormality processing can be applied in a case where the up-down converter 100 is not provided.

By the way, in the conventional lifting magnet hybrid construction machine, if all control is stopped when an abnormality occurs in the motor generator for assistance or a drive control system of the motor generator, an electric power supply to a lifting magnet is no longer be performed. This is the same when an abnormality occurs in an electric power accumulator or an up-down converter of an electric power accumulation system. Thus, if an operation is stopped each time an abnormality occurs, a work efficiency is remarkable decreased.

Thus, in the embodiments mentioned below, when an abnormality occurs in a motor generator, a drive control system of the motor generator or an electric power accumulator or an up-down converter of an electric power accumulation system, a lifting magnet is permitted to be driven, thereby attempting to improve a work efficiency.

A description will be given below, with reference to the lifting magnet hybrid construction machine illustrated in FIG. 7 as an example, of hybrid construction machines according to the eleventh through thirteenth embodiments.

The machine drive system and the electric drive system of the lifting magnet hybrid construction machine according to the eleventh embodiment of the present invention have the same structure as the lifting magnet hybrid construction machine according to the second embodiment illustrated in FIG. 6 and FIG. 7, and descriptions thereof will be omitted.

Figure 17:
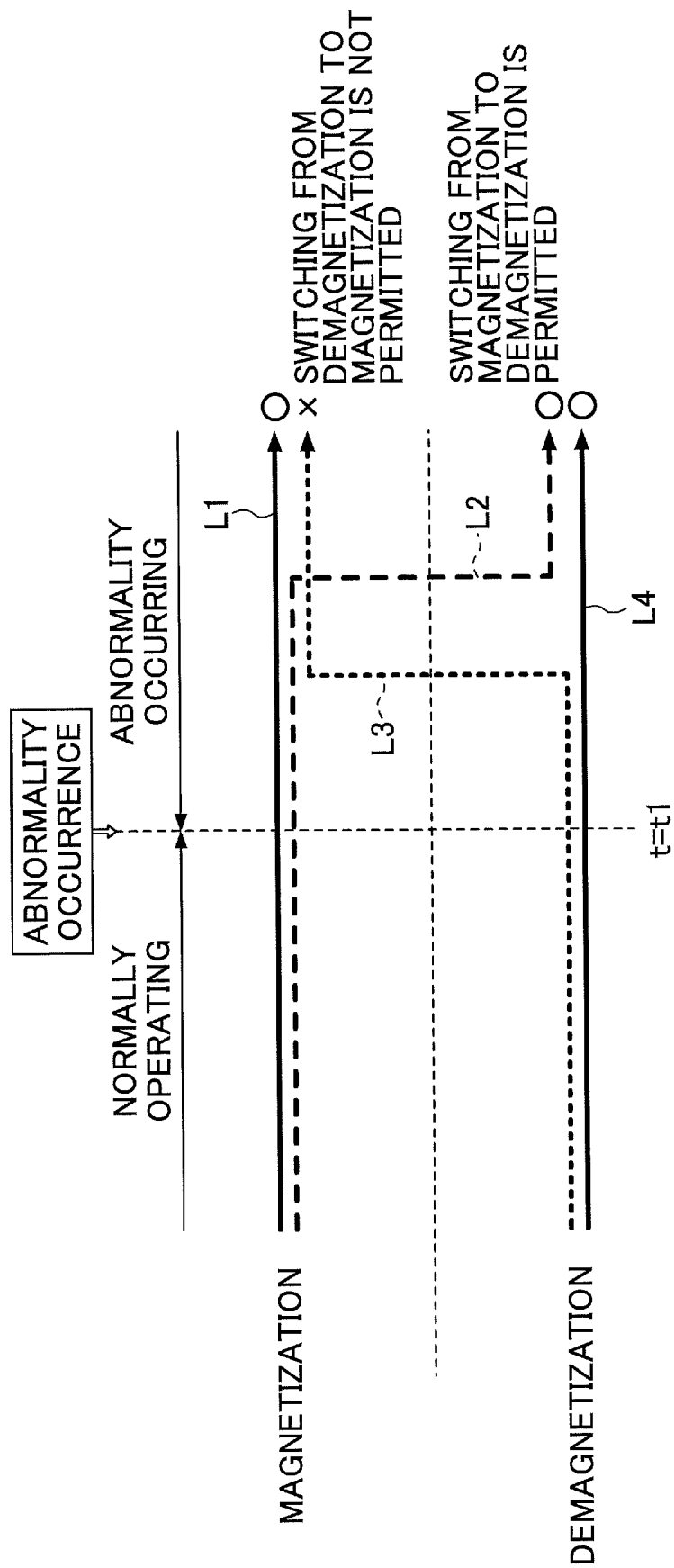
FIG. 17 is a time chart conceptually illustrating a pattern of a drive control of a lifting magnet before and after an occurrence of an abnormality of a lifting magnet system hybrid construction machine according to an eleventh embodiment of the present invention.

FIG. 17 is a time chart conceptually illustrating a pattern of a drive control of the lifting magnet 200 before and after an occurrence of abnormality of the lifting magnet hybrid construction machine according to the eleventh embodiment.

As illustrated in FIG. 17, it is supposed that an abnormality occurs in either the motor generator 12, the inverter 18, the battery 19 or the up-down converter 100 at a time t=t1. If the lifting magnet 200 is magnetized (attraction) (L1, L2), the magnetization (attraction) state is maintained after the time t=t1. In this case, the magnetization (attraction) state can be maintained (L1) as indicated by a solid line, and if there is a demagnetization (release) operation, the lifting magnet 200 is demagnetized (released) (L2) as indicated by a dashed line.

On the other hand, if the lifting magnet 200 is demagnetized (released) before the time t=t1 (L3, L4), and there is no magnetization (attraction) operation after the time t=t1, the demagnetization (release) state is continued as indicated by a solid line. Additionally, if there is a magnetization (attraction) operation after the time t=t1, change of the operation to the magnetization of the lifting magnet 200 is prohibited (L3) as indicated by a dashed line.

As mentioned above, in the present embodiment, the lifting magnet 200 cannot be changed into the magnetization (attraction) state after an abnormality occurs.

FIG. 18A is a graph illustrating transition of a voltage in a case where an abnormality occurs in the up-down converter 100 in the hybrid construction machine according to the present embodiment. FIG. 18B is a graph illustrating transition of a drive state of the up-down converter 100, a drive state of the lifting magnet 200, and contents of operation of the lifting magnet 200 by the operator in a case where an abnormality occurred in the up-down converter 100.

In FIG. 18A, a horizontal axis represents a time t, and a vertical axis represents a voltage value. V1 in the vertical axis indicates a target value of the DC bus voltage value, V2 indicates a battery voltage value (initial value) at a time t=0, V3 indicates a generation voltage in the magnetized state of the motor generator 12. Additionally, the DC bus voltage value is represented by $V_{DC}$, the battery voltage value is represented by $V_{BAT}$ and the output voltage value of the motor generator 12 is represented by $V_{ASM}$.

At the time t=0, as illustrated in FIG. 18B, the up-down converter 100 is performing a voltage up and down control, and the operation of the lifting magnet 200 by the operator is magnetization (attraction), and, thus, the lifting magnet 200 is in a magnetized (attracting) state. Additionally, the motor generator 12 is set in a generating state as a magnetized state.

Here, as illustrated in FIG. 18A, values of the output voltage value $V_{ASM}$, the battery voltage value $V_{BAT}$ and the DC bus voltage value $V_{DC}$ are higher in that order.

Because, the lifting magnet 200 is set in the magnetized (attracting) state, after the time t=0, electric power is supplied from the DC bus 110 to the lifting magnet 200. However, because the up-down converter 100 is performing a voltage-up operation, the DC bus voltage value $V_{DC}$ is maintained at the target value V1 and the battery voltage value $V_{BAT}$ decreases. The motor generator 12 is performing a generating operation in the magnetized state by being driven by the engine 11, and the output voltage value $V_{ASM}$ of the motor generator 12 is maintained at V3.

Then, the voltage-up operation is continuously performed from the battery 19, and the reactor is set in an overheated state. An abnormality determination part compares a temperature detection value detected by the temperature sensor of the reactor with a threshold value and, if the temperature detection value is equal to or higher than the threshold value, determines that an abnormality has occurred. Then, the controller 30 stops an operation of the up-down converter 100 (time t=t1). The controller 30 controls the lifting magnet 200 to continue the operation before and after the occurrence of the abnormality in the up-down converter 100. Thus, electric power of the DC bus 110 is consumed by the lifting magnet 200, but because the up-down converter 100 stops the operation, the DC bus voltage cannot be maintained at V1 and gradually decreases. Here, even if an abnormality occurs in the up-down converter, electric power is supplied from the battery 19 to the DC bus 110 because the battery 19 and the up-down converter 100 are in an electrically connected state. As a result, the battery voltage $V_{BAT}$ of the battery 19 also decreases by an amount corresponding to electric power supplied to the DC bus 110.

On the other hand, the controller 30 controls the inverter 18A to maintain the generation state of a previously determined electric power. Thus, because the control of the inverter 18A of the motor generator 12 is continued before and after the occurrence of the abnormality, the voltage value V3 before the occurrence of the abnormality can be maintained.

At a time t=t2, the DC bus voltage value $V_{DC}$ decreases to the same value as the battery voltage value $V_{BAT}$, and, thereafter, the DC bus voltage value $V_{DC}$ and the battery voltage value $V_{BAT}$ decrease together. At this time, the lifting magnet 200 is maintained at the magnetized (attracting) state. At a time t=t3, the DC bus voltage value $V_{DC}$ and the battery voltage value $V_{BAT}$ become the same value as the output voltage value $V_{ASM}$ of the motor generator 12. Because the output voltage value VASM of the motor generator 12 is maintained at V3 after that, electric power is supplied to the lifting magnet 200 from the motor generator 12 through the inverter 18B, the DC bus 110 and the inverter 18A, the lifting magnet 200 is maintained in the magnetized (attracting) stated. At a time t=t4, an operation instruction is input by the operator to demagnetize (release) the lifting magnet 200, and the lifting magnet 200 is demagnetized (released) by the controller 30.

Thus, according to the hybrid construction machine according to the present embodiment, after an abnormality occurs in the up-down converter 100 and a voltage-up operation is not performed, the magnetizing (attracting) operation of the lifting magnet 200 can be continued by electric power generated in the magnetized state of the motor generator 12. Even if an abnormality occurs in the battery 19, similar to the case where an abnormality occurs in the up-down converter 100, the magnetizing (attracting) operation of the lifting magnet 200 can be continued by electric power generated in the magnetized state of the motor generator 12.

Figure 19A:
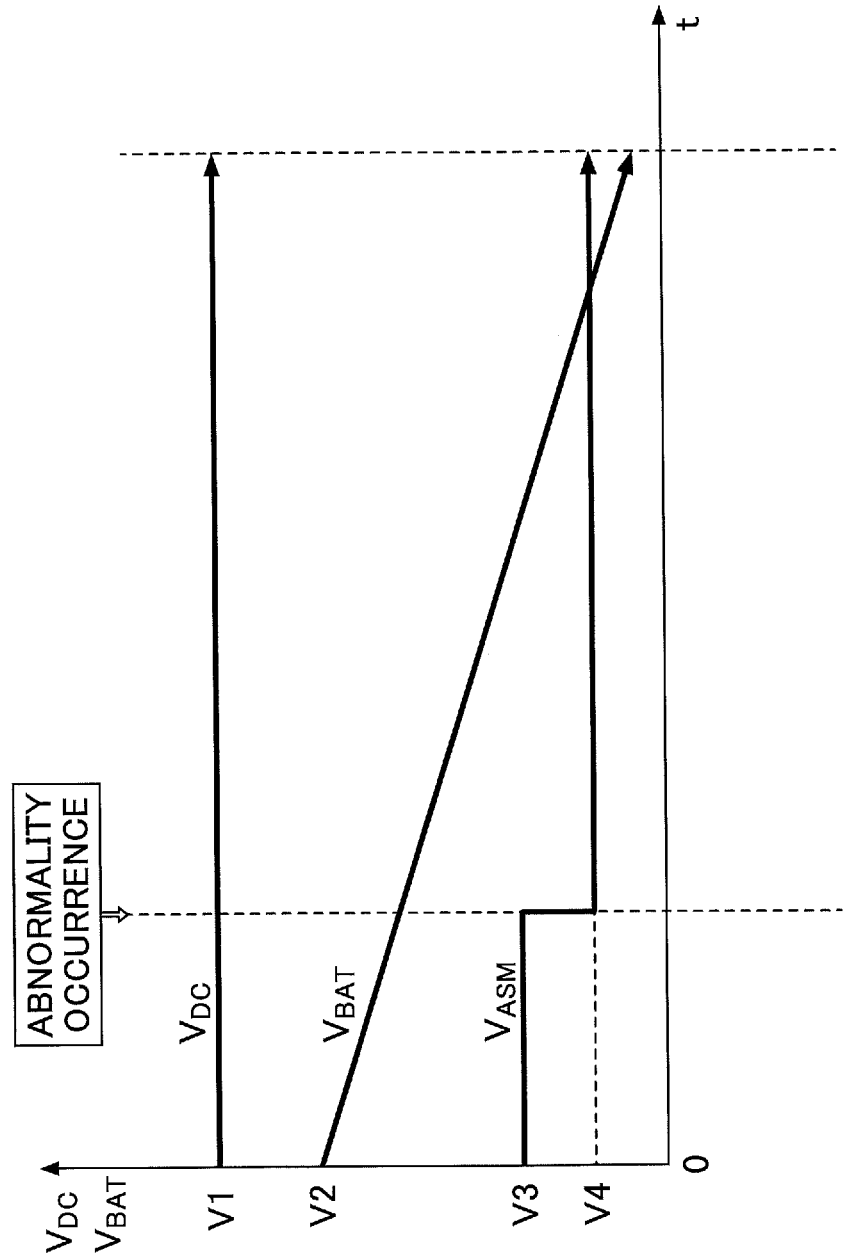
FIG. 19A is a graph illustrating a voltage of each part when an abnormality occurs in an inverter in the hybrid construction machine according to an eleventh embodiment of the present invention.

FIG. 19A is a graph illustrating transition of a voltage of each part in a case where an abnormality occurs in the inverter 18A in the hybrid construction machine according to the eleventh embodiment. FIG. 19B is a graph illustrating transition of a drive state of the motor generator 12, a drive state of the lifting magnet 200, and contents of operation of the lifting magnet 200 by the operator in a case where an abnormality occurs in the inverter 18A.

In FIG. 19A, a horizontal axis represents a time t, and a vertical axis represents a voltage value. V1 in the vertical axis indicates a target value of the DC bus voltage value, V2 indicates a battery voltage value (initial value) at a time t=0, V3 indicates a generation voltage in the magnetized state of the motor generator 12. V4 indicates a generation voltage in the non-magnetized stated of the motor generator 12. Additionally, the DC bus voltage value is represented by $V_{DC}$, the battery voltage value is represented by $V_{BAT}$ and the output voltage value of the motor generator 12 is represented by $V_{ASM}$.

At the time t=0, as illustrated in FIG. 19B, the motor generator 12 is set in a generating state as a magnetized state, the operation of the lifting magnet 200 by the operator is magnetization (attraction), and, thus, the lifting magnet 200 is in a magnetized (attracting) state.

Here, as illustrated in FIG. 19A, values of the output voltage value $V_{ASM}$, the battery voltage value $V_{BAT}$ and the DC bus voltage value $V_{DC}$ are higher in that order.

Because the lifting magnet 200 is set in the magnetized (attracting) state, after the time t=0, electric power is supplied from the DC bus 110 to the lifting magnet 200. However, because the up-down converter 100 is performing a voltage-up operation, the DC bus voltage value $V_{DC}$ is maintained at the target value V1 and the battery voltage value $V_{BAT}$ decreases. The motor generator 12 is performing a generating operation in the non-magnetized state by being driven by the engine 11, and the output voltage value $V_{ASM}$ of the motor generator 12 is maintained at V3.

Then, the inverter 18A is set in an overheated state, and then the abnormality determination part compares a temperature detection value detected by the temperature sensor of the inverter 18A with a threshold value and, if the temperature detection value is equal to or higher than the threshold value, determines that an abnormality has occurred. Then, the controller 30 stops an operation of the temperature sensor of the inverter 18A (time t=t1). Thus, when an abnormality occurs in the inverter 18A at the time t=t1, electric power generated by the motor generator in a no-load state is not supplied to the DC bus 110, and, thus, the output voltage value $V_{ASM}$ of the motor generator 12 decreases to the voltage V4 which is in a non-magnetized state.

However, the controller 30 controls the lifting magnet 200 to continue the operation before and after the occurrence of the abnormality in the inverter 18A. Accordingly, electric power of the DC bus 110 is consumed by the lifting magnet 200, and the up-down converter 100 continues a voltage-up operation, and, thereby, the DC bus voltage is maintained at the target value V1. In association with that, the battery voltage value $V_{BAT}$ continues to decrease.

At a time t=t5, an operation instruction is input by the operator to demagnetize (release) the lifting magnet 200, and the lifting magnet 200 is demagnetized (released) by the controller 30.

Thus, according to the hybrid construction machine according to the present embodiment, after an abnormality occurs in the inverter 18A and the motor generator 12 is in the non-magnetized state, electric power is supplied to the lifting magnet 200 by the controller 30 causing the up-down converter 100 to continue the voltage-up operation, and, thus, the magnetizing (attracting) operation of the lifting magnet 200 can be continued.

Even when an abnormality occurs in the motor generator 12, similar to the case where an abnormality occurs in the inverter 18A, electric power is supplied to the lifting magnet 200 by the controller 30 causing the up-down converter 100 to continue the voltage-up operation, and, thereby, the magnetizing (attracting) operation of the lifting magnet 200 can be continued. Further, the abnormality determination part may be provided to the engine 11 to detect an abnormality in the engine 11. In this case, for example, if an engine stall occurs, the generating operation of the motor generator 12 cannot be performed. However, the controller 30 outputs a control instruction continuously to the up-down converter 100 after the determination of the occurrence of the abnormality, and, thereby, the drive control of the lifting magnet 200 can be continuously performed by electric power by a discharge operation of the battery 19.

As mentioned above, according to the present embodiment, after an abnormality occurs in the motor generator 12, the inverter 18A, the battery 19 or the up-down converter 100, the magnetizing (attracting) operation of the lifting magnet 200 can be continued.

Next, a description is given of a hybrid construction machine according to the twelfth embodiment.

Figure 20:
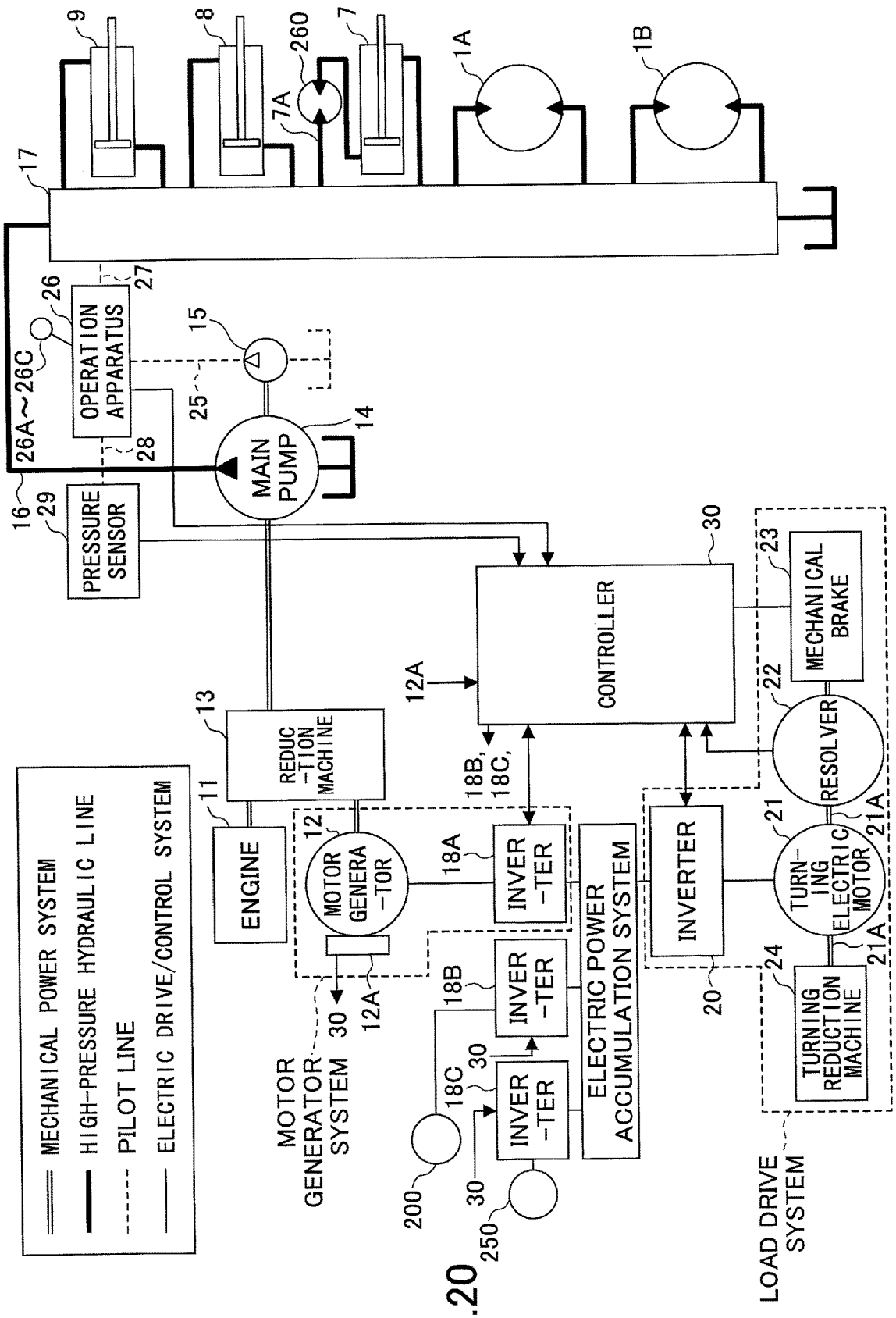
FIG. 20 is a block diagram illustrating a structure of a hybrid construction machine according to a twelfth embodiment according to the present invention.

FIG. 20 is a block diagram illustrating a structure of a hybrid construction machine according to a twelfth embodiment of the present invention. The hybrid construction machine according to the twelfth embodiment of the present invention differs from the hybrid construction machine according to the eleventh embodiment of the present invention in that a generator 250 as an electric work element is connected to the DC bus 110 through an inverter 18C as a drive control system.

In the hybrid construction machine according to the present embodiment, the hydraulic motor 260 is connected to the boom cylinder 7, and the rotation axis of the generator 250 is driven by the hydraulic motor 260. Although the hydraulic motor 260 and the generator 250 are separated from each other in FIG. 20 for the sake of convenience of explanation, actually, the rotation axis of the generator 250 is mechanically connected to the hydraulic motor 260. The generator 250 is an electric work element which is driven by the hydraulic motor 260, as mentioned above, to convert potential energy into electric energy when the boom 4 is moved down by gravity. The hydraulic motor 260 is configured to be rotated by oil discharged from the boom cylinder 7 when the boom 4 is lowered, and is provided to convert energy of the boom 4 being lowered by gravity into a rotational force. Because the hydraulic motor 260 is provided between a hydraulic pipe 7A between the control valve 17 and the boom cylinder 7, it can be attached to an appropriate position in the upper-part turning body 3. Electric power generated by the boom regenerative generator 250 is supplied to the DC bus 110 through the inverter 18C as regeneration energy.

Thus, a situation may occur where electric power is supplied any one of the motor generator 12, the lifting magnet 200 and the turning electric motor 21 through the DC bus 110. Moreover, a situation may occur where electric power is supplied to the DC bus 110 from any one of the motor generator 12, the generator 250 and the turning electric motor 21.

In the present embodiment, the up-down converter 100 performs a control to switch between a voltage-up operation and a voltage-down operation in response to the operation states of the motor generator 12, the generator 250 and the turning electric motor 21 so that the DC bus voltage value falls within a fixed range. The DC bus 110 is provided between the inverters 18A, 18B, 18C and 20 and the up-down converter 100 to enable exchange of electric power between the battery 19, the motor generator 12, the lifting magnet 200, the generator 250 and the turning electric motor 21.

In the present embodiment, when an abnormality occurs in the motor generator system, the supply of regenerative energy by the boom cylinder 7 into the DC bus 110 is continued, and, thus, the controller 30 can perform an electric power supply by continuing the control of the lifting magnet 200 before and after an occurrence of an abnormality. Similarly, if an abnormality occurs in the electric power accumulation system and electric power cannot be supplied from the battery 19, the supply of regenerative energy by the boom cylinder 7 into the DC bus 110 is continued, and, thus, the controller 30 can perform an electric power supply by continuing the control of the lifting magnet 200 before and after an occurrence of an abnormality.

Although a mode of converting potential energy of the boom 4 into electric energy by the generator 250 through the hydraulic motor 260 was explained in the above embodiment, the generator 250 may be connected to the boom axis of the boom 4 to perform a generating operation when the boom 4 is lowered. A determination of up and down of the boom 4 may be made by the controller 30 based on an output of a pressure sensor provided on a secondary side of the operation lever 26A to perform an operation of the boom 4.

Next, a description will be given of a hybrid construction machine according to a thirteenth embodiment of the present invention.

Figure 21:
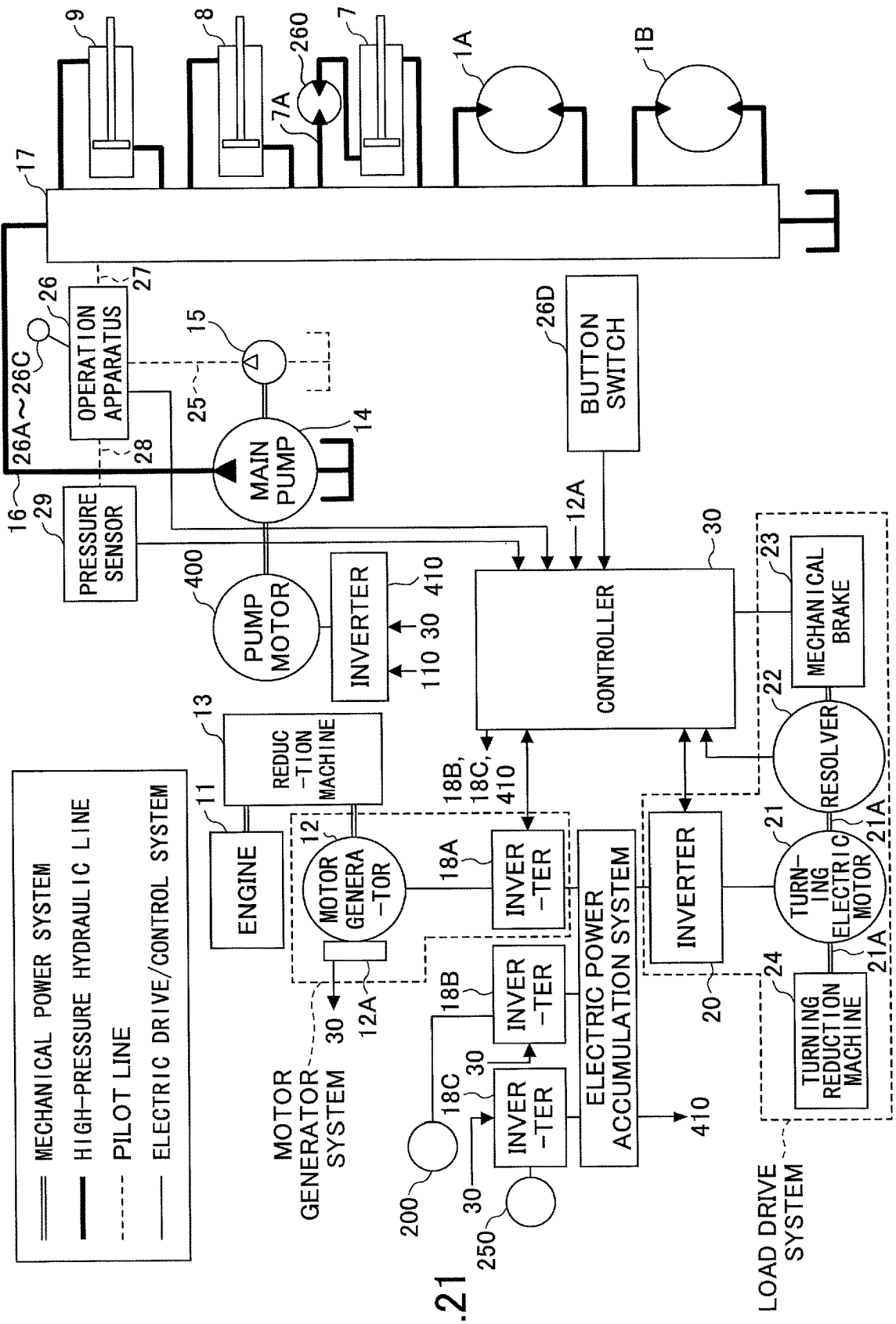
FIG. 21 is a block diagram illustrating a structure of a hybrid construction machine according to a thirteenth embodiment according to the present invention.

FIG. 21 is a block diagram illustrating a structure of the hybrid construction machine according to the thirteenth embodiment of the present invention. The hybrid construction machine according to the thirteenth embodiment differs from the hybrid construction machine according to the twelfth embodiment illustrated in FIG. 20 in that the main pump 14 is driven by the pump motor 400 and the motor generator 12 is configured to perform a recovery of electric power (generating operation) by being driven by the engine 11. Because other structures are the same as the hybrid construction machine according to the twelfth embodiment, the same structural elements are given the same reference numerals and descriptions thereof will be omitted. The motor generator 12 is provided with only a function as a generator, which performs only a generating operation by being driven by the engine 11.

The pump motor 400 is configured to perform only a power running operation to drive the main pump 14, and is connected to the DC bus 110 through an inverter 410. The pump motor 400 is configured to be driven by the controller 30. When any one of the levers 26A-26C is operated, electric power is supplied through the inverter 410 from the DC bus 110 and a power running operation is performed, and the main pump 14 is driven and pressurized oil is discharged.

Thus, a situation may occur where electric power is supplied through the DC bus 110 to any one of the motor generator 12, the pump motor 400 and the turning electric motor 21. Additionally, a situation may occur where electric power is supplied to the DC bus 110 from any either one of the motor generator 12 and the turning electric motor 21.

In the present embodiment, the up-down converter 100 performs a switching control between a voltage-up operation and a voltage-down operation so that the DC bus voltage value falls within a fixed range in accordance with operation states of the motor generator 12, the pump motor 400 and the turning electric motor 21. The DC bus 110 is arranged between the inverters 18, 410 and 20 and the up-down converter 100, and exchanges electric power with the battery 19, the pump motor 400 and the turning electric motor 21.

In the hybrid construction machine according to the present embodiment, when an abnormality occurs in the motor generator system, electric power is supplied from the battery to the DC bus 110 through the up-down converter 100. Thus, the controller 30 can supply electric power by continuing the control of the lifting magnet 200 before and after an occurrence of an abnormality. Similarly, if an abnormality occurs in the electric power accumulation system, electric power can be supplied from the motor generator, and, thus, the controller 30 can perform an electric power supply by continuing the control of the lifting magnet 200 before and after an occurrence of an abnormality.

It should be noted that if an abnormality occurs in the motor generator 12, similar to the case where an abnormality occurs in the inverter 18A, electric power is supplied to the lifting magnet 200 by continuing the voltage-up operation of the up-down converter 100, and, thus, the magnetizing (attracting) operation of the lifting magnet 200 can be continued. Also in this case, because electric power generated by the generator 250 is supplied to the DC bus 110, a load to the up-down converter 100 is smaller than that in the case of the eleventh embodiment. Additionally, the battery voltage value $V_{BAT}$ is not decreased more than the case of the eleventh embodiment, and the lifting magnet is maintained in the magnetized (attracting) state for a longer time.

As mentioned above, there is provided according to the present embodiment a hybrid construction machine in which, after an abnormality occurs in the motor generator 12, the inverter 18A, the battery 19 or the up-down converter 100, the magnetizing (attracting) operation of the lifting magnet 200 can be continued.

Although the hybrid construction machines of various structures were explained in the eleventh through thirteenth embodiments, the hybrid construction machine according to the present invention can combine the structures of the eleventh through thirteenth embodiments arbitrarily.

By the way, when an abnormality occurs in the motor generator to assist a drive of the hydraulic pump or the inverter to perform a drive control of the motor generator, or when an abnormality occurs in the battery or the up-down converter, it is possible that an output for driving the hydraulic pump runs short. If an assistance of the motor generator is not obtained and if an output of the engine runs short with respect to an output of the hydraulic pump, it is possible that an appropriate operation state cannot be acquired.

Thus, the fourteenth embodiment through sixteenth embodiment explained below is for providing hybrid construction machines which can continue a suitable operation state, when assistance of the motor generator is not obtained.

Figure 22:
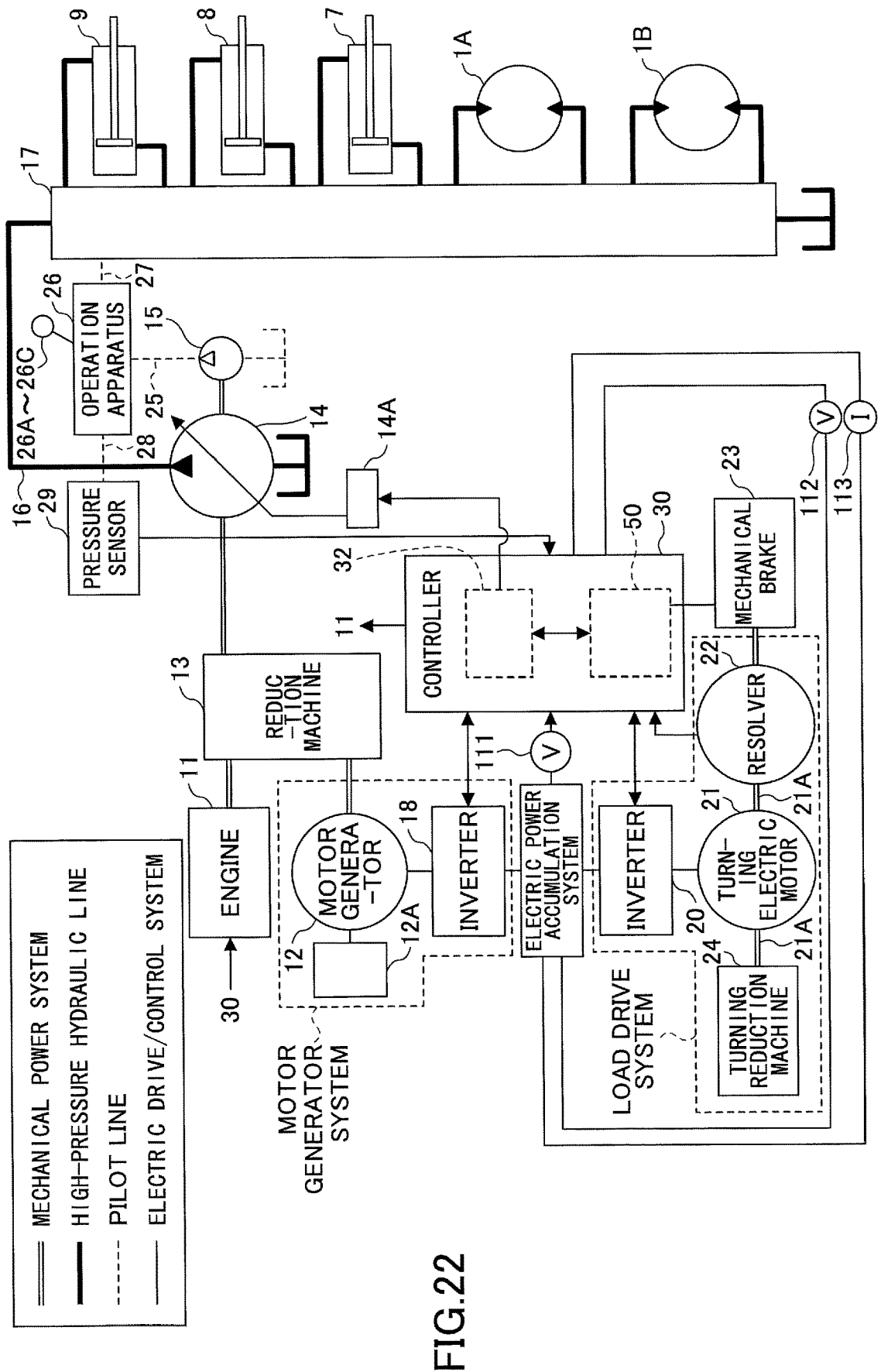
FIG. 22 is a block diagram illustrating a structure of a hybrid construction machine according to a fourteenth embodiment according to the present invention.

FIG. 22 is a block diagram illustrating a structure of a hybrid construction machine according to the fourteenth embodiment of the present invention. Although the hybrid construction machine according to the fourteenth embodiment of the present invention has basically the same structure as the hybrid construction machine according to the first embodiment illustrated in FIG. 2, structures mentioned below are added. In FIG. 22, parts that are the same as parts illustrated in FIG. 2 are given the same reference numerals, and descriptions thereof will be omitted.

In the present embodiment, the main pump 14 which is a hydraulic pump is provided with a pump control valve 14A which controls a tilt-roll angle of the main pump 14. The pump control valve 14A is electrically driven by the controller 30, and a control of the tilt-roll angle of the main pump 14 is performed.

Next, a description is given, with reference to FIG. 3, of the details of the electric power accumulation system. The DC bus voltage detection part 111 is connected to the electric power accumulation system including the DC bus 110. The DC bus voltage detection part 111 detects the voltage of the DC bus 110, and supplies the DC bus voltage value to the controller 30. The DC bus voltage detection part 111 corresponds to a voltage detection part to detect the DC bus voltage value. The DC bus voltage value detected by the DC bus voltage detection part 111 is input into the controller 30, and is used to perform a switching control between a voltage-up control and a voltage-down control to cause the DC bus voltage value to fall within a fixed range.

Moreover, the battery voltage detection part 112 and the battery current detection part 113 are connected to the electric power accumulation system. The battery voltage detection part 112 detects the voltage of the battery 19, and supplies the battery voltage value to the controller 30. The battery current detection part 113 detects a current flowing between the battery 19 and the up-down converter 100, and supplies the battery current value to the controller 30. The switching control between the voltage-up operation and the voltage-down operation of the up-down converter 100 is performed by a control instruction from the controller 30 based on the DC bus voltage value detected by the DC bus voltage detection part 111, the battery voltage value detected by the battery voltage detection part 112, and the battery current value detected by the battery current detection part 113.

The battery voltage detection part 112 corresponds to the voltage detection part for detecting a voltage value of the battery 19, and is used to detect a charge state of the battery 19. The battery voltage value detected by the battery voltage detection part 112 is input into the controller 30, and is used to perform the switching control between the voltage-up operation and the voltage-down operation of the up-down converter 100. The DC bus voltage detection part 111 and the battery voltage detection part 112 also function as an abnormality detection part, which can specify, when an abnormality occurs between the up-down converter 100 and the battery 19, the occurrence of the abnormality and the location of the occurrence of the abnormality by comparing the voltage values of the battery voltage detection part 112 and the DC bus voltage detection part 111.

The battery current detection part 113 corresponds to a current detection part for detecting the current value of the battery 19. The battery current value is detected based on the current which flows from the battery 19 to the up-down converter 100 is a positive value. The battery current value detected by the battery current detection part 113 is input into the controller 30, and is used to perform the switching control between the voltage-up operation and the voltage-down operation of the up-down converter 100. Then, if a line failure abnormality occurs between the up-down converter 100 and the battery 19, the battery current detection part 113 also function as an abnormality detection part of the electric power accumulation part by detecting a rapid decrease in the current value detected by the battery current detection part 113.

The controller 30 is provided with an assist abnormality determination part 50, and is configured to be supplied with a temperature of the motor generator 12 detected by the abnormality detection part, a voltage value applied to the motor generator 12, a temperature of a switching element contained in the inverter 18, a voltage value applied to the inverter 18 and a current value supplied to the inverter 18. Similarly, it is configured to be supplied with a temperature of the battery 19 detected by the abnormality detection part, a current value flowing to the battery 19 or the up-down converter 100, a voltage value applied to the battery 19 or the up-down converter 100, and a temperature of a switching element contained in the up-down converter 100.

Then, when detection values detected by the abnormality detection part is input, the assist abnormality determination part 50 determines that an assist abnormality has occurred, when the detection values exceed threshold values set for the detection values of the respective kinds.

Moreover, the controller 30 is provided with an engine-stall prevention part 32. If it is determined that an assist abnormality occurs in the assist abnormality determination part 50, the engine-stall prevention part 32 performs an engine-stall prevention process. In the fourteenth embodiment, the engine-stall prevention part 32 performs the engine-stall prevention process to reduce the tilt-roll angle of the main pump 14, so that the output of the hydraulic pump 14 decreases to the engine output upper limit value, by driving and controlling the pump control valve 14A.

Here, the abnormality of the electric power accumulation system refers to, for example, a line failure in the motor generator 12, the up-down converter 100 or the battery 19, and a case where a temperature rises abnormally. The abnormality of the inverter 18 refers to, for example, an occurrence of an overheated state, an over-voltage state or an over-current state that occurs because a temperature, a voltage value or a current value of the switching element exceeds the respective threshold values due to a line failure or a malfunction.

Figure 23A:
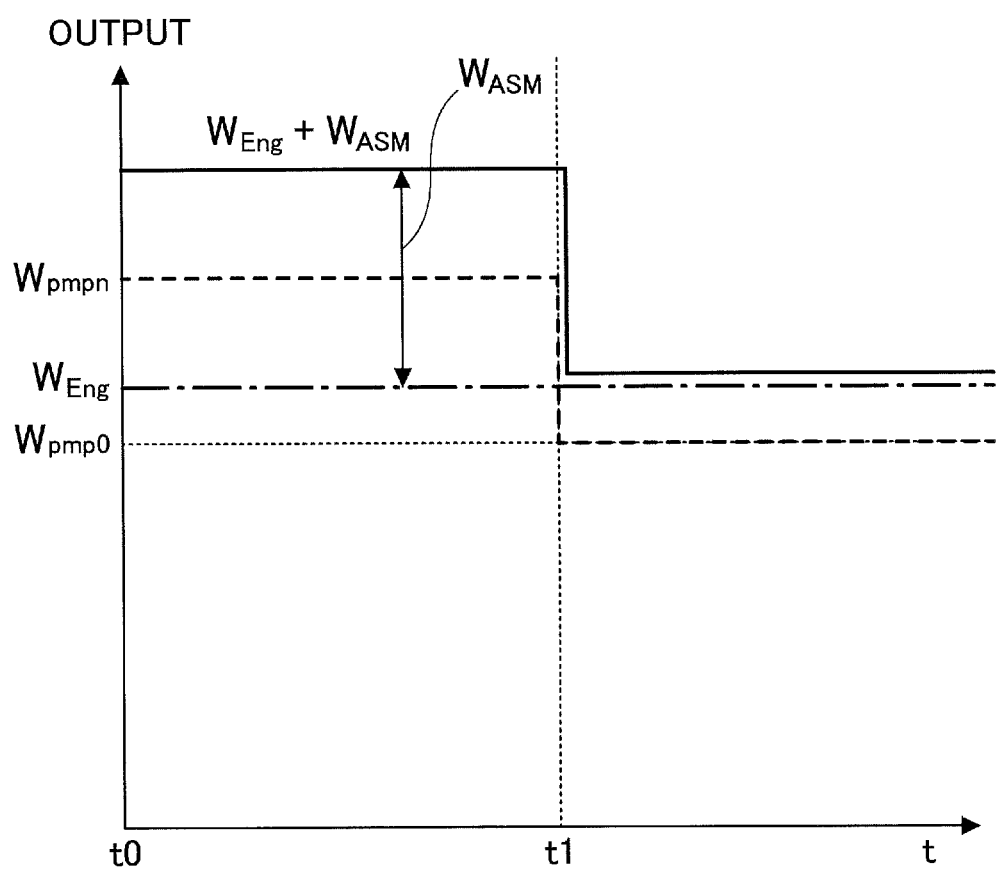
FIG. 23A is a graph illustrating an output of an engine, an output of a main pump and a total output of the engine and a motor generator over a time before and after a detection of an abnormality when the abnormality occurs in the motor generator or an inverter in the hybrid construction machine according to the fourth embodiment of the present invention.
Figure 23B:
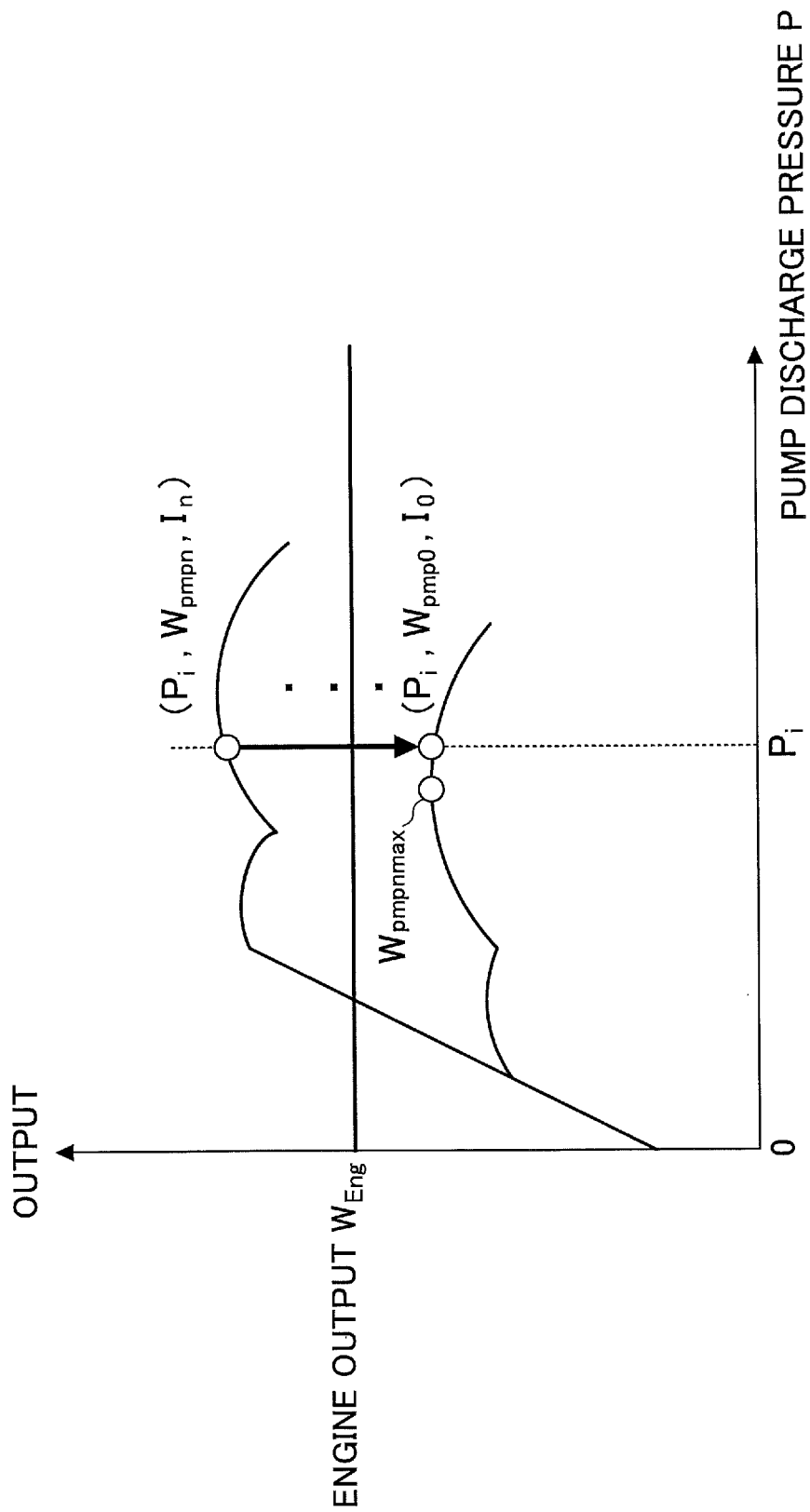
FIG. 23B is a graph illustrating a relationship between a discharge pressure and an output of a main pump and when an abnormality occurs in a motor generator or an inverter and a control command input to a pump control valve is changed in the hybrid construction machine according to the fourth embodiment of the present invention.

FIG. 23A is a graph illustrating an output of the engine 11, an output of the main pump 14, a total output of the engine 11 and the motor generator 12 before and after an abnormality detection. FIG. 23B is a graph illustrating a relationship between a discharge pressure and an output of the main pump 14 when a control instruction input to the pump control valve 14A varies in a case where an abnormality occurs in the motor generator 12 or the inverter 18 in the hybrid construction machine according to the fourteenth embodiment. The discharge pressure of the main pump 14 is determined according to a load condition which the boom cylinder 7, the arm cylinder 8, the bucket cylinder 9, and the hydraulic motors 1A and 1B receive. Therefore, when a load is small, the output of the main pump 14 is lower than the output upper limit value of the engine 11, and when a load is large, the output of the main pump 14 is higher than the output upper limit value of the engine 11. Here, when the output of the main pump 14 is higher than the output upper limit value of the engine 11, the engine 11 is assisted by the motor generator 12.

In FIG. 23A, $W_{Eng}$ indicates the output upper limit value of the engine 11, $W_{Pmpn}$ indicates an output value of the main pump 14, $W_{ASM}$ indicated the output upper limit value of the motor generator 12, $W_{Eng}+W_{ASM}$ indicates the total output value of the engine ($W_{Eng}$) and the motor generator 12 ($W_{ASM}$), and $W_{PmpO}$ indicates an output of the main pump 14 after the engine-stall prevention process is executed by the engine-stall prevention part 32 of the controller 30.

At a time t=t0, no abnormality occurs in the motor generator 12 or the inverter 18. At this time, a request of a high output is made to the hydraulic cylinder by a lever operation of an operator. In association with it, the output $W_{Pmpn}$ of the main pump 14 is higher than the output upper limit value $W_{Eng}$ of the engine 11. For this reason, in order to prevent an engine-stall of the engine 11, the controller 30 sends an instruction to the inverter 18 to cause the motor generator 12 to assist the engine 11. Thereby, if an output higher than the output upper limit value $W_{Eng}$ of the engine 11 is requested, a work can be done without an engine-stall. Here, the output upper limit value $W_{ASM}$ of the motor generator 12 is set so that when the output upper limit value $W_{Eng}$ is added, it is higher than the output $W_{Pmpn}$ of the main pump 14.

However, if an excessive load is applied to the motor generator 12 and the detection value of the temperature sensor 12A reaches a previously determined temperature, the assist abnormality determination part 50 of the controller 30 determines that the motor generator 12 in an overload state. In this case, the assist abnormality determination part 50 of the controller 30 determines that an abnormality occurs in the motor generator system, and sends an instruction to the inverter 18 to stop the output of the motor generator 12 in order reduce the load to the motor generator 12 by performing the assist abnormality process. Thereby, there is no output from the motor generator 12, and, thus, the output $W_{Pmpn}$ of the main pump 14 becomes higher than the output upper limit value $W_{Eng}$. Here, in the present embodiment, when an abnormality occurs in the motor generator at a time t=t1, the engine-stall prevention part 32 of the controller 30 detects the abnormality of the motor generator 12, and changes a drive instruction for drive and control the pump control valve 14A to reduce the tilt-roll angle. Thereby, the output $W_{Pmpn}$ of the main pump 14 is decreased from $W_{Pmpn}$ to $W_{PmpO}$, which is smaller than the output upper limit value $W_{Eng}$ of the engine 11.

Here, the drive instruction to drive and control the pump control valve 14A is a pump current I to control the tilt-roll angle of an oblique plate of the main pump 14. Thus, as illustrated in FIG. 23B, if the pump current I is reduced from In to $I_O$ ($I_n$>$I_O$) in a state where a discharge pressure of the main pump 14 is fixed at Pi, the tilt-roll angle is controlled in response to the pump current value, and the output of the main pump 14 is reduced from $W_{Pmpn}$ to $W_{PmpO}$.

As illustrated in FIG. 23B, if, for example, the discharge output Pi fluctuates arbitrarily, the current $I_O$ is set so that the output of the main pump 14 does not exceed the output limit value $W_{Eng}$ of the engine 11. Specifically, the current $I_O$ is set so that the maximum value $W_{Pmpnmax}$ of the output of the main pump 14 does not exceed the output upper limit value $W_{Eng}$ of the engine 11. For this reason, also in a state where there is no assist power by the motor generator 12, the main pump 14 can be driven only by the output $W_{Eng}$ of the engine 11. Thus, the output $W_{Eng}$ of the engine 11 can satisfy the condition of $W_{Eng}$>$W_{PmpO}$, even if the output $W_{PmPn}$ of the main pump 14 is fluctuated due to the discharge pressure Pi.

As mentioned above, according to the hybrid construction machine according to the present embodiment, when an abnormality occurs in the motor generator 12 or the inverter 18, the tilt-roll angle of the main pump 14 is reduced to a predetermined angle by the controller 30, and, thereby, the output $W_{PmpO}$ of the main pump 14 becomes lower than the output $W_{Eng}$ of the engine 11. Therefore, if an abnormality occurs in the motor generator 12 or the inverter 18 and there is no assist force by the motor generator 12, the main pump 14 can be driven only by the output $W_{Eng}$ of the engine 11 because the output of the main pump 14 is reduced, and, thus, the operation state can be continued even when assistance of the motor generator 12 is not obtained.

Although the process of the case where a temperature abnormality occurs in the motor generator 12 was explained in the present embodiment, the assist abnormality determination part 50 may judge an abnormality of the motor generator system based on a detection value of a current detector or a voltage detector in the inverter, which is an abnormality detection part of the motor generator system. In this case, a process of reducing the output of the main pump 14 may be performed by the engine-stall prevention part 32. Additionally, when an abnormality occurs in the electric power accumulation system, similar to the above-mentioned case, the assist abnormality determination part 50 may determine the abnormality of the electric power accumulation system according to the detection value of the abnormality detection value provided in the electric power accumulation system constituted by the battery 19 and the up-down converter 100. In this case, because it becomes impossible to supply electric power from the battery 19 to the motor generator 12, the assist abnormality determination part 50 determines that no assistance can be made, and performs an assist abnormality determination process to stop the motor operation and the generating operation of the motor generator 12. Thus, even when an abnormality occurs in the electric power accumulation system, similar to the case where an abnormality occurs in the motor generator system, it may be configured to perform a process of reducing the output of the main pump 14 by the engine-stall prevention part 32.

Next, a description is given of a hybrid construction machine according to a fifteenth embodiment.

Figure 24B:
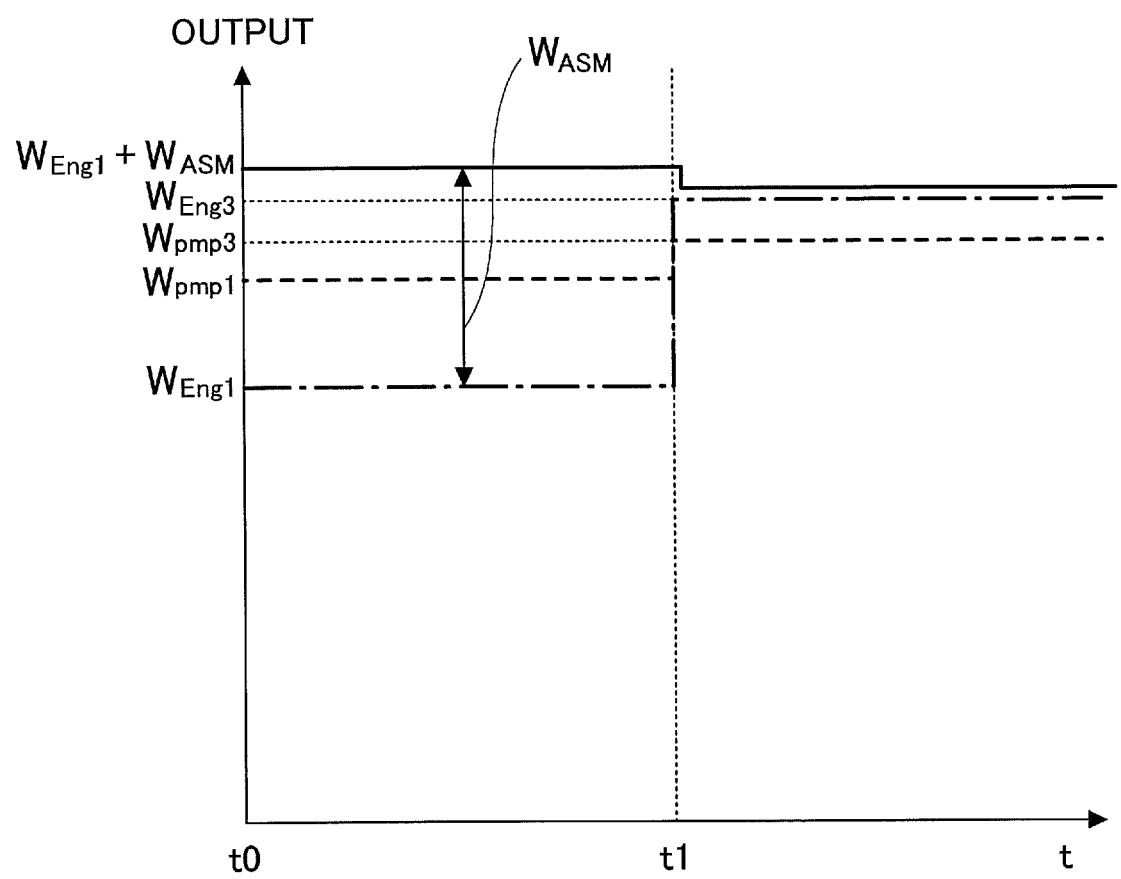
FIG. 24B is a graph illustrating an output upper limit value of an engine, an output of a main pump, an output upper limit value of a motor generator and a total output upper limit value of the engine and the motor generator over a time before and after a detection of an abnormality when the abnormality occurs in the motor generator or an inverter in the hybrid construction machine according to the fifth embodiment of the present invention.

FIG. 24A is a graph in which the output upper limit value of the engine 11 and the output upper limit value of the main pump 14 are plotted when reducing the engine revolution number of the engine 11 in a case where an abnormality occurs in the motor generator 12 or the inverter 18 in the hybrid construction machine according to the fifth embodiment of the present invention. FIG. 24B is a graph illustrating the output limit value of the engine 11, the output of the main pump 14, the output upper limit value of the motor generator 12, and the total output upper limit value of the engine 11 and the motor generator 12 when reducing the engine revolution number of the engine 11 in a case where an abnormality occurs in the motor generator 12 to the inverter 18 in the hybrid construction machine according to the fifteenth embodiment of the present invention before and after an abnormality detection.

The hybrid construction machine according to the fifteenth embodiment differs from the hybrid construction machine according to the fourteenth embodiment in that, when an abnormality occurs in the motor generator 12 or the inverter 18, the output of the main pump 14 is not reduced but it is set to an operation range in which the output of the engine 11 is higher than the output of the main pump 14 by adjusting the engine revolution number of the engine 11 based on a relationship between the output characteristic of the engine 11 and the output characteristic of the main pump 14.

The output characteristic illustrated in FIG. 24A is the output characteristic of a case where the tilt-roll angle is a maximum. Thus, in a state where the tilt-angle is set smaller than the maximum value, the output of the main pump 14 is a lower value than the value illustrated in FIG. 24A.

As illustrated in FIG. 24A, the output of the main pump 14 has the characteristic which increases linearly according to the rise of the engine revolution number. On the other hand, it has a characteristic in which the output upper limit value $W_{Eng}$ of the engine 11 increases in a secondary curve with the rise of the engine revolution number, and reaches the maximum output, and slightly decreases in an area where the engine revolution number r is high.

For this reason, as illustrated in FIG. 24A, in a state where the engine revolution number is r1, the output $W_{Pmp1}$ of the main pump 14 is higher than the output $W_{Eng1}$ of the engine 11. This state continues until the engine revolution number goes up to r2. That is, an area where the engine revolution number is equal to or smaller than r2 is an area requiring an assistance by the motor generator 12 to drive the main pump 14.

When the engine revolution number reaches r2, the output $W_{Pmp1}$ of the main pump 14 and the output $W_{Eng1}$ of the engine 11 are equal to each other. The output upper limit value $W_{Eng}$ of the engine 11 becomes a maximum output $W_{Eng3}$ when the engine revolution number is r3, and, thereafter, gradually decreases and the output $W_{Pmp1}$ of the main pump 14 and the output $W_{Eng1}$ of the engine 11 become equal to each other again at the engine revolution number r4. That is, an area from the engine revolution number r2 to r4 is an area where the hydraulic pump 14 can be driven in a state where no assist is provided by the motor generator 12 because the output upper limit value $W_{Eng}$ of the engine 11 is larger than the output $W_{Pmp}$ of the main pump 14.

If the engine revolution number is higher than r4, similar to the area where the engine revolution number is equal to or lower than r2, the output $W_{Pmp1}$ of the main pump 14 is larger than the output $W_{Eng1}$ of the engine 11, and, thus, an assistance of the motor generator 12 is required to drive the hydraulic pump 14.

In the hybrid construction machine according to the fifteenth embodiment, in a case where the engine revolution number is used at a revolution number r1 which is smaller than r2, when an abnormality occurs in the motor generator 12 or the inverter 18, the controller 30 controls the engine revolution number to fall within a range from r2 to r4. Thereby, even if an assistance of the motor generator 12 is not obtained, the main pump 14 can be driven by the output upper limit value $W_{Eng}$ of the engine 11, thereby enabling to continue the operation state.

As illustrated in FIG. 24B, at a time t=0, the motor generator 12 and the inverter 18 are operating normally, and the engine revolution number of the engine 11 is r1 at a normal time. Then, at this time point, a high output request is made to the hydraulic cylinder by a lever operation of the operator. Here, the output requested to the main pump 14 is the same value as the output upper limit value $W_{Pump1}$ of the main pump 14 at the revolution number r1. Then, the output $W_{Pmp1}$ to the main pump 14 is higher than the output upper limit value $W_{Eng}$ of the engine 11. Thus, in order to prevent an engine-stall of the engine 11, the controller 30 sends an instruction to the inverter 18 to cause the motor generator 12 to assist the engine 11. Thereby, if an output higher than the output upper limit value $W_{Eng}$ of the engine 11 is requested, a work can be done without an engine-stall. Here, the output upper limit value $W_{ASM}$ of the motor generator 12 is set so that when the output upper limit value $W_{Eng}$ is added, it is higher than the output $W_{Pmp1}$ of the main pump 14.

However, if an excessive load is applied to the motor generator 12 and the detection value of the temperature sensor 12A reaches a previously determined temperature, the assist abnormality determination part 50 of the controller 30 determines that the motor generator 12 in an overload state. In this case, the assist abnormality determination part 50 of the controller 30 determines that an abnormality occurs in the motor generator system, and sends an instruction to the inverter 18 to stop the output of the motor generator 12 in order to reduce the load to the motor generator 12 by performing the assist abnormality process. Thereby, there is no output from the motor generator 12, and, thus, the output $W_{Pmp1}$ of the main pump 14 becomes higher than the output upper limit value $W_{Eng1}$ of the engine 11. Here, in the present embodiment, when an abnormality occurs in the motor generator at a time t=t1, the engine-stall prevention part 32 of the controller 30 detects the abnormality of the motor generator 12, and controls the engine revolution number to be r3. Here, the output upper limit value $W_{Pmp1}$ of the main pump 14 slightly increases to $W_{Pmp3}$ in association with an increase in the revolution number. At the engine revolution number r3, even if the main pump 14 is operating at a limit capacity by which the hybrid construction machine can output, the output upper limit value $W_{Pmp3}$ of the main pump 14 becomes higher than output upper limit value $W_{Eng3}$ of the engine 11. Accordingly, due to an occurrence of an abnormality, the output $W_{ASM}$ of the motor generator 12 becomes zero, but because the output of the engine 11 becomes $W_{Eng3}$, the output $W_{ASM}$ exceeds the output $W_{Pmp3}$ of the main pump 14, and, thereby, the operation of the main pump 14 can be continued only by the output $W_{Eng3}$ of the engine 11.

Although the example in which, when an abnormality occurs in the motor generator at the time t=t1, the engine revolution number is controlled to r3 at which the maximum output is generated was explained for the sake of convenience of explanation, the engine revolution number is not limited to r3, and may be between r2 and r4. If it is in an operation area in which the engine revolution number is between r2 and r4, it is an operation area in which the output of the engine 11 exceeds the output of the main pump 14.

As mentioned above, according to the hybrid construction machine according to the fifth embodiment, when an abnormality occurs in the motor generator 12 or the inverter 18, the operation area in which the output of the engine 11 exceeds the output of the main pump 14 is set by the controller 30, and, thus, the main pump 14 can be driven by only the output upper limit value $W_{Eng}$ of the engine 11 even if there is no assist force by the motor generator 12, thereby enabling the operation state to continue.

Moreover, although the explanation was given using the engine revolution number of the engine 11, the revolution number of the motor generator 12, which is mechanically coupled with the engine 11, may be used as the engine revolution number.

Next, a description is given of a hybrid construction machine according to a sixteenth embodiment.

Figure 25A:
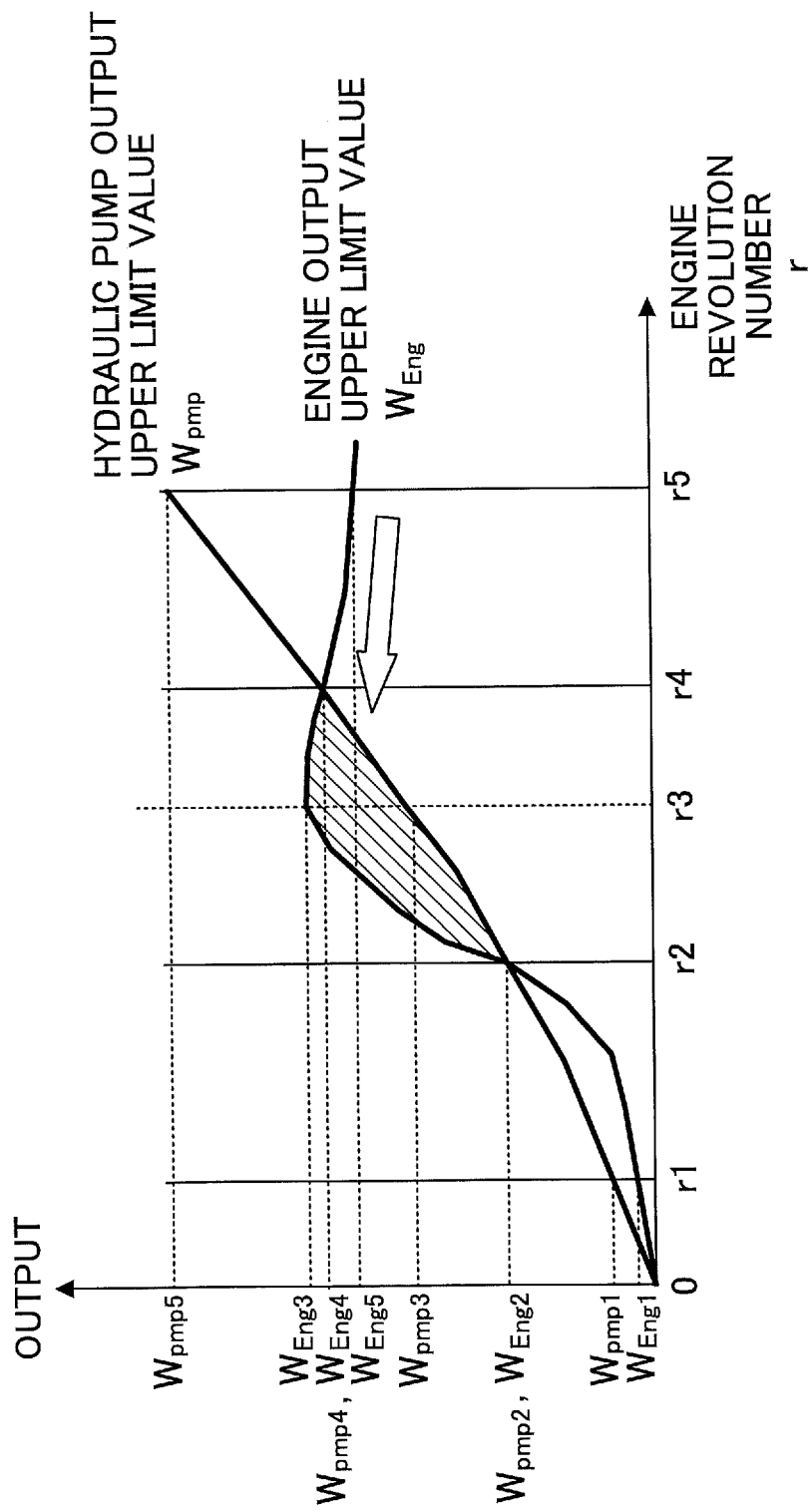
FIG. 25A is a graph in which an output upper limit value of an engine and an output upper limit value of a main pump are plotted with respect to an engine revolution to decrease an engine revolution speed of the engine when an abnormality occurs in motor generator or an inverter in a hybrid construction machine according to a sixteenth embodiment of the present invention.
Figure 25B:
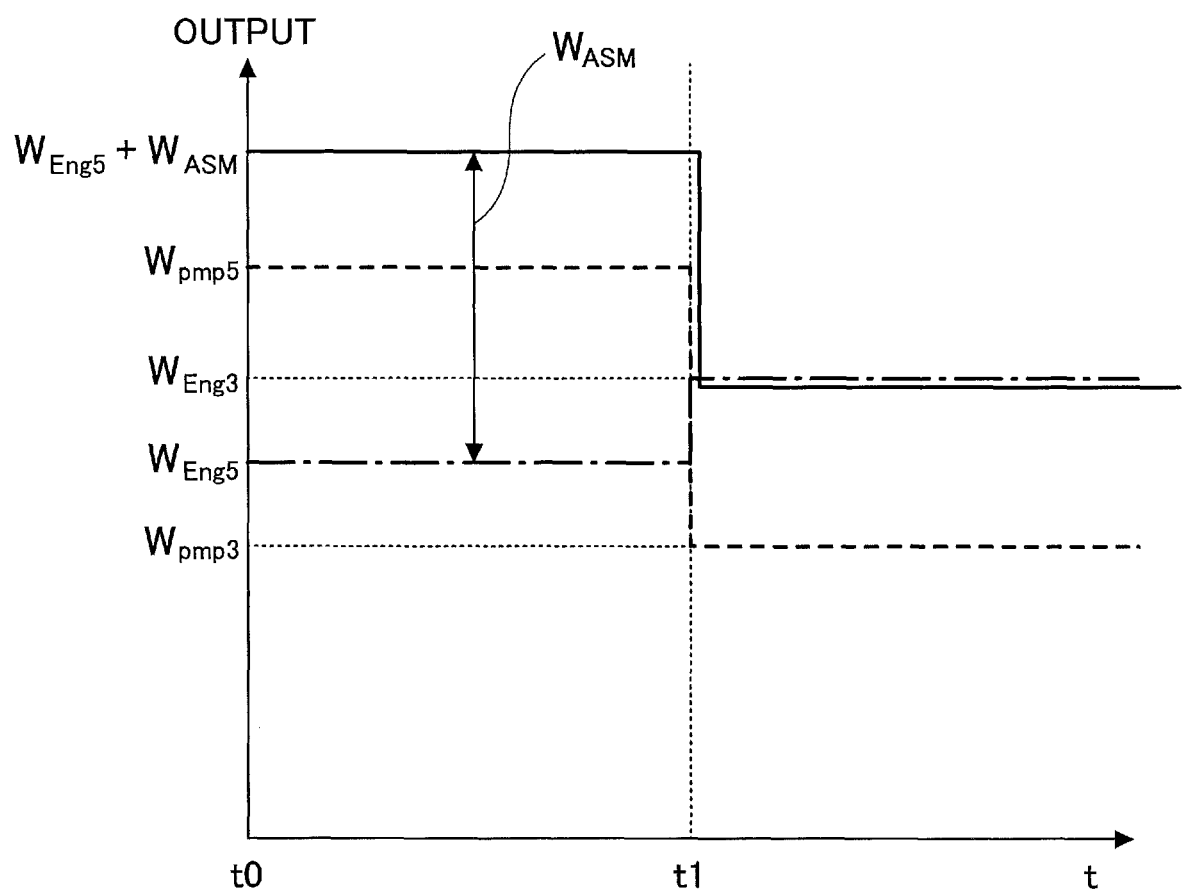
FIG. 25B is a graph illustrating an output upper limit value of an engine, an output of a main pump, an output upper limit value of a motor generator and a total output upper limit value of the engine and the motor generator over a time before and after a detection of an abnormality when the abnormality occurs in the motor generator or an inverter in the hybrid construction machine according to the sixteenth embodiment of the present invention.

FIG. 25A is a graph in which the output upper limit value of the engine 11 and the output upper limit value of the main pump 14 are plotted when reducing the engine revolution number of the engine 11 in a case where an abnormality occurs in the motor generator 12 or the inverter 18 in the hybrid construction machine according to the sixteenth embodiment of the present invention. FIG. 25B is a graph illustrating the output limit value of the engine 11, the output of the main pump 14, the output upper limit value of the motor generator 12, and the total output upper limit value of the engine 11 and the motor generator 12 when reducing the engine revolution number of the engine 11 in a case where an abnormality occurs in the motor generator 12 to the inverter 18 in the hybrid construction machine according to the sixteenth embodiment of the present invention before and after an abnormality detection.

The output characteristic of the engine 11 and the output characteristic of the main pump 14 illustrated in FIG. 25A are the same as the characteristics illustrated in FIG. 24A.

The hybrid construction machine according to the sixteenth embodiment differs from the hybrid construction machine according to the fifteenth embodiment in that, in a case where the engine revolution number at a normal time is r5, which is higher than r4, when an abnormality occurs in the motor generator 12 or the inverter 18, the engine revolution number is set in an operation area between r2 and r4.

At a time t=0, the motor generator 12 and the inverter 18 are operating normally, and the engine revolution number of the engine 11 is r5 at a normal time. Then, at this time point, a high output request is made to the hydraulic cylinder by a lever operation of the operator. Here, the output requested to the main pump 14 is the same value as the output upper limit value $W_{Pump5}$ of the main pump 14 at the engine revolution number r5. Then, the output $W_{Pmp5}$ to the main pump 14 is higher than the output upper limit value $W_{Eng5}$ of the engine 11. Thus, an operation to assist is performed by the motor generator 12. Accordingly, the total output upper limit which is a sum of the output upper limit value $W_{ASM}$ and the output upper limit value $W_{Eng5}$ of the engine, can be set higher than the output $W_{Pump5}$ of the main pump 14.

However, if an excessive load is applied to the motor generator 12 and the detection value of the temperature sensor 12A reaches a previously determined temperature, the assist abnormality determination part 50 of the controller 30 determines that the motor generator 12 in an overload state. In this case, the assist abnormality determination part 50 of the controller 30 determines that an abnormality occurs in the motor generator system, and sends an instruction to the inverter 18 to stop the output of the motor generator 12 in order to reduce the load to the motor generator 12 by performing the assist abnormality process. Thereby, there is no output from the motor generator 12, and, thus, the output $W_{Pmp5}$ of the main pump 14 becomes higher than the output upper limit value $W_{Eng5}$ of the engine 11. Here, in the present embodiment, when an abnormality occurs in the motor generator at a time t=t1, the engine-stall prevention part 32 of the controller 30 detects the abnormality of the motor generator 12, and controls the engine revolution number to be r3.

Here, the output upper limit value $W_{Pmp5}$ of the main pump 14 decreases to $W_{Pump3}$ in association with an increase in the revolution number. At the engine revolution number r3, even if the main pump 14 is operating at a limit capacity by which the hybrid construction machine according to the sixteenth embodiment can output, the output upper limit value $W_{Pmp3}$ of the main pump 14 becomes higher than output upper limit value $W_{Eng3}$ of the engine 11. Accordingly, due to an occurrence of an abnormality, the output $W_{ASM}$ of the motor generator 12 becomes zero, but because the output of the engine 11 becomes $W_{Eng3}$, the output $W_{ASM}$ exceeds the output $W_{Pmp3}$ of the main pump 14, and, thereby, the operation of the main pump 14 can be continued only by the output $W_{Eng3}$ of the engine 11.

Although the mode in which, when an abnormality occurs in the motor generator at the time t=t1, the engine revolution number is controlled to r3 at which the maximum output is generated was explained for the sake of convenience of explanation, the engine revolution number is not limited to r3, and may be between r2 and r4. If it is in an operation area in which the engine revolution number is between r2 and r4, it is an operation area in which the output of the engine 11 exceeds the output of the main pump 14.

As mentioned above, according to the hybrid construction machine according to the sixteenth embodiment, when an abnormality occurs in the motor generator 12 or the inverter 18, the operation area in which the output of the engine 11 exceeds the output of the main pump 14 is set by the controller 30, and, thus, the main pump 14 can be driven by only the output upper limit value $W_{Eng}$ of the engine 11 even if there is no assist force by the motor generator 12, thereby enabling the operation state to continue.

Moreover, although the explanation was given using the engine revolution number of the engine 11, the revolution number of the motor generator 12, which is mechanically coupled with the engine 11, may be used as the engine revolution number.

Although the process of the case where a temperature abnormality occurs in the motor generator 12 was explained in the present embodiment, the assist abnormality determination part 50 may judge an abnormality of the motor generator system based on a detection value of a current detector or a voltage detector in the inverter 18, which is an abnormality detection part of the motor generator system. In this case, a process of driving the engine in the revolution number range in which the output upper limit value of the engine 11 is higher than the output upper limit value of the main pump 14 by increasing and decreasing the engine revolution number from the revolution number at a normal time by the engine-stall prevention part 32.

Additionally, it is the same as in a case where an occurrence of an abnormality in the electric power accumulation system is determined according to a detection value from the abnormality detection part provided in the electric power accumulation system constituted by the battery 19 and the up-down converter 100. In this case, because it becomes impossible to supply electric power from the battery 19 to the motor generator 12, the assist abnormality determination part 50 determines that no assistance can be made, and performs an assist abnormality determination process to stop the motor operation and the generating operation of the motor generator 12. Thus, even when an abnormality occurs in the electric power accumulation system, similar to the case where an abnormality occurs in the motor generator system, the engine revolution number of the engine 11 is changed by the engine-stall prevention part 32 so that the engine can be driven in a revolution number range where the output upper limit value of the engine 11 is higher than the output upper limit value of the main pump 14.

Although the hybrid construction machine provided with the bucket 6 was explained in the fourteenth through sixteenth embodiment, a lifting magnet may be provided instead of the bucket 6. The lifting magnet is an electric work element which attracts or releases a metal material by an electromagnetic force. Additionally, although the hybrid construction machine provided with the up-down converter 100 was explained in the fourteenth through sixteenth embodiment, the abnormality processing can be applied also to a case where the up-down converter is not provided.

By the way, many hybrid construction machines are provided with a cooling system which cools a motor generator, a turning electric motor and inverters. The above-mentioned Patent Document 1 discloses cooling a motor generator by work oil of a pump motor in a hydraulic drive apparatus.

However, in the following seventeenth embodiment and eighteenth embodiment, a hybrid construction machine is provided, which can continue an operation state even in a case where an abnormality occurs in a cooling apparatus provided independently of a hydraulic drive part.

Figure 26:
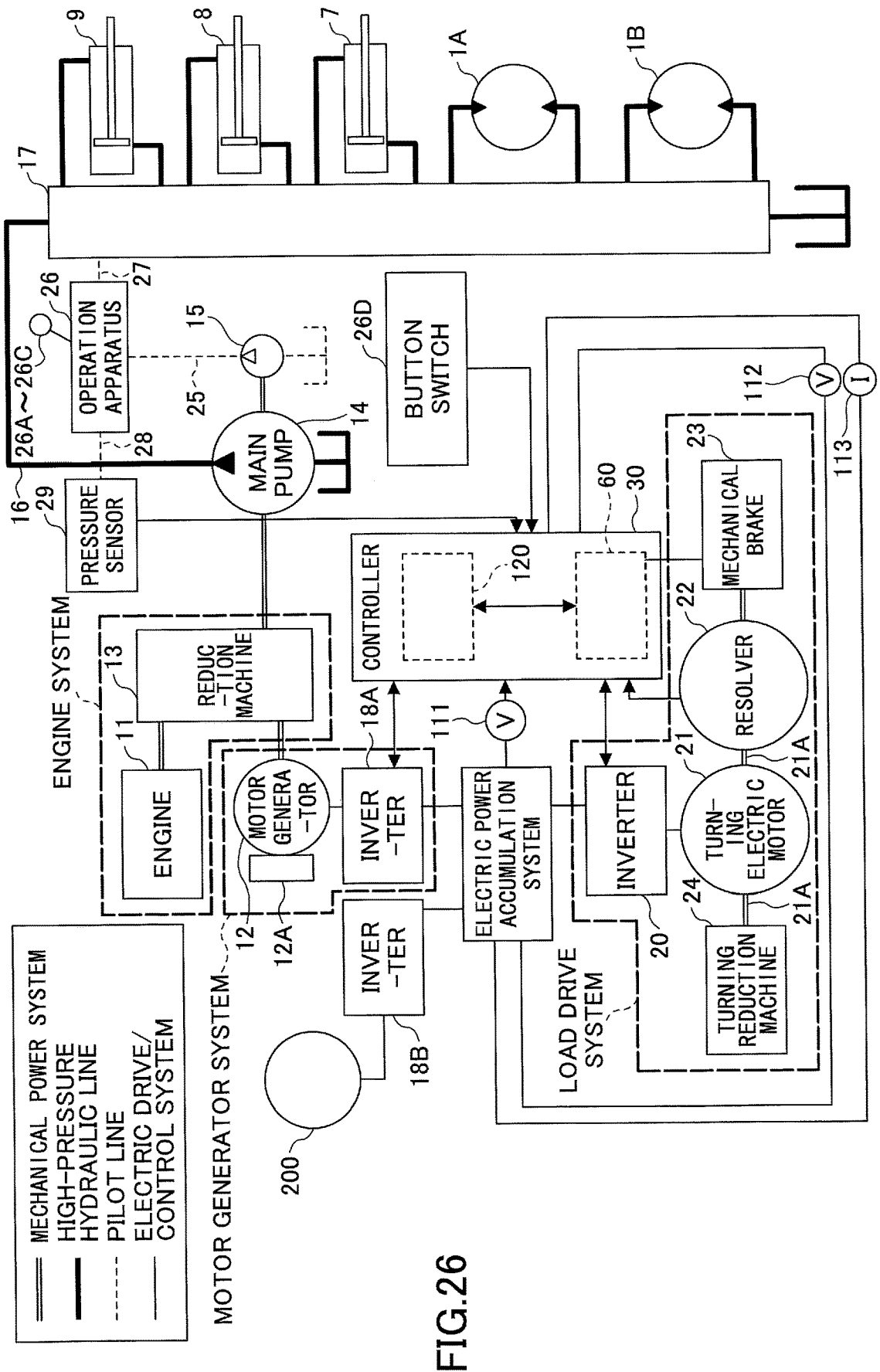
FIG. 26 is a block diagram illustrating a structure of a lifting magnet system hybrid construction machine according to the seventeenth embodiment according to the present invention.

FIG. 26 is a block diagram illustrating a structure of a hybrid construction machine according to the seventeenth embodiment of the present invention. The hybrid construction machine according to the seventeenth embodiment of the present invention is a lifting magnet hybrid construction machine, and has basically the same structure as the lifting magnet hybrid construction machine according to the second embodiment illustrated in FIG. 7, but structural elements mentioned below are added. In FIG. 26, parts that are the same as part illustrated in FIG. 7 are given the same reference numerals, and descriptions thereof will be omitted.

Because the hybrid construction machine according to the seventeenth embodiment of the present invention is a lifting magnet hybrid construction machine, a button switch 26D is provided to the operation apparatus 26 for switching between a magnetization (ON: attraction) and demagnetization (OFF: release) of the lifting magnet 200. When the button switch 26D is pressed by an operator, the controller 30 switches the operation of the lifting magnet 200 between the magnetization (ON: attraction) and the demagnetization OFF: release).

In the electric system, a DC bus voltage detection part 111 is connected to the electric power accumulation system. The DC bus voltage detection part 111 detects the voltage of the DC bus 110, and supplies the DC bus voltage value to the controller 30. The DC bus voltage detection part 111 corresponds to a voltage detection part to detect the DC bus voltage value. The DC bus voltage value detected by the DC bus voltage detection part 111 is input into the controller 30, and is used to perform a switching control between a voltage-up control and a voltage-down control to cause the DC bus voltage value to fall within a fixed range.

Moreover, a battery voltage detection part 112 and a battery current detection part 113 are connected to the electric power accumulation system. The battery voltage detection part 112 detects the voltage of the battery 19, and supplies the battery voltage value to the controller 30. The battery current detection part 113 detects a current flowing between the battery 19 and the up-down converter 100, and supplies the battery current value to the controller 30. The switching control between the voltage-up operation and the voltage-down operation of the up-down converter 100 is performed by a control instruction from the controller 30 based on the DC bus voltage value detected by the DC bus voltage detection part 111, the battery voltage value detected by the battery voltage detection part 112, and the battery current value detected by the battery current detection part 113.

The battery voltage detection part 112 corresponds to the voltage detection part for detecting a voltage value of the battery 19, and is used to detect a charge state of the battery 19. The battery voltage value detected by the battery voltage detection part 112 is input into the controller 30, and is used to perform the switching control between the voltage-up operation and the voltage-down operation of the up-down converter 100. The DC bus voltage detection part 111 and the battery voltage detection part 112 also function as an abnormality detection part, which can specify, when an abnormality occurs between the up-down converter 100 and the battery 19, the occurrence of the abnormality and the location of the occurrence of the abnormality by comparing the voltage values of the battery voltage detection part 112 and the DC bus voltage detection part 111.

The battery current detection part 113 corresponds to a current detection part for detecting the current value of the battery 19. The battery current value is detected based on the current which flows from the battery 19 to the up-down converter 100 is a positive value. The battery current value detected by the battery current detection part 113 is input into the controller 30, and is used to perform the switching control between the voltage-up operation and the voltage-down operation of the up-down converter 100. Then, if a line failure abnormality occurs between the up-down converter 100 and the battery 19, the battery current detection part 113 also function as an abnormality detection part of the electric power accumulation part by detecting a rapid decrease in the current value detected by the battery current detection part 113.

In the present embodiment, the controller 30 includes a cooling function abnormality determination part 130 which determines an abnormality of the cooling system based on detection values from first abnormality detection parts 310A, 320A, 330A and 340A provided in the cooling system mentioned below. If the controller 30 detects an abnormality of the cooling system, the controller 30 performs a process to continue operations of the lifting magnet 200, the motor generator 12, and the turning electric motor 21. This process is mentioned later.

Additionally, the controller 30 is provided with a drive part abnormality determination part 60. The drive art abnormality determination part 60 is configured to be supplied with signals representing a temperature of the motor generator 12 and a temperature of a switching element contained in the inverter 18.

Figure 27A:
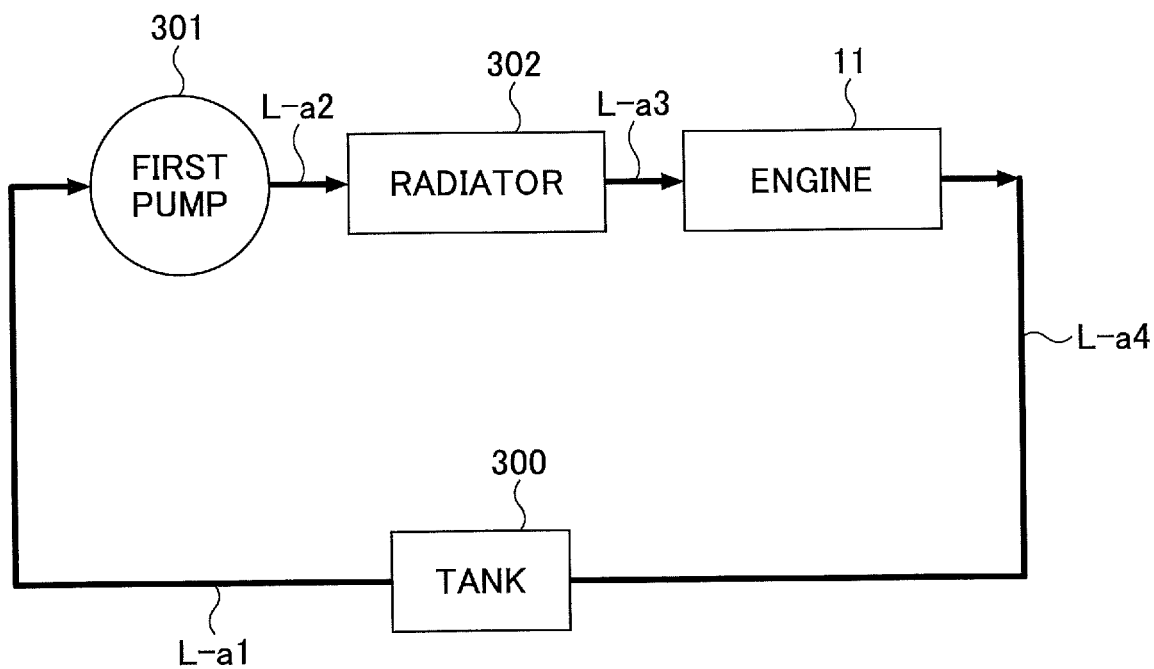
FIG. 27A is an illustration illustrating a cooling system of an engine of the hybrid construction machine according to the seventeenth embodiment of the present invention.

FIG. 27A is an illustration illustrating the cooling system of the engine 11 of the hybrid construction machine according to the seventeenth embodiment of the present invention. FIG. 27B is an illustration illustrating a cooling path of the motor generator 12, the reduction machine 13, the turning electric motor 21 and a drive control system of aforementioned in the hybrid construction machine according to the seventeenth embodiment of the present invention. In FIG. 27A and FIG. 27B, an order of flow of cooling water is indicated for each structural element, and arrows indicate directions of flow of the cooling water.

As illustrated in FIG. 27A, the cooling system of the engine 11 is configured so that a cooling water circulates through a tank 300, a first pump 301, a radiator 302 and the engine 11, in that order. The cooling water passing through the cooling-water path of the engine 11 returns to the tank 300. The first pump 301 is mechanically connected to an output axis of the engine 11 via a fan belt, and is driven by the engine 11. The first pump 301 is not limited to be driven by the engine 11, and may be driven by an electric motor. Such an electric motor is supplied with electric power from the DC bus 110. In this case, if the first pump 301 is driven, the cooling water in the tank 300 is suctioned by the first pump 301, and is supplied to the radiator 302 through pipes L-a1 and L-a2. After a heat exchange is performed by the radiator 302, the cooling water is supplied to the engine 11 through a pipe L-a3, and the engine 11 is cooled. The cooling system is configured so that the cooling water, which has been heated by the heat of the engine 11, passes the pipe La-4, and is returned to the tank 300.

The hybrid construction machine according to the seventeenth embodiment has another cooling system for cooling the motor generator 12, the reduction machine 13 and the turning electric motor 21, separate from the cooling system of the engine 11.

As illustrated in FIG. 27B, the cooling apparatus constituting the cooling system is configured so that a cooling water circulates along a tank 310, an inverter 322 for pumps, a second pump 320, a radiator 330, the controller 30, a power supply system 340, the turning electric motor 21, the motor generator 12, and the reduction machine 13, in that order. The second pump 320 is driven by a motor 321 for pumps.

The power supply system 340 includes the inverters 18A, 18B and 20, the inverter 322 for pumps, the up-down converter 100 and the battery 19. Because the lifting magnet 200 itself is of an air-cooled type, it is not included in the cooling system, and only the inverter 18B, which perform a drive control of the lifting magnet 200, is included in the cooling system.

The motor 321 for pumps is driven and controlled by the controller 30 through the inverter 322 for pumps. Thermistors 12A, 13A, 21B and 340A are provided to the motor generator 12, the reduction machine 13, the turning electric motor 21, the controller 30, the motor 321 for pumps, and the power supply system 340.

Although the thermistor 340A of the power supply system 340 is integrally illustrated as a second abnormality detection means in FIG. 27B, actually, the thermistor 340A is configured to be capable of detecting temperatures of the inverters 18A, 18B and 20, the up-down converter 100 and the battery 19 individually. Moreover, the thermistor 340B, which is a temperature sensor of the inverter 322 for pumps, is provided as a first abnormality detection means.

In the cooling apparatus, when the second pump 320 is driven based on a signal from the inverter 322 for pumps, the cooling water in the tank 310 is suctioned by the second pump 320, and is supplied to the radiator 330 through the pipes L-b1 and L-b2. After a heat exchange is performed in the radiator 330, the cooling water is directly supplied to the controller 30 through the pipe L-b3. This is because a heat resistance of a CPU provided in the controller 30 is lowest and it is necessary to use the cooling water in the lowest temperature state. Then, the cooling water heated by the controller 30 is supplied to the power supply system 340 through the pipe L-b4. The cooling water, which has absorbed a heat of the heated power supply system and has been heated further, is supplied to the turning electric motor 21 and the motor generator 12 through the pipes L-b5 and L-b6. Then, after becoming further higher temperature, the cooling water is supplied to the reduction machine 13, which is at the highest temperature, and the reduction machine 13 is cooled. Thus, the cooling system of the electric system can be configured to cool first the controller 30, which is at the lower temperature, and cool finally the reduction machine 13, which is at the highest temperature. Thereby a plurality of heating bodies can be efficiently cooled by a single cooling system.

Furthermore, also in the cooling system of the electric system, as a first abnormality detection part, a pressure gauge 320A is provided to the pipe L-b2 extending from the second pump, a water temperature meter 330A is provided to the pipe L-b3, and a water amount meter 310A is provided to the tank 310. Then, the detection values detected by the pressure gauge 320A, the water temperature meter 330A and the water amount meter 310A are supplied to the controller 30, and the controller determines an occurrence of an abnormality by comparing the detection values with respective threshold values corresponding to the detection values. For example, the detection value of the water temperature meter 330A remarkably rises in a case where the cooling capacity of the radiator 330 is decreased due to clogging of the pipes. In this case, if the detection value reaches the previously determined threshold value, which is for judging an occurrence of an abnormality of water temperature, the controller 30 determines that an abnormality has occurred in the cooling function. Similarly, because an amount of cooling water is reduced if a hole is formed in the pipes, the detection value of the water amount meter is decreased, and an occurrence of an abnormality can be made when it reaches the threshold value.

The electric signals representing temperatures detected by the thermistor 340B of the inverter 322 for pumps, which corresponds to the first abnormality detection part, and the thermistors 12A, 13A, 21B and 340A, which correspond to the second abnormality detection part, are all supplied to the controllers.

The cooling function abnormality determination part 130 in the controller 30, when the detection value detected by the first abnormality detection part is input, compares the detection values with the threshold values previously set in response to each kind of the detection values, and determines that an abnormality has occurred when the detection values exceed the respective threshold values.

Similarly, the drive part abnormality determination part 60 of the controller 30 is supplied with signals representing a temperature of the battery 19 detected by the second abnormality detection part, a current value supplied to the battery 19 and the up-down converter 100, a voltage value applied to the battery 19 and the up-down converter 100, a temperature of a switching element of the up-down converter 100, temperatures of the motor generator 12 and the turning electric motor 21, current values and voltage values supplied to the inverters 18A, 18B and 20, temperatures of switching elements of the inverters 18A, 18B and 20, in order to determine that an abnormality has occurred in the drive function if they exceed the respective threshold values previously set in response to each kind of the detection values.

If, for example, the radiator 330 is damaged and a heating capacity is decreased, the temperature of the cooling water discharged into the pipe L-b3 is raised. Thereby, the temperature of the water temperature meter 330A gradually rises, when it reaches the previously determined threshold value, the cooling function abnormality determination part 130 determines that an abnormality has occurred in the cooling function. However, before and after the determination of the cooling abnormality, the controller 30 causes the dive part such as the motor generator 12 and the turning electric motor 21 to be driven continuously. This is because, if an abnormality occurs in the cooling function, an abnormality does not always occur in the temperature of the drive part. Accordingly, even if the temperature of the water temperature meter 330A reaches the previously set threshold value, the motor generator 12 and the turning electric motor 21 are driven continuously.

Similarly, if the cooling function abnormality determination part 130 determines that a switching element of the inverter 322 for pumps is in an overheated state based on the detection value of the thermistor 340A, which is the first abnormality detection part, the controller 30 causes the drive system such as the motor generator 12 and the turning electric motor 21 to be driven continuously.

In the hybrid construction machine, whether the drive system has a remaining power in operation depends largely on a circumferential environment or a mode of use. Thus, if there is a remaining power in operation of the drive system, the operation of the drive system can be continued without problems even if the cooling function is deteriorated, and the construction machine can be driven continuously. Thereby, an efficiency of a work such as an excavation can be improved.

Moreover, although the cooling apparatus according to the seventeenth embodiment was explained using the structure of cooling the controller 30, the power supply system 340, the turning electric motor 21, the motor generator 12, the reduction machine 13, and all parts possible to generate a heat, the cooling apparatus of the hybrid construction machine may cool at least the motor generator 12 or the inverter 18A of the motor generator 12.

Next, a description will be given of a hybrid construction machine according to the eighteenth embodiment of the present invention.

In the hybrid construction machine according to the eighteenth embodiment of the present invention, when the cooling function abnormality determination part 130 determines that an abnormality has occurred, the controller 30 continues to operate the drive parts, and further an abnormality determination function of the drive parts by the drive part abnormality determination part 60 on an individual drive part basis is added.

The drive part abnormality determination part 60 of the controller 30 determines that an abnormality has occurred in the drive function if the detection values detected by the second abnormality detection part exceed the previously set threshold values, respectively. In this case, a temperature of each of the motor generator 12, the reduction machine 13, the turning electric motor 21, the controller 30, and the power supply system 340 is determined individually, and an output limitation of each of the motor generator 12, the reduction machine 13, the turning electric motor 21, and the controller 30 is performed in response to each temperature.

Figure 28:
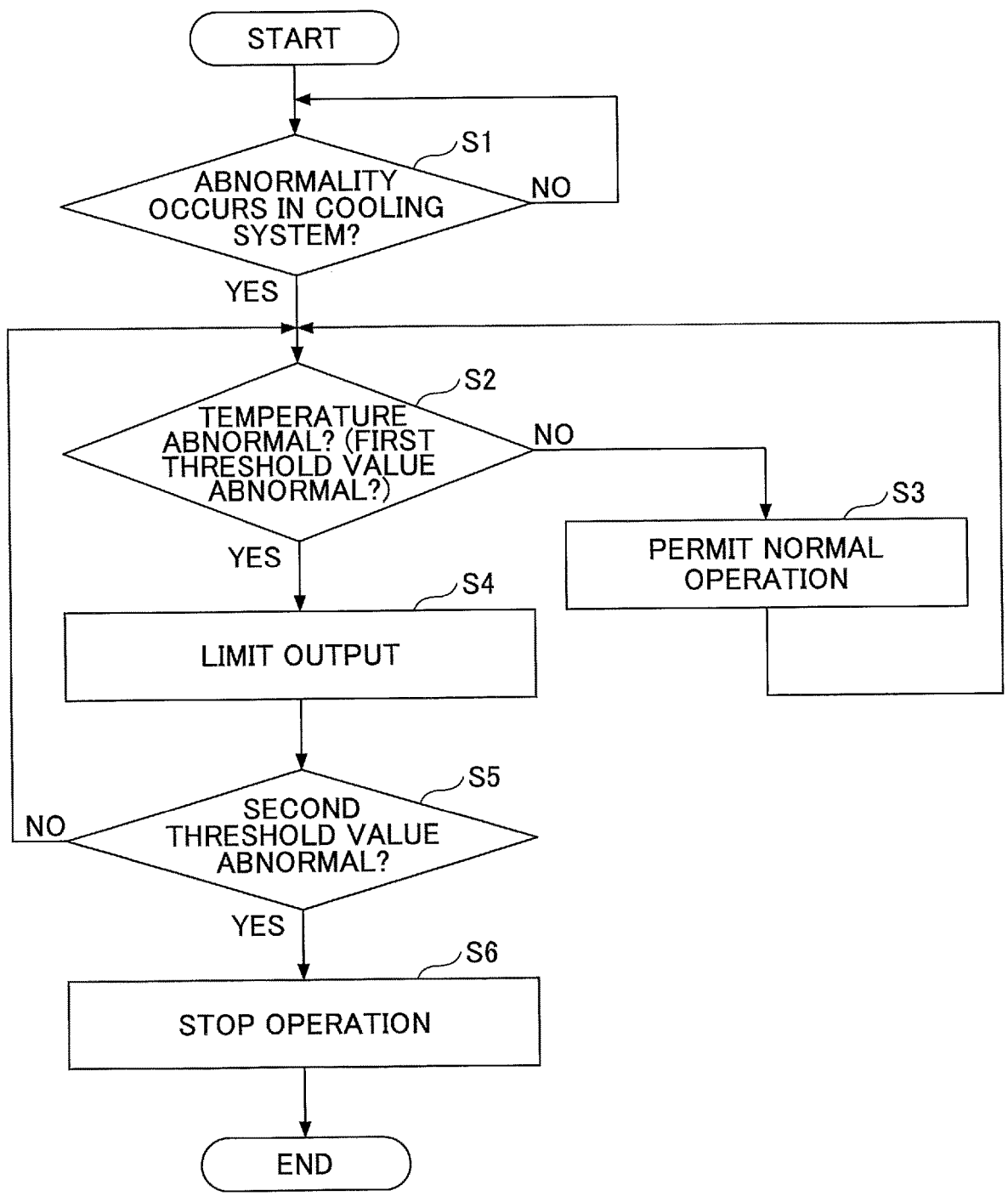
FIG. 28 is an illustration illustrating a procedure of an abnormality determination process and an output limit process of a cooling system in a hybrid construction machine according to an eighteenth embodiment of the present invention.

FIG. 28 is an illustration illustrating a procedure of an abnormality determination process of the cooling system and an output limitation process in the hybrid construction machine according to the eighteenth embodiment. These processes are performed by the controller 30.

The cooling function abnormality determination part 130 of the controller 30 compares the detection value from the first abnormality detection part with the threshold value, and determines whether an abnormality has occurred (step S1). Specifically, a determination is made based on the detection value of the water temperature meter arranged in the pipe L-b3. The process of step S1 is repeatedly performed. At this stage, the controller 30 can continue an operation of each drive part without stop before and after the abnormality determination in the cooling function abnormality determination part 130.

The controller 30 determines, after making a determination of an abnormality of the cooling system (step S1), whether the temperature detected by each of the temperature sensors provided to the motor generator 12, the reduction machine 13, the turning electric motor 21, the controller 30, and the power supply system 340 is equal to or higher than the first threshold value as a lower threshold value, which is previously set in response to each of the sensors (step S2).

The controller 30 does not apply an output limitation and permits a normal operation (step S3) with respect to the part of which temperature is not equal to or higher than the first threshold value from among the motor generator 12, the reduction machine 13, the turning electric motor 21, the controller 30, and the power supply system 340 (NO of step S2).

On the other hand, if it is determined that the temperature detected by each of the temperature sensors provided to the motor generator 12, the reduction machine 13, the turning electric motor 21, the controller 30, and the power supply system 340 is equal to or higher than the first threshold value, which is previously set in response to each of the sensors (YES of step S2), the controller 30 limits an output of one of the motor generator 12, the reduction machine 13, the turning electric motor 21, the controller 30, and the power supply system 340 of which temperature is equal to or higher than the first threshold value (step S4). Here, if a temperature abnormality occurs in the reduction machine 13, the output of the engine 11 is limited.

Here, from among the motor generator 12, the reduction machine 13, the turning electric motor 21, the controller 30, and the electric power supply system 34, parts which are operated as work elements are the motor generator 12, the reduction machine 13 and the turning electric motor 21. Additionally, there is the lifting magnet 200 as a work element which is driven by the inverter 18B in the electric power supply system.

Moreover, even if the temperatures of all of the motor generator 12, the reduction machine 13, the turning electric motor 21, and the controller 30 do not exceed the first threshold value, if it is determined that the temperature detected by the temperature sensor arranged in each of the inverters 18A, 18B and 20 included in the electric power supply system is equal to or higher than the first threshold value, an output of the structural element (any of the lifting magnet 200, the motor generator 12 and the turning electric motor 21) corresponding to the inverter (18A, 18B or 20) of which temperature exceeds the first threshold value is limited in step S4. This is because the lifting magnet 200, the motor generator 12 and the turning electric motor 21 are driven and controlled by the inverter 18A, 18A or 20. As mentioned above, by providing the first threshold value (lower threshold value) and limiting the output of the drive part of which detection value exceeds the lower threshold value, the construction machine can be operated continuously, which improves an efficiency of a work such a an excavation.

The controller 30 determines whether a temperature is equal to or higher than a second threshold value (higher threshold value) higher than the first threshold value with respect to the one to which the output limitation was applied from among the motor generator 12, the reduction machine 13, the turning electric motor 21, the controller 30, and the power supply system 340 (step S5). Here, if it is not equal to or higher than the second threshold value, the comparison with the first threshold value is performed again (step S2).

The controller 30 stops an operation of a part of which temperature is equal to or higher than the second threshold value from among the motor generator 12, the reduction machine 13, the turning electric motor 21, the controller 30, and the power supply system 340 (step S6). Thereby, the structural element (any of the motor generator 12, the reduction machine 13, the turning electric motor 21, the controller 30, and the power supply system 340) of which temperature is equal to or higher than the second threshold value is prohibited. As mentioned above, an operation of a drive part of which temperature is equal to or greater than the second threshold value is stopped quickly, and, thereby, the drive part is prevented from being damaged due to heat.

Thus, according to the hybrid construction machine according to the eighteenth embodiment, even when an abnormality occurs in the cooling system, a normal operation is permitted if a temperature of each structural element is lower than the first threshold value, and an operation is permitted in a state where an output is limited if the temperature is equal to or higher than the first threshold value but lower than the second threshold value. Thus, there is provided a hybrid construction machine in which, if an abnormality occurs in the cooling system, a state where an operation is not performed for all parts is not set, but a structural element of which temperature is not excessively high can continue the operation.

Although the hybrid construction machine equipped with the lifting magnet 200 was explained in the above-mentioned seventeenth embodiment and the eighteenth embodiment, a hybrid construction machine equipped with a bucket instead of the lifting magnet 200 may be used. Additionally, although the mode using the water-cooling type cooling apparatus was explained in the above-mentioned seventeenth embodiment and the eighteenth embodiment, an oil-cooling type may be used instead of the water-cooling type.

By the way, in a hybrid construction machine, when an abnormality occurs in a hydraulic pump and an operation is continued, it is possible that a request output to the hydraulic pump becomes excessive in order to operate a hydraulic drive part normally. In such a case, an assistance output of the motor generator to the engine is made larger in order to increase the output of the hydraulic pump, and, thereby, a large amount of electric power is consumed by the motor generator.

Thus, there is provided according to the nineteenth embodiment mentioned below a hybrid construction machine which can suppress a generation of an unnecessary output to a hydraulic pump even if an abnormality occurs in the hydraulic system.

The hybrid construction machine according to the nineteenth embodiment has a mechanical system and an electric system similar to that of the hybrid construction machine illustrated in FIG. 1 and FIG. 2, and a description of each part is omitted.

Figure 29:
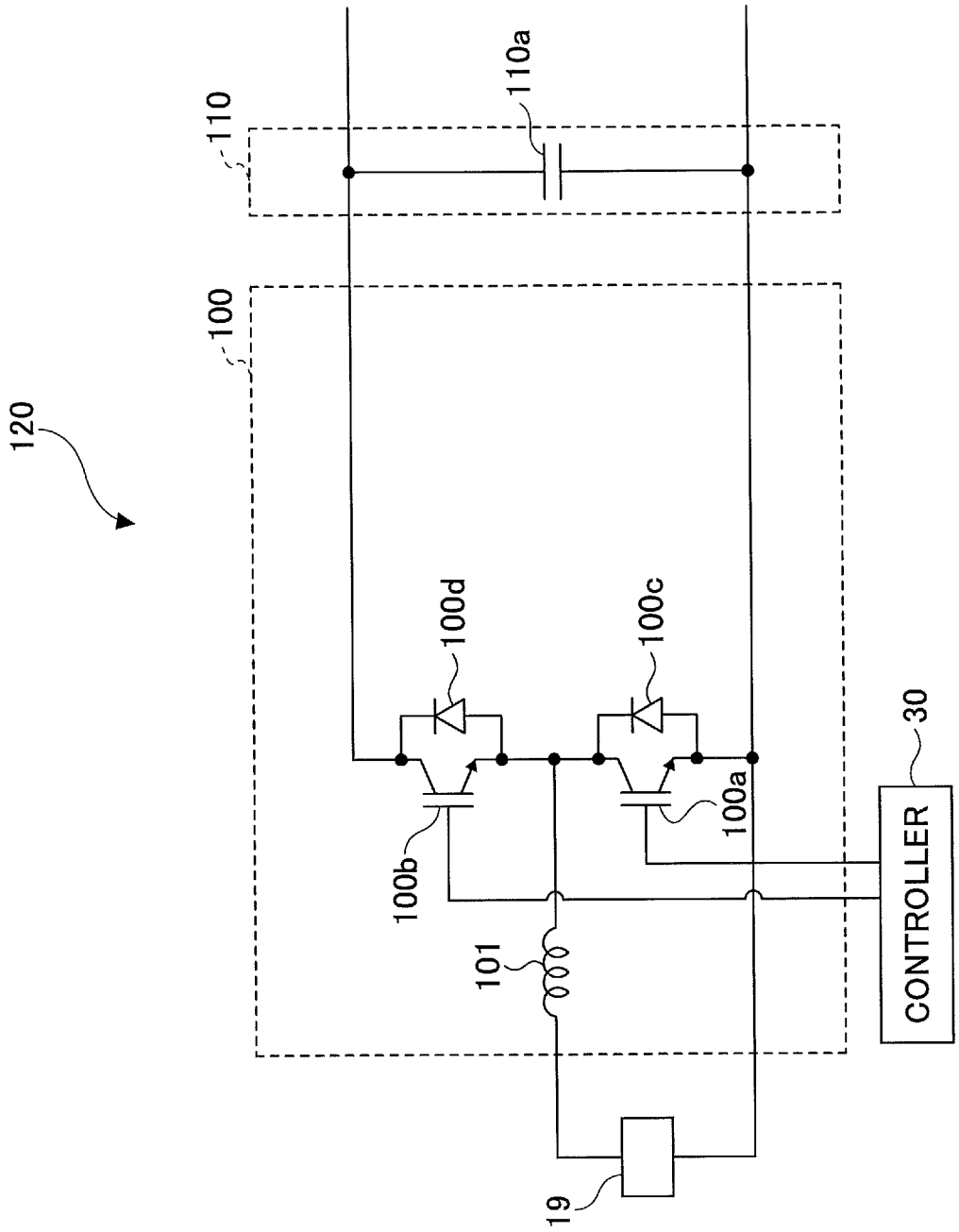
FIG. 29 is an illustration illustrating an internal structure of an electric power accumulation system in a hybrid construction machine according to a nineteenth embodiment of the present invention.

The up-down converter 100 according to the present embodiment uses a switching control system, and includes, as illustrated in FIG. 29, transistors 100a and 100b which are connected in series to each other, a reactor 101 connected between a connecting point of the transistors and a positive terminal of the battery 19, a diode 100c connected in parallel to the transistor 100a in an opposite direction, and a diode 100d connected in parallel to the transistor 100b in an opposite direction. Each of the transistors 100a and 100b is configured by, for example, IGBT (Insulated Gate Bipolar Transistor). When supplying a direct current electric power from the battery 19 to the DC bus 110, a PWM voltage is applied to a gate of the transistor 100a according to an instruction from the controller 30. Then, an induced electric power generated in the reactor 101 in association with ON/OFF of the transistor 100a is transmitted through the diode 100d so that the electric power is smoothed by a capacitor 110a of the DC bus 110. Additionally, when supplying a direct current electric power from the DC bus 110 to the battery 19, a PWM voltage is applied to a gate of the transistor 100b according to an instruction from the controller 30, and the current output from the transistor 100b is smoothed by the reactor 101.

The controller 30 in the present embodiment constitutes a hydraulic system abnormality detection part to detect an abnormality of a hydraulic system including the main pump 14 and the control valve 17. For example, it is assumed that a tilt-roll angle of the main pump 14 cannot be controlled due to rust of an oblique plate of the main pump 14 or damage of the pump control valve 14A. In this case, a drive current supplied from the controller 30 to the pump control valve 14A is increased in order to operate the oblique plate to be at an angle requested. When the drive current deviates from a predetermined current range due to such a phenomenon, the controller 30 judges that an abnormality has occurred in the hydraulic system including the main pump 14. When such an occurrence of an abnormality is detected, the controller 30 controls the main pump 14 and the motor generator 12 so that the output upper limit value of the main pump 14 and the upper limit value of the assistance output of the motor generator 12 are suppressed to lower values than that of a normal time.

Figure 30:
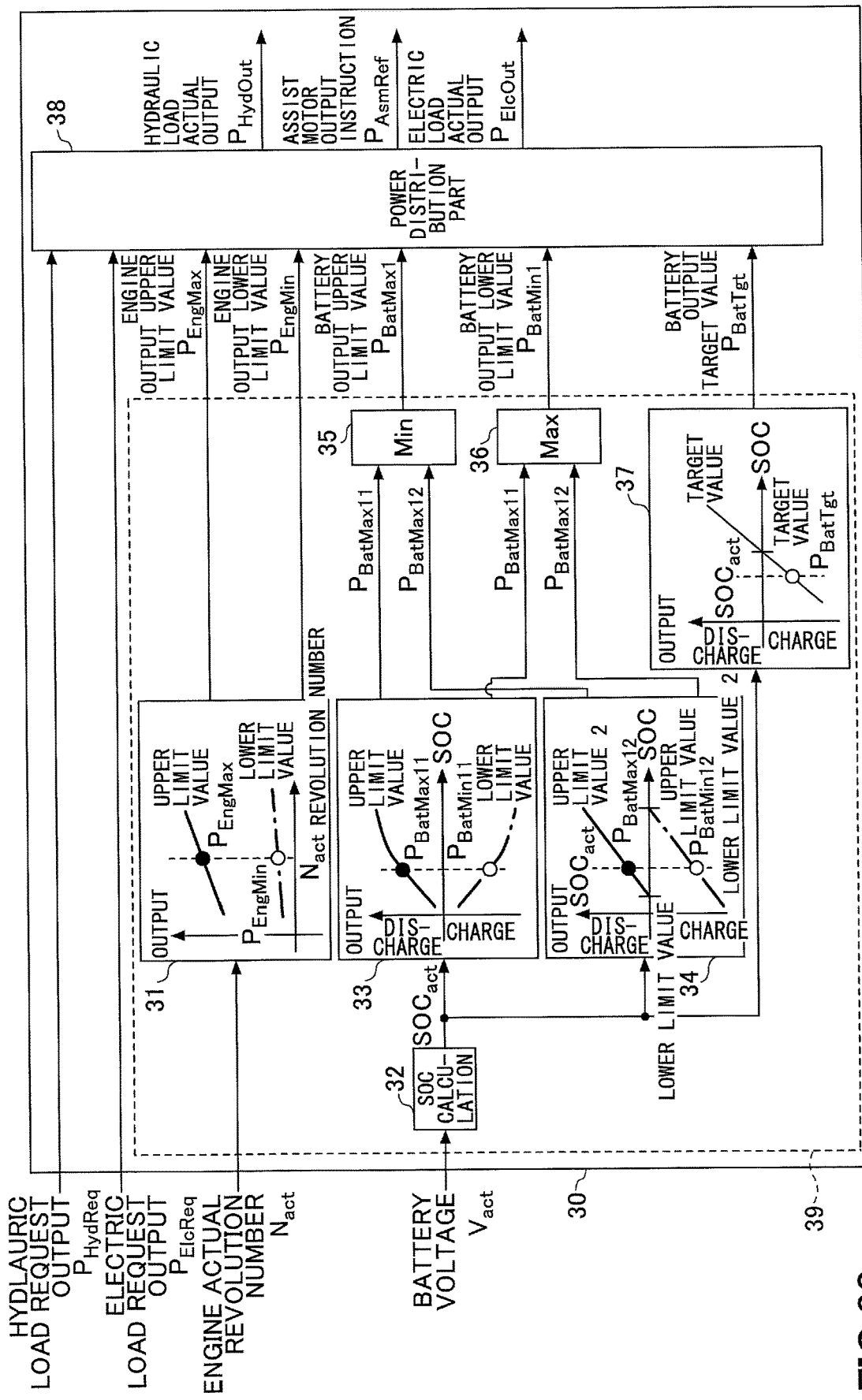
FIG. 30 is a block diagram illustrating a function of a controller.

Here, the function of the controller 30 in the present embodiment is explained in detail. FIG. 30 is a block diagram illustrating the function of the controller 30.

As illustrated in FIG. 30, the controller 30 includes an output condition calculation part 39 which computes the upper and lower limit values of an output corresponding to an output dependency to the engine 11 and the battery 19, and a power distribution part 38. The output condition calculation part 39 is constituted by functional blocks 31-37.

First, an engine actual revolution number $N_{act}$ which is a signal indicating an actual revolution number of the engine 11 is input to the block 31 of the output condition calculation part 39. The block 31 determines the upper limit value $P_{EngMax}$ and the lower limit value $P_{EngMin}$ of the engine output torque based on the engine actual revolution number $N_{act}$, and provides these values to the power distribution part 38. The block 31 has a map or a conversion table indicating the upper limit value and the lower limit value in a relationship between the revolution number and the output torque of the engine 11, and determines the upper limit value $P_{EngMax}$ and the lower limit value $P_{EngMin}$ of the engine output torque based on the map or the conversion table. The map or the conversion table is previously stored in a memory of the controller 30. The upper limit value $P_{EngMax}$ and the lower limit value $P_{EngMin}$ may be acquired by substituting the engine actual revolution number $N_{act}$ in a formula representing the upper limit value and the lower limit value.

A signal representing a hydraulic load request Output $P_{HydReq}$ and a signal representing an electric load request output $P_{ElcReq}$ are input into the power distribution part 38. The hydraulic load request output $P_{HydReq}$ is a parameter which indicates a power required by a hydraulic load (hydraulically driven structural parts, the boom cylinder 7, the arm cylinder 8, the bucket cylinder 9, the hydraulic motors 1A and 1B, etc.), and corresponds to, for example, an amount of operation of the operation lever when the operator operates the hydraulic load. The electric load request output $P_{ElcReq}$ is a parameter indicating the electric power required by the electric load (structural parts driven by electric power such as an electric motor or an electric actuator, the turning electric motor 21, etc.), and corresponds to, for example, an amount of operation of the operation lever when the operator operates the hydraulic load.

The battery voltage $V_{act}$ is input into the block 32 of the output condition calculation part 39. The battery voltage $V_{act}$ is a variable which represents an output voltage of the battery 19. In a case of a capacitor type electric power accumulator, because a charge amount thereof is proportional to a square of the terminal voltage of the capacitor, a state of charge can be known through the battery voltage $V_{act}$. The block 32 acquires a present state of charge $SOC_{act}$ based on the battery voltage $V_{act}$, and supplies it to the blocks 33, 34 and 37.

A map or a conversion table representing an output [kW] for charging at a maximum current in response to the state of charge SOC and an output [kW] for discharging at a maximum current in response to the state of charge SOC is stored in the block 33 of the output condition calculation part 39. The block 33 acquires a battery output upper limit value $P_{BatMax11}$ which is a maximum discharge amount and a battery output lower limit value $P_{BatMin11}$ which is a maximum charge amount based on the map or the conversion table and the state of charge $SOC_{act}$ of the battery 19 provided from the block 32. The block 33 provides the battery output upper limit value $P_{BatMax11}$ to the block 35, and supplies the battery output lower limit value $P_{BatMin11}$ to the block 36.

For example, the map of the block 33 represents an electric power amount (a charge and discharge maximum current×a capacitor voltage) determined when flowing a charge and discharge maximum current limited by a capacitor of the converter and the capacitor in a certain state of charge SOC. Because the state of charge SOC is proportional to a square of the charge and discharge voltage (capacitor voltage), each of the maximum charge electric power and the maximum discharge electric power forms a parabola with respect to the state of charge SOC. The block 33 acquires the maximum charge electric power (battery output upper limit $P_{BatMax11}$) and the maximum discharge electric power (battery output lower limit value $P_{BatMin11}$) permitted under a constant current in the present state of charge $SOC_{act}$ by referring to the map or the conversion table.

A map or a conversion table representing an output [kW] for discharging an energy, which reduces the state of charge SOC to the SOC lower limit value in a predetermined time period and an output [kW] for charging an energy, which increases the state of charge SOC to the SOC upper limit value in a predetermined time period is stored in the block 34. The block 34 acquires a battery output upper limit value $P_{BatMax12}$ which is a maximum discharge amount and a battery output lower limit value $P_{BatMin12}$ which is a maximum charge amount based on the map or the conversion table and the state of charge $SOC_{act}$ of the battery 19 provided from the block 32. The block 34 provides the battery output upper limit value $P_{BatMax12}$ to the block 35, and supplies the battery output lower limit value $P_{BatMin12}$ to the block 36.

For example, the map illustrated in the block 34 represents a suitable charge and discharge electric power in a certain state of charge SOC. In the map illustrated in the block 34, the lower limit value is a state of charge SOC set to give a margin so that the state of charge does not drop to zero. If the state of charge SOC decreases to zero or a value close to zero and when a discharge request is made, a discharge cannot be made immediately, and, thus, it is desirable to maintain in a state where it is charged to a certain level. Thus, the lower limit value (for example, 30%) is provided to the state of charge SOC in order to control so that a discharge is not performed when the state of charge SOC is equal to or smaller than the lower limit value. Accordingly, the maximum discharge electric power (dischargeable maximum power) is zero at the lower limit value of the state of charge SOC (that is, discharge is not permitted), and because a margin is generated in the dischargeable power as the state of charge SOC increases, the maximum discharge electric power is increased. According to the map in the block 34, the maximum discharge electric power increases linearly from the upper limit value of the state of charge SOC, but it is not limited to the linear increase, and may be increased to form a parabola or may be set to increase with an arbitrary pattern.

On the other hand, when a regenerative electric power is generated, for example, from an electric load if the state of charge SOC is 100%, the regenerative electric power cannot be absorbed immediately by the battery 19, and, therefore, an upper limit value (for example, 90%) is provided so that the state of charge SOC does not become 100% in order to control so that a charge is not performed when the state of charge SOC is equal to or larger than the upper limit value. Accordingly, the maximum charge electric power (chargeable maximum power) is zero at the upper limit value of the state of charge SOC (that is, charge is not permitted), and because a margin is generated in the dischargeable power as the state of charge SOC decreases, the maximum charge electric power is increased. According to the map in the block 34, the maximum charge electric power increases linearly from the upper limit value of the state of charge SOC, but it is not limited to the linear increase, and may be increased to form a parabola or may be set to increase with an arbitrary pattern.

Thus, the block 34 acquires, by referring to the map or the conversion table, the maximum discharge electric power (battery output upper limit value $P_{BatMax12}$) and the maximum charge electric power (battery output low limit value $P_{BatMin12}$) which are permitted in the present state of charge $SOC_{act}$.

The block 35 provides a smaller one of the battery output upper limit value $P_{BatMax11}$ provided from the block 33 and the battery output upper limit value $P_{BatMax12}$ provided from the block 34 to the power distribution part 38 as a battery output upper limit value $P_{BatMax1}$. Additionally, the block 36 provides a larger one (may be said as a smaller absolute value because the battery output lower limit value is normally a negative value indicating a charge state) of the battery output lower limit value $P_{BatMin11}$ provided from the block 33 and the battery output lower limit value $P_{BatMin12}$ provided from the block 34 to the power distribution part 38 as a battery output lower limit value $P_{BatMin1}$.

A map or a conversion table representing a correlation between the present state of charge $SOC_{act}$ of the battery 19 and a battery target output $P_{BatTgt}$ for approximating the state of charge $SOC_{act}$ to a predetermined SOC target value is previously stored in the block 37. The block 37 acquires the battery target output $P_{BatTgt}$ based on the map or the conversion table and the present state of charge SOC of the battery 19 provided from the block 32, and provides the acquired value to the power distribution part 38.

The power distribution part 38 determines a hydraulic load actual output $P_{HydOut}$, an electric load actual output $P_{ElcOut}$ and an assist motor output command $P_{AsmRef}$ based on the engine output upper limit value $P_{EngMax}$, the engine output lower limit value $P_{EngMin}$, the battery output upper limit value $P_{BatMax1}$, the battery output lower limit value $P_{BatMin1}$, and the battery target output $P_{BatTgt}$, and outputs the determined values to each part of the controller 30.

The hydraulic load actual output power $P_{HydOut}$ is a power actually supplied to a hydraulic load in response to the hydraulic load request output $P_{HydReq}$. If a requested power by the hydraulic load request output $P_{HydReq}$ is always supplied, a request from an electric load, which is simultaneously driven, cannot be satisfied or the state of charge SOC of the battery 19 cannot be maintained in an appropriate range. Thus, there is a case where a power actually supplied to the hydraulic load must be limited to some extent. In the present embodiment, when the controller 30 detects an abnormality of the hydraulic system, a power supplied to a hydraulic load is limited to a low value.

The electric load actual output power $P_{ElcOut}$ is a power actually supplied to an electric load in response to the electric load request output $P_{ElcReq}$. If a requested power by the electric load request output $P_{ElcReq}$ is always supplied, a request from a hydraulic load, which is simultaneously driven, cannot be satisfied or the state of charge SOC of the battery 19 cannot be maintained in an appropriate range. Thus, there is a case where a power actually supplied to the electric load must be limited to some extent.

The assist motor output command $P_{AsmRef}$ is a value which designates an output of the motor generator 12. It is instructed whether the motor generator 12 functions as an electric motor or a generator by the assist motor output command $P_{AsmRef}$. In addition, in the present embodiment, when the controller 30 detects an abnormality of the hydraulic system, an output when the motor generator 12 functions as an electric motor is limited to a low value.

Figure 31:
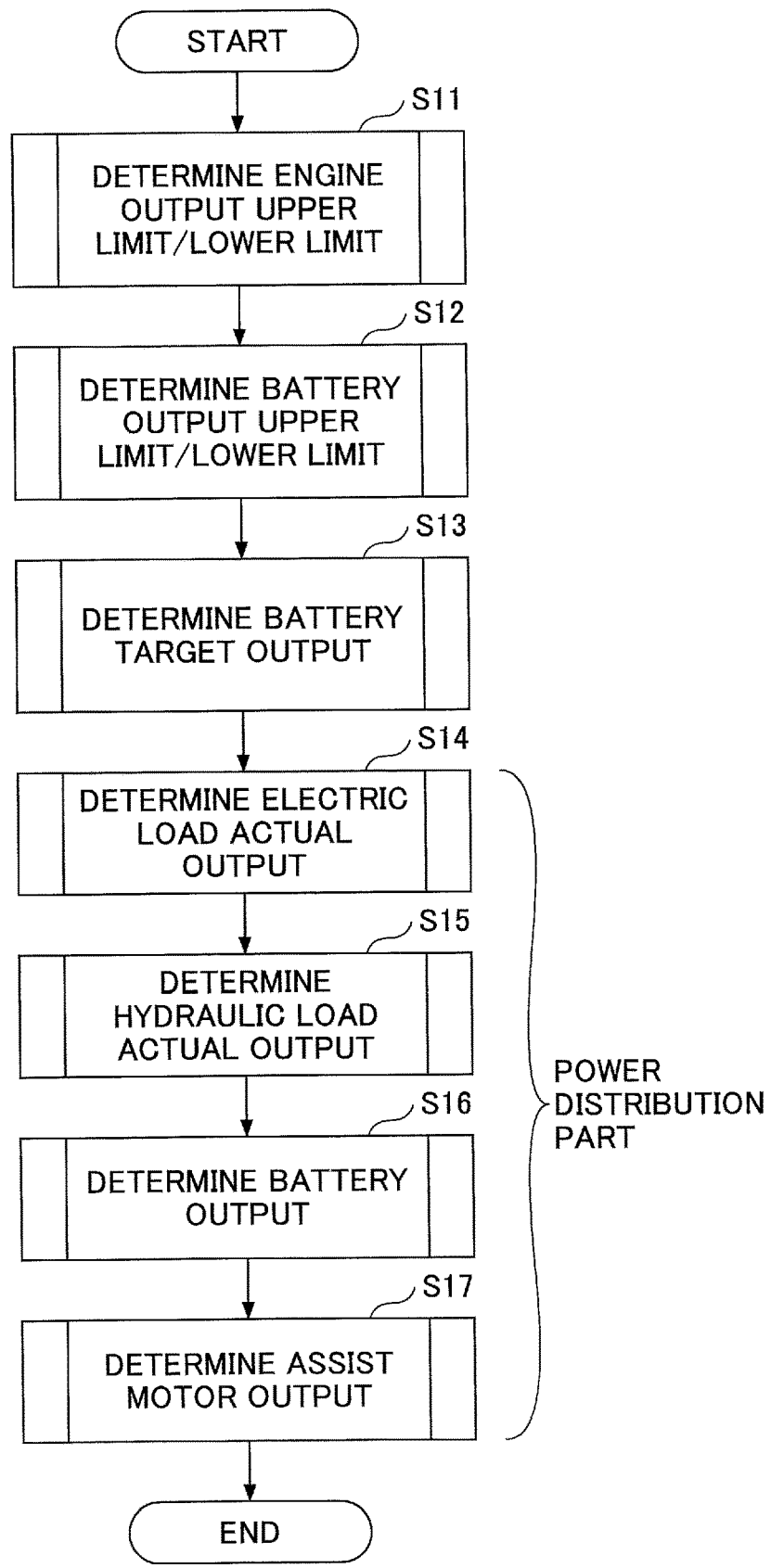
FIG. 31 is a flowchart of a process performed in the controller.

Here, a description will be given of a process of determining the hydraulic load actual output power $P_{HydOut}$, the electric load actual output $P_{ElcOut}$, and the assist motor output command $P_{AsmRef}$ in the controller 30. FIG. 31 is a flow chart of the process performed in the controller 30.

First, in the block 31, the engine output upper limit value $P_{EngMax}$ of the engine 11 and the engine output lower limit value $P_{EngMin}$ are determined based on the engine actual revolution number $N_{act}$ which indicates the present number of revolutions of the engine 11 (step S11). Even if the controller 30 detects an abnormality of the hydraulic system, the engine output upper limit value $P_{EngMax}$ of the engine 11 is maintained constant. Next, in the blocks 32-36, the battery output upper limit value $P_{BatMax1}$ and the battery output lower limit value $P_{BatMin1}$ are determined based on the present battery voltage $V_{act}$ (step S12).

Then, in the block 37, the battery target output $P_{BatTgt}$ is determined from the present state of charge $SOC_{act}$ (step S13). Thereafter, in the power distribution part 38, the electric load actual output $P_{ElcOut}$ is determined based on the limit values of the request outputs of the engine 11 and the battery 19 (step S14), and the hydraulic load actual output $P_{HydOut}$ is determined based on the limit values of the request outputs of the engine 11 and the battery 19 (step S15). Moreover, in the power distribution part 38, the battery output $P_{BatOut}$, which is a command value of an amount of charge and discharge of the battery 19, is determined based on the computed outputs of the engine 11, the electric load and the battery 19 (step S16). Then, in the power distribution part 38, the assist motor output command $P_{AsmRef}$ is determined based on comparison of the electric load actual output $P_{ElcOut}$ and the battery output $P_{BatOut}$ (step S17).

Here, the process in the above-mentioned steps S4-S7 is explained in detail.

Figure 32:
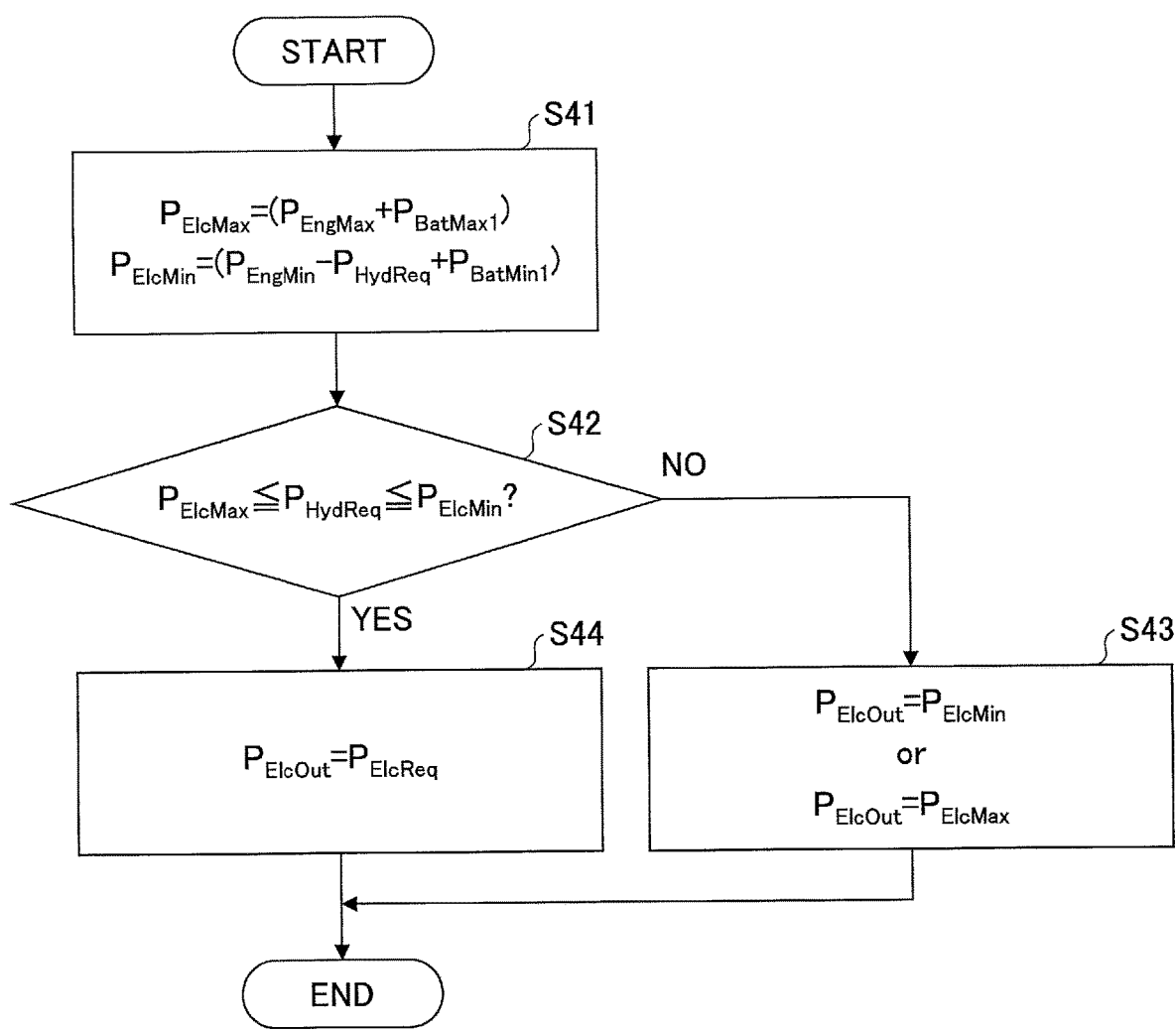
FIG. 32 is a flowchart of a process of step S4 of FIG. 31.

Referring to FIG. 32, in step S4, first the electric load output upper limit value $P_{ElcMax}$, which is the maximum electric power which can be supplied to the electric load, is computed, and also the electric load output lower limit value $P_{ElcMin}$, which is the electric power which can be accumulated in the battery 19, is computed (step S41). The electric load output upper limit value $P_{ElcMax}$ is a sum of the engine output upper limit value $P_{EngMax}$ and the battery output upper limit value $P_{BatMax1}$. That is, the maximum electric power which can be supplied to the electric load is a sum of the amount of electric power generated by the motor generator 12 obtained by the maximum output of the engine 11 and the amount of the maximum electric discharge of the battery 19. Moreover, the electric load output lower limit value $P_{ElcMin}$ is acquired by subtracting the hydraulic load output request $P_{HydReq}$ from the summed value of the engine output lower limit value $P_{EngMin}$ and the battery output lower limit value $P_{BatMin1}$.

Next, it is determined whether the electric load request output $P_{ElcReq}$ is equal to or smaller than the electric load output upper limit value $P_{ElcMax}$ and equal to or larger than the electric load output lower limit value $P_{ElcMin}$ (step S42). If it is determined in step S42 that the electric load request output $P_{ElcReq}$ is larger than the electric load output upper limit value $P_{ElcMax}$ (step S42: NO), the value of the electric load actual output $P_{ElcOut}$ is made equal to the value of the electric load output upper limit value $P_{ElcMax}$ (step S43). That is, when the electric power which the electric load requires is larger than the maximum electric power which can be supplied by the motor generator 12 and the battery 19 together, this maximum electric power is supplied to electric load. Additionally, if it is determined that the electric load request output $P_{ElcReq}$ is smaller than the electric load output lower limit value $P_{ElcMin}$ (step S42: NO), the value of the electric load actual output $P_{ElcOut}$ is made equal to the value of the electric load output lower limit value $P_{ElcMin}$ (step S43). That is, if the electric power requested by the electric load is larger than the maximum electric power, which can be supplied by the motor generator 12 and the battery 19, the maximum electric power is supplied to the electric load. Additionally, if the electric load request output $P_{ElcReq}$ is smaller than the electric load output lower limit value $P_{ElcMin}$ (step S42: NO), the value of the electric load actual output $P_{ElcOut}$ is made equal to the value of the electric load output lower limit value $P_{ElcMin}$ (step S43). That is, if the electric power regenerated by the electric load is larger than the electric power which is a sum of the maximum electric power which can be consumed by the motor generator 12 and the maximum electric power which can be accumulated in the battery 19, the regenerative electric power of the electric load is made not larger than the electric power.

If the electric load request output $P_{ElcReq}$ is equal to or smaller than the electric load output upper limit value $P_{ElcMax}$ and equal to or larger than the electric load output lower limit value $P_{ElcMin}$ (step S42: YES), the value of the electric load actual output $P_{ElcOut}$ is made equal to the value of the electric load request $P_{ElcReq}$, and the electric power requested by the electric load is supplied as requested (step S44).

Figure 33:
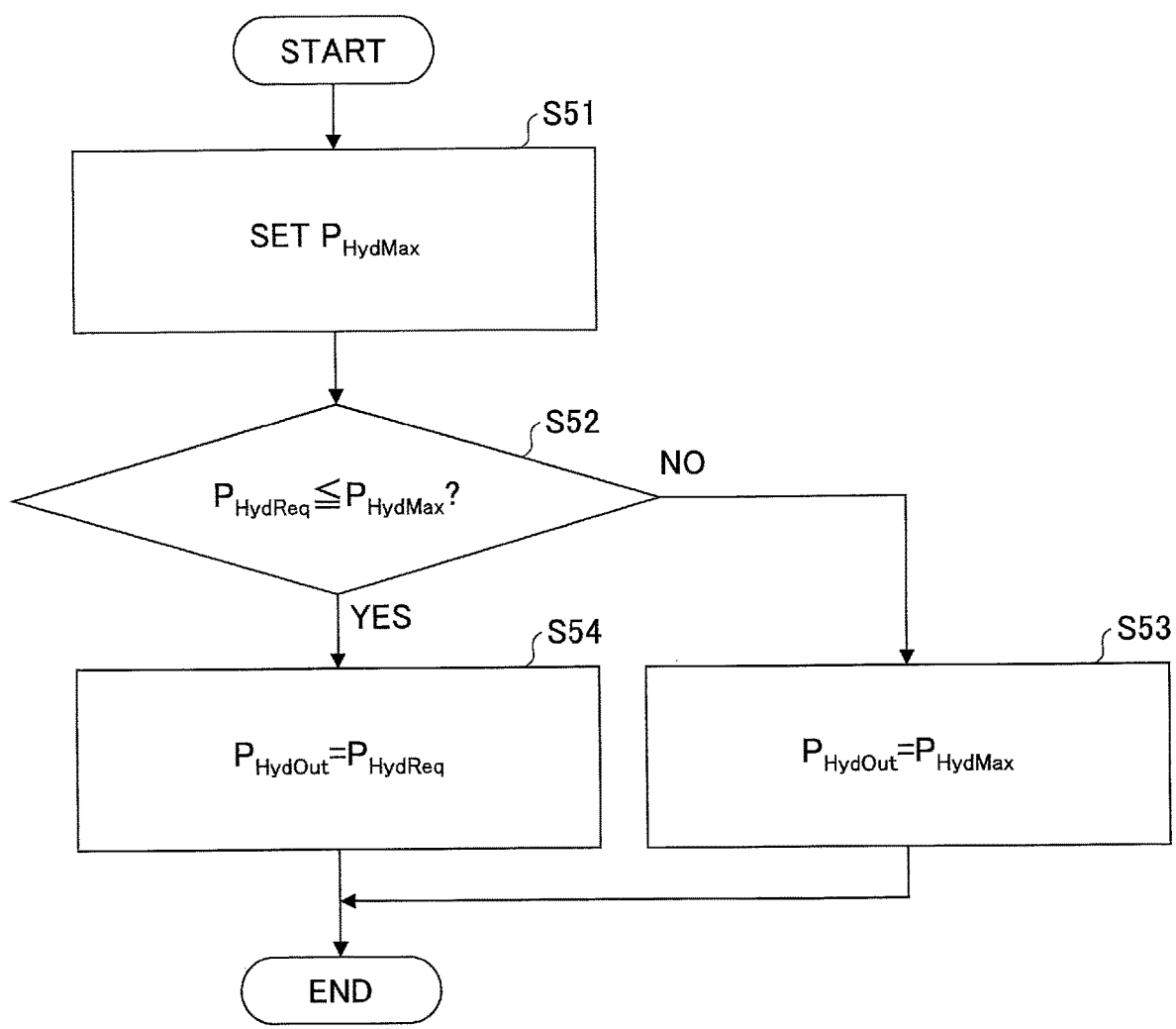
FIG. 33 is a flowchart of a process of step S5 of FIG. 31.

Referring to FIG. 33, in step S5, a set-up is performed first of the hydraulic load output upper limit value $P_{HydMax}$ which is the maximum power which can be supplied to the hydraulic load (step S51). Normally, the hydraulic load output upper limit value $P_{HydMax}$ is computed by subtracting the electric load actual output $P_{ElcOut}$ from the value of a sum of the engine output upper limit value $P_{EngMax}$ and the battery output upper limit value $P_{BatMax}$. Moreover, when an abnormality of the hydraulic system such as the main pump 14 is detected, it is set to a value lower than the computed value.

Next, it is determined whether the hydraulic load request output $P_{HydReq}$ is equal to or smaller than the hydraulic load output upper limit value $P_{HydMax}$ (step S52). If the hydraulic load request output $P_{HydReq}$ is larger than the hydraulic load output upper limit value $P_{HydMax}$ (step S52: NO), the value of the hydraulic load output $P_{HydOut}$ is made equal to the hydraulic load output upper limit value $P_{HydMax}$ (step S53). On the other hand, if the hydraulic load request output $P_{HydReq}$ is equal to or smaller than the hydraulic load output upper limit value $P_{HydMax}$ (step S52: YES), the value of the hydraulic load output $P_{HydOut}$ is made equal to the value of the hydraulic load request output $P_{HydReq}$ and the power requested by the hydraulic load is supplied as requested (step S54).

Figure 34:
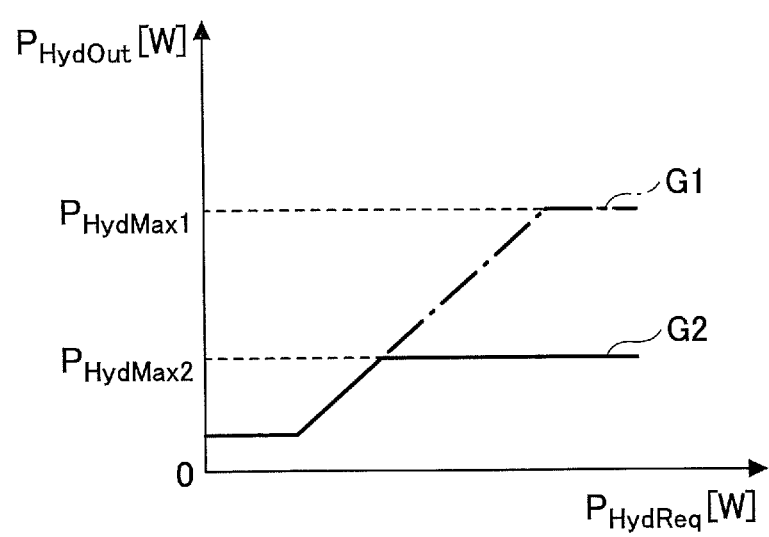
FIG. 34 is a graph illustrating changes in an output upper limit value of a main pump performed in the controller when an abnormality is detected in a hydraulic system.

Here, FIG. 34 is a graph illustrating a relationship between the hydraulic load request output $P_{HydReq}$ and the hydraulic load output $P_{HydOut}$ in the present embodiment. Normally, it is supposed that the hydraulic load output upper limit value $P_{HydMax}$ is set as $P_{HydMax1}$ ($=P_{EngMax}+P_{BatMax}-P_{ElcOut}$) illustrated in the figure. In this case, as indicated by a single dashed chain line, the hydraulic load output $P_{HydOut}$ is set to be equal to the hydraulic load request output $P_{HydReq}$ until the hydraulic load request output $P_{HydReq}$ reaches $P_{HydMax1}$. Then, if the hydraulic load request output $P_{HydReq}$ exceeds $P_{HydMax1}$, the hydraulic load output $P_{HydOut}$ is set to be equal to $P_{HydMax1}$.

On the other hand, when an abnormality of the hydraulic system such as the main pump 14 is detected, the hydraulic load output upper limit value $P_{HydMax}$ is set as $P_{HydMax2}$ ($<P_{HydMax1}$), which is lower than $P_{HydMax1}$. In this case, as indicated by a solid line G2, the hydraulic load output $P_{HydOut}$ is set to be equal to the hydraulic load request output $P_{HydReq}$ until the hydraulic load request output $P_{HydReq}$ reaches $P_{HydMax2}$. Then, if the hydraulic load request output $P_{HydReq}$ exceeds $P_{HydMax2}$, the hydraulic load output $P_{HydOut}$ is set to be equal to $P_{HydMax2}$. This $P_{HydMax2}$ may be computed by multiplying $P_{HydMax1}$ by a coefficient, or may be a previously determined value.

Figure 35:
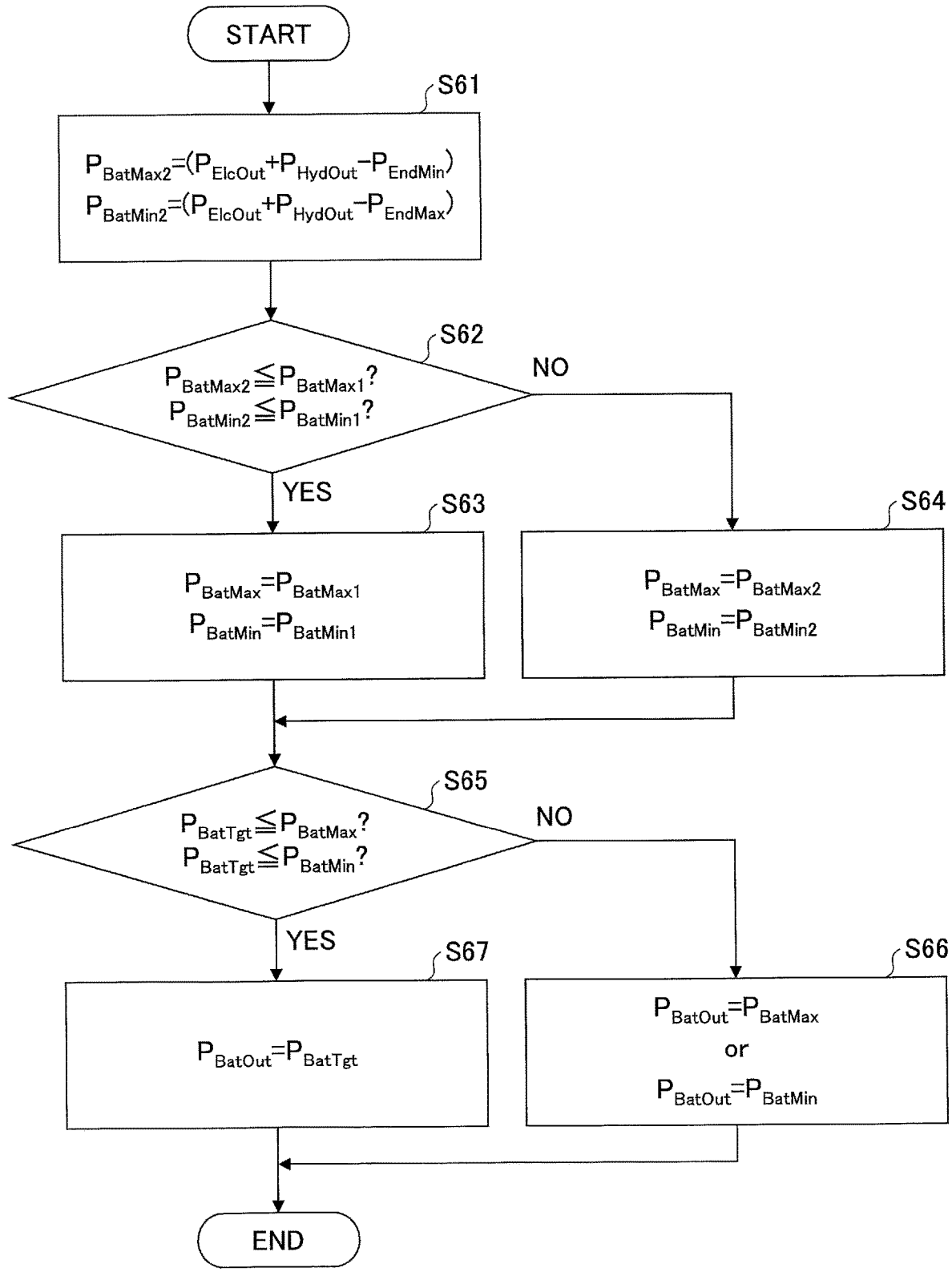
FIG. 35 is a flowchart of a process of step S6 of FIG. 31.

Moreover, referring to FIG. 35, in step S6, the battery control output upper limit value $P_{BatMax2}$ and the battery control output lower limit value $P_{BatMin2}$ are computed first (step S61). The battery control output upper limit value $P_{BatMax2}$ is a sum of the electric power which can be consumed by the electric load and the electric power which can be consumed by assisting the hydraulic system by the motor generator 12, and is computed by subtracting the engine output lower limit value $P_{EngMin}$ from the value of a sum of the electric load actual output $P_{ElcOut}$ and the hydraulic load output $P_{HydOut}$. The battery control output lower limit value $P_{BatMin2}$ is a sum of the regenerative electric power of the electric load and the electric power generated by the motor generator 12, and is computed by subtracting the engine output upper limit value $P_{EngMax}$ from the value of a sum of the electric load actual output $P_{ElcOut}$ and the hydraulic load output $P_{HydOut}$.

Next, the battery control output upper limit value $P_{BatMax2}$ is compared with the battery output upper limit value $P_{BatMax1}$, and the battery control output lower limit value $P_{BatMin2}$ is compared with the battery output lower limit value $P_{BatMin1}$ (step S62). The comparison here is performed for each of the battery output upper limit value $P_{BatMax1}$ and the battery output lower limit value $P_{BatMin1}$. Then, if the battery control output upper limit values $P_{BatMax2}$ is equal to or larger than the battery output upper limit value $P_{BatMax}$ (step S62: YES), the value of the battery output upper limit value $P_{BatMax}$ is made equal to the value of the battery output upper limit value $P_{BatMax1}$ (step S63). Additionally, if the battery control output lower limit value $P_{BatMin2}$ is equal to or smaller than the battery output lower limit value $P_{BatMin}$ (step S62: YES), the value of the battery output lower limit value $P_{BatMin}$ is made equal to the value of the battery output lower limit value $P_{BatMin1}$ (step S63).

On the other hand, if the battery control output upper limit value $P_{BatMax2}$ smaller than the battery output upper limit value $P_{BatMax1}$ (step S62: NO), the value of the battery output upper limit value $P_{BatMax}$ is made equal to the value of the battery control output upper limit value $P_{BatMax2}$ (step S64). Moreover, if the battery control output lower limit value $P_{BatMin2}$ is larger than the battery output lower limit value $P_{BatMin1}$ (step S62: NO), the value of the battery output lower limit value $P_{BatMin}$ is made equal to the value of the battery control output lower limit value $P_{BatMin2}$ (Step S64).

Then, the battery output upper limit value $P_{BatMax}$ is compared with the battery target output $P_{BatTgt}$, and the battery target output $P_{BatTgt}$ is compared with the battery output lower limit value $P_{BatMin}$ (step S65).

The comparison here is performed for each of the battery output upper limit value $P_{BatMax}$ and the battery output lower limit value $P_{BatMin}$. If the battery target output $P_{BatTgt}$ is larger than the battery output upper limit value $P_{BatMax}$ (step S65: NO), the value of the battery output $P_{BatOut}$ is made equal to the value of the battery output upper limit value $P_{BatMax}$ (step S66). If the battery target output $P_{BatTgt}$ is smaller than the battery output lower limit value $P_{BatMin}$ (step S65: NO), the value of the battery output $P_{BatOut}$ is made equal to the value of the battery output lower limit value $P_{BatMin}$ (step S66).

On the other hand, if the battery target output $P_{BatTgt}$ is equal to or smaller than the battery output upper limit value $P_{BatMax}$ and equal to or larger than the battery output lower limit value $P_{BatMin}$ (step S65: YES), the value of the battery output $P_{BatOut}$ is made equal to the value of the battery target output $P_{BatTgt}$ (step S67).

Figure 36:
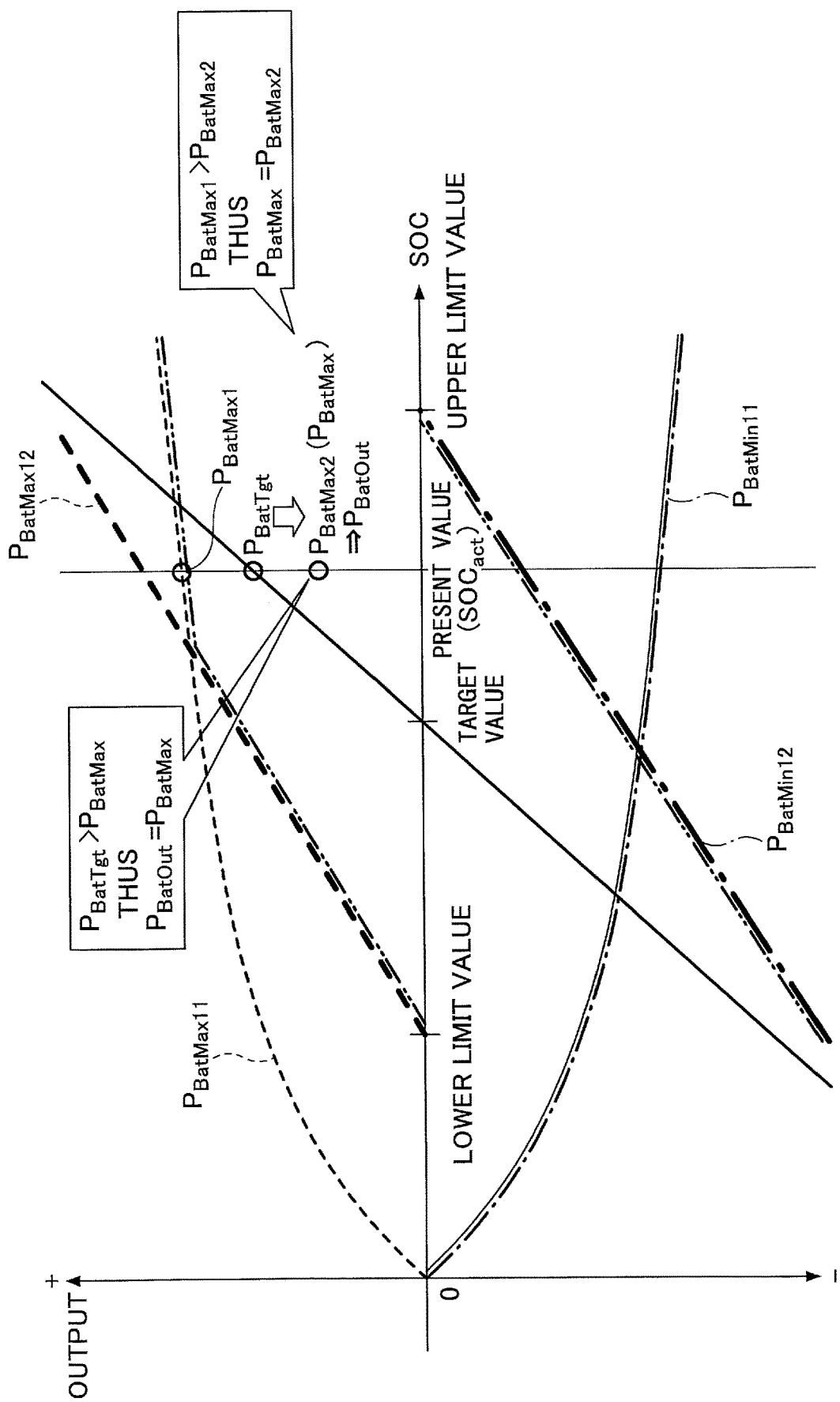
FIG. 36 is an illustration illustrating a relationship between a battery state of charge (SOC) and a battery output.

Here, FIG. 36 is a graph illustrating a relationship between a battery state of charge (SOC) and a battery output. In the graph of FIG. 36, the battery output upper limit values $P_{BatMax11}$ (thin dashed line in the figure) and $P_{BatMax12}$ (thick dashed line in the figure) and the battery output upper limit value $P_{BatMax1}$ (double-dashed chain line in the figure) are illustrated. The battery output upper limit value $P_{BatMax1}$ is a value of the smaller one of the battery output upper limit values $P_{BatMax11}$ and $P_{BatMax12}$. Similarly, in the graph of FIG. 36, the battery output lower limit values $P_{BatMin11}$ (thin single-dashed line in the figure) and $P_{BatMin12}$ (thick single-dashed chain line in the figure) and the battery output lower limit value $P_{BatMin1}$ (double-dashed chain line in the figure) are illustrated. The battery output lower limit value $P_{BatMin1}$ is a value of the larger one of the battery output lower limit values $P_{BatMin11}$ and $P_{BatMin12}$.

In the figure, the actual battery output $P_{BatOut}$ is determined so that it falls within an area smaller than the battery output upper limit value $P_{BatMax1}$ on a plus side, and is determined so that it falls within an area larger than the battery output lower limit value $P_{BatMin1}$ on a minus side.

Moreover, the battery target output $P_{BatTgt}$ is indicated in the graph illustrated in FIG. 36. In the present embodiment, an amount of actual electric discharge or an amount of charge of the battery 19 is determined as a battery output $P_{BatOut}$ in consideration of the present state of charge $SOC_{act}$ of the battery 19 in addition to the battery output upper limit value $P_{BatMax1}$ and the battery output lower limit value $P_{BatMin1}$.

As an example, a case where the state of charge $SOC_{act}$ of the battery 19 is the value (the present value) illustrated in FIG. 36 is explained. At this time, if the battery control output upper limit value $P_{BatMax2}$ is smaller than the battery output upper limit value $P_{BatMax1}$ as illustrated in FIG. 36, the battery output upper limit value $P_{BatMax}$ is set to be equal to the battery control output upper limit value $P_{BatMax2}$ (step S64 of FIG. 35). Furthermore, if the battery target output $P_{BatTgt}$ in the state of charge $SOC_{act}$ concerned is larger than the battery output upper limit value $P_{BatMax}$, the battery output $P_{BatOut}$ is set to be equal to the battery output upper limit value $P_{BatMax}$ (step S66 of FIG. 35).

Figure 37:
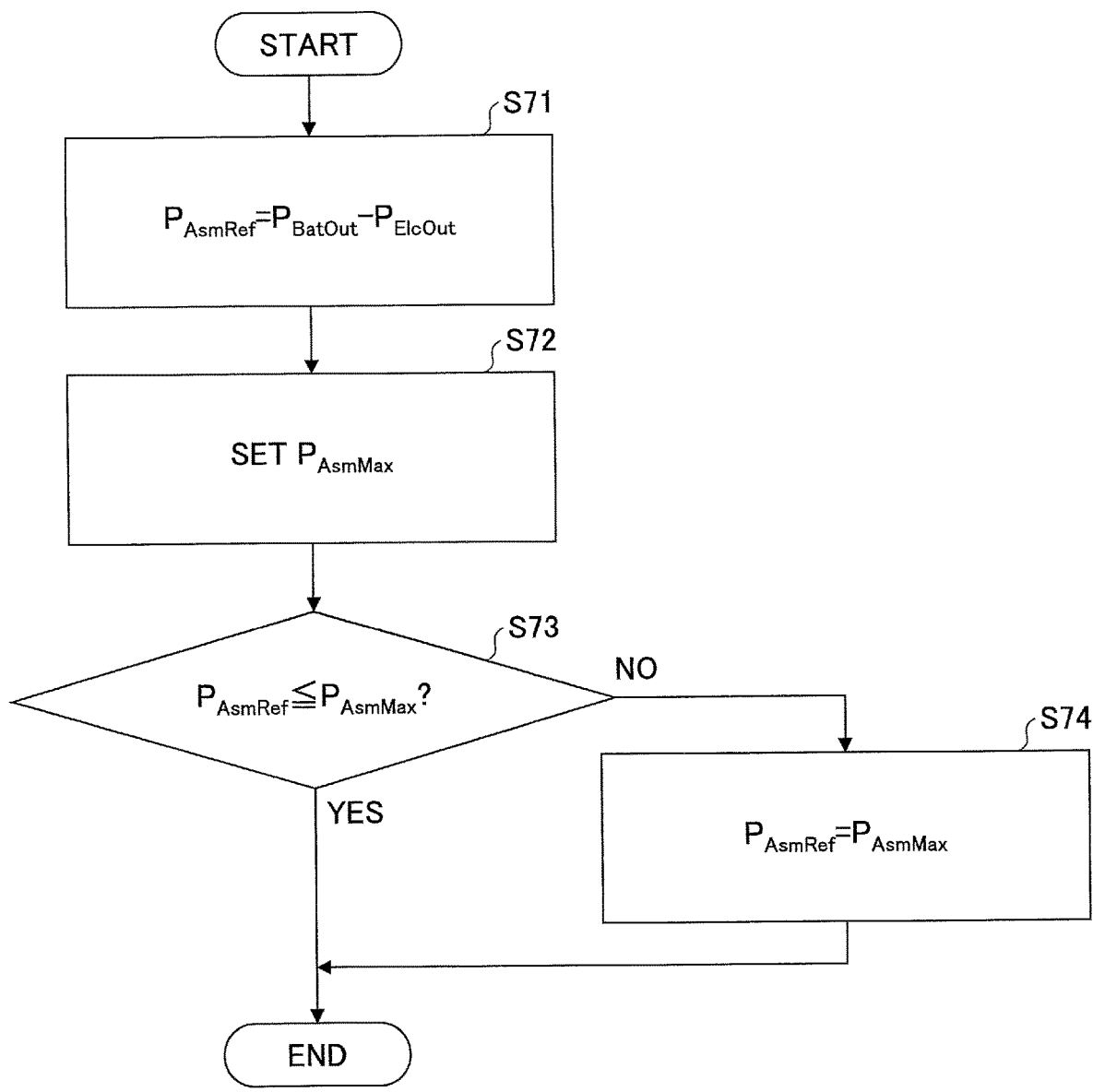
FIG. 37 is a flowchart of a process of step S7 of FIG. 31.

Referring to FIG. 37, in step S7, first the assist motor output command $P_{AsmRef}$ which instructs an operation of an assist motor 52, is computed in step S71. The assist motor output command $P_{AsmRef}$ is computed by subtracting the electric load actual output $P_{ElcOut}$ from the battery output $P_{BatOut}$.

Figure 38:
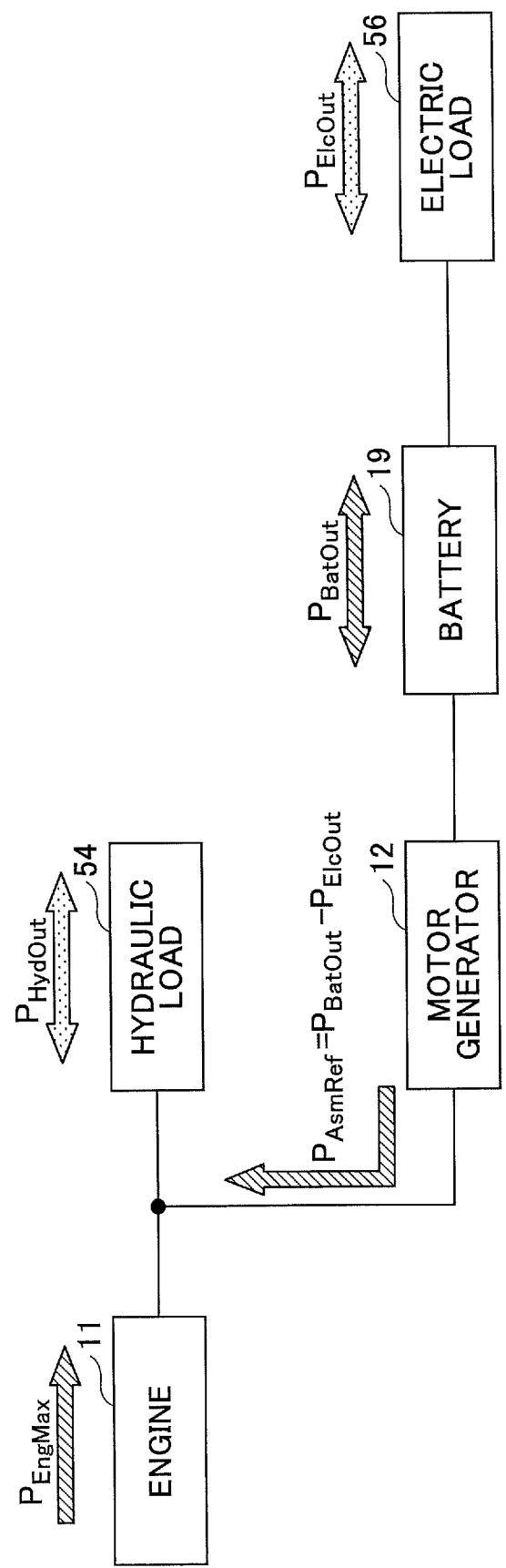
FIG. 38 is an illustration illustrating a calculation model of an auxiliary output of a motor generator.

Here, FIG. 38 is an illustration illustrating a computation model of the assist motor output command $P_{AsmRef}$. In FIG. 38, in a case were an electric load 56 actually consumes electric power, if a value acquired by subtracting the electric load output (a negative value when electric power is regenerated in the electric load 56) which is electric power consumed by the electric load 56 from the electric poser discharged from the battery 19 is a positive value, the electric power concerned is supplied to the motor generator 12, and the motor generator 12 assists the drive force of the engine 11. On the other hand, if a value acquired by subtracting the electric load output which is the electric power consumed by the electric load 56 from the electric poser discharged from the battery 19 is a negative value, a power is supplied from the engine 11 to the motor generator 12. That is, because the assist output of the motor generator 12 corresponds to the electric power obtained by subtracting the electric power consumed by the electric load 56 form the electric power discharged from the battery, the assist motor output command $P_{AsmRef}$ can be computed by subtracting the electric load actual output $P_{ElcOut}$ from the battery output $P_{BatOut}$.

Referring to FIG. 37 again, in the subsequent step S72 (or may be prior to step S71), the assist motor output upper limit value $P_{AsmMax}$ which is an upper limit value of the assist motor output command $P_{AsmRef}$ is set. Normally, the assist motor output upper limit value $P_{AsmMax}$ is set as a predetermined value. Then, if an abnormality of the hydraulic system such as the main pump 14 is detected, it is set as a value lower than this predetermined value.

Then, it is determined whether the assist motor output command $P_{AsmRef}$ is equal to or smaller than the assist motor output upper limit value $P_{AsmMax}$ (step S73). If the assist motor output command $P_{AsmRef}$ is larger than the assist motor output upper limit value $P_{AsmMax}$ (step S73: NO), the value of the assist motor output command $P_{AsmRef}$ is made equal to the assist motor output upper limit value $P_{AsmMax}$ (Step S74). On the other hand, is the assist motor output command $P_{AsmRef}$ is equal to or smaller than the assist motor output upper limit value $P_{AsmMax}$ (step S73: YES), the value of the assist motor output command $P_{AsmRef}$ is output without change.

Figure 39:
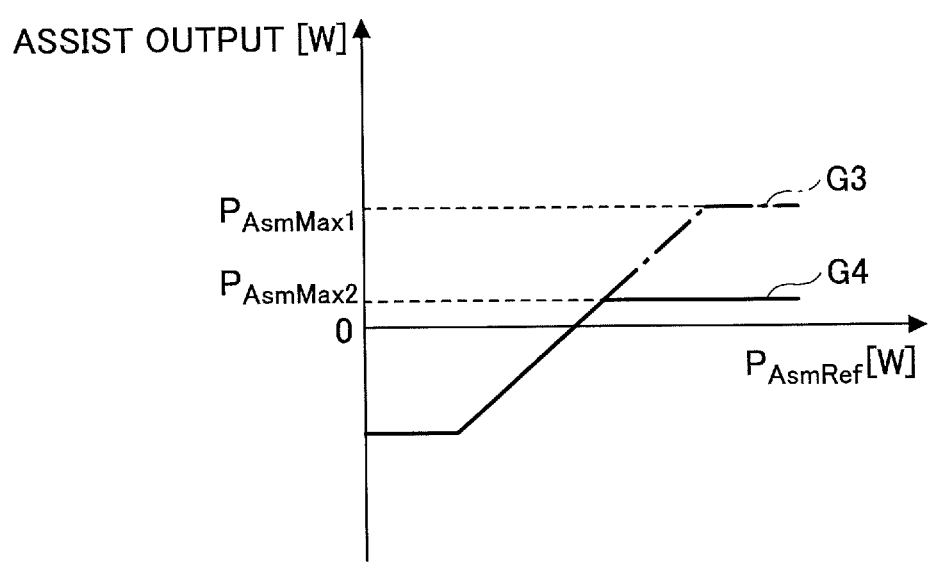
FIG. 39 is a graph illustrating changes in an upper limit value of the auxiliary output of the motor generator performed in the controller when an abnormality is detected in a hydraulic system.

Here, FIG. 39 is a graph illustrating a relationship between the assist motor output command $P_{AsmRef}$ and the assist output [W] in the present embodiment. It is assumed that the assist motor output upper limit value $P_{AsmMax}$ is set normally as $P_{AsmMax1}$ illustrated in the figure. In this case, as illustrated in a single-dashed chain line G3, an assistant output is set equal to the assist motor output command $P_{AsmRef}$ until the assist motor output command $P_{AsmRef}$ reaches $P_{AsmMax1}$. If the assist motor output command $P_{AsmRef}$ exceeds $P_{AsmMax1}$, the assist output is set to be equal to $P_{AsmMax1}$.

On the other hand, if the controller 30 detects an abnormality of the hydraulic system such as the main pump 14, the assist motor output upper limit value $P_{AsmMax}$ is set as $P_{AsmMax2}$ ($0 \leq P_{AsmMax2} < P_{AsmMax1}$) which is smaller than $P_{AsmMax1}$. If $P_{AsmMax2}$ is zero, the assist motor output command $P_{AsmRef}$ surely becomes below zero, which means that the motor generator 12 does not perform an assist operation. If the assist motor output upper limit value $P_{AsmMax}$ is set as $P_{AsmMax2}$, the assist output is controlled according to the assist motor output command $P_{AsmRef}$ as indicated by a solid line G4 until the assist motor output command $P_{AsmRef}$ reaches $P_{AsmMax2}$. Then, if the assist motor output command $P_{AsmRef}$ exceeds $P_{AsmMax2}$, the assist output is controlled according to the value of $P_{AsmMax2}$.

In addition, when determining the assist motor output upper limit value $P_{AsmMax2}$ at the time of the hydraulic system abnormality mentioned above, for example, an output value minimum required to maintain the revolution of the main pump 14 may be set as the assist motor output upper limit value $P_{AsmMax2}$. By maintaining the revolution of the main pump 14, the revolution speed of the engine 11 can be stabilized, and if the regenerative electric power from the turning electric motor 21 is large or the state of charge of the battery 19 is high, such energy can be released to the hydraulic system through the motor generator 12.

A description will be given of an effect of the hybrid construction machine (hydraulic shovel) according to the present embodiment explained above. As already stated, the hydraulic shovel is equipped with the controller 30 which controls the output of the main pump 14, the generated electric power and the assist output of the motor generator 12. If an abnormality of the hydraulic system such as the main pump 14 is detected, the controller 30 sets the output upper limit value (hydraulic load output upper limit value $P_{HydMax}$) of the main pump 14 and the upper limit value (assist motor output upper limit value $P_{AsmMax}$) of the assist output of the motor generator 12 to be lower than those of a normal time, respectively. Here, with respect to the upper limit value of the generation output, there is no change made before and after an abnormality occurs in the hydraulic system.

Therefore, because the actual output $P_{HydOut}$ of the main pump 14 is controlled low even if the hydraulic load request output $P_{HydReq}$ to the main pump 14 is excessive, there is no need to increase the assist output of the motor generator 12 to the engine 11, and because the actual assist output of the motor generator 12 is controlled low, generation of an unnecessary output to the hydraulic pump can be suppressed. Moreover, an excessive decrease in the state of charge of the battery 19 can be suppressed. That is, if an abnormality occurs in the hydraulic system, an operation can be continued for a longer time. Additionally, a decrease in the service life of the battery can be suppressed.

Moreover, it is desirable that the output upper limit value $P_{EngMax}$ of the engine 11 is fixed before and after an occurrence of an abnormality in the hydraulic system. Thereby if there is an output request by the electric load when an abnormality occurs in the hydraulic system, the upper limit value of the generation output of the motor generator 12 is not changed, thereby enabling a sufficient generating operation. Thus, work can be continued without decreasing an output of the electric load.

The hybrid construction machine according to the present embodiment is not limited to the above-mentioned embodiments, and various variations can be made. For example, although the hydraulic shovel is explained as the hybrid construction machine, the present embodiment may be applied to other hybrid construction machines (for example, a lifting magnet vehicle or a wheel loader, a crane, etc.).

Moreover, in the above-mentioned embodiment, although an adherence of the oblique plate of the hydraulic pump and a failure of the pump control valve were explained as an abnormality of the hydraulic system in the above-mentioned embodiments, as an abnormality of the hydraulic system, there are various abnormalities which prevent generation of pressurized oil. Additionally, although, as means for detecting such an abnormality, a structure of detecting an abnormality of a current value to drive the pump control valve by a control part in the above-mentioned embodiments, the control part may detect an abnormality of the hydraulic system according to other methods, or a hydraulic system abnormality detection part may be provided separately from the control part so that the control part may receive a signal from the hydraulic system abnormality detection part.

By the way, if an abnormality occurs in an engine which drives a hydraulic pump, and if an operation is continued as it is, a load becomes in excess to the drive capability of the engine, which may invite a natural stop of the engine. Additionally, if an abnormality occurs in a battery which supplies electric power to a motor generator, and if an operation is continued as it is, the state of charge of the battery is excessively deceased, and it may be difficult to perform an operation continuously.

Accordingly, it is an object of a twentieth embodiment mentioned below to provide a hybrid construction machine which can continue an operation for longer time even if an abnormality occurs in an engine or a battery.

Figure 40:
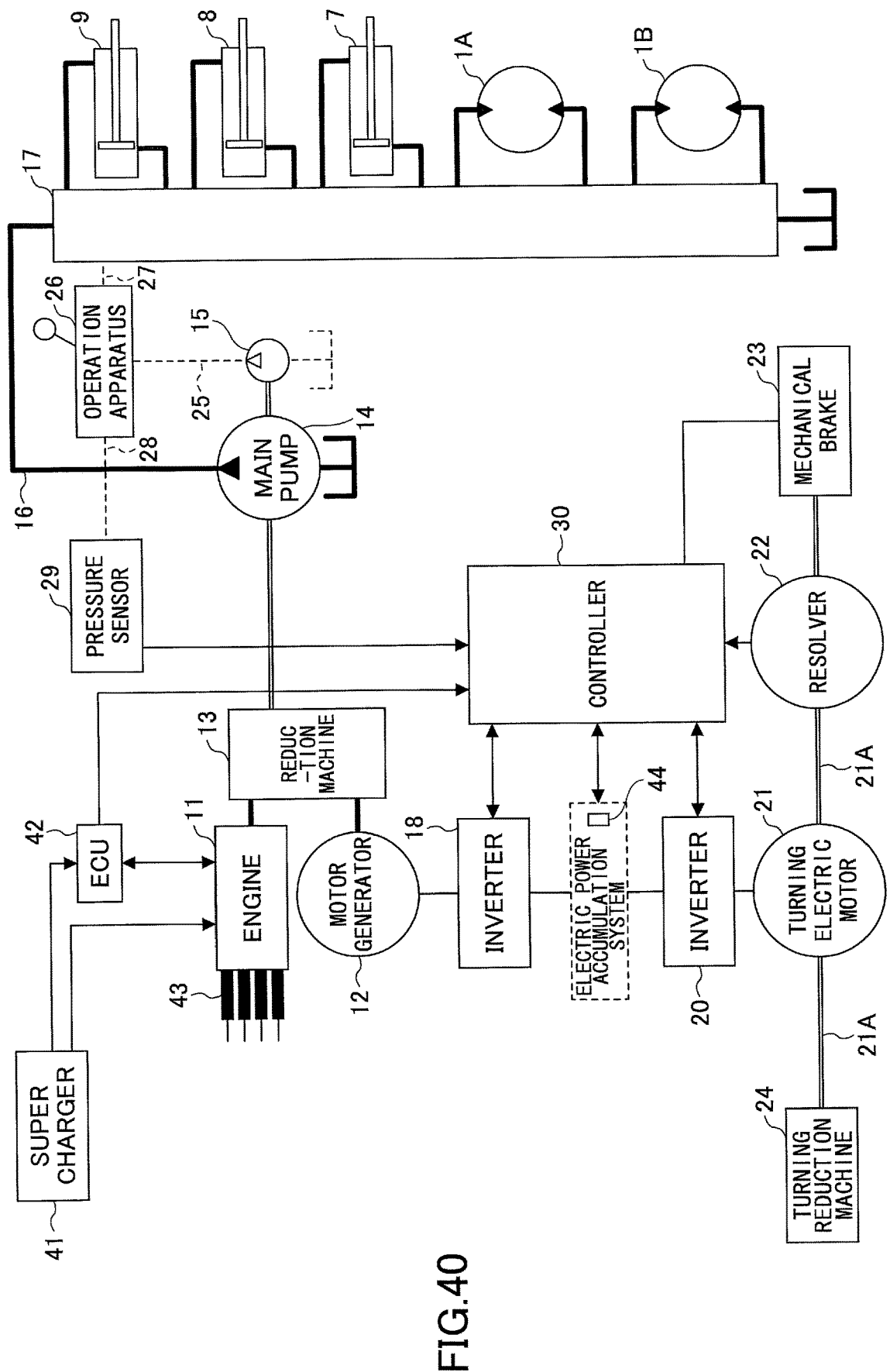
FIG. 40 is a block diagram illustrating a structure of a hybrid construction machine according to a twentieth embodiment of the present invention.

FIG. 40 is a block diagram illustrating a structure of a hybrid construction machine according to the twentieth embodiment of the present invention. The hybrid construction machine according to the twentieth embodiment of the present invention has the same mechanical system and electric system structure as the hybrid construction machine illustrated in FIG. 1 and FIG. 2, and descriptions thereof will be omitted.

The hybrid construction machine according to the present embodiment is equipped with a turbocharger 41 and an engine control unit (ECU) 42 as illustrated in FIG. 40. The turbocharger 41 is an apparatus for supplying compressed air to the engine 11. The turbocharger 41 causes a turbine to rotate at a high-speed using a pressure of an exhaust gas exhausted from the engine 11 in order to rotate a compressor directly coupled to the turbine to compress a suction air and supplies the air to the engine 11. Thereby, an amount of intake air of the engine 11 is increased.

The ECU 42 is a unit for controlling an operation (a fuel injection timing of the engine 11, etc.) of the engine 11. The ECU 42 of the present embodiment constitutes the engine system abnormality-detection part for detecting the abnormalities of the engine 11. That is, the ECU 42 outputs to the controller 30 an abnormality signal regarding imperfect combustion provided by an injection nozzle sensor 43 attached to the engine 11, an abnormality signal regarding an abnormality in a boost pressure of the turbocharger 41, and an abnormality signal regarding a malfunction of a water temperature sensor to detect a temperature of a cooling water to cool the engine.

The controller 30 of the hybrid construction machine according to the present embodiment also has the function explained below other than the same function as the controller 30 according to the nineteenth embodiment. The controller 30 of the hybrid construction machine according to the present embodiment relatively raises an output dependency to the engine 11 as compared to an output dependency to the electric power accumulation system when an abnormality is detected in the electric power accumulation system containing the battery 19 and the up-down converter 100 (specifically, when a temperature of the battery 19 indicated in a battery temperature signal provided from a temperature sensor 44 exceeds a predetermined value). Additionally, when an abnormality is detected in the engine 11 (specifically, the abnormality signal supplied from the ECU 42 indicates imperfect combustion of the engine 11, an abnormality of the boost pressure of the turbocharger 41 or a malfunction of the water temperature sensor), an output dependency to the electric power accumulation system is raised relatively as compared to the output dependency to the engine 11.

Figure 41A:
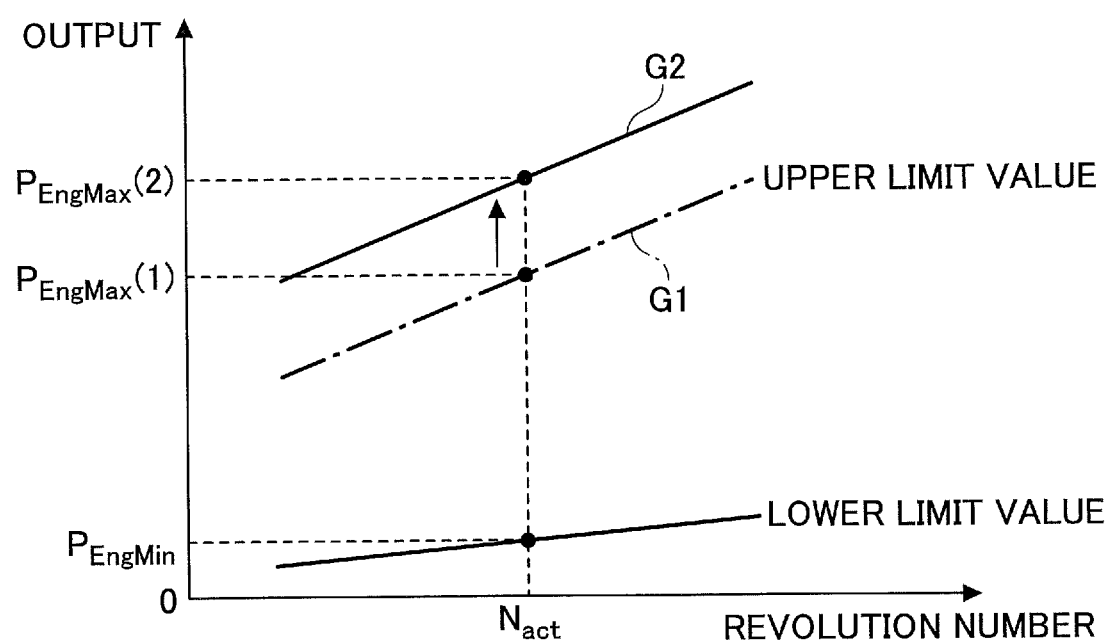
FIG. 41A is an illustration illustrating a map or a conversion table in a block of the controller illustrated in FIG. 30.
Figure 41B:
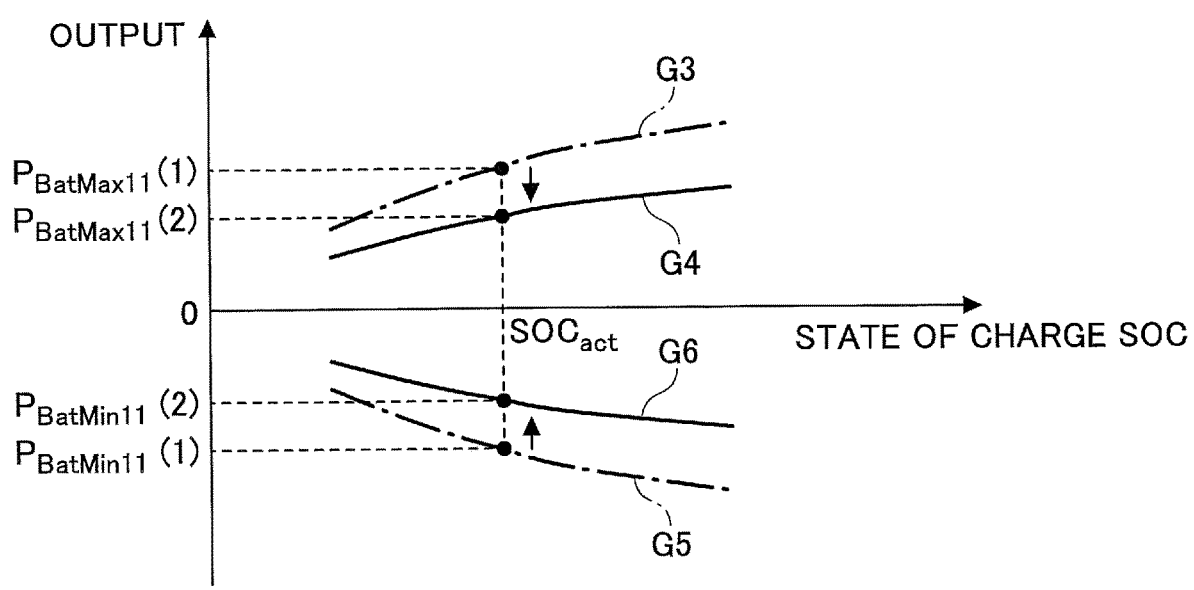
FIG. 41B is an illustration illustrating a map or a conversion table in another block of the controller illustrated in FIG. 30.

When an abnormality is detected in the electric power accumulation system containing the battery 19 and the up-down converter 100, the controller 30 performs a process to raise the output dependency to the electric power accumulation system relatively as compared to the output dependency to the engine 11. FIG. 41A is an illustration illustrating a map or a conversion table in the block 31 of the controller 30 (refer to FIG. 30). FIG. 41B is an illustration illustrating a map or a conversion table in the block 33 of the controller (refer to FIG. 30).

When an abnormality is detected in the electric power accumulation system, in the blocks 31 and 33 of the controller 30, a change of the map or the conversion table is performed as mentioned below. In the block 31, as illustrated in FIG. 41A, a function indicating a correlation between the engine revolution number and the engine output upper limit value is changed from a single-dashed chain line G1 to a solid line G2 in FIG. 41A. That is, the engine output upper limit value in each engine revolution number is set higher. For example, if the engine output upper limit value corresponding to the engine actual revolution number $N_{act}$ is $P_{EngMax}(1)$, and if an abnormality is detected in the electric power accumulation system, the engine output upper limit value corresponding to the engine actual revolution number $N_{act}$ is set to $P_{EngMax}(2)$ which is larger than $P_{EngMax}(1)$. Thus, by raising the output of the engine as mentioned above, the output dependency to the engine 11 can be relatively raised as compared to the electric power accumulation system.

On the other hand, in the block 33, as illustrated in FIG. 41B, the function indicating the correlation between the state of charge SOC of the battery 19 and the battery output upper limit value is changed from the single-dashed chain line G3 to the solid line G4 in FIG. 41B, and the function indicating the correlation between the state of charge SOC of the battery 19 and the battery output lower limit value is changed from the single-dashed chain line G5 to the solid line G6 in FIG. 41B. That is, the battery output upper limit value in each state of charge SOC is set lower, and the battery output lower limit value in each state of charge SOC is set higher. For example, supposing the battery output upper limit value and battery output lower limit value corresponding to the present state of charge $SOC_{act}$ at a normal time are $P_{BatMax11}(1)$ and $P_{BatMin11}(1)$, respectively, when an abnormality is detected in the electric power accumulation system, the battery output upper limit value corresponding to the present state of charge $SOC_{act}$ is changed and set to $P_{BatMax11}(2)$ which is smaller than $P_{BatMax11}(1)$, and the battery output lower limit value is changed and set to $P_{BatMin11}(2)$ which is larger than $P_{BatMin11}(1)$. Thus, the discharge amount and the charge amount of the battery 19, that is, the output limit values, are controlled, thereby increasing the output dependency to the engine relatively as compared to the electric power accumulation system.

When an abnormality is detected in the electric power accumulation system, the controller 30 may perform only one of the setting change in the block 31 (FIG. 41A) and the setting change in the block 33 (FIG. 41B), or may perform both together.

FIG. 42 is a graph illustrating an example of a mode of change of the engine output $P_{Eng}$ and the battery output $P_{Bat}$ before and after a time t1 at which an abnormality of the electric power accumulation system (overheat of the battery 19) is generated in the present embodiment. It should be noted that $P_{Elc}$ is the electric power which is required by an electric load in FIG. 42.

In FIG. 42, no abnormality occurs in the electric power accumulation system at a time t0. At this time point, a request of a high power is made to the electric load according to a lever operation of an operator. The controller 30 sets the engine output upper limit value $P_{EngMax}$, the battery output upper limit value $P_{BatMax11}$, and the battery output lower limit value $P_{BatMin11}$ so that the value $(P_{Eng}+P_{Bat})$ which is a sum of the engine output $P_{Eng}$ and the battery output $P_{Bat}$ becomes larger than the required electric power $P_{Elc}$ of the electric load. Thereby, it is assumed that the output $P_{Eng}$ of the engine 11 is stabilized at $P_{Eng}(1)$, and the output $P_{Bat}$ of the battery 19 is stabilized at $P_{Bat}(1)$.

Here, when the temperature detected by the temperature sensor 44 attached to the battery 19 exceeds a predetermined value, the controller 30 raises the output dependency to the engine 11 relatively as compared to the electric power accumulation system. That is, the controller 30 sets the engine output upper limit value in each engine revolution number higher (refer to FIG. 41A), and sets the engine output lower limit value in each engine revolution number lower and sets the battery output limit value higher (refer to FIG. 41B). Thereby, the output $P_{Eng}$ of the engine 11 shifts to $P_{Eng}(2)$ which is higher than $P_{Eng}(1)$, and the output $P_{Bat}$ of the battery 19 shifts to $P_{Bat}(2)$ which is lower than $P_{Bat}(1)$. In this case, a value which is a sum of the engine output $P_{Eng}$ and the battery output $P_{Bat}$ is maintained, and can satisfy the electric power $P_{Elc}$ which the electric load requires.

Figure 43A:
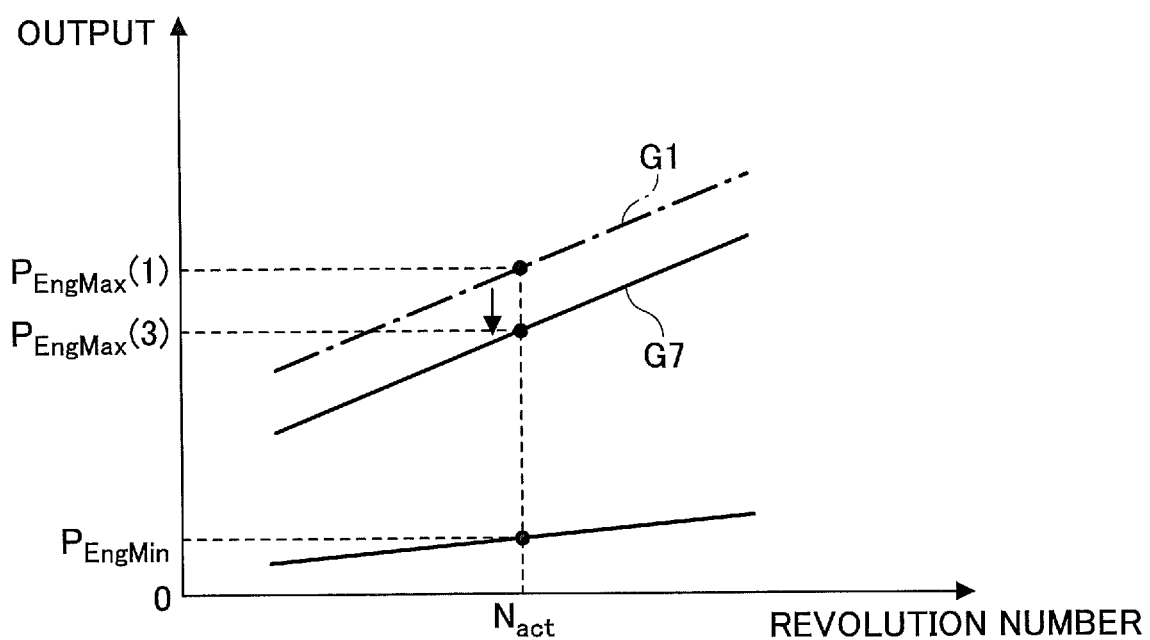
FIG. 43A is an illustration illustrating a map or a conversion table in a block of the controller illustrated in FIG. 30.
Figure 43B:
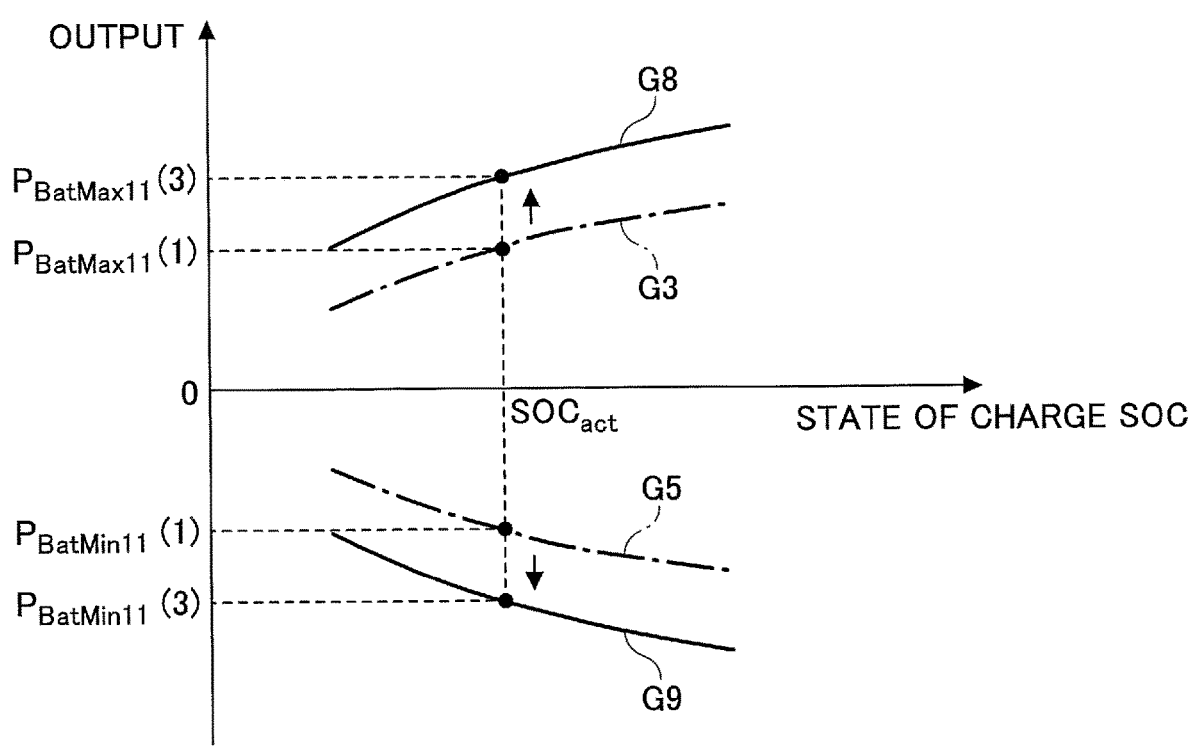
FIG. 43B is an illustration illustrating a map or a conversion table in another block of the controller illustrated in FIG. 30.

Moreover, when an abnormality is detected in the engine 11, the controller 30 of the hybrid construction machine according to the present embodiment performs a process to raise the output dependency to the electric power accumulation system relatively as compared to the output dependency to the engine 11. FIG. 43A is an illustration illustrating a map or a conversion table in the block 31 of the controller 30. FIG. 43B is an illustration illustrating a map or a conversion table in the block 33 of the controller 30.

When an abnormality is detected in the engine 11, in the blocks 31 and 33 of the controller 30, a change of the map or the conversion table is performed as mentioned below. In the block 31, as illustrated in FIG. 43A, a function indicating a correlation between the engine revolution number and the engine output upper limit value is changed from a single-dashed chain line G1 to a solid line G7 in FIG. 43A. That is, the engine output upper limit value in each engine revolution number is set lower. For example, if the engine output upper limit value corresponding to the engine actual revolution number $N_{act}$ is $P_{EngMax}(1)$, and if an abnormality is detected in the engine 11, the engine output upper limit value corresponding to the engine actual revolution number $N_{act}$ is set to $P_{EngMax}(3)$ which is smaller than $P_{EngMax}(1)$. Thus, by reducing the output of the engine 11 as mentioned above, the output dependency to the electric power accumulation system can be relatively raised as compared to the engine 11.

On the other hand, in the block 33, as illustrated in FIG. 43B, the function indicating the correlation between the state of charge SOC of the battery 19 and the battery output upper limit value is changed from the single-dashed chain line G3 to a solid line G8 in FIG. 43B, and the function indicating the correlation between the state of charge SOC of the battery 19 and the battery output lower limit value is changed from the single-dashed chain line G5 to a solid line G9 in FIG. 43B. That is, the battery output upper limit value in each state of charge SOC is set higher, and the battery output lower limit value in each state of charge SOC is set lower. For example, supposing the battery output upper limit value and battery output lower limit value corresponding to the present state of charge $SOC_{act}$ at a normal time are $P_{BatMax11}(1)$ and $P_{BatMin11}(1)$, respectively, when an abnormality is detected in the engine 11, the battery output upper limit value corresponding to the present state of charge $SOC_{act}$ is changed and set to $P_{BatMax11}(3)$ which is larger than $P_{BatMax11}(1)$, and the battery output lower limit value is changed and set to $P_{BatMin}(3)$ which is smaller than $P_{BatMin11}(1)$. Thus, the discharge amount and the charge amount of the battery 19, that is, the output limit values, are raised, thereby increasing the output dependency to the electric power accumulation system relatively as compared to the engine 11.

When an abnormality is detected in the engine 11, the controller 30 may perform only one of the setting change in the block 31 (FIG. 43A) and the setting change in the block 33 (FIG. 43B), or may perform both together.

Figure 44:
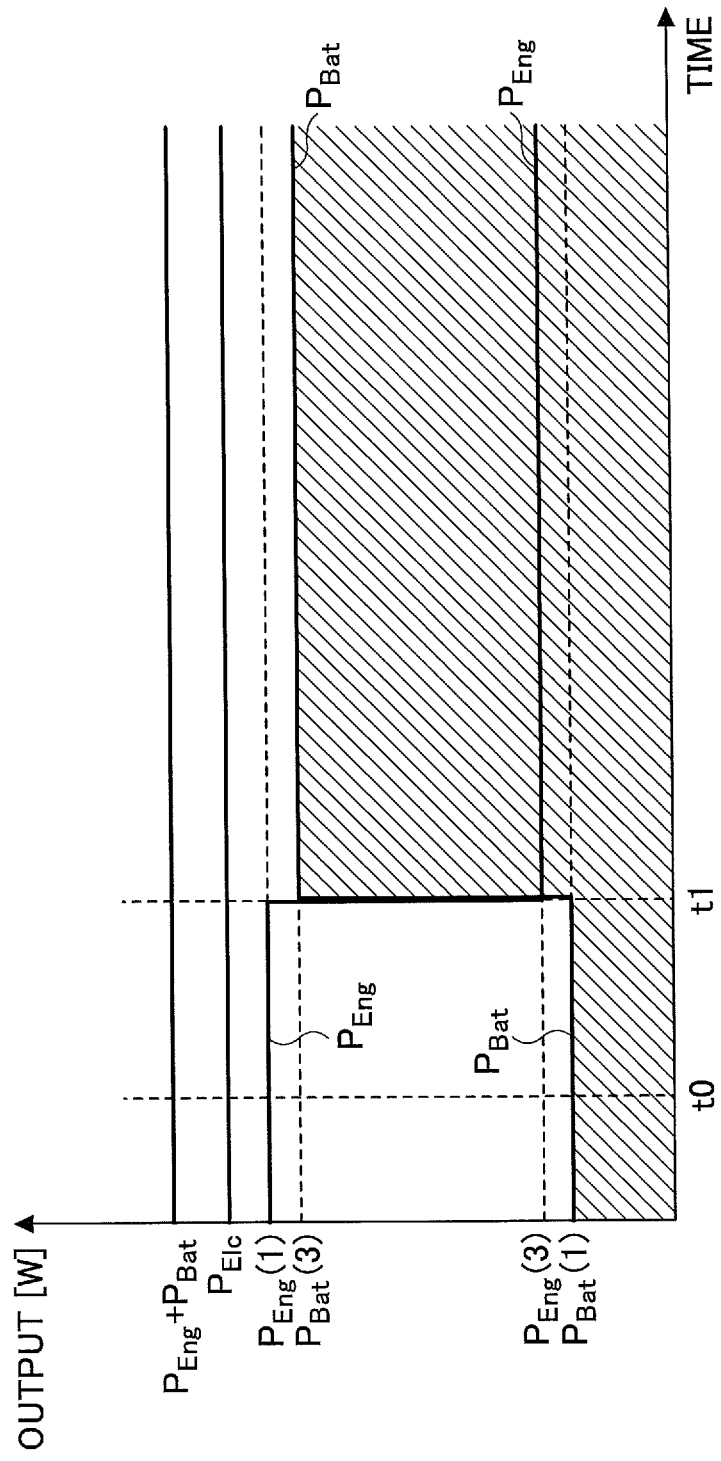
FIG. 44 is a graph illustrating an example of changes in an engine output and a battery output before and after the time at which an abnormality occurs in the engine in the twentieth embodiment of the present invention.

FIG. 44 is a graph illustrating an example of a mode of change of the engine output $P_{Eng}$ and the battery output $P_{Bat}$ before and after a time t1 at which an abnormality of the engine 11 (imperfect combustion of the engine 11, an abnormality of a boost pressure of the turbocharger 41, a malfunction of the water temperature sensor, etc.) is generated in the hybrid construction machine (power shovel) according to the present embodiment.

In FIG. 44, operations of the controller 30 by the time t1 is the same as the operations illustrated in FIG. 42 mentioned above. Here, when a signal regarding the an abnormality of the engine 11 mentioned above is sent from the ECU 42, the controller 30 raises the output dependence to the electric power accumulation system relatively as compared with the engine 11. That is, the controller 30 sets the engine output upper limit value in each engine revolution number lower (refer to FIG. 43A), and sets the battery output upper limit value in each state of charge SOC higher and sets the battery output lower limit value lower (refer to FIG. 43B). Thereby, the output $P_{Eng}$ of the engine 11 shifts to $P_{Eng}(3)$ which is lower than $P_{Eng}(1)$, and the output $P_{Bat}$ of the battery 19 shifts to $P_{Bat}(3)$ which is higher than $P_{Bat}(1)$. Also in this case, the value of a sum of the engine output $P_{Eng}$ and the battery output $P_{Bat}$ is maintained, and can satisfy the electric power $P_{Elc}$ which the electric load requires.

A description is given of an effect according to the hybrid construction machine according to the present embodiment.

As already stated, the hybrid construction machine according to the present embodiment is equipped with an electric power accumulation system abnormality detection part such as the temperature sensor 44 which detects the temperature of the battery 19, and the controller 30 raises the output dependence to the engine 11 relatively as compared to the electric power accumulation system, when the an abnormality of the electric power accumulation system is detected. Thereby, even if an abnormality occurs in the electric power accumulation system such as the battery 19, etc., it becomes possible to prevent the state of charge of the battery 19 from falling excessively, and to continuously drive the power shovel 1. The power shovel 1 is equipped with an engine system abnormality detection part referred to as the ECU 42 which detects the an abnormality of the engine 11, and the controller 30 raises the output dependence to the electric power accumulation system relatively as compared to the output dependence to the engine 11, when an abnormality of the engine 11 is detected.

Thereby, even if an abnormality occurs in the engine 11, a load to the engine 11 is prevented from being excessive to the drive capability of the engine 11 to avoid a natural stop of the engine 11.

Therefore, according to the hybrid construction machine according to the present embodiment, even if an abnormality occurs in the engine 11 or the battery 19, an operation of the hybrid construction machine can be continued for a longer time.

Although the hydraulic shovel is explained as the hybrid construction machine in the present embodiment, the present embodiment may be applied to other hybrid construction machines (for example, a lifting magnet vehicle or a wheel loader, a crane, etc.).

Moreover, although the temperature sensor which detects the temperature of the battery as the electric power accumulation system abnormality detection part was explained in the above-mentioned embodiment, if it is an apparatus which detects a failure of the electric power accumulation system containing a storage battery and a direct current voltage converter, other various apparatuses are applicable to the electric power accumulation system abnormality detection part. Moreover, although the ECU which detects imperfect combustion of an internal combustion engine, a boost pressure of the turbocharger, and a malfunction of a water temperature sensor etc., was explained as the engine system abnormality detection part, if it an apparatus which detects a malfunction of an internal combustion engine and peripheral apparatuses thereof, various other apparatuses are applicable to the engine system abnormality detection part.

By the way, in a hybrid construction machine, when electric power supplied to a load is large, or a regenerative electric power from the load is large, an over-current (hereinafter, may be referred to as an over-current) may flow in an up-down converter. Because such an over-current leads to damage of an internal element of the up-down converter (for example, a reactor, an IGBT (Insulated Gate Bipolar Transistor), etc.), it is generally performed to stop (turn OFF) the up-down converter when an over-current is generated.

However, in a case where a load requires a large amount of electric power or a large amount of regenerative electric power is generated, if an over-current is generated, the up-down converter is stopped, and it is possible that a sufficient amount of electric power cannot be supplied to the load or the regenerative electric power from the load is not sufficiently recovered by an electric power accumulator.

Thus, there is provided according to a twenty-first embodiment explained below a drive control apparatus and a drive control method which can supply a sufficient amount of electric power or can recover a sufficient amount of regenerative electric power without damaging an up-down converter in a case where a load requires a large amount of electric power or a large amount of regenerative electric power is generated.

Figure 45:
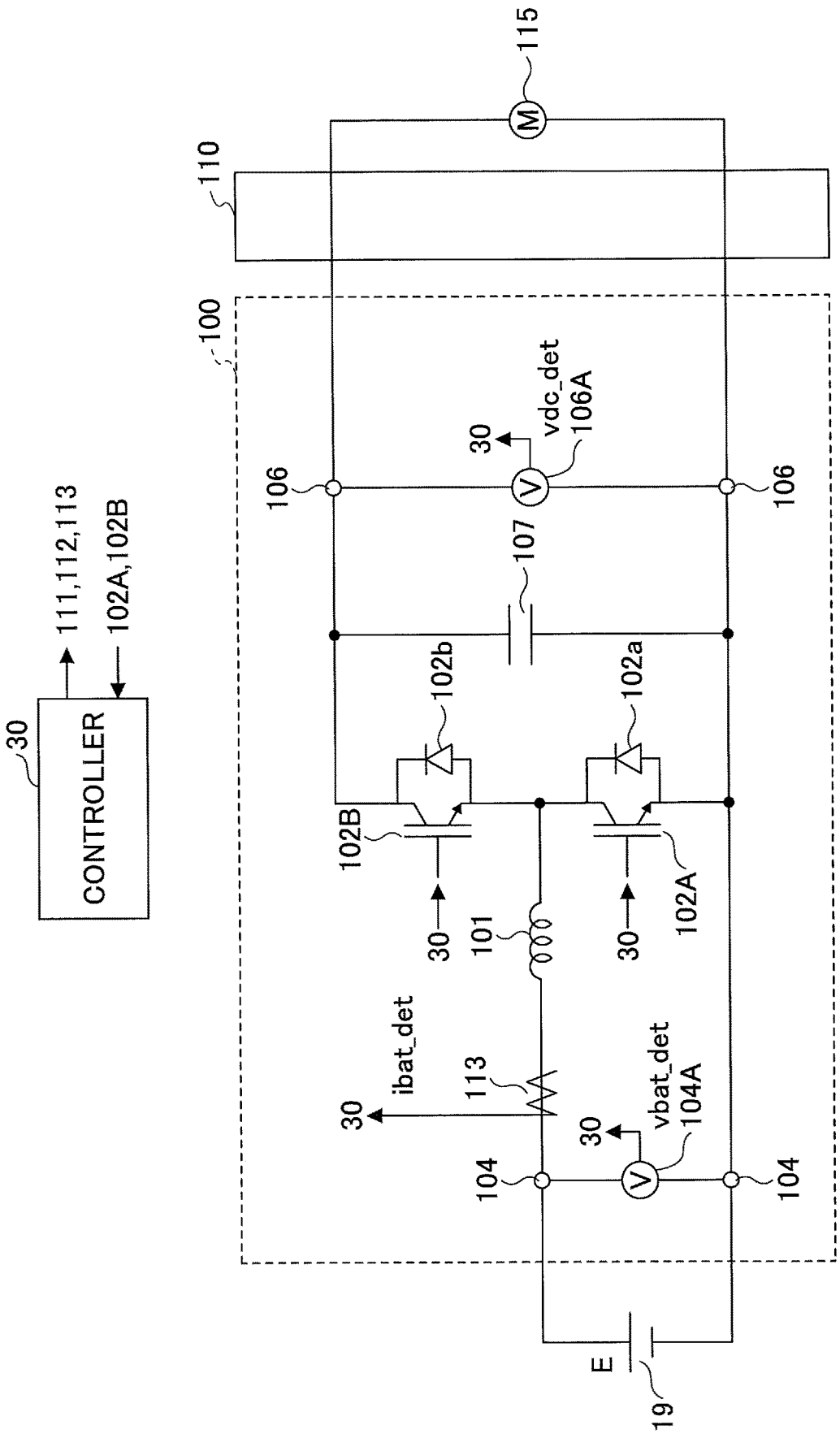
FIG. 45 is a circuit diagram of an up-down converter provided in a hybrid construction machine according to a twenty-first embodiment of the present invention.

FIG. 45 is an illustration of a circuit structure of an up-down converter provided in a hybrid construction machine according to the twenty-first embodiment of the present embodiment. The hybrid construction machine according to the twenty-first embodiment of the present embodiment has the same structure as the hybrid construction machine according to the first embodiment illustrated in FIG. 1 and FIG. 2, and a description thereof will be omitted. Additionally, because the circuit structure of the up-down converter according to the present invention illustrated in FIG. 45 is the same as the circuit structure of the up-down converter 100 illustrated in FIG. 3, the equivalent parts are given the same reference numerals, and descriptions thereof will be omitted.

In FIG. 45, a motor 115, which is a load connected to the output terminals 106, can be an electric motor which can perform both a power running operation and a regenerative operation, and, for example, can be constituted by an IPM motor (Interior Permanent Magnetic) motor in which magnets are embedded in a rotor. Although the motor 115 for a direct current drive is illustrated in FIG. 45, a motor driven by an alternating current through an inverter may be used. The motor 115 is an example of, for example, the motor generator 12 or the turning electric motor 21 illustrated in FIG. 2.

In the up-down converter 100 illustrated in FIG. 45, when raising a voltage of the DC bus 110, a PWM voltage is applied to a gate terminal of the voltage-up IGBT 102A and an induced electric power generated in the reactor 101 in association with ON/OFF of the voltage-down IGBT 102B is supplied to the DC bus 110 through the diode 102*b* connected in parallel to the voltage-down IGBT 102B. Thereby, a current flows in the reactor in a normal direction, and the voltage of the DC bus 110 goes up.

On the other hand, when lowering the voltage of the DC bus 110, a PWM voltage is applied to a gate terminal of the voltage-down IGBT 102B and a regenerative electric power generated by the motor 115 is supplied to the battery 19 through the voltage-down IGBT 102B. Thereby, a current flows in the reactor in reverse direction, and the electric power accumulated in the DC bus 110 is charged into the battery 19, and the voltage of the DC bus 110 goes down.

When performing a power running operation and a regenerative operation of the motor 115, the electric power necessary for the power running operation is supplied from the DC bus 110 to the motor 115, and the electric power obtained by the regenerative operation is supplied from the motor 115 to the DC bus 110. Thus, the voltage value of the DC bus 110 fluctuates, but the voltage value of the DC falls within a fixed range according to a voltage up and down control using a target value of the DC bus voltage value.

Here, when the motor 115 needs a large amount of electric power, or when a large amount of regenerative electric power is generated, an over-current exceeding the rated current may flow in the up-down converter 100. Such an over-current tends to be generated especially if the rated current value of the motor 115 is large. Thus, generally, in order to protect the internal elements (for example, a reactor, an IGBT, etc.) of the up-down converter from an over-current, the up-down converter is stopped (turned OFF) when an over-current is generated.

However, if the up-down converter 100 is stopped, a case may occur where a sufficient electric power supply for the motor 115 cannot be performed, or the regenerative electric power of the motor 115 cannot be sufficiently recovered.

By the way, when an over-current is supplied, the reactor 101 and IGBTs 102A and 102B are not given damage if it is a very short time.

Thus, when the motor 115 needs a large amount of electric power, or when a large amount of regenerative electric power is generated, the up-down converter 100 is stopped temporarily. Then, after the stop for a very short time, the voltage up and down control of the up-down converter 100 is resumed (restarted), and when the current value rises and reaches the over-current again, the up-down converter 100 is temporarily stopped again. Further, after the temporary stop, the up-down converter 100 is restarted.

If the up-down converter 100 is temporarily stopped when an over-current is generated, and restarted after a very short time, an over-current is permitted to flow for a very short time. However, if it is a very short time as mentioned above, the over-current does not damage the reactor 101, the IGBTs 102A and 102B, etc.

The drive control apparatus of the up-down converter according to the present embodiment permits a supply or recover of a large amount of power by repeating the permission of an over-current for an instant time. In the present embodiment, an over-current for an instant time is determined as a light abnormality, and if it is less than a predetermined number of times, the over-current for an instant time is permitted to supply of recover a large amount electric power.

Moreover, if the restart of the up-down converter 100 is repeated for a number of times equal to or larger than a predetermined number of times, the over-current for an instant time is permitted repeatedly for the number of times equal to or larger than the predetermined number of times, which increases a burden given to the up-down converter 100 due to the over-current. Then, in such a case, in order to protect the up-down converter 100 from being damaged, it is determined that a heavy abnormality occurs due to the over-current, and stops the up-down converter 100 completely and set in a state where a restart is not permitted.

As mentioned above, even if an over-current is generated when the motor requires a large amount of electric power or a large amount of regenerative electric power is generated, both acquisition of the efficient drive of the motor 115 and acquisition of safety can be provided simultaneously because a supply or a recovery of a large amount of electric power is permitted without immediately and completely stopping the up-down converter 100 and when a burden given to the up-down converter 100 is large due to the over-current, the up-down converter 100 can be prevented from being damaged. A description will now be given below, with reference to FIG. 46 through FIG. 48, of an operation of the up-down converter 100.

Figure 46:
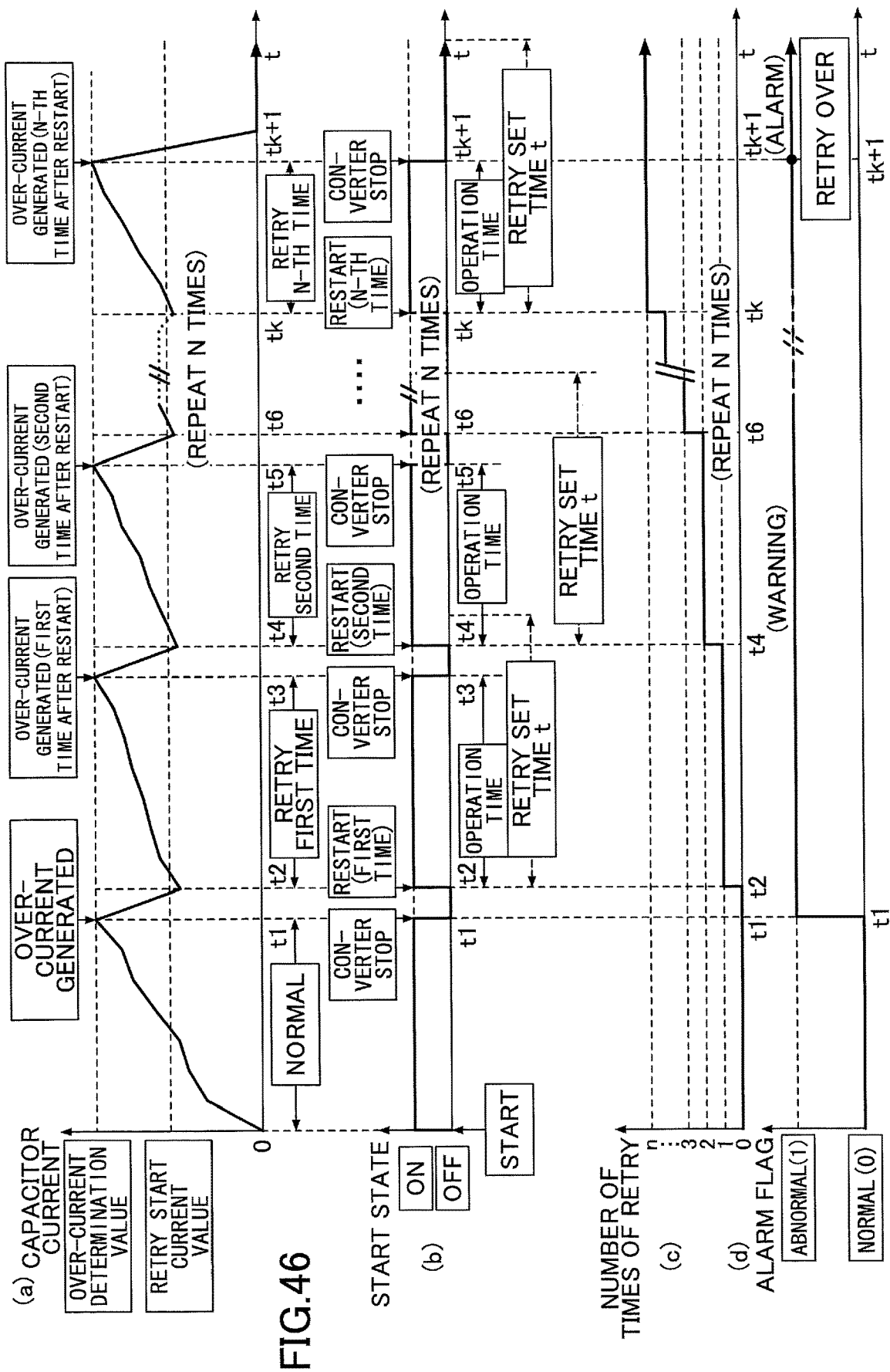
FIG. 46 is an illustration illustrating a drive control process performed by a drive control device of the up-down converter together with an operation of the up-down converter.

FIG. 46 is an illustration of a drive control process performed by a drive control apparatus of the up-down converter according to the present embodiment with an operation of the up-down converter 100, and (a) indicates a current value detected by the reactor current detection part 113, (b) indicates an activated state of the up-down converter 100, (c) indicates a number of times of retrying, and (d) indicates an alarm state. All of these are indicated as time change characteristics on the same time axis.

As illustrated in FIG. 46-(a), an over-current determination value and a retry start current value are set to a current value detected by the reactor current detection part 113. The over-current determination vale is a threshold value (first threshold value) for determining whether the current flowing in the reactor 101 is an over-current, and is set to, for example, a maximum current value of the up-down converter 100. If the current value detected by the battery current detection part 113 exceeds the over-current determination value, the controller stops the up-down converter 100.

The retry start current value is a threshold value (second threshold value) for determining whether to resume the voltage up and down control of the up-down converter 100 by the controller 30 (restart the up-down converter 100) after the up-down converter 100 is stopped by the controller 30 due to the current value detected by the reactor current detection part 113 exceeding the over-current determination value. If the current value detected by the reactor current detection part 113 decreases to the retry start current value after the up-down converter 100 is stopped, the up-down converter 100 is restarted. The retry start current value as the second threshold value is a threshold value lower than the over-current determination value as the first threshold value, and is set to, for example, the rated current value.

The activated state of FIG. 46-(b) represents whether the voltage up and down control of the up-down converter 100 is ON or OFF. If the current value detected by the reactor current detection part 113 exceeds an over-current determination value, the up-down converter 100 is turned off by the controller 30, and if the current value decreases to the retry start current value, the up-down converter 100 is turned on and restarted by the controller 30.

The retry number of times of FIG. 46-(c) represents a number of times of a restart of the voltage up and down control of the up-down converter 100 by the controller 30. The accumulation of the retry number of times is performed by a counter function of the controller 30. Here, the controller 30 determines whether to increment or reset the accumulated number of times based on whether an operation time of the up-down converter reaches a retry set time. Specifically, if the operation time does not reach the retry set time, the controller increments the accumulated value, and if the operation time reaches the retry set time, the controller 30 resets the accumulated value.

Here, "operation time" means a time period during which the up-down converter 100 is continuously operated. That is, if the up-down converter 100 is restarted, it represents the operation time from the restart until it is stopped again. This corresponds to, in FIG. 46-(c), a time period from a time at which the up-down converter 100 is stopped by the controller 30 because the current value detected by the reactor current detection part 113 exceeds the over-current determination value and thereafter the current decreases to the retry start current value until a time at which the current value exceeds the over-current determination value again and the up-down converter 100 is stopped.

Moreover, the "retry reset time" is a threshold value for determining whether to reset the accumulated value (accumulated times) of the number of times of restart of the controller 30. In the drive control apparatus of the up-down converter according to the present embodiment, if the accumulated number of times reaches the predetermined number of times (N times (N is an integer equal to or larger than 2)), it is determined that an abnormality occurs due to an over-current, and the controller 30 does not permit the up-down converter 100 to restart and stops it completely.

The number of times of accumulation represents a number of times the operation time does not reach the retry reset time and a restart is performed. If the number of times of accumulation is large, it represents that the number of times an over-current at an instant time during a relatively short time is large. If the number of times of accumulation reaches the predetermined number of times (N times), a situation is set where a burden which the up-down converter 100 is given by an over-current is large. Thus, in order to prevent the up-down converter from being damaged, a restart of the up-down converter 100 is not permitted and the up-down converter 100 is stopped completely.

On the other hand, if a restart is performed after the operation time passed the retry reset time, the restart is performed after a relatively long time has passed after the last restart. Accordingly, there is a small possibility that a burden may be given to the up-down converter 100 due to flow of an over-current for a very short time, and, thus, the number of times of accumulation for determined whether to completely stop is reset.

As mentioned above, the retry reset time must be a sufficient time period to return to the up-down converter 100 to a drive state to the extent that the up-down converter 100 is not given damage even if a short time over-current flows N−1 times in a relatively short predetermined time.

The alarming state of FIG. 46-(d) represents whether a warning or an alarm is issued. When a warning or an alarm is issued, a warning flag is set to "1", and when a warning and an alarm are not issued, the warning flag is set to "0". The warning is to announce that an over-current is detected and the up-down converter 100 is stopped, and corresponds to a warning according to a light abnormality which the controller 30 issues when the number of times of retrying does not reach N times. The alarm is a warning issued by the controller 30 when the number of times of retrying reaches N times. That is, the warning is to announce a light abnormality of which a degree of abnormality is light and there is no need to completely stop the up-down converter 100 immediately.

It should be noted that the alarm should be set to announce a stronger degree of warning than the warning, and, for example, it can be configured so that, in the warning, a warning lamp on an operation panel of the motor 115 is turned on, and, in the alarm, an alarming sound is issued in addition to the warning lamp.

The controller 30 determined an occurrence of a light abnormality or a heavy abnormality based on the number of times of retrying of the up-down converter 100, and sets the warning flag. The controller 30 sets the warning flag to "1" when the warning or the alarm is issued, and sets the warning flag to "0" when neither the warning nor the alarm is issued.

Here, a description is given of operations illustrated in FIG. 46-(a) to (d) together.

When the up-down converter 100 is turned on at a time t=0 and voltage up and down operation is performed by the controller 30, a current value in a normal direction is detected by the reactor current detection part 113.

When a current value exceeds an over-current determination value at a time t=t1, the up-down converter 100 is turned OFF by the controller 30 (refer to FIG. 46-(b)), and the voltage up and down control is stopped temporarily. When the up-down converter 100 is turned OFF, the current in the normal direction gradually decreases because the voltage-up IGBT 102A is not driven (refer to FIG. 46-(a)).

Moreover, because the current value exceeds the over-current determination value at the time t=t1 and an over-current is detected, the warning flag illustrated in FIG. 46-(d) is set to "1", and a warning is issued by the controller 30.

Then, because the current value detected by the reactor current detection part 113 decreases to the retry start current value at a time t=t2 (refer to FIG. 46-(a)), the up-down converter 100 is turned on again by the controller 30 (refer to FIG. 46-(b)). As mentioned above, by the up-down converter 100 being restarted, the voltage-up operation is resumed, and electric power is supplied from the reactor 101 to the DC bus 110, and, thereby, the current value detected by the reactor current detection part 113 starts to rise again (refer to FIG. 46-(a)).

When the up-down converter 100 is restarted at the time t=t2, the controller increments a counter, which results in the number of times of retrying being set to "1" (refer to FIG. 46-(c)). In addition, when the up-down converter 100 is restarted at the time t=t2, the controller 30 starts a measurement of the operation time of the up-down converter 100.

Next, because the current value detected by the reactor current detection part 113 exceeds the over-current determination value again at a time t=t3 (refer to FIG. 46-(a)), the controller 30 turns OFF the up-down converter 100 (refer to FIG. 46-(b)) and the voltage up and down operation is stopped temporarily. Thus, because a voltage-up operation is not performed, a current value detected by the reactor current detection part 113 decreases (refer to FIG. 46-(a)).

At this time, because the operation time measured by the controller 30 is shorter than the retry reset time (refer to FIG. 46-(b)), the controller 30 continues the process without resetting the counter. In addition, the alarm flag is maintained at "1".

Then, at a time t=t4, the current value detected by the reactor current detection part 113 decreases to the retry start current value, and thus, the controller 30 restarts the up-down converter 100 (refer to FIG. 46-(b)). Additionally, when the up-down converter 100 is restarted at the time t=t4, the controller increments the counter, which results in the number of times of retrying being set to "2".

Thereafter, the current value detected by the reactor current detection part 113 exceeds the over-current determination value again at a time t=t5, the controller 30 turns OFF the up-down converter 100 (refer to FIG. 46-(b)) and the voltage up and down operation is stopped temporarily. Thus, because a voltage-up operation is not performed, the current value detected by the reactor current detection part 113 decreases (refer to FIG. 46-(a)).

At this time, because the operation time measured by the controller 30 is shorter than the retry reset time (refer to FIG. 46-(b)), the controller 30 continues the process without resetting the counter. In addition, the alarm flag is maintained at "1".

Then, at a time t=t6, the current value detected by the reactor current detection part 113 decreases to the retry start current value, and thus, the controller 30 restarts the up-down converter 100 (refer to FIG. 46-(b)). Thereby, the voltage up and down operation is resumed, and the current value starts to rise again (refer to FIG. 46-(a)).

Additionally, when the up-down converter 100 is restarted at the time t=t4, the controller increments the counter, which results in the number of times of retrying being set to "3".

As a result of repeating the above-mentioned process, the current value detected by the reactor current detection part 113 exceeds the over-current determination value again at a time t=tk (k is an integer equal to or larger than 79, and, thereby, the controller 30 turns OFF the up-down converter 100 (refer to FIG. 46-(b)) and the voltage up and down operation is stopped temporarily. Thus, because a voltage-up operation is not performed, the current value detected by the reactor current detection part 113 decreases (refer to FIG. 46-(*a*)).

At this time, because the operation time measured by the controller 30 is shorter than the retry reset time (refer to FIG. 46-(*b*)), the controller 30 continues the process without resetting the counter. In addition, the alarm flag is maintained at "1".

Thereafter, when it becomes a time t=tk+1, the current value detected by the reactor current detection part 113 decreases to the retry start current value, and thus, the controller 30 restarts the up-down converter 100 (refer to FIG. 46-(*b*)). Thereby, the voltage up and down operation is resumed, and the current value starts to rise again (refer to FIG. 46-(*a*)).

Additionally, when the up-down converter 100 is restarted at the time t=tk+1, the controller 30 increments the counter, which results in the number of times of retrying being set to "N" (refer to FIG. 46-(*c*)).

Thus, when the number of times of retrying turns into the number of times "N" determined previously, the controller 30 causes the up-down converter 100 to stop completely in order to protect the up-down converter 100 from being damaged. That is, even if the current value detected by the reactor current detection part 113 decreases to the retry start current value, the controller does not permit the up-down converter 100 to restart.

Moreover, at this time, the controller 30 issues an alarm to announce that a heavy abnormality has occurred due to an over-current according to the fact that the number of timed of retry reaches N times, which is the predetermined number of times.

Then, the operation and process illustrated in FIG. 46 are ended.

Figure 47:
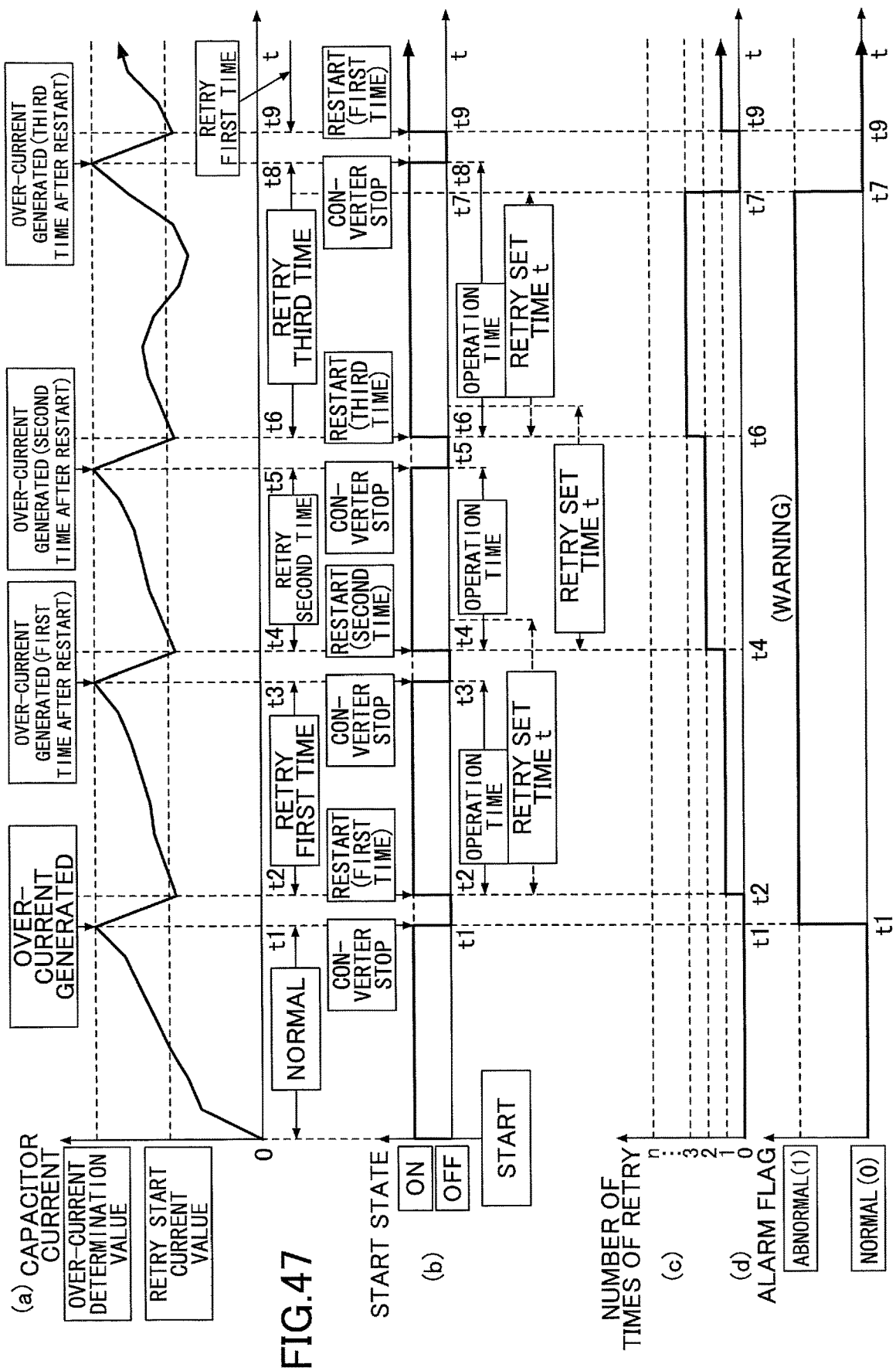
FIG. 47 is an illustration illustrating another drive control process performed by the drive control device of the up-down converter together with an operation of the up-down converter.

FIG. 47 is an illustration illustrating another drive control process performed by a drive control apparatus of the up-down converter according to the present embodiment together with an operation of the up-down converter, and (a) indicates a current value detected by the reactor current detection part 113, (b) indicates an activated state of the up-down converter 100, (c) indicates a number of times of retrying, and (d) indicates a warning state. All of these are indicated as time change characteristics on the same time axis. The operation of FIG. 47 differs from the operation of FIG. 46 in that the number of times of retrying is reset, but the operations to the time t=t6 is the same as the operations illustrated in FIG. 46. Thus, descriptions of the operation of the time t=0 to t6 are omitted.

After a time t=t6 has passed, the current value detected by the reactor current detection part 113 starts to rise again.

When it becomes a time t=t7, the operation time exceeds the retry reset time before the predetermined number of times "N" is reached, and, thereby, the controller 30 resets the counter to set the number of times of retrying to "0". In association with it, the controller 30 sets the warning flag to "0", and cancels the announcement of the warning.

When it becomes a time t=t8, the controller 30 turns OFF the up-down converter 100 because the current value detected by the reactor current detection part 113 exceeds the over-current determination value (refer to FIG. 47-(*b*)). Thus, a voltage-up operation is not performed, and, thereby, the current value detected by the reactor current detection part 113 decreases (refer to FIG. 47-(*a*)).

Then, at a time t=t9, the current value detected by the reactor current detection part 113 decreases to the retry start current value, and thus, the controller 30 restarts the up-down converter 100 (refer to FIG. 47-(*b*)). Thereby, the voltage up and down operation is resumed, and the current value starts to rise again (refer to FIG. 47-(*a*)).

Additionally, when the up-down converter 100 is restarted at the time t=t9, the controller increments the counter, which results in the number of times of retrying being set to "1".

Then, the operation illustrated in FIG. 47 ends.

It should be noted that although the examples illustrated in FIG. 46 and FIG. 47 correspond to a case where an over-current is generated when a voltage-up operation is performed, the process contents of a case where, a voltage-down operation is performed when an over-current is generated are the same as the process contents of the case where a voltage-up operation is performed except for the signs of the current value are different. Thus, description of the operation at the time of voltage-down operation will be omitted.

Figure 48:
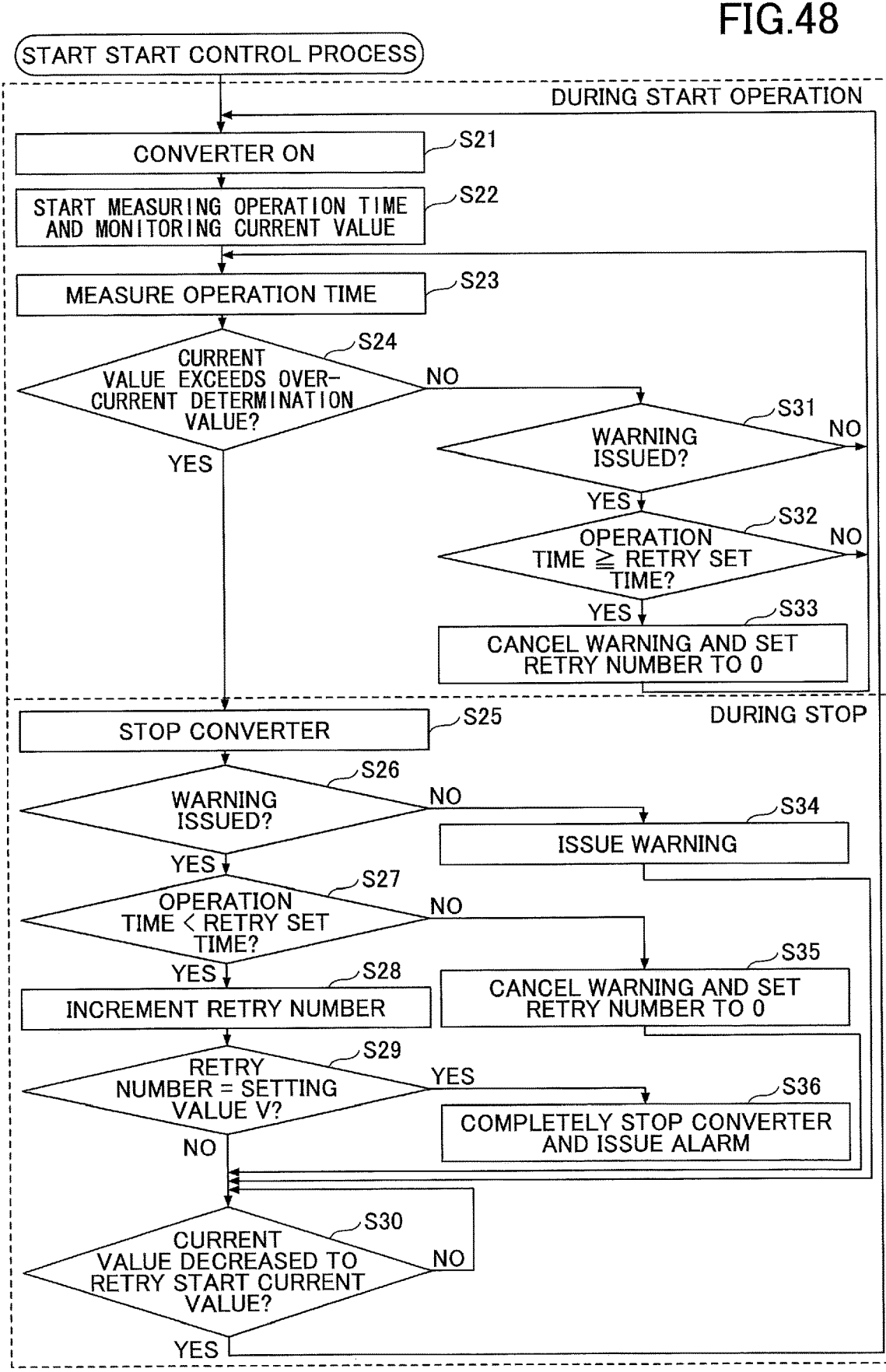
FIG. 48 is a flowchart of a drive control process performed by the drive control device of the converter.

FIG. 48 is an illustration illustrating a process procedure of the drive control process performed by the drive control apparatus of the up-down converter according to the present embodiment. The drive control process is a process performed by the controller 30, and the operations illustrated in FIG. 46 and FIG. 47 are generalized and other process patterns are covered. The process illustrated in FIG. 48 is repeatedly performed for, for example, each 10 milliseconds. Thus, the N times which is the threshold vale of the number of times of retrying can be, for example, about a few times.

After the drive control process is started, the controller 30 first turns ON the up-down converter 100 (step S21). This is to start a voltage up and down operation.

Then, the controller 30 starts a measurement of the operation time of the up-down converter 100 and also starts monitoring the current value detected by the reactor current detection part 113 (step S22). This is to compare the operation time with the retry reset time and to compare the detected current value with the over-current determination value.

Further, the controller 30 continues to measure the operation time (step S23).

Subsequently, the controller 30 determines whether the current value detected by the reactor current detection part 113 exceeds the over-current determination value (step S24). This is because the up-down converter 100 must be stopped immediately when an over-current is generated in order to protect is from being damaged.

If it is determined that the current value exceeds the over-current determination value (step S24: YES), the controller 30 stops the up-down converter 100 immediately. The step S25 is a process performed as a first process in the drive control method of the up-down converter according to the present embodiment, which is performed to prevent the up-down converter 100 from being damaged.

Subsequently, the controller 30 determines whether a warning is issued (step S26). If a warning as a light abnormality is not issued, this means a case where an over-current is generated for the first time. Thus, the controller 30 determines whether a warning is to be issued in order to announce such a state.

If it is determined that a warning is issued (step S26: YES), the controller determines whether the operation time reaches the retry reset time (step S27). This is to determine whether to perform a reset of the number of times of retrying.

If it is determined that a warning is issued (step S26: YES), the controller 30 increments the counter (step S28). Thereby, the number of times of retrying is increased by one.

Subsequently, the controller 30 determines whether the number of times of retrying reaches N times, which is the threshold value (step S29). This is because the up-down converter 100 must be stopped completely if it reaches N times.

If it is determined that the number of times of retrying has not reached N times (step S29: NO), the controller 30 determines whether the current value detected by the reactor current detection part 113 decreased to the retry start current value (step S30). This is to turn ON and restart the up-down converter 100 if it decreased to the retry start current value. The restart of the up-down converter 100 performed in step S21 after step S30 is a process performed as a second process in the drive control method in the up-down converter according to the present embodiment.

If it is determined in step S24 that the current value detected by the reactor current detection part 113 does not exceed the over-current determination value, the controller 30 determines whether a warning is issued (step S31). This is to determine whether it is in a state where a warning is issued when the current value does not exceed the over-current determination value.

If it is determined that a warning is issued (step S31: YES) the controller 30 determines whether the operation time reaches the retry reset time (step S32). If it reaches the retry reset time, it is necessary to cancel the warning.

If it is determined that it reaches the retry reset times (step S32: YES), the controller 30 cancels the warning and resets the counter to set the number of times of retrying to zero (step S33). After the process of step S33 has ended, the controller returns the process to step S23.

On the other hand, if it is determined in step S26 that a warning is not issued (step S26: NO), the controller 30 issues a warning (step S34). This is to issue a warning as a light abnormality if an over-current is generated.

After the process of step S34 has ended, the controller 30 proceeds the process flow to step S100.

On the other hand, if it is determined in step S27 that the operation time does not reach the retry reset time (step S27: NO), the controller 30 cancels the warning and resets the counter to set the number of times of retrying to zero.

After the process of step S35 has ended, the controller 30 returns the process to step S30.

On the other hand, if it is determined in step S29 that the number of times of retrying reaches N times (step S29: YES), the controller 30 stops the up-down converter 100 completely and issues an alarm (step S36). This is because, if the drive control of the up-down converter 100 is continued any longer, the up-down converter 100 may be given damage. Step S36 is a process performed as a third process in the drive control method of the up-down converter according to the present embodiment.

After the process of step S36 has ended, the controller 30 ends the drive control process.

As mentioned above, according to the drive control apparatus of the up-down converter according to the present embodiment, when the motor 115 requires a large amount of electric power or a large amount of regenerative electric power is generated, and when an over-current is generated, the up-down converter 100 is stopped for a very short time to permit the over-current to flow for the very short time, and repeating this to enable supply or recover of a large amount of electric power.

Thereby, the motor 115 can be efficiently driven as compared to a conventional case where the up-down converter is completely stopped when an over-current is generated for a very short time.

Additionally, because when an over-current for a very short time is permitted for a predetermined number of times or more, the up-down converter 100 is stopped completely, the up-down converter 100 is prevented from being damaged and the drive control can be performed in safe.

As mentioned above, if the number of generations of an over-current (that is, the number of times of retrying) is smaller than N times, a warning is issued as a light abnormality has occurred, and, when the number of generations of an over-current reaches N times, it is determined that a heavy abnormality has occurred and the up-down converter is stopped completely and an alarm is issued. However, such an issuance of the warning is not always necessary, and it may be configured so that a warning is not issued until the number of generations of an over-current reaches N times and when the number of generations of an over-current reaches N times, the alarm may be issued as a warning representing an abnormality.

Additionally, in the above explanation, when the number of times of retrying exceeds the predetermined number N, the up-down converter 100 is stopped completely. However, when the current value detected by the reactor current detection part 113 exceeds the over-current determination value as the first threshold value, the drive of the up-down converter may be stopped, and, additionally, when the current value detected by the reactor current detection part 113 decreases to the retry start current value which is the second threshold value lower than the first threshold value, the drive of the up-down converter 100 is resumed, and, further, when the passed time from the time at which the drive of the up-down converter 100 is resumed until the time at which the current value detected by the reactor current detection part 113 exceeds the first threshold value again is equal to or shorter than a predetermined time, it may be determined that an abnormality due to an over-current has occurred. That is, in the above-mentioned embodiment, it is determined that an abnormality has occurred at the time of stopping the up-down converter 100 as a light abnormality has occurred for the first time, and the controller 30 does not permit the up-down converter 100 to resume the drive. In this case, the predetermined time may be set in accordance with a performance and a rate of equipments to which the up-down converter 100 is applied.

Moreover, although a mode of directly connecting the direct-current drive motor 115 to the output terminals 106 was explained in the above embodiment, a motor driven by an alternating current may be connected to the output terminals 106 through an inverter.

It should be noted that the control part of the drive control apparatus of the up-down converter according to the present embodiment may be realized by either an electronic circuit or an operation processing device.

As explained above, the present specification discloses the following items.

(Additional Remark 1)

A hybrid construction machine comprising:

a motor generator system connected to an internal combustion engine and performing a motor generator operation;

an electric power accumulation system connected to said motor generator system;

a load drive system connected to said electric power accumulation system and being driven electrically;

an abnormality detection part equipped to said motor generator system, said electric power accumulation system and said load drive system; and a main control part determining whether an abnormality has occurred based on a detection value of said abnormality detection part, wherein, when said abnormality determination part determines that an abnormality has occurred, said main control part stops a drive of a drive system in which the abnormality is detected in said load drive system.

(Additional Remark 2)

The hybrid construction machine as recited in additional remark 1, wherein said main control part continues driving said motor generator system and said electric power accumulation system when an abnormality is detected in said load drive system.

(Additional Remark 3)

The hybrid construction machine as recited in additional remark 2, comprising a DC bus connected with said electric power accumulation system, said load drive system and said motor generator system, and wherein said main control part performs a control of said electric power accumulation system so that a voltage value of said DC bus becomes a previously determined target value after a determination of an abnormality of said motor generator system or said load drive system is made by said abnormality detection part.

(Additional Remark 4)

The hybrid construction machine as recited in additional remark 2 or 3, wherein said electric power accumulation system is equipped with an electric power accumulation system abnormality detection part, and, when a detection value of said electric power accumulation system exceeds a previously determined threshold value, said main control part stops said electric power accumulation system.

(Additional Remark 5)

The hybrid construction machine as recited in any one of additional remarks 2 through 4, further comprising an electric power accumulator contained in said electric power accumulation system and a charge voltage value detection part detecting a charge voltage value of said electric power accumulator, and wherein, when the charge voltage value detected by said charge voltage value detection part is apart from a previously determined range for each time of an abnormality determination of said load drive system, said main control part stops driving said motor generator system.

(Additional Remark 6)

The hybrid construction machine as recited in additional remark 1, further comprising a work element driven by a hydraulic pressure generated by a drive force of said internal combustion engine or said motor generator, and an electric work element which is driven electrically, and wherein, when an abnormality of said electric power accumulation system is detected by said abnormality detection part, said main control part stops driving said electric work element.

(Additional Remark 7)

The hybrid construction machine as recited in additional remark 6, wherein, when an abnormality of said electric power accumulation system is detected by said abnormality detection part, said main control part further stops a drive control system of said electric work element.

(Additional Remark 8)

The hybrid construction machine as recited in additional remark 6 or 7, wherein, said main control part is configured to control an output of a hydraulic pump generating said hydraulic pressure, and, when an abnormality of said electric power accumulation system is detected by said abnormality detection part, said main control part further limits an output of said hydraulic pump.

(Additional Remark 9)

The hybrid construction machine as recited in any one of additional remarks 6 through 8, wherein, said electric power accumulation system includes a DC bus connecting between said motor generator and said electric work element, and an up-down converter provided between said DC bus and said electric power accumulator.

(Additional Remark 10)

The hybrid construction machine as recited in additional remark 1, wherein, when an abnormality is detected in said motor generator system or said electric power accumulation system, said main control part stops driving said load drive system.

(Additional Remark 11)

The hybrid construction machine as recited in additional remark 10, wherein said main control part continues a charge and discharge control of said electric power accumulation system before and after an abnormality determination.

(Additional Remark 12)

The hybrid construction machine as recited in additional remark 10 or 11, wherein said load drive system includes a turning electric motor, and, said control part, when it is determined that an abnormality occurs, stops driving said turning electric motor.

(Additional Remark 13)

The hybrid construction machine as recited in any one of additional remarks 10 through 12, wherein said main control part is further configured to perform a drive control of a hydraulic pump that generates a hydraulic pressure, and, when an abnormality of said motor generator or a drive control system of said motor generator is detected, said main control part limits an amount of discharge of said hydraulic pump.

(Additional Remark 14)

The hybrid construction machine as recited in any one of additional remarks 10 through 13, wherein said load drive system includes a boom regenerative generator, and said control part, when it is determined that an abnormality occurs, stops driving said boom regenerative generator.

(Additional Remark 15)

The hybrid construction machine as recited in additional remarks 1, wherein said load drive system is an attraction system connected to said electric power accumulation system, and said main control part continues driving said attraction system before and after an abnormality determination.

(Additional Remark 16)

The hybrid construction machine as recited in additional remarks 15, wherein, when said attraction system is magnetized after an abnormality is detected by said abnormality detection part, said main control part demagnetizes said attraction system based on an operation instruction being input to demagnetize said attraction system.

(Additional Remark 17)

The hybrid construction machine as recited in additional remarks 15 or 16, wherein said main control part, when it is determined that an abnormality of said electric power accumulation system has occurred, permits a drive control of said attraction system to continue according to a generating operation of said motor generator system.

(Additional Remark 18)

The hybrid construction machine as recited in additional remarks 15 or 16, wherein said main control part, when it is determined that an abnormality of said motor generator system has occurred, permits a drive control of said attraction system to continue according to a discharge operation of said electric power accumulation system.

(Additional Remark 19)

The hybrid construction machine as recited in any one of additional remarks 15 through 18, wherein said main control part, when it is determined that an abnormality of said internal combustion engine has occurred, permits a drive control of said attraction system to continue according to a discharge operation of said electric power accumulation system.

(Additional Remark 20)

The hybrid construction machine as recited in additional remark 1, further comprising a hydraulic pump driven by said internal combustion engine, and wherein said main control part includes an assist abnormality determination part, which determines an assist abnormality based on a detection value of said abnormality detection part, and an engine-stall prevention part, which maintains an output upper limit value of said internal combustion engine at a higher state than an output value of said hydraulic pump when a determination of the assist abnormality is made by said assist abnormality determination part.

(Additional Remark 21)

The hybrid construction machine as recited in additional remark 20, wherein said engine-stall prevention part decreases an output value of said hydraulic pump to a value equal to or lower than the output upper limit value of said internal combustion engine.

(Additional Remark 22)

The hybrid construction machine recited in additional remark 20 or 21, further comprising a pump output control part controlling an output of said hydraulic pump, and wherein said pump output control part controls the output of said hydraulic pump by controlling a tilt-roll angle of said hydraulic pump.

(Additional Remark 23)

The hybrid construction machine as recited in additional remark 20 or 21, wherein said engine-stall prevention part increases an output upper limit value of said internal combustion engine to a value equal to or higher than the output upper limit value of said hydraulic pump.

(Additional Remark 24)

The hybrid construction machine as recited in additional remark 23, further comprising an engine revolution number detection part detecting an engine revolution number of said internal combustion engine, and wherein, when the engine revolution number detected by said engine revolution number detection part is higher than a maximum output generation revolution number, said engine-stall prevention part increases an output of said internal combustion engine by decreasing the engine revolution number.

(Additional Remark 25)

The hybrid construction machine as recited in additional remark 23, further comprising an engine revolution number detection part detecting an engine revolution number of said internal combustion engine, and wherein, when the engine revolution number detected by said engine revolution number detection part is lower than a maximum output generation revolution number, said engine-stall prevention part increases an output of said internal combustion engine by increasing the engine revolution number.

(Additional Remark 26)

The hybrid construction machine as recited in any one of additional remarks 23 through 25, further comprising a pump output control part that controls the output of said hydraulic pump so that the output of said hydraulic pump is equal to or lower than the output of said internal combustion engine.

(Additional Remark 27)

The hybrid construction machine as recited in any one of additional remarks 23 through 26, wherein the output of said hydraulic pump is computed based on an amount of operation of an operation part to operate a work element driven by said hydraulic pressure (Additional Remark 28)

The hybrid construction machine as recited in additional remark 1, further comprising:

a cooling apparatus cooling a drive control part of a motor generator or a drive control part of said motor generator contained in said motor generator system; and a cooling abnormality detection part provided in said cooling apparatus to detect an abnormality of said cooling apparatus, wherein said main control part performs an abnormality determination of said cooling apparatus based on a result of detection of said cooling abnormality detection part, and continues a control of said motor generator system and said electric power accumulation system before and after the abnormality determination.

(Additional Remark 29)

The hybrid construction machine as recited in additional remark 28, wherein said main control part compares a detected value of said abnormality detection part with a first threshold value, and limits an output of one of which the detection value is equal to or higher than the first threshold value.

(Additional Remark 30)

The hybrid construction machine as recited in additional remark 28 or 29, further comprising a drive control abnormality detection part provided in a drive control part of said motor generator or a drive control part of said load drive system, and wherein said main control part compares a detected value of said drive control abnormality detection part with a first threshold value, and limits an output of one of which the detection value is equal to or higher than the first threshold value.

(Additional Remark 31)

The hybrid construction machine as recited in any one of additional remarks 28 through 30, wherein said main control part compares a detection part of said drive control abnormality detection part with a second threshold value, and prohibits a continuous drive of one of which the detection value is equal to or larger than the second threshold value.

(Additional Remark 32)

The hybrid construction machine as recited in any one of additional remarks 28 through 31, wherein said cooling apparatus cools an electric work element of said electric load drive system or a drive control part of said electric work element.

(Additional Remark 33)

The hybrid construction machine as recited in additional remarks 28, wherein, said cooling apparatus cools a drive control part of an electric work element of said electric load system, and, thereafter, cools said electric work element.

(Additional Remark 34)

The hybrid construction machine as recited in any one of additional remarks 28 through 30, wherein said cooling apparatus cools said motor generator or an electric work element of said electric load system, and, thereafter, cools a reduction machine.

(Additional Remark 35)

The hybrid construction machine as recited in any one of additional remarks 28 through 31, wherein said cooling apparatus includes a radiator so that a cooling water cooled by said radiator is directly supplied to said main control part.

(Additional Remark 36)

The hybrid construction machine as recited in additional remark 1, further comprising a hydraulic pump that is driven by said internal combustion engine, wherein said main control part, when detects an abnormality of a hydraulic system, sets an output upper limit value of said hydraulic pump to a value lower than that in a normal time.

(Additional Remark 37)

The hybrid construction machine as recited in additional remark 36, wherein said main control part, when it detects an abnormality of said hydraulic system, sets an upper limit value of an assist output of a motor generator contained in said motor generator system to a value lower than that in a normal time.

(Additional Remark 38)

The hybrid construction machine as recited in additional remark 36 or 37, wherein the output upper limit value of said internal combustion engine is fixed before and after an occurrence of an abnormality in said hydraulic system.

(Additional Remark 39)

The hybrid construction machine as recited in additional remark 1, further comprising at least one of an electric power accumulation system abnormality detection part that detects an abnormality of said electric power accumulation system containing a direct current voltage converter and an electric power accumulator, and an engine system abnormality detection part that detects an abnormality of said internal combustion engine, wherein said main control part controls an inverter circuit and said direct current voltage converter to increase an output dependency to said internal combustion engine relatively as compared to an output dependency to said electric power accumulation system when an abnormality of said electric power accumulation system is detected by said electric power accumulation system abnormality detection part, and increase the output dependency to said electric power accumulation system relatively as compared to the output dependency to said internal combustion engine when an abnormality of said internal combustion engine is detected by engine system abnormality detection part.

(Additional Remark 40)

The hybrid construction machine as recited in additional remark 39, wherein, when an abnormality of said electric power accumulation system is detected by said electric power accumulation system abnormality detection part, said main control part decreases an output upper limit value of said electric power accumulator.

(Additional Remark 41)

The hybrid construction machine as recited in additional remark 39 or 40, wherein, when an abnormality of said electric power accumulation system is detected by said electric power accumulation system abnormality detection part, said main control part increases an output upper limit value of said internal combustion engine.

(Additional Remark 42)

The hybrid construction machine as recited in any one of additional remarks 39 through 41, wherein, when an abnormality of said internal combustion engine is detected by said engine system abnormality detection part, said main control part decreases an output upper limit value of said internal combustion engine.

(Additional Remark 43)

The hybrid construction machine as recited in any one of additional remarks 39 through 42, wherein, when an abnormality of said internal combustion engine is detected by said engine system abnormality detection part, said main control part increases an output upper limit value of said electric power accumulator.

(Additional Remark 44)

The hybrid construction machine as recited in additional remark 1, further comprising:

a drive control apparatus of an up-down converter connected between said electric power accumulation system and a load that performs both a power running operation and a regenerative operation; and a current detection part that detects a current flowing in said up-down converter, wherein said main control part drives said up-down converter so that a voltage value of a DC bus between said load and said up-down converter follows a target voltage value, and wherein, when a current value detected by said current detection part exceeds a first threshold value, said main control part causes a drive of said up-down converter to stop, and, when a current value detected by said current detection part decreases to a second threshold value lower than said first threshold value, said main control part causes a drive of said up-down converter to resume, and, when a number of times where a current value detected by said current detection part exceeds said first threshold value becomes equal to or larger than a predetermined number of times, said main control part determines that an abnormality due to an over-current has occurred.

(Additional Remark 45)

The hybrid construction machine as recited in additional remark 44, further comprising a counter that accumulates a number of times where a current value detected by said current detection part exceeds said first threshold value, and wherein, when said counter is not incremented for a predetermined time, said main control part resets an accumulated value of said counter.

(Additional Remark 46)

The hybrid construction machine as recited in additional remark 44 or 45, wherein, when a time passed from a time at which a drive of said up-down converter is resumed until a time at which a current value detected by said current detection part exceeds said first threshold value again is equal to or shorter than a predetermine time, said main control part determines that an abnormality due to an over-current has occurred.

(Additional Remark 47)

The hybrid construction machine as recited in any one of additional remarks 44 through 46, wherein, when it is determined that an abnormality due to said over-current has occurred, said main control part causes said up-down converter to stop and does not permit resumption of drive.

(Additional Remark 48)

The hybrid construction machine as recited in any one of additional remarks 44 through 47, wherein, a current value detected by said current value detection part exceeds the first threshold value, said main control part determines that said up-down converter has a light abnormality that is lighter than said abnormality in a level.

(Additional Remark 49)

A drive control method of an up-down converter connected between an electric power accumulation system and a load performing both a power running operation and a regenerative operation, comprising:

stopping a drive of said up-down converter when a current value detected by a current detection part exceeds a first threshold value;

resuming the drive of said up-down converter when a current value detected by said current detection part decreases to a second threshold value lower than said first threshold value according to said stopping step; and determining that an abnormality has occurred in said up-down converter when a number of times where a current value detected by said current detection part exceeds the first threshold value is equal to or larger than a predetermined number of times.

The present invention is not limited to the specifically disclosed embodiments mentioned above, and various variations and modifications may be made without departing from the scope of the present invention.

The present invention is applicable to a hybrid construction machine using an up-down converter, which performs a control of an electric power supply to a load and a control of supply of a regenerative electric power to the condenser of the regeneration electric power obtained from a load to an electric power accumulator.

What is claimed is:

1. A hybrid construction machine comprising:
   a lower running body;
   an upper turning body mounted on the lower running body through a turning device;
   a motor generator system connected to an internal combustion engine and performing a motor generator operation, the motor generator system including a first inverter and a motor generator, the first inverter controlling an operation of the motor generator, the motor generator being driven by an alternating current output by the first inverter to operate as a motor and being driven by a drive power of the internal combustion engine to operate as a generator;
   a load drive system driven electrically, the load drive system including a second inverter and a turning electric motor, the second inverter controlling an operation of the turning electric motor, the turning electric motor being contained in the turning device and driven by an alternating current output by the second inverter to drive the turning device;
   an electric power accumulation system connected to the first inverter of the motor generator system and the second inverter of the load drive system, the electric power accumulation system including an electric power accumulator that accumulates DC electric power and a DC bus;
   an abnormality detection part operatively connected to the motor generator system, the electric power accumulation system and the load drive system, the abnormality detection part detecting an abnormality in the motor generator system, the electric power accumulation system, and the load drive system; and
   a main control part that determines an occurrence of the abnormality based on a detection value of the abnormality detection part,
   wherein the main control part stops driving the motor generator system in response to the abnormality detection part detecting the abnormality in the electric power accumulation system.

2. The hybrid construction machine as claimed in claim 1, wherein the main control part stops driving the load drive system in response to the abnormality detection part detecting the abnormality in the electric power accumulation system.

3. The hybrid construction machine as claimed in claim 1, wherein
   the abnormality detection part is provided in the electric power accumulation system, and
   the main control part stops the electric power accumulation system in response to the detection value of the abnormality detection part exceeding a predetermined threshold value.

4. The hybrid construction machine as claimed in claim 1, further comprising:
   a hydraulic pump driven by the internal combustion engine,
   wherein the main control part reduces an output value of the hydraulic pump in response to the abnormality detection part detecting the abnormality in the electric power accumulation system.

5. The hybrid construction machine as claimed in claim 1, wherein the main control part continues driving the internal combustion engine in response to the abnormality detection part detecting the abnormality in the electric power accumulation system.

6. The hybrid construction machine as claimed in claim 1, wherein
   the load drive system is connected to the electric power accumulation system, and
   wherein the main control part stops driving the load drive system in response to the abnormality detection part detecting the abnormality in the electric power accumulation system.

7. The hybrid construction machine as claimed in claim 6, wherein
   the abnormality detection part is provided in the electric power accumulation system, and
   the main control part stops the electric power accumulation system in response to the detection value of the abnormality detection part exceeding a predetermined threshold value.

8. The hybrid construction machine as claimed in claim 6, further comprising:
   a hydraulic pump driven by the internal combustion engine,
   wherein the main control part reduces an output value of the hydraulic pump in response to the abnormality detection part detecting the abnormality in the electric power accumulation system.

9. The hybrid construction machine as claimed in claim 6, wherein the main control part continues driving the internal combustion engine in response to the abnormality detection part detecting the abnormality in the electric power accumulation system.

10. The hybrid construction machine as claimed in claim 1, wherein
    the load drive system is connected to the electric power accumulation system, and
    wherein the main control part continues driving the load drive system in response to the abnormality detection part detecting the abnormality in the motor generator system.

11. The hybrid construction machine as claimed in claim 10, further comprising:
    a hydraulic pump driven by the internal combustion engine,
    wherein the main control part reduces an output value of the hydraulic pump in response to the abnormality detection part detecting the abnormality in the electric power accumulation system.

12. The hybrid construction machine as claimed in claim 10, wherein the main control part continues driving the internal combustion engine in response to the abnormality detection part detecting the abnormality in the electric power accumulation system.

13. The hybrid construction machine as claimed in claim 10, wherein the main control part stops driving the load drive system in response to the abnormality detection part detecting the abnormality in the electric power accumulation system.

* * * * *